(12) United States Patent
Lochhead et al.

(10) Patent No.: US 8,484,355 B1
(45) Date of Patent: Jul. 9, 2013

(54) SYSTEM AND METHOD FOR CUSTOMER PROVISIONING IN A UTILITY COMPUTING PLATFORM

(75) Inventors: Jason A. Lochhead, Frisco, TX (US); Randy Rowland, Argyle, TX (US); Stephen R. Johnson, Jr., Flower Mound, TX (US); Manikandan Subramanian, Flower Mound, TX (US); Emmanuel Kothapally, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 386 days.

(21) Appl. No.: 12/957,768

(22) Filed: Dec. 1, 2010

Related U.S. Application Data

(63) Continuation of application No. 12/829,877, filed on Jul. 2, 2010, now abandoned, which is a continuation-in-part of application No. 12/468,525, filed on May 19, 2009.

(60) Provisional application No. 61/054,576, filed on May 20, 2008, provisional application No. 61/223,208, filed on Jul. 6, 2009, provisional application No. 61/247,277, filed on Sep. 30, 2009, provisional application No. 61/285,666, filed on Dec. 11, 2009, provisional application No. 61/313,336, filed on Mar. 12, 2010, provisional application No. 61/328,456, filed on Apr. 27, 2010.

(51) Int. Cl.
*G06F 15/173* (2006.01)
*G06F 15/177* (2006.01)

(52) U.S. Cl.
USPC .............. 709/226; 709/222; 709/223

(58) Field of Classification Search
USPC ........................................................ 709/226
See application file for complete search history.

(56) References Cited

U.S. PATENT DOCUMENTS

| | | | |
|---|---|---|---|
| 5,951,644 A | 9/1999 | Creemer | |
| 5,999,162 A * | 12/1999 | Takahashi et al. | 345/440.1 |
| 6,181,613 B1 * | 1/2001 | Yoshida | 365/191 |
| 6,516,350 B1 | 2/2003 | Lumelsky et al. | |
| 6,785,592 B1 | 8/2004 | Smith et al. | |
| 6,792,399 B1 | 9/2004 | Phillips et al. | |
| 7,130,807 B1 | 10/2006 | Mikurak | |
| 7,263,583 B2 | 8/2007 | Hood et al. | |
| 7,730,183 B2 * | 6/2010 | Brown et al. | 709/226 |
| 7,743,001 B1 | 6/2010 | Vermeulen et al. | |
| 7,894,918 B2 * | 2/2011 | Kanodia et al. | 700/17 |
| 2001/0014868 A1 | 8/2001 | Herz et al. | |
| 2002/0052941 A1 * | 5/2002 | Patterson | 709/223 |
| 2002/0075244 A1 * | 6/2002 | Tani et al. | 345/173 |
| 2003/0055677 A1 | 3/2003 | Brown et al. | |
| 2004/0031030 A1 * | 2/2004 | Kidder et al. | 717/172 |
| 2004/0034580 A1 * | 2/2004 | Okamura | 705/28 |
| 2004/0186905 A1 | 9/2004 | Young et al. | |

(Continued)

*Primary Examiner* — Richard G Keehn

(57) ABSTRACT

Systems and methods are provided for provisioning a virtual server. An identification of an operating system, a server name, a number of processors, a memory amount, and a disk storage amount is received, and a virtual server is provisioned by provisioning a number of processors, an amount of memory, and an amount of storage resources based on the identified number of processors, the identified memory amount, and the identified disk storage amount. Resource usage of the virtual server is monitored, and additional resources for the virtual server are provisioned if burst resource usage mode is enabled for the virtual server.

46 Claims, 180 Drawing Sheets

U.S. PATENT DOCUMENTS

| | | |
|---|---|---|
| 2005/0005158 A1 | 1/2005 | Alaluf |
| 2005/0044301 A1* | 2/2005 | Vasilevsky et al. ............... 711/1 |
| 2005/0120160 A1* | 6/2005 | Plouffe et al. ..................... 711/1 |
| 2005/0234935 A1 | 10/2005 | Barsness et al. |
| 2005/0240558 A1* | 10/2005 | Gil et al. ........................... 707/1 |
| 2005/0240668 A1 | 10/2005 | Rolia et al. |
| 2006/0095601 A1* | 5/2006 | Wang et al. ..................... 710/14 |
| 2006/0112075 A1 | 5/2006 | Hellerstein et al. |
| 2006/0155708 A1* | 7/2006 | Brown et al. .................... 707/10 |
| 2006/0248023 A1 | 11/2006 | Caprini et al. |
| 2007/0094367 A1* | 4/2007 | Esfahany et al. ............. 709/223 |
| 2007/0266136 A1* | 11/2007 | Esfahany et al. ............. 709/223 |
| 2008/0127186 A1* | 5/2008 | Kanodia et al. ............... 718/101 |
| 2008/0270692 A1* | 10/2008 | Cochran et al. ............... 711/114 |
| 2008/0301674 A1* | 12/2008 | Faus .................................. 718/1 |
| 2008/0313357 A1* | 12/2008 | Wang et al. ..................... 710/14 |
| 2009/0037682 A1* | 2/2009 | Armstrong et al. ........... 711/164 |
| 2009/0070781 A1* | 3/2009 | Fitzgerald et al. ............ 719/316 |
| 2009/0217267 A1* | 8/2009 | Gebhart et al. ............... 718/100 |
| 2009/0240910 A1* | 9/2009 | Inomata et al. ............... 711/171 |
| 2009/0248847 A1* | 10/2009 | Sutoh et al. ................... 709/223 |
| 2009/0271472 A1* | 10/2009 | Scheifler et al. .............. 709/202 |
| 2009/0327596 A1* | 12/2009 | Christenson et al. ......... 711/105 |
| 2010/0175070 A1* | 7/2010 | Baba ............................. 718/105 |
| 2010/0198972 A1* | 8/2010 | Umbehocker ................ 709/226 |

* cited by examiner

☐ Infinicenter Environment: Messaging Platform- Microsoft Internet Explorer provided by Terremark ☐ ☐ ☒

Colo Environment

☐ Save ⊕ Upgrade ⟳ Refresh | ☆ Favorites

| Name: | Messaging Platform |
| --- | --- |
| Virtual Center: | Miami Colo Infinistructure |
| Cluster: | MIA9000IVCL2201 |
| Resource Pool: | 35513_MIA_1 |
| # of Virtual Machines: | 0 |

☑ Active —206

Resources:

| CPU | Memory | Storage |
| --- | --- | --- |
| Purchased: 1000 MHz | Purchased: 2048 MB | Purchased: 130 GB |
| Allocated: 0 VPUs | Allocated: 0 MB | Allocated: 0 GB |
| Used: 0 MHz | Used: 0 MB | Used: 0 GB |

—208

Networks:

[ Add ] [ Remove ]

| Name | VLAN Id |
| --- | --- |
| | |

[ Details ] [ Quotes ] [ Transaction History ] [ History ]

Done | 🖳 Local Intranet | ⊕ 100 %

Upgrade Environment

Save

| Organization: | SampleCompany, LLC |
| --- | --- |
| Environment: | Messaging Platform |

Available New Quotes

| Quote | Contract | Location | Term (Mos) | Proc. (MHz) | Memory (MB) | Storage (GB) |
| --- | --- | --- | --- | --- | --- | --- |
| 53711 | XXX-YYY-ZZZ | Miami | 12 | 10000 | 20480 | 0 |
| 53712 | XXX-YY-ZZZ | Miami | 12 | 10000 | 20480 | 0 |
| 53714 | BBB-UU-ZZZZ | Miami | 12 | 1000 | 0 | 0 |

Resources

|  | Current | Upgraded |
| --- | --- | --- |
| Processor: | 1000 MHz | 2000 MHz |
| Memory: | 2048 MB | 2048 MB |
| Storage: | 130 GB | 130 GB |

Environment Options

Activation Date: 5/13/2008

● Yes > Quotes: -SELECT-
○ No

Co-terminus:

Create Server

ⓥ Template ⓥ Configuration ⓥ Network Settings ⓥ Row/Group Location ⓥ Review and Save

| | |
|---|---|
| Server Name: | Cyclotron |
| Operating System: | Microsoft Windows Server 2003, Enterprise Edition (32-bit) |
| Processors: | 1 |
| Licensing Cost: | $0/mo. |
| System Disk: | 20 GB |
| Memory: | 1000 MB |
| IP Address: | 10.122.181.11 |
| Subnet Mask: | 255.255.255.0 |
| Default Gateway: | 10.122.181.1 |
| Primary DNS Server: | |
| Secondary DNS Server: | |

☐ Power the server on when created

☐ AGREEMENT: I understand that I will be charged for all licensing and resource usage fees when I click the "Deploy" button below.

[Deploy]  [Back]  [Cancel]

| Date | Transaction | Environment | Name/ID | Description | User |
|---|---|---|---|---|---|
| 05/06/2008 | Create Server • Windows Server 2003 Std., 64Bit-UD (Per CPU) | PLM Infinicenter Beta | BizTalk | 1 processor | Danny Jones |
| 05/06/2008 | Create Server • Windows Server 2003 Std., 64Bit-UD (Per CPU) | PLM Infinicenter Beta | Web | 1 processor | Danny Jones |
| 05/06/2008 | Delete Server • Windows Server 2003 Std., 64Bit-UD (Per CPU) | PLM Infinicenter Beta | x64Test | 1 processor | Jason Lochhead |
| 05/05/2008 | Create Server • Windows Server 2003 Std., 64Bit-UD (Per CPU) | PLM Infinicenter Beta | x64Test | 1 processor | Jason Lochhead |
| 05/05/2008 | Create Server • Windows Server 2003 Std., 64Bit-UD (Per CPU) | PLM Infinicenter Beta | JL01 | 1 processor | Jason Lochhead |
| 05/05/2008 | Delete Server • Windows Server 2003 Std., 64Bit-UD (Per CPU) | PLM Infinicenter Beta | CentOSx64 | 1 processor | Jason Lochhead |
| 05/05/2008 | Delete Server • Windows Server 2003 Std., 64Bit-UD (Per CPU) | PLM Infinicenter Beta | W2K8x86 | 1 processor | Jason Lochhead |
| 05/05/2008 | Delete Server • Windows Server 2003 Std., 64Bit-UD (Per CPU) | PLM Infinicenter Beta | testServer | 4 processors | Jason Lochhead |
| 05/02/2008 | Processor Increase • Windows Server 2003 Std., 64Bit-UD (Per CPU) | PLM Infinicenter Beta | testServer | From 2 to 4 | Jonathan Avedikian |
| 05/02/2008 | Create Server • Windows Server 2003 Std., 64Bit-UD (Per CPU) | PLM Infinicenter Beta | testServer | 2 processors | Jonathan Avedikian |
| 05/02/2008 | Delete Server • Windows Server 2003 Std., 64Bit-UD (Per CPU) | PLM Infinicenter Beta | TestRH | 4 processors | Jonathan Avedikian |
| 05/02/2008 | Processor Increase • Windows Server 2003 Std., 64Bit-UD (Per CPU) | PLM Infinicenter Beta | TestRH | From 2 to 4 | Jonathan Avedikian |
| 05/02/2008 | Create Server • Windows Server 2003 Std., 64Bit-UD (Per CPU) | PLM Infinicenter Beta | TestRH | 2 processors | Jonathan Avedikian |
| 05/01/2008 | Delete Server • Windows Server 2003 Std., 64Bit-UD (Per CPU) | PLM Infinicenter Beta | Kevin | 2 processors | Jonathan Avedikian |
| 05/01/2008 | Delete Server • Windows Server 2003 Std., 64Bit-UD (Per CPU) | PLM Infinicenter Beta | jaosrv1 | 4 processors | Jonathan Avedikian |
| 05/01/2008 | Delete Server • Windows Server 2003 Std., 64Bit-UD (Per CPU) | PLM Infinicenter Beta | testsrv01 | 4 processors | Jonathan Avedikian |

Fig. 27

Cluster MIA21717VCL301 — Colo Virtual Center Cluster: MIA21717VCL301 - Microsoft Internet Explorer provided by Terremark Save | Refresh | ☆ Favorites

| Name: | Organization | Memory (MB) | Proc. (MHz) | Storage (GB) | Active |
|---|---|---|---|---|---|
| Company 1 | Organization 1 | 20480 | 10000 | 250 | ☑ |
| Company 2 | Organization 2 | 20480 | 10000 | 250 | ☑ |
| Company 3 | Organization 3 | 20480 | 10000 | 250 | ☑ |
| Company 4 | Organization 4 | 20480 | 10000 | 250 | ☑ |
| Company 5 | Organization 5 | 20480 | 10000 | 250 | ☑ |
| Company 6 | Organization 6 | 20480 | 10000 | 250 | ☑ |
| Company 7 | Organization 7 | 20480 | 10000 | 250 | ☑ |
| Company 8 | Organization 8 | 20480 | 10000 | 250 | ☑ |
| Company 9 | Organization 9 | 20480 | 10000 | 250 | ☑ |

— 732

Details | Environments | History

Done | Trusted sites | 100%

Fig. 34A digitalOps

INFINICENTER — X: OPERATING SYSTEMS

Find Any ≫ [ ] go | options | sign-out

Export | ☆ Favorites infinicenter

- ☐ Environments
  - ☐ Organizations
- ☐ Administration
  - ☐ Component Types
  - ☐ Configuration
  - ☐ User Registration Settings
  - ☐ License Keys — 164B
  - ☐ Locations
  - ☐ Operating Systems
  - ☐ Revenue Types
- ☐ Virtual Centers
  - ☐ Data Centers
    - ☐ MIA2I717VMCI01
      - ☐ Clusters
        - MIA2I717VCL
  - ☐ Templates

- ☐ Billing
- ☐ Organizations
- ☐ Quoting
- ☐ Catalog
- ☐ Infinicenter
- ☐ Favorites
- ☐ History
- ☐ Administration

| Name | Family | Max. Processors | Min. Memory (MB) | Max. Memory (MB) |
|---|---|---|---|---|
| Microsoft Windows NT 4 | Windows | 1 | 64 | 2048 |
| Microsoft Windows 2000 Server | Windows | 4 | 128 | 4096 |
| Microsoft Windows 2000 Advanced Server | Windows | 2 | 128 | 8192 |
| Microsoft Windows XP Professional (32-bit) | Windows | 2 | 128 | 4096 |
| Microsoft Windows Server 2003, Standard Edition (32-bit) | Windows | 4 | 128 | 4096 |
| Microsoft Windows Server 2003, Datacenter Edition | Windows | 2 | 512 | 65532 |
| Microsoft Windows Small Business Server 2003 | Windows | 2 | 128 | 4096 |
| Microsoft Windows Server 2003, Web Edition | Windows | 2 | 128 | 2048 |
| Microsoft Windows Vista (32-bit) | Windows | 2 | 512 | 65532 |
| Microsoft Windows Server 2008 (32-bit) | Windows 2008 | 2 | 512 | 65532 |
| Microsoft Windows XP Professional (64-bit) | Windows 2008 | 2 | 128 | 4096 |
| Microsoft Windows Server 2003, Standard Edition (64-bit) | Windows | 4 | 128 | 4096 |
| Microsoft Windows Server 2003, Enterprise Edition (64-bit) | Windows | 4 | 128 | 65532 |
| Microsoft Windows Vista (64-bit) | Windows 2008 | 2 | 512 | 65532 |
| Microsoft Windows Server 2003, Datacenter Edition (64-bit) | Windows | 2 | 512 | 65532 |
| Microsoft Windows Server 2008 (64-bit) | Windows 2008 | 4 | 512 | 65532 |
| Novell NetWare 5.1 | NetWare | 1 | 256 | 4096 |
| Novell NetWare 6.x | NetWare | 1 | 512 | 65532 |
| Sun Solaris 10 (32-bit) | Solaris | 4 | 256 | 65532 |
| Sun Solaris 10 (64-bit) | Solaris | 4 | 256 | 65532 |
| Ubuntu Linux (32-bit) | Linux | 4 | 64 | 65532 |
| Ubuntu Linux (64-bit) | Linux | 4 | 64 | 65532 |
| Suse Linux Enterprise Server (32-bit) | Linux | 4 | 256 | 65532 |
| Suse Linux Enterprise Server 10 (32-bit) | Linux | 4 | 256 | 65532 |
| Suse Linux Enterprise Server (64-bit) | Linux | 4 | 256 | 65532 |
| Suse Linux Enterprise Server 10 (64-bit) | Linux | 4 | 256 | 65532 |
| Red Hat Enterprise Linux 2 | Linux | 4 | 256 | 65532 |
| Red Hat Enterprise Linux 3 (32-bit) | Linux | 4 | 256 | 65532 |
| Red Hat Enterprise Linux 4 (32-bit) | Linux | 4 | 256 | 65532 |

740

Feedback | Support

Create Internet Service

*Indicates required information

*Public IP: Select an IP... — 802
*Protocol: Select a Protocol... — 804
*Port: — 806
*Service Name: — 808
Service Description: — 810

State: ● Enabled - Allow traffic to Node Services — 812
○ Disabled - Stop all traffic to Node Services ✓ Save
✗ Cancel

800

Create Internet Service

*Indicates required information

*Public IP: 72.46.238.10 ▷  — 802
*Protocol: HTTPS ▷  — 804
*Port: 443  — 806
*Service Name: Secure Web Site  — 808

Service Description: [ ] — 810
◀ ▶ — 812

State:  ● ⊘ Enabled - Allow traffic to Node Services
       ○ ⊘ Disabled - Stop all traffic to Node Services ✗ Cancel        ✓ Save

Create Node Service for Internet Service: Jason FTP

Public IP: 72.46.238.10
Protocol + Port: FTP: 21
Persistence: 2 Minute(s)

Node Options
*Indicates required information

- *Network: [Select a Network...▷] — 862
- *Device: [Select a Device...▷] — 864
- *Device IP Address: [Select an IP...▷] — 866

The IP addresses listed have been assigned to this device from within this application. Be sure the selected IP address has been manually added to the selected device.

- *Device Port: [____] — 868
- *Node Name: [____] — 870
- Node Description: [_____] — 872

State: ◉ ✓ Enabled - Allow traffic to this Node Services
       ○ ⊘ Disabled - Stop all traffic to this Node Services

[✗ Cancel]  [✓ Save] — 874

Create Node Service for Internet Service:
Jason FTP

Public IP:         72.46.238.10
Protocol + Port:   FTP: 21
Persistence:       2 Minute(s)

Node Options
*Indicates required information

*Network:            [10.122.181.0/26 (DMZ_150) ▷]  — 862
*Device:             [BlogServer ▷]  — 864
*Device IP Address:  [10.122.181.12 ▷]  — 866

The IP addresses listed have been assigned to this device from within this application. Be sure the selected IP address has been manually added to the selected device.

*Device Port:        [21]  — 868
*Node Name:          [FTP Node 1]  — 870
Node Description:    [                    ]  — 872
                     [◁ □ ▷]

State:  ⦿ ⊘ Enabled - Allow traffic to this Node Services
        ○ ⊘ Disabled - Stop all traffic to this Node Services

[✗ Cancel]          [✓ Save] — 874

```
Create Blank Server
─────────────────────────────
*OS Family:  [Windows ▽]
*Version:    [Microsoft Windows NT4 ▽]
*Server Name: [Test 123]
             Name must use uppercase and/or lowercase letters.
             Name can optionally use numbers (0-9) and the
             hyphen (-) character. Maximum of 15 characters allowed.
*Processors: [1 ▽]
*Memory:     [64] MB
             Memory size must be in multiples of 4
*System Disk Size: [1] GB
             You can create a system disk of 1 GB min. to 512 GB max. You have
             87 GB remaining to use of 350 GB purchased.
*Network:    [10.153.8.48/28 (INT_153) ▽]
*Place in Row: [Web Servers ▽]
*Group:      [Test ▽]

[☑] AGREEMENT: I understand that Service Provider is not responsible or liable for any
             unlicensed software installed on this server.

[✗ Cancel]    [✓ Deploy]
```

Fig. 60

| Copy Server | |
|---|---|
| ⊘ Server Details  ⊕ Network Settings  ○ Name and Location  ○ Review and Save | |

Copy Server: RHEL5-Web
Operating System: Red Hat Enterprise Linux 5 (32-bit)
Licensing Costs: $0.00/mo.

*Indicates required information

*Network: [10.122.136.0/27 (INT_151) ▽]

IP and DNS Settings
 *IP Address: [10.122.136.3 ▽]
 Subnet Mask: 255.255.255.224
 Default Gateway: 10.122.136.1
 Primary DNS Server: [_____] (IP Address)
 Secondary DNS Server: [_____] (IP Address)

[✕ Cancel]  [⇦ Back]  [Next ⇨]

Fig. 64

| Copy Server |
| --- |
| ⓙ Server Details  ⓙ Network Settings  ⓙ Name and Location  ⓙ Review and Save |

```
Server Name:          Cojo123
Operating System:     Red Hat Enterprise Linux 5 (32-bit)
Licensing Cost:       $0.00/mo.
Processor(s):         1
Memory:               1024 MB
Disk Usage:           1 GB Used
                      • Disk 1 : 1 GB (System Disk)
IP Address:           10.122.136.3
Subnet:               10.122.136.0/27 (INT_151)
Default Gateway:      10.122.136.1
Primary DNS:
Secondary DNS:
Row and Group Location:  Jason's Row>Test
```

☑ Power the server on when created

☑ AGREEMENT: I understand that Service Provider is not responsible or liable for any unlicensed software installed on this server.

✖ Cancel   ⇦ Back   ▭ Deploy

Fig. 66

Add New User

Select a user from the company contact list or enter your own. Click "Invite" to send the email invitation to a user.

User is a: ● Company contact >   Stuhl, Katya ▷
         ○ New user

First              First
Full Name: Katya              Stuhl

User Name (Email): katusha4978@gamil.com

☑ Enable Multi-Factor for User

Primary Phone: +1  (817) 777-7777   ext.

1570 — User Role: Other >> ▷

Environment Access

| Environment | Access Level | Billing Access |
|---|---|---|
| Terremark Product Line Management – … | No access ▷ | ☐ Allow billing access |
| Terremark Product Line Management – … | Read-only ▷ | ☑ Allow billing access |

1572                           1574         1576

✗ Cancel    ✓ Invite

| User Audit Log: 1-20 (of 1065) | | | | |
|---|---|---|---|---|
| From: [ ] To: [ ] | | | | [ ] Export |
| User: [All ▽] [ ] Action: [All ▽] | | | | |
| *indicates an active user | | | | |
| [▽ Filter] [◇ Clear] | | | | |
| Date ▽ | Name | User Name (Email) | Action | Details |
| 03/03/2010 11:37:12 | User, Demo | demouser@hrblock.com | Login Succeeded | |
| 03/03/2010 11:21:35 | User, Demo | demouser@hrblock.com | Login Succeeded | |
| 03/03/2010 11:13:45 | User, Demo | demouser@hrblock.com | Login Succeeded | |
| 03/03/2010 11:11:00 | User, Demo | demouser@hrblock.com | Login Succeeded | |
| 03/03/2010 10:51:17 | User, Demo | demouser@hrblock.com | Login Succeeded | |
| 03/03/2010 10:02:10 | User, Demo | demouser@hrblock.com | Login Succeeded | |
| 03/03/2010 16:17:21 | User, Demo | demouser@hrblock.com | Login Succeeded | |
| 03/03/2010 16:13:28 | User, Demo | demouser@hrblock.com | Login Succeeded | |
| 03/02/2010 16:09:10 | Dean, Lincoln | lincolndean@hotmail.com | Login Failed | Primary Authentication Failed: Invalid Password |

Page ⇦ [1] of 54 ⇨

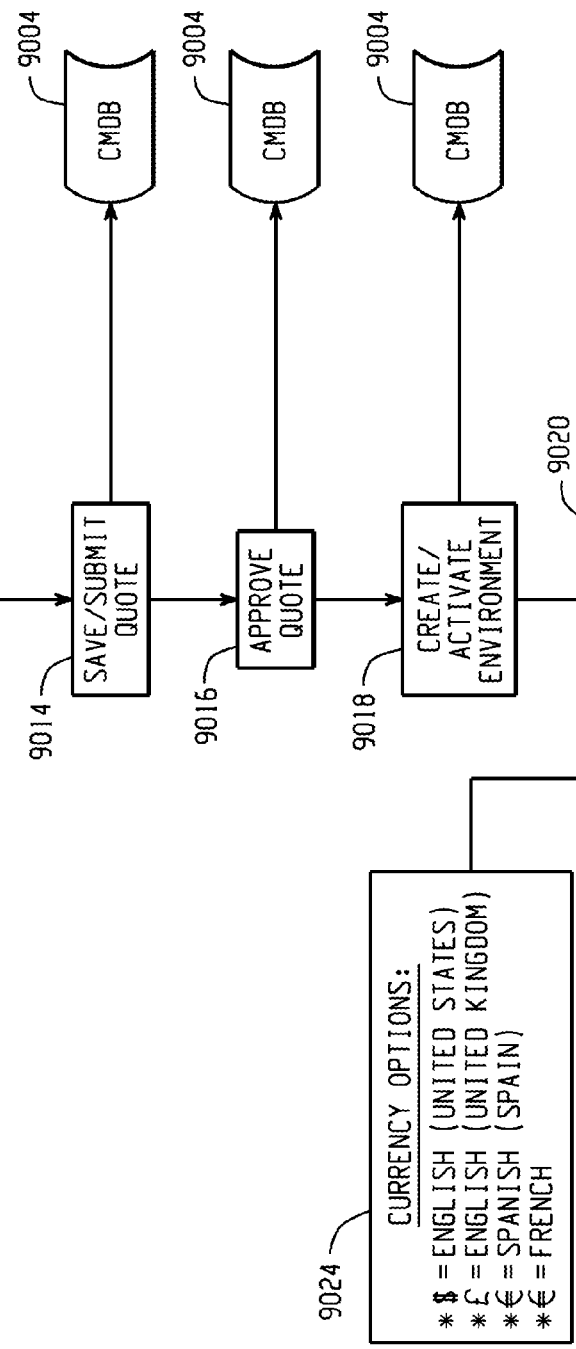
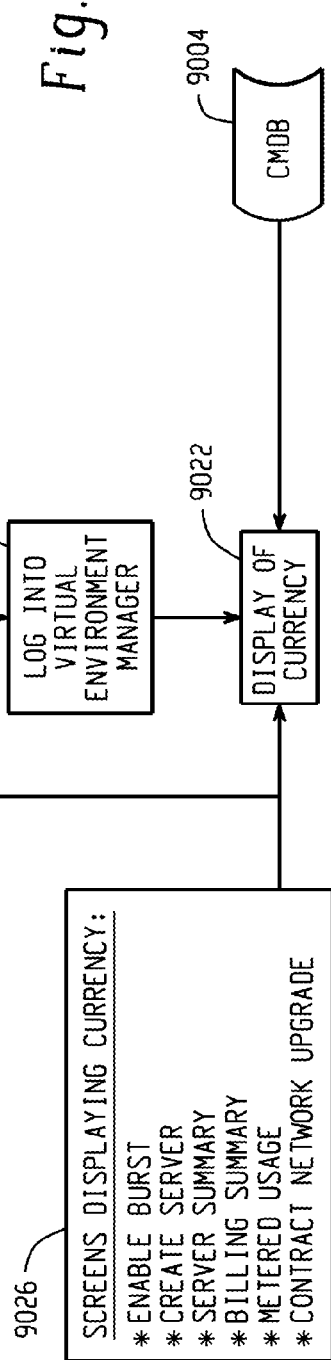
Fig. 90B

Fig. 91B

| PRODUCT CONTAINER HA VPN Router Container | GROUP Devices | PRICE LIST Legacy Price List | | | | | | |
|---|---|---|---|---|---|---|---|---|
| ☐ Save ☐☐☐☐ ☐☐☐☐☐☐ ☐☐ | | | | | | | | |
| Classification | Component | Qty | List | Ext List | Quoted | Ext Quoted | Disc % |
| Network Chassis | HP/Cisco MDS9124 Fabric Switch (24 Ports Active) (AG648A) | 1 | $9,295.00 | $9,295.00 | $9,295.00 | $9,295.00 | 0.000% |
| Router Classification | HA Router VPN (HA Router VPN - Part 1) | 1 | $0.00 | $0.00 | $0.00 | $0.00 | 0.000% |

Infinicenter      Demo User -      [Environments] [My Account]

My Account

Settings | Users | Billing | Transaction History | Bandwidth

Billing Period: [March 2010 ▽] [🔍 View Statement] [◁ Metered Usage]

Billing Summary for 2/23/2010 to 3/22/2010

Note: The billing details provided below are for information purposes only. The invoices you receive from the billing department should be considered the official billable rates.

Sub Total:    $8,242.00

▽ Katya's Test Environment

Advance Billing Committed Monthly Expenses for 4/23/2010 to 5/22/2010

| Description | Qty | Unit Price | Ext Price |
|---|---|---|---|
| 54132 (1/19/2010 - 1/18/2011) | | | |
| Product Container - 1 | 1 | $1,940.00 | $1,940.00 |

Advance Billing Committed Monthly Expenses for 4/23/2010 to 5/22/2010

| Description | Qty | Unit Price | Ext Price |
|---|---|---|---|
| Physical devices (1/21/2010 - 1/17/2011) | | | |
| HA 3rd Party Router Container | - | $0.00 | $0.00 |
| HA Circuit Router Container | - | $0.00 | $0.00 |
| HA VPN Router Container | - | $0.00 | $0.00 |
| router container 1 | - | $0.00 | $0.00 |

Advance Billing Committed Monthly Expenses for 2/23/2010 to 3/22/2010

| INFINICENTER ENVIRONMENT |
| --- |
| Save | Upgrade >> | Convert To Trial | Initiate STAR | Import Server | Refresh | Favorites |

Upgrade Resources □ do not delete!!!! ☑ Active
Upgrade with Physical devices

Name:
Virtual Center: MIA9000IVBC006
Cluster: 10202 — MIA9000IVCL2208A
Resource Pool: 21267_MIA_1
Type: Normal
# of Virtual Machines: 25
# of Physical Devices: 5
Default Outbound IP: 72.46.238.159
Number of Public IPs: 5
Firewall Context: MIA21267VFW068
Resources:

☑ Allow Bursting   (Allow bursting cannot be disabled because the environment is currently bursting. To disable allow bursting, the customer must first disable burst within the Infinicenter console.)

CPU                          Memory                          Storage
Purchased: 2000 MHz    Purchased: 4096 MB     Purchased: 150 GB
Allocated: 38 MHz       Allocated: 8608 MB     Allocated: 80 GB Open Tasks Required to complete and verify:
There are no active tasks found.

| Details | 0 Task(s) | Public IPs | Subnets | Firewall Context | VPN | Quotes | Physical Devices | Transaction History | History |

UPGRADE ENVIRONMENT: PHYSICAL DEVICES

☐ Save

Organization:
Environment:     VC4 - do not delete this environment

Available New Physical Device Quotes

| Quote | Contract | Location | Term (Mos) | # of Physical Devices |
|-------|----------|----------|------------|----------------------|
| 54175 | 55748    | Miami    | 12         | 6                    |

↑ 10302

Physical Devices:

|          | Current | Upgraded |
|----------|---------|----------|
| Server:  | 1       | 2        |
| Storage: | 1       | 2     ↖ 10304 |
| Router:  | 4       | 8        |

Environment Options:

Activation Date:  [2/23/2010 ▷]
Co-terminus:      ⦿ Yes  Quotes: [1/26/2011 ▷]  ↖ 10306
                  ○ No

| INFINICENTER ENVIRONMENT | | | | |
|---|---|---|---|---|
| 💾 Save 🌐 Upgrade >> 🔄 Convert To Trial 🌐 Initiate STAR 🗂 Import Server 🔁 Refresh ⭐ Favorites | | | | |
| View Task State Criteria: | | | | |
| ⦿ Active ◯ All | | | | |
| Quote/Contract: 54175/55478 | | | | |
| Task | State | Last Attempt | Last Result | Verified |
| Firewall Context (Automated) | ⬇ In Progress | | | |
| Physical Server Provisioning - MIA21267SRV014 | ⬇ In Progress | | | |
| Physical Storage Device Provisioning - MIA21267ST0007 | ⬇ In Progress | | | |
| High Availability Router Provisioning - MIA21267RTR016 | ⬇ In Progress | | | |
| High Availability Router Provisioning - MIA21267RTR017 | ⬇ In Progress | | | |
| High Availability Router Provisioning - MIA21267RTR018 | ⬇ In Progress | | | |
| High Availability Router Provisioning - MIA21267RTR019 | ⬇ In Progress | | | |

| Details | 7 Task(s) | Public IPs | Subnets | Firewall Context | VPN | Quotes | Physical Devices | Transaction History | History |

INFINICENTER ENVIRONMENT

🖫 Save  🌐 Upgrade ⇒  🔄 Convert To Trial  🌐 Initiate STAR  💻 Import Server  ↻ Refresh  ☆ Favorites View Task State Criteria:
◯ Active  ◉ All Quote/Contract: 54175/Server|Storage|RouterS

| Task | State | Last Attempt | Last Result | Verified |
|---|---|---|---|---|
| Firewall Context (Automated) | ✓ Verified | 02/23/2010 10:58:19 AM | | |
| Physical Server Provisioning - MIA21267SRV013 | ✓ Verified | 02/23/2010 11:07:51 AM | | |
| Physical Storage Device Provisioning - MIA21267ST0006 | ✓ Verified | 02/23/2010 11:12:04 AM | | |
| High Availability Router Provisioning - MIA21267RTR012 | ✓ Verified | 02/23/2010 11:15:29 AM | | |
| High Availability Router Provisioning - MIA21267RTR013 | ✓ Verified | 02/23/2010 11:16:41 AM | | |
| High Availability Router Provisioning - MIA21267RTR017 | ✓ Verified | 02/23/2010 11:17:47 AM | | |
| High Availability Router Provisioning - MIA21267RTR015 | ✓ Verified | 02/23/2010 11:20:24 AM | | |

[Details] [7 Task(s)] [Public IPs] [Subnets] [Firewall Context] [VPN] [Quotes] [Physical Devices] [Transaction History] [History]

| Change Device Info | |
|---|---|
| Equipment: | A6647A-HP/Cisco MDS9124 Fabr ▷ |
| Name: | MIA21267SRV013 |
| Serial Number: | 123456 |
| Asset Tag: | |
| Legacy Asset Tag: | |
| Status: | Assigned ▷ |
| Shared: | ☐ |
| Infrastructure: | ☐ |
| Owner: | ANY COMPANY A ▷ |
| Single Point of Failure: | ☐ |
| | Save   Cancel |

| TEMPLATE Windows 2003 Standard R2 SP2 (32-bit) |
| Save | Refresh | ☆ Favorites |

Name: [Windows 2003 Standard R2 SP2 (32-bit)]    Active: ☑

Notes: [ < > ]

Details:

Operating System: [Microsoft Windows Server 2003, Standard Edition (32-bit) >]
Operating System Family: [Windows >]
License Key: [Windows 2003 Standard R2 SP2 (32-bit) >]
Storage (GB): [4 <>]
Network Adapters: [1 <>]
Template Family: [Standard Templates >]
Template Category: [OS + Database >]
Template Author: [Data Return (HDQ) >]
Make Private: ☐

| Details | Components | Virtual Machines | History |

Infinicenter — Reseller Demo

Reseller

[ Branding ] [ Customers ]

[ Dashboard ] [ Appearance ] [ Email Templates ]

[ Account Registration ]  [ Account Reset ]

| Field | Value |
|---|---|
| From | support@ecloudseller.com |
| Subject | eCloudreseller Application User Registration-Invita |
| Admin Invitation | You have been added as an administrator user to the ecloudreseller web application. Click on the link to complete the user registration process. Once you registered, you will be able to login and grant acc additional users. If you have any questions or prob please call you account contact. Thank you. |
| Body | Dear User, |

Administrator Invitation

To complete the registration process follow the ste

Step 1: Click the REGISTRATION LINK below:

Registration Link

Step 2: Enter the REGISTRATION TOKEN below on the Registration Validation Page:
REGISTRATION TOKEN:

Registration Token

Step 3: Finish the required information on the Regi Form and Click on Register Button.

If you have any questions or problems, contact us at support@ecloudreseller.com or 1-800-000-0000 (Toll Sincerely, eCloud Reseller Service Administrator

MATCH TO FIG. 129B

Admin - Terremark PLM - Master Reseller | Reseller | My Account | Help | Sign Out ⟲ Reset  ✓ Save ☑ Preview with administrator invitation To: email@domain.com
From: support@ecloudreseller.com
Subject: eCloudreseller Application User Registration - Invitation Dear User, You have been added as an administrator user to the ecloudreseller web application. Click on the link below to complete the user registration process. Once you are registered, you will be able to login and grant access to additional users. If you have any questions or problems, please call your account contact. Thank you.

To complete the registration process follow the steps below:

Step 1: Click the REGISTRATION LINK below.
http://ecloudreseller.com/Registration.aspx Step 2: Enter the REGISTRATION TOKEN below on the Registration Validation Page.
REGISTRATION TOKEN: ****__*_****

Step 3: Finish the required information on the Registration Form and Click on Register Button.

If you have any questions or problems, contact us at support@ecloudreseller.com or 1-800-000-0000 (Toll Free)

Sincerely,
eCloud Reseller Service Administrator

MATCH TO FIG. 129A

Fig. 129B

SYSTEM AND METHOD FOR CUSTOMER PROVISIONING IN A UTILITY COMPUTING PLATFORM

CROSS SECTION TO RELATED APPLICATIONS

This application is a continuation of U.S. patent application Ser. No. 12/829,877 filed on Jul. 2, 2010, now abandoned entitled "System and Method for Customer Provisioning in a Utility Computing Platform," which is a continuation-in-part of U.S. patent application Ser. No. 12/468,525 filed on May 19, 2009, entitled "System and Method for Customer Provisioning in a Utility Computing Platform," which claims priority to U.S. Provisional Application No. 61/054,576, filed May 20, 2008. U.S. patent application Ser. No. 12/829,877 claims priority to: U.S. Provisional Application No. 61/223,208, filed Jul. 6, 2009, entitled "System and Method for Customer Provisioning in a Utility Computing Platform;" U.S. Provisional Application No. 61/247,277, filed Sep. 30, 2009, entitled "System and Method for Customer Provisioning in a Utility Computing Platform;" U.S. Provisional Application No. 61/285,666, filed Dec. 11, 2009, entitled "System and Method for Customer Provisioning in a Utility Computing Platform;" U.S. Provisional Application No. 61/313,336, filed Mar. 12, 2010, entitled "System and Method for Customer Provisioning in a Utility Computing Platform;" and U.S. Provisional Application No. 61/328,456, filed Apr. 27, 2010, entitled "System and Method for Customer Provisioning in a Utility Computing Platform." All of these documents are herein incorporated by reference in their entirety.

BACKGROUND

The technology described in this patent application is generally directed to computer-implemented systems and processes for provisioning and managing one or more customer virtual data centers within a utility computing platform. A utility computing platform may include one or more physical data centers each comprising processor, storage and network infrastructure that may be shared by a plurality of customers. Such utility computing platforms may include a variety of managed hosting or co-location computing platforms that are presently known in the art. These platforms may provide virtual resource capabilities for the plurality of customers by employing a virtualization control system that abstracts and granularizes the processor, storage and network hardware into virtual resources that may be allocated by a system administrator in order to provide each customer with a virtual data center.

FIG. 1, for example, is a system diagram 10 of a known managed hosting computer platform including a virtualization control system 20. The platform 12 includes storage infrastructure 14, server infrastructure 16 and network infrastructure 18. This infrastructure is controlled and managed by the virtualization control system 20, which may be, for example, the Virtual Center Management Server from VMWare, or any other type of system for virtualizing the storage, server and network infrastructure resources. The virtualization control system 20 is configured and managed by a system administrator 30, which is typically associated with the owner/operator of the managed hosting computer platform 12.

One common use of such a managed hosting computer platform is for hosting customer web sites. Web browsers 28 access a customer's hosted web site via the Internet 24, which connects to the managed hosting platform 10 via one or more connections 22 to the network infrastructure 18. Customer systems 26 may also access and control the application environment of their virtual resources through an Internet connection, and may also have access to a system viewing component of the system 12 that enables the customer to view the configuration of their virtual resources hosted by the managed hosting platform 12. If the customer is interested in creating, modifying or upgrading their virtual resources at the managed hosting platform, then the customer typically contacts the system administrator 30, by phone, email or other form of communication, and makes a request to the system administrator 30. The system administrator 30 then interacts with the virtualization control system 20 in order to configure or reconfigure the customer's virtual resources to match their request, typically by adding one or more virtual servers to the resource pool dedicated to a particular customer. This process can take several days, or longer, however, depending on the workload of the system administrator and the efficiency with which the managed hosting platform 12 is operated in terms of hardware setup and provisioning.

SUMMARY

Systems and methods are provided herein for provisioning virtual servers in a virtual environment having a virtualization control system coupled to a physical server, disk drive, and networking resources, where the virtualization control system is configured to partition the physical resources into virtual resources including virtual processor, memory, and storage resources. An identification of an operating system, a server name, a number of processors, a memory amount, and a disk storage amount may be received. An identification of a network on which a virtual server is to reside also may be received. The virtual server may be provisioned by provisioning a number of physical processors, an amount of physical memory, and an amount of physical storage resources based on the identified number of processors, the identified memory amount, and the identified disk storage amount. The provisioned virtual server may be deployed and resource usage of the virtual environment containing the virtual server may be monitored. Resource usage of virtual servers exceeding processing resources, memory amount, or disk storage amount allocated to the virtual environment may be detected, and whether burst resource usage mode is enabled for the virtual environment may be determined. Additional resources for the virtual servers in the virtual environment may be provisioned if burst resource usage mode is enabled for the virtual environment.

As another example, a computer-implemented system and method for provisioning virtual servers in a virtual environment having a virtualization control system coupled to a physical server, disk drive, and networking resources, where the virtualization control system is configured to partition the physical resources into virtual resources including virtual processor, memory, and storage resources, may receive an identification of an operating system, a server name, a number of processors, a memory amount, and a disk storage amount. An identification of a network on which the virtual server is to reside also may be received. A virtual server may be provisioned by provisioning a number of processors, an amount of memory, and an amount of storage resources based on the identified number of processors, the identified memory amount, and the identified disk storage amount, and the provisioned virtual server may be deployed.

As a further example, a computer implemented method for provisioning resources for virtual servers in a virtual environment having a virtualization control system coupled to a physical server, disk drive, and networking resources, where the virtualization control system is configured to partition the physical resources into virtual resources including virtual processor, memory, and disk storage resources may provision the virtual servers according to a requested number of processors, memory amount, and disk storage amount. Resource usage of the virtual servers may be monitored. Resource usage of the virtual servers exceeding processing resources, memory amount, or disk storage amount for the virtual environment may be detected. A determination as to whether burst resource usage mode is enabled for the virtual environment may be made, and additional resources for the virtual servers may be provisioned if burst resource usage mode is enabled for the virtual environment.

BRIEF DESCRIPTION OF THE DRAWINGS

FIGS. 5A-5E depict graphical user interface screens of an exemplary administration console for creating a customer environment;

FIGS. 6A-6D depict graphical user interface screens of an exemplary administration console for adding a network connection to a customer environment;

FIGS. 7A-7C depict graphical user interface screens of an exemplary administration console for upgrading a customer environment;

FIGS. 20A-20J depict graphical user interface screens of the exemplary customer provisioning console for creating a new server within a customer environment;

FIG. 26 depicts a graphical user interface screen of the exemplary customer provisioning console for configuring the disk storage resource of a virtual server;

FIG. 27 depicts a graphical user interface screen of the exemplary customer provisioning console for viewing customer transaction history;

FIGS. 32A-32B depict graphical user interface screens of an exemplary administration console for provisioning a computing cluster;

FIG. 33 depicts a graphical user interface screen of an exemplary administration console for managing resource templates;

FIGS. 34A-34D depict graphical user interface screens of an exemplary administration console for performing various system administration tasks.

FIGS. 36A-36B depict graphical user interface screens for creating an Internet service;

FIGS. 39A-39B depict graphical user interface screens for creating a node service;

FIGS. 41A-41B depict graphical user interface screens for checking an environment IP address usage;

FIGS. 48A-48C depict graphical user interface screens for setting a firewall deny rule;

FIGS. 59 and 60 depict graphical user interface screens for creating a blank server;

FIGS. 62-66 depict graphical user interface screens for copying a server;

FIGS. 68-70 depict graphical user interface screens for performing role-based security.

FIG. 77 is a configuration page provided to a user having an administrative level of access.

FIG. 87 is a screenshot depicting an example user login audit log.

FIG. 88 is a screenshot depicting an example general task log.

FIGS. 90A and 90B are a flow diagram depicting an example process for providing quotes and other financial data to a user in an appropriate currency for that user.

FIGS. 91A and 91B are a screenshot of an example display for inputting data for a new organization.

FIG. 94 depicts a price list used to update a generated quote based on components added to a virtual environment.

FIG. 97 is a screenshot depicting a billing summary, wherein the costs depicted are displayed in the preferred currency of the user or organization.

FIGS. 99-108 depict graphical user interfaces for incorporating a physical device into a virtual server supporting environment.

FIGS. 112-116 depict graphical user interfaces for generating a logical template and associating the logical template with one or more physical templates.

FIGS. 126-131 are graphical user interfaces for facilitating virtualization control system branding and example user interfaces that can be provided to customers of a reseller after branding customization.

DETAILED DESCRIPTION

Figure 1:
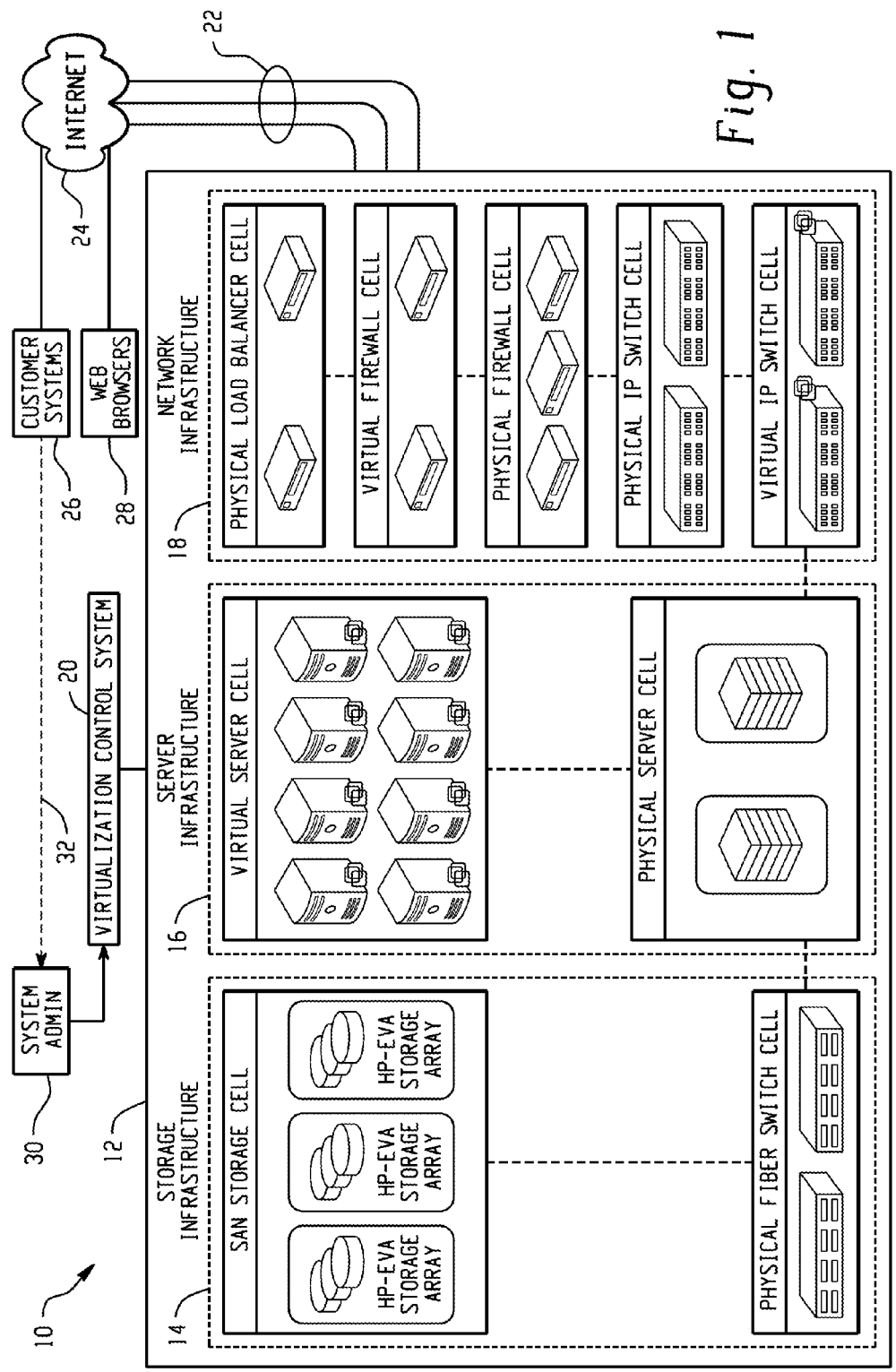
FIG. 1 is a system diagram of a known managed hosting computer platform including a virtualization control system.
Figure 2:
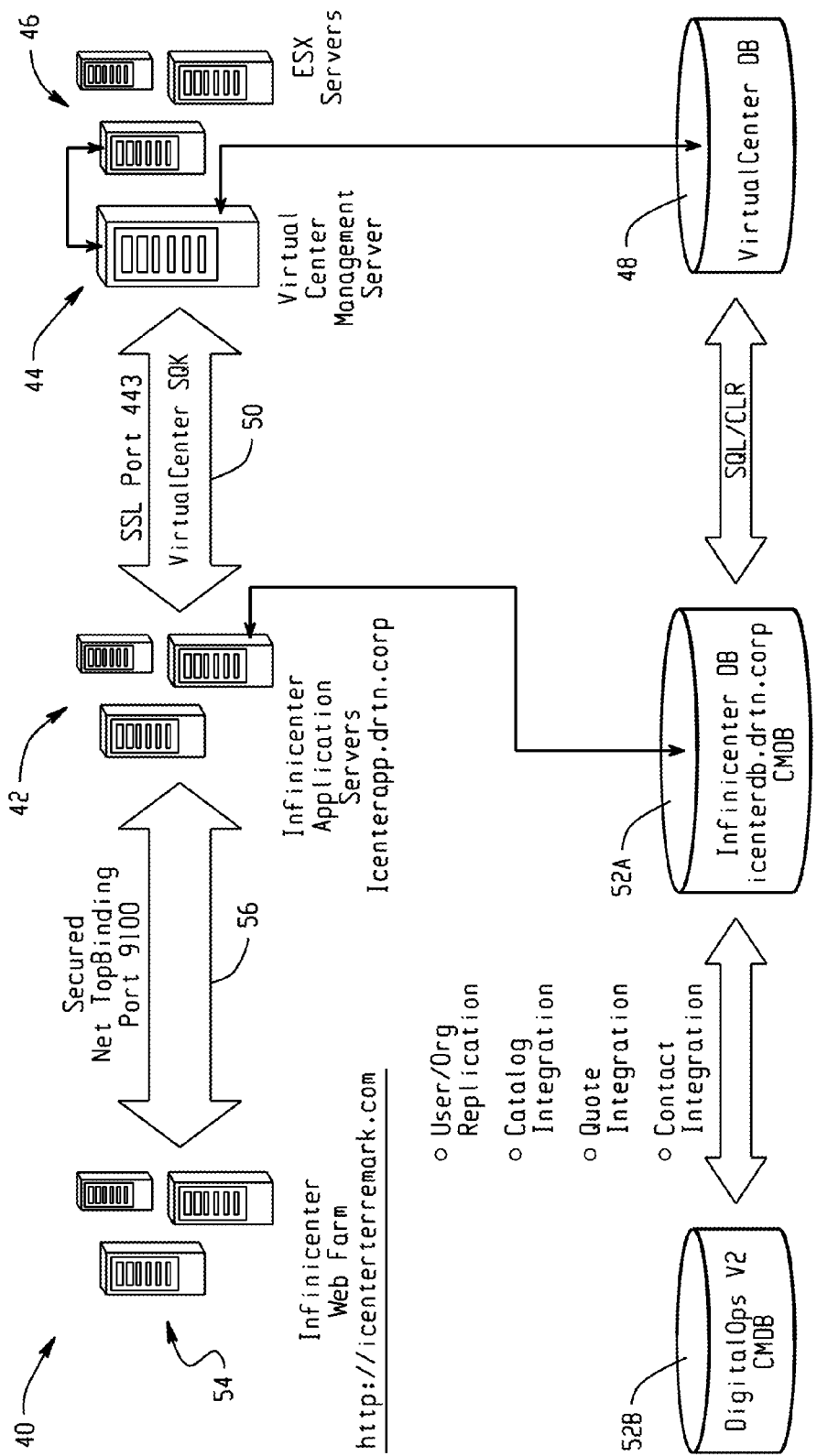
FIG. 2 is a system diagram of an exemplary customer provisioned utility computing platform.

FIG. 2 is a system diagram 40 of an exemplary customer provisioned utility computing platform. The system 40 includes a Web Farm 54, Application Servers 42, configuration management databases (CMDB) 52A, 52B and a virtualization control system 44 coupled to a plurality of virtual server resources 46 and also coupled to a virtualization control system database 48.

Operationally, customers of the system access the customer provisioning utility computing platform 40 using a web browser that communicates via the Internet to a web server in the Web Farm 54, which in turn is coupled to one of the application servers 42 via a secure connection 56. The application servers 42, in combination with the web servers 54, enable the software applications (as further detailed in the remaining drawing figures) to create, manage and provision their own virtual data center resources, including the creation and provisioning of virtual server resources 54. The application servers 42 are, in turn, coupled to and communicate with the virtualization control system 44 via a secure SSL port 50. Customer resource and configuration data, resource catalog information, quotation information, and other data necessary to enable the customers to self-provision their virtual data center resources are stored in the configuration management database 52, which in turn is coupled to the virtualization control system database 48.

Figure 3:
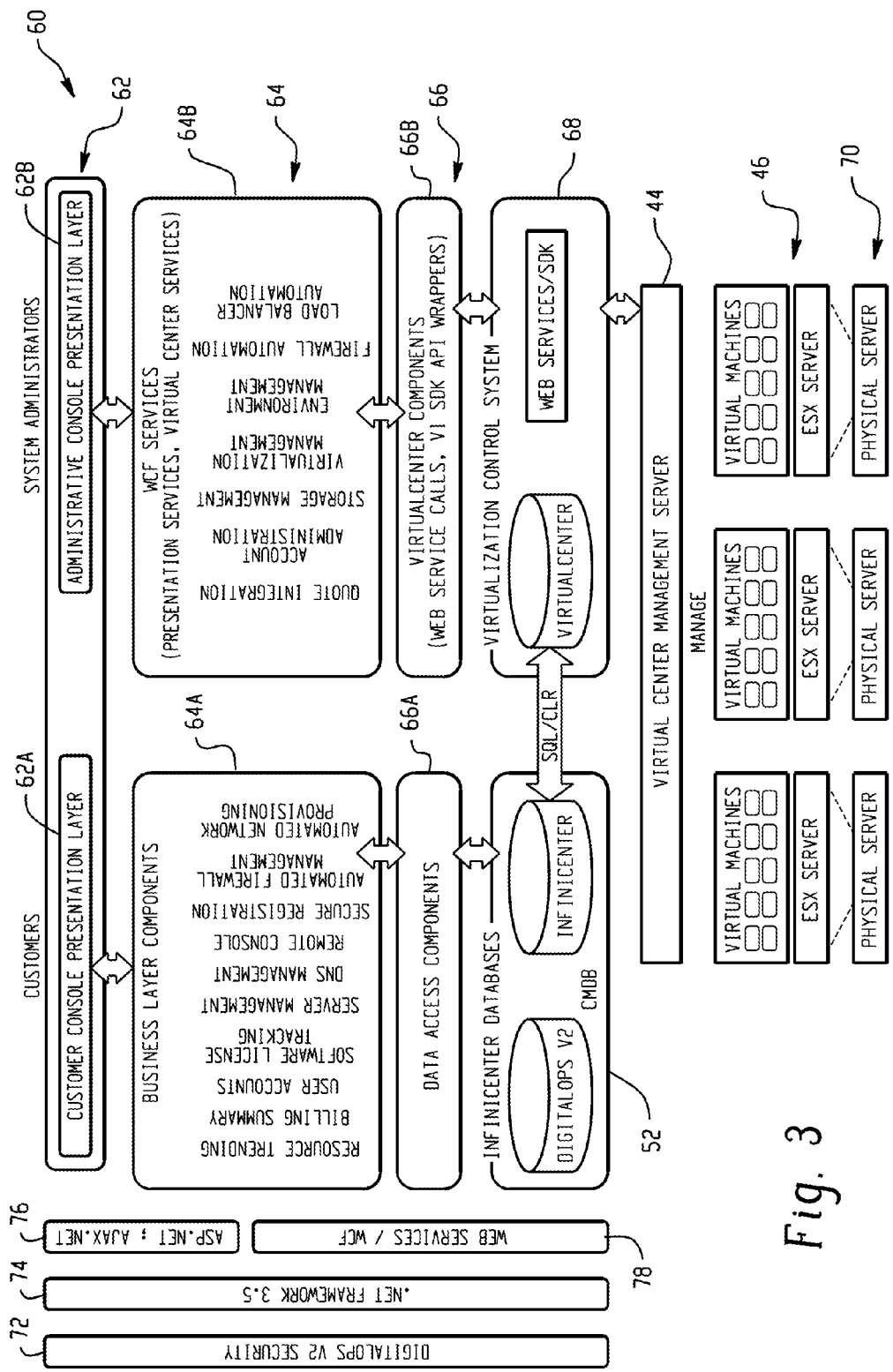
FIG. 3 is software architecture diagram of the exemplary customer provisioned utility computing platform shown in FIG. 2.

FIG. 3 is software architecture diagram 60 of the exemplary customer provisioned utility computing platform shown in FIG. 2. The software system includes a presentation layer comprising a customer provisioning console 62A and an administration console 62B, a functional application layer 64 comprising business layer components 64A associated with the customer provisioning console 62A and virtual center services components 64B associated with the administration console 62B. Also shown in FIG. 3 is a data access layer 66 coupling the functional application layer components 64 to database servers 52 and to the virtualization control system 68. The data access layer 66 includes data access components 66A, which enable the business layer components 64A to communicate with the configuration management database 52, and virtual center components 66B, which enable the virtual center services components 64B to communicate with the virtualization control system 68. The virtual center components 66B include web service calls, virtual center SDK/API interfaces and API wrappers that are associated with the particular virtualization control system 68, and which enable the business layer components 64A and the virtual center services components 64B to interface with and control the virtualization control system 68.

The presentation, functional application and data access layers 62, 64 and 66 are preferably programmed using a variety of known programming tools, such as ASP.net/Ajax-.net 76, Web Services/WCF 78, and .Net Framework 3.5 74. Other programming tools may be used, as necessary, to enable the functionality and graphical user interface of the software technology described herein.

The business layer components 64A shown in FIG. 3, and described in more detail functionally and graphically below, enable the customers to create, provision and analyze their own virtual data center resources through the data access layers 66 and database integration with the virtualization control system 68. These components 64A provide resource trending, billing summary, user accounts, software license tracking, server management, DNS management, remote console, secure registration, automated firewall management and automated network provisioning functions through the customer console presentation layer 62, which is accessible to the customer via a standard web browser application.

The virtual center services components 64B shown in FIG. 3, and described in more detail functionally and graphically below, enable a system administrator to quote, create and manage customer environments, and to assist the customer, where necessary, in provisioning and managing its virtual data center resources. These components 64B provide quote integration, account administration, storage management, virtualization management, environment management, firewall automation and load balancer automation.

Figure 3A:
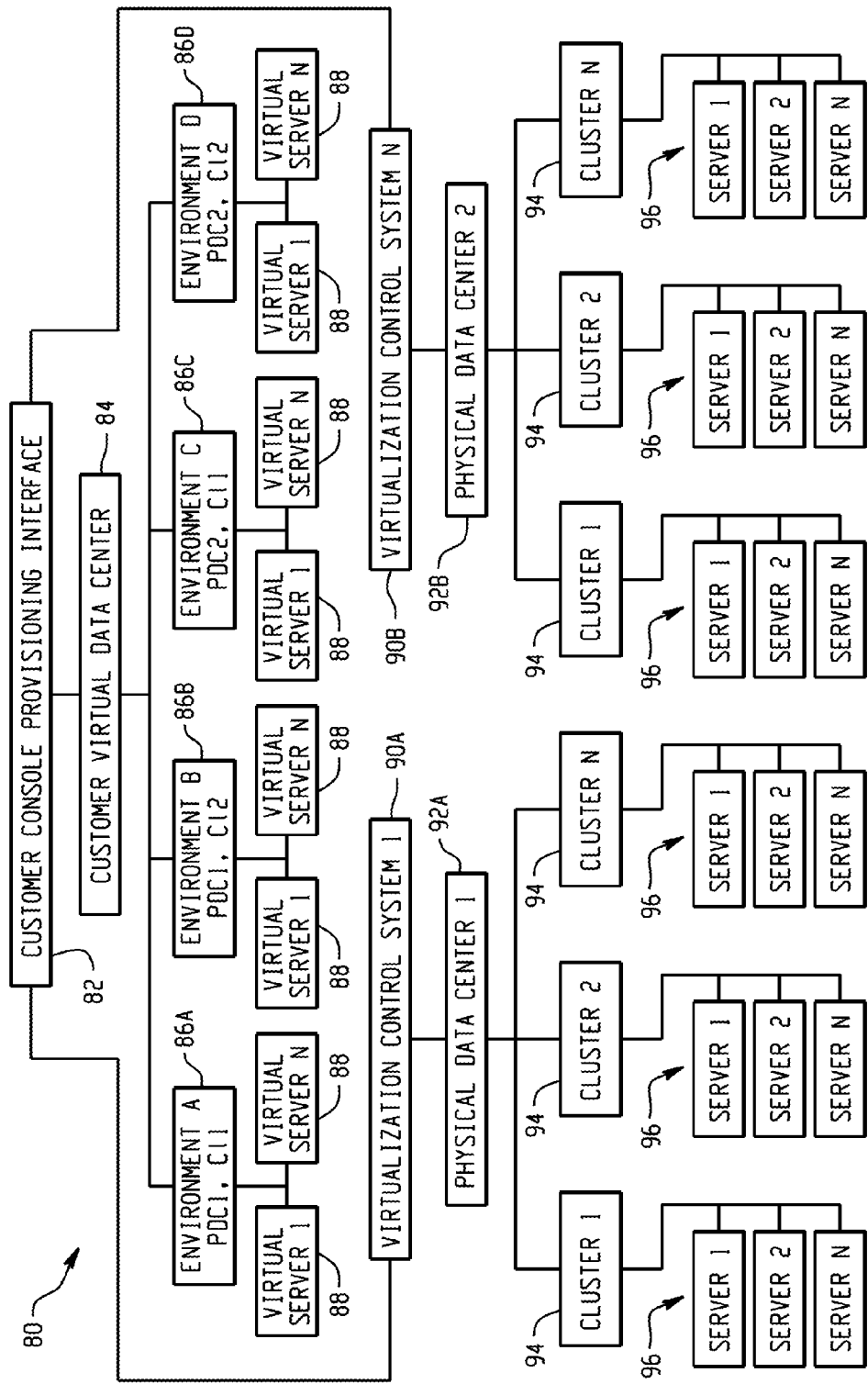
FIG. 3A is an exemplary extended system architecture diagram showing a customer virtual data center partitioned into multiple customer environments through the use of a customer provisioning interface module.

FIG. 3A is an exemplary extended system architecture diagram 80 showing a customer virtual data center partitioned into multiple customer environments 86A-86D through the use of a customer provisioning interface module 82. Using this interface module 82, a customer can manage their own virtual data center 84 comprising one or more customer environments 86A-86D. Each customer environment may comprise one or more virtual servers 88 located within a cluster of virtual servers of a single physical data center. The environments may be located at different physical data centers. FIG. 3A shows the customer console provisioning interface 82 coupled to two virtualization control systems 90A and 90B, each of which manages a separate physical data center 92A, 92B. These physical data centers 92A, 92B may be geographically co-located or they may be widely dispersed. Moreover, although FIG. 3A shows just two such connections to virtualization control systems, there is no limit on the number of such systems that the customer console provisioning interface 82 may be connected to. Each of the physical data centers 92A, 92B includes a plurality of computing clusters 94. A computing cluster includes a plurality of physical servers 96.

The virtualization control systems 90A, 90B abstract the server (and storage and network) hardware 96 so as to provide a more granular virtual server (and virtual storage and network) resource allocation that can be accessed by the customer. By coupling the customer console provisioning interface 82 to a plurality of virtualization control systems 90A, 90B, the customer can create, provision and manage its own virtual resources across numerous virtual environments 86A-86D which physically span multiple physical data centers. For example, customer Environment A 86A includes several virtual servers 88 that are physically located at cluster 1 (94) of physical data center 1 (92A), which hardware is in turn virtualized by virtualization control system 90A. Customer Environment C, however, includes virtual servers 88 that are physically located at cluster 1 (94) of physical data center 2 (92B), which is in turn virtualized by virtualization control system 90B. The difference in physical location is irrelevant to the customer, however, because the customer console provisioning interface 82 is able to provide the customer with an abstracted view of its virtual data center assets that span multiple virtualization control systems and multiple geographic locations.

Figure 4A:
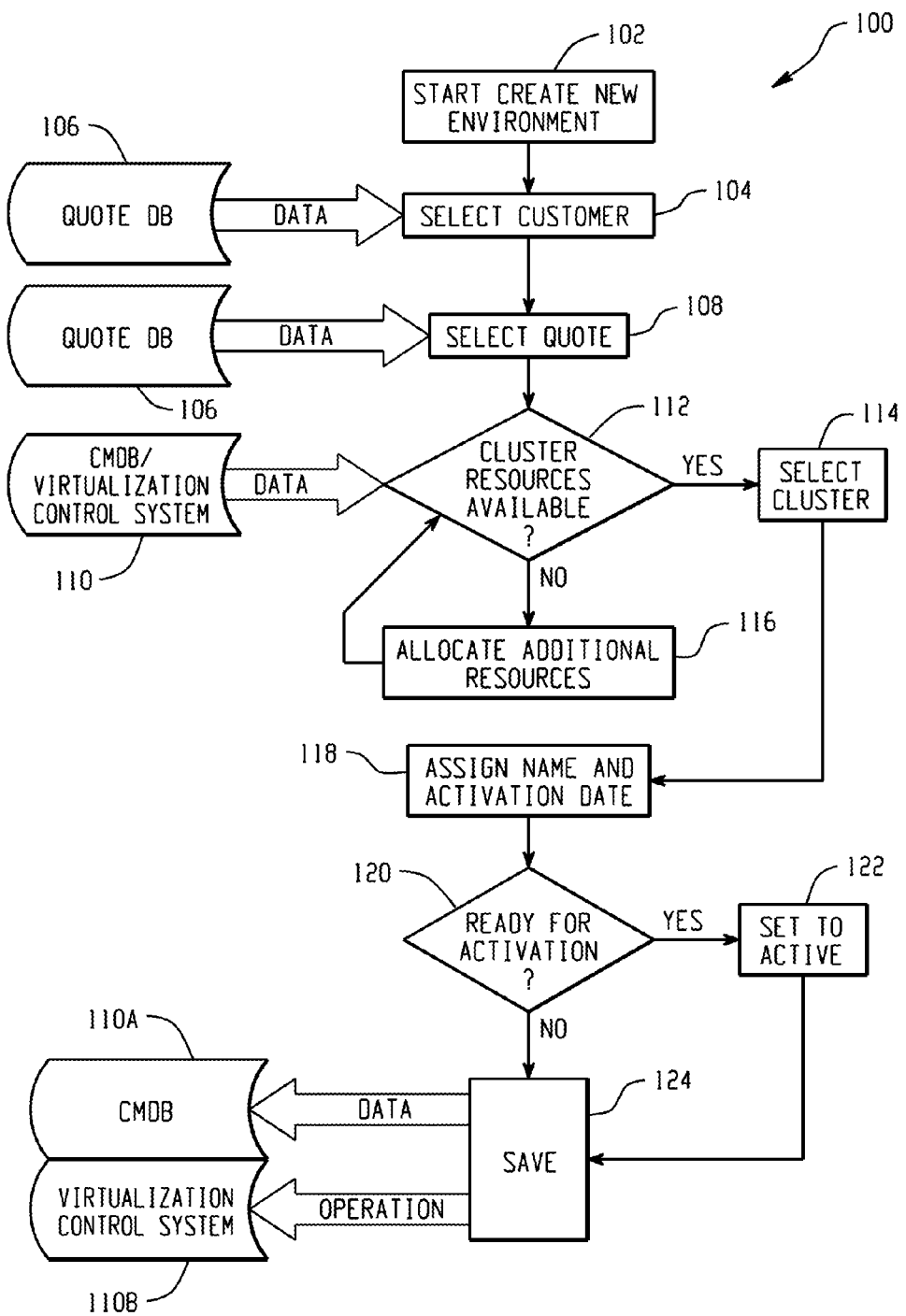
FIG. 4A is an exemplary flow diagram depicting a method for adding a new customer environment to a customer provisioned utility computing platform.

FIG. 4A is an exemplary flow diagram 100 depicting a method for adding a new customer environment to a customer provisioned utility computing platform. The method begins at step 102 where a system administrator, preferably, begins the process of creating a new customer environment. Although certain functionality is described herein as being performed by a system administrator, it is possible that these same functions may be accessible to and executed by a customer through the customer console provisioning interface described in more detail below. At step 104 the system administrator selects a customer, and quotation information for that customer is retrieved from a quotation database 106, which may be separate from or integrated into the configuration management database 110A. A quote is selected at step 108. At step 112, the system administrator determines whether adequate computing cluster resources are available to create the new customer environment. In this step, information from the configuration management database and/or the virtualization control system 110 may be accessed. If sufficient computing cluster resources are available, then at step 114 a cluster is selected for the new customer environment. If sufficient resources are not available, however, then at step 116 additional resources are allocated to the virtualization control system 110B. This step 116 may include physically installing additional server or other computing resources and making these additional computing resources accessible to the virtualization control system 110B. Control then passes to step 118, where a name is assigned to the new customer environment and an activation date is associated with the new environment. At step 120 the system determines whether the new environment is ready for activation. If so, then the environment is set to active at step 122 and saved to the system at step 124. Saving the new environment to the system causes data to be written into the configuration management database 110A, and also causes commands to flow through the SDK/API data interface layer 66B to the virtualization control system 110B in order to setup the logical configuration of the new environment within the allocated cluster of computing resources managed by the virtualization control system 110B. (FIGS. 5A-5E, discussed below, depict graphical user interface screens of an exemplary administration console for creating a customer environment.)

Figure 4B:
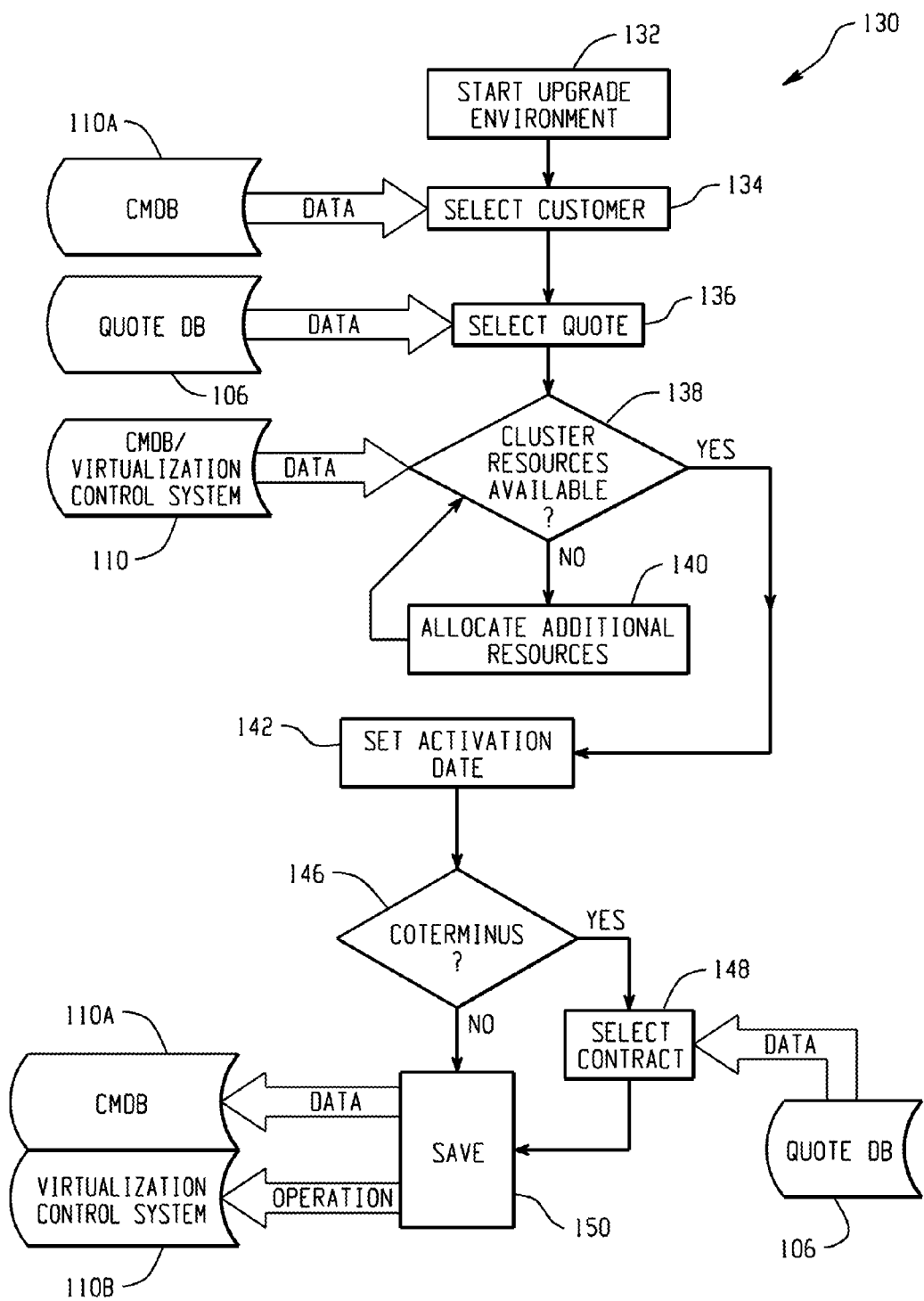
FIG. 4B is an exemplary flow diagram depicting a method for upgrading an existing customer environment in a customer provisioned utility computing platform.

FIG. 4B is an exemplary flow diagram 130 depicting a method for upgrading an existing customer environment in a customer provisioned utility computing platform. The method begins at step 132 where a system administrator, preferably, begins the process of upgrading the customer environment. Although certain functionality is described herein as being performed by a system administrator, it is possible that these same functions may be accessible to and executed by a customer through the customer console provisioning interface described in more detail below. At step 134 the system administrator selects a customer and at step 136 quotation information for that customer is retrieved from a quotation database 106, which may be separate from or integrated into the configuration management database 110A. At step 138, the system administrator determines whether adequate computing cluster resources are available to upgrade the customer environment. In this step, information from the configuration management database and/or the virtualization control system 110 may be accessed. If sufficient computing cluster resources are available, then at step 142 an activation date is set for the upgrade environment. If sufficient resources are not available, however, then at step 140 additional resources are allocated to the virtualization control system 110B. This step 140 may include physically installing additional server or other computing resources and making these additional computing resources accessible to the virtualization control system 110B. At step 146, it is determined whether the upgrade quote is coterminous with another customer quotation/contract, and if so then the quotation information is obtained from the quote database 106 at step 148. The upgraded environment is then saved to the system at step 150. Saving the upgraded environment to the system causes data to be written into the configuration management database 110A, and also causes commands to flow through the SDK/API data interface layer 66B to the virtualization control system 110B in order to setup the logical configuration of the upgraded environment within the allocated cluster of computing resources managed by the virtualization control system 110B. (FIGS. 7A-7C, discussed below, depict graphical user interface screens of an exemplary administration console for upgrading a customer environment.)

FIGS. 5A-5E depict graphical user interface screens of an exemplary administration console 190 for creating a customer environment. As detailed in FIG. 3, this administration console may be used for quote integration, account administration, storage management, virtualization management, customer environment management, firewall automation and load balancer automation, as well as other system-level functions. The administration console may include these WCF services and communicates directly with the one or more virtualization control systems 68 using virtual interface components 66.

Figure 5A:
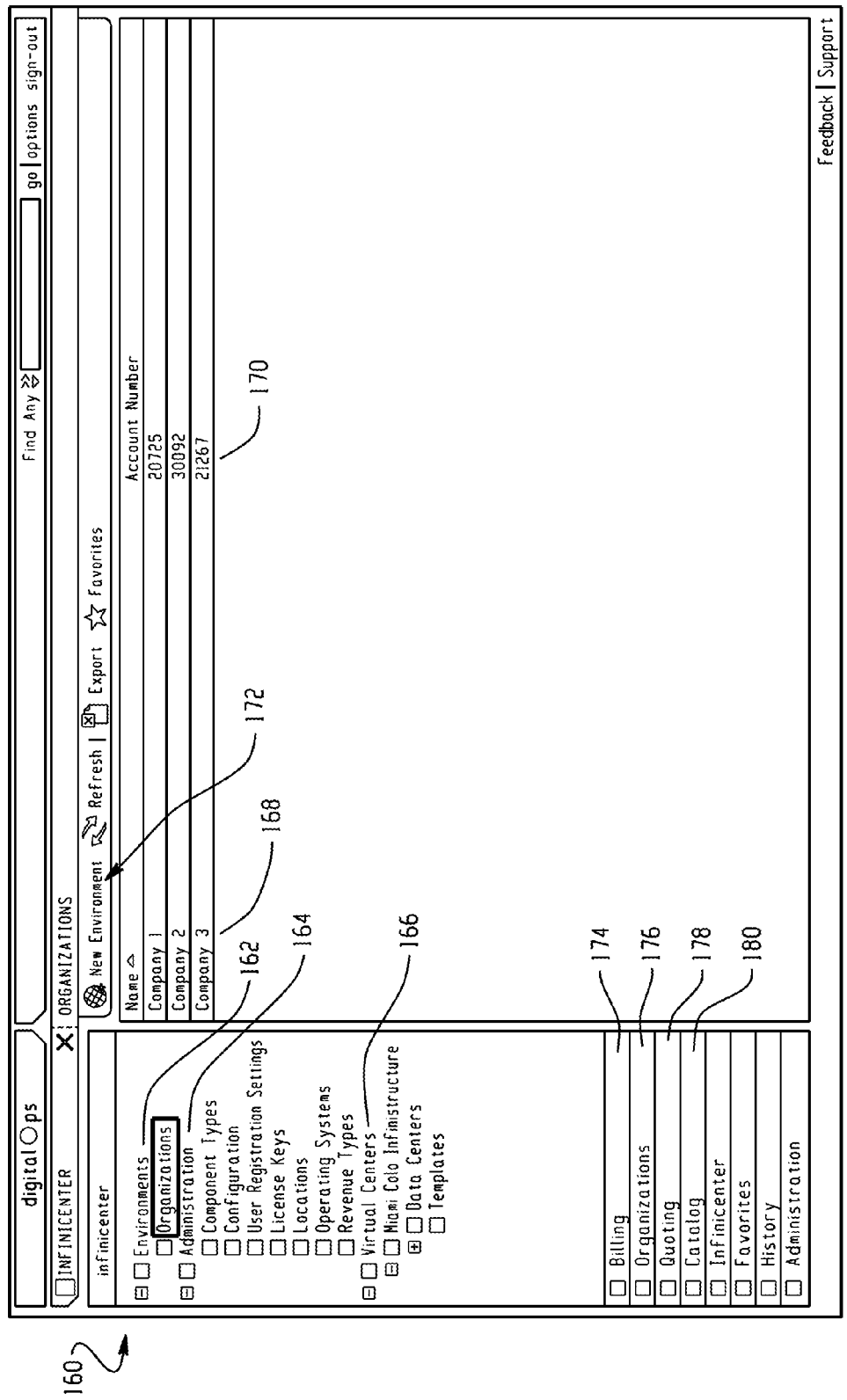

FIG. 5A depicts an opening screen for the exemplary administration console 190. This interface includes an environment selector (by organization) 162, an administration function selector 164, and a virtual center selector 166. The administration function selector 162 is utilized to select various administration functions, including component types, configuration, user registration settings, license keys, locations, operations systems and revenue types. Other functions of the administration console 190 are accessible through billing selector 174, organization selector 176, quoting selector 178 and catalog selector 180. Each of these selectors engages additional interface screens for the administrator to manage billing, organizations, quotes for virtual services and catalogs of available products. The main display area of the opening screen shows that the organization selector 162 has been activated, thereby listing the organizations (i.e., customers) by name that are presently associated with the system. This display lists the customers 168 and customer account numbers 170 in a table format. Also available from this screen is a "New Environment" selector 172, which is used by the administrator to associate a new virtual environment with a particular customer.

Figure 5B:
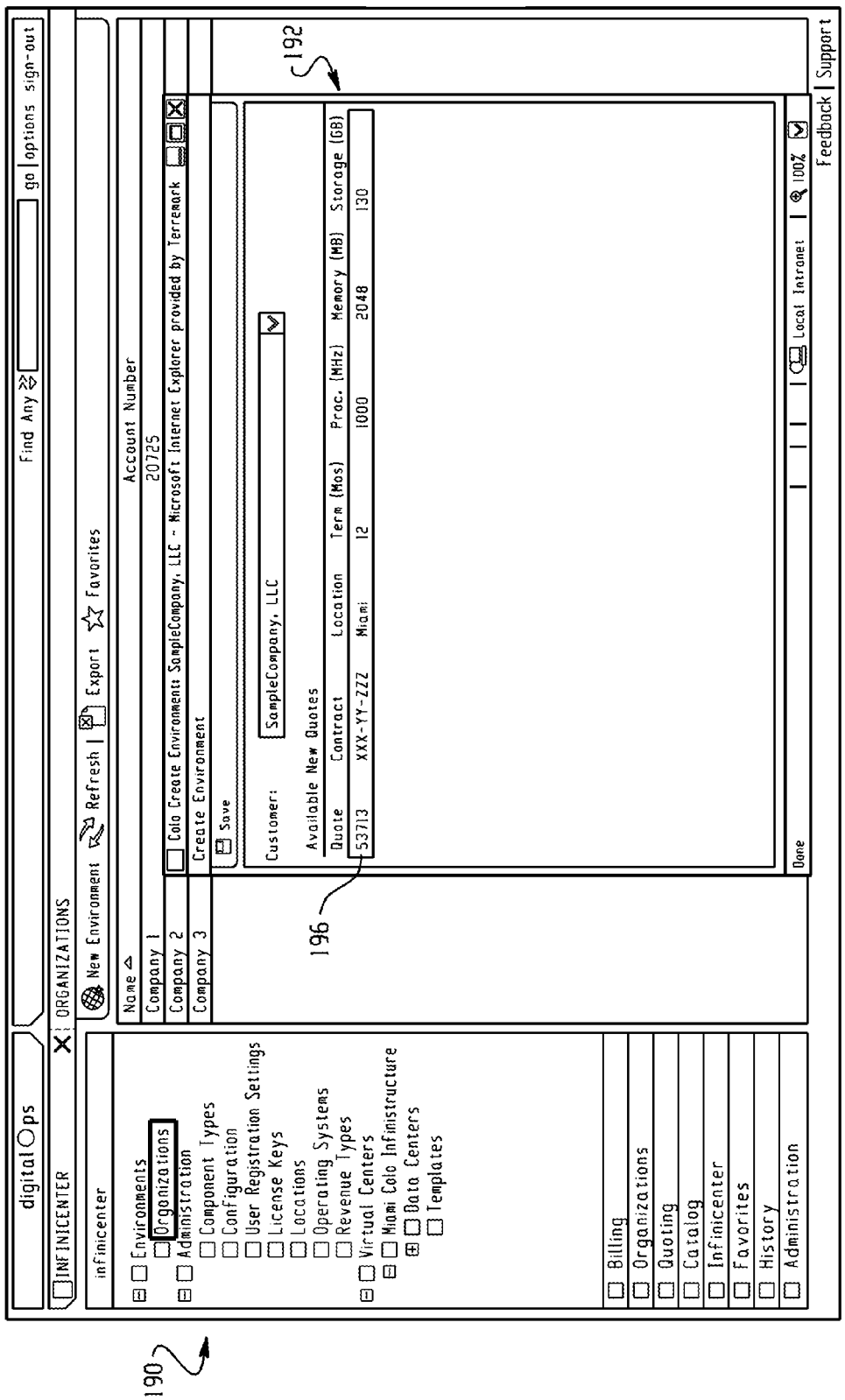
Figure 5C:
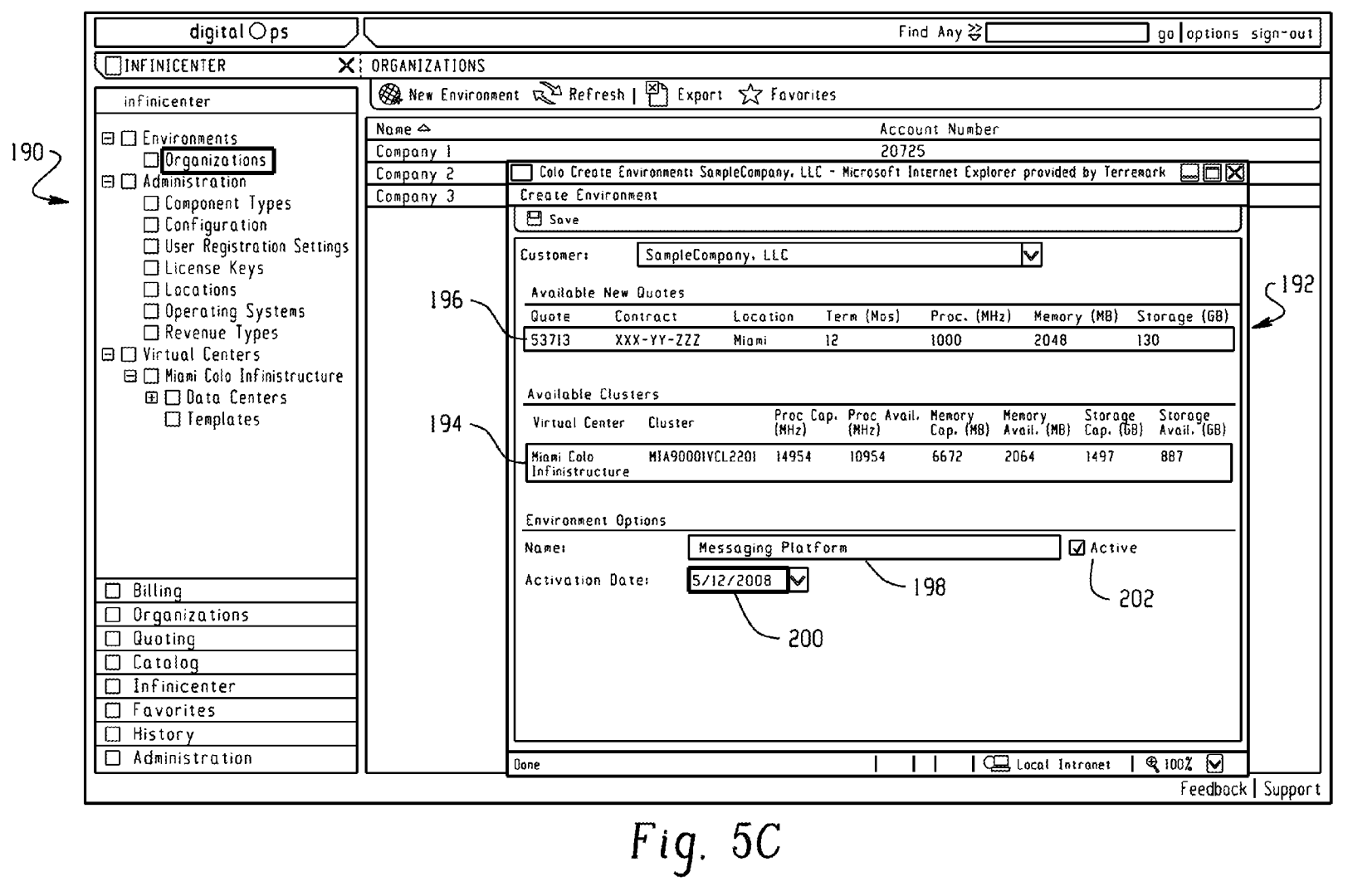

FIG. 5B shows an interface screen 192 displaying a list of available quotes 196 for a selected customer. In this example there is only one quote 196 associated with the selected customer. The available quote identifies the amount of processing (1000 MHz), memory (2048 MB) and storage (130 GB) associated with the customer quotation (i.e., request for virtual resources), a term, location, contract number and quotation number. FIG. 5C shows an interface screen 192 in which the quote for the new environment has been selected 196, and the system administrator has provided a name 198 for the new environment, provided an activation date 200, and set the new environment to active 202.

Figure 5D:
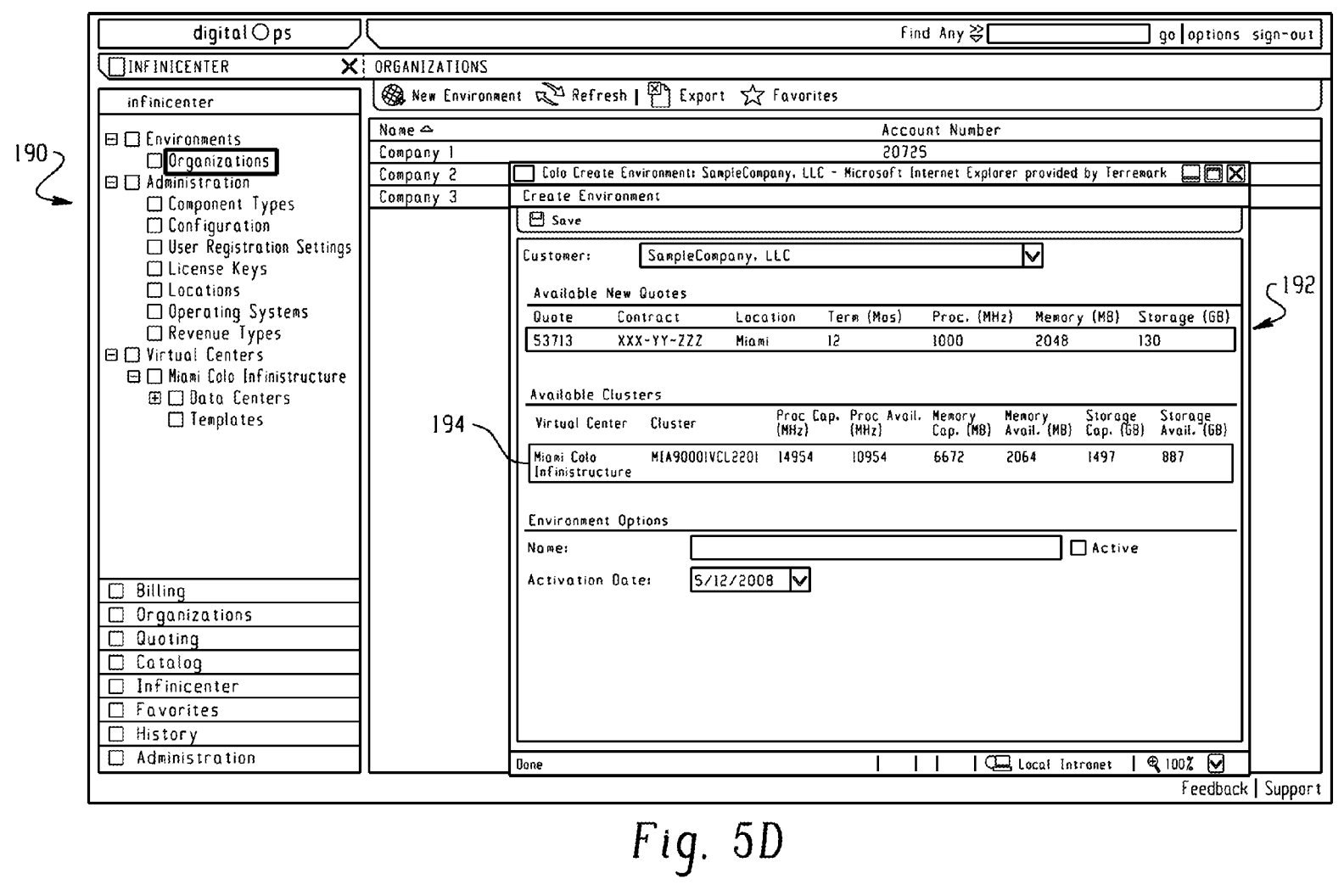

FIG. 5D depicts a graphical user interface screen 192 for selecting a particular virtual center 194 within which the new customer environment is to be created. This screen is activated in response to selection of the "New Environment" selector 172 in the main screen 190. Here, in screen 192, the customer is listed, along with available new quotes 196 for the particular customer. Available physical clusters 194 are listed in the bottom portion of the screen 192 by virtual center. In this example figure, only one virtual center is available for physical provisioning, but it is envisioned that the system disclosed herein could be used with multiple geographically dispersed virtual centers, in which case more than one virtual center would be present in the screen 192, depending upon the availability of physical clusters of computing resources in those dispersed virtual centers. Each virtual center is preferably controlled by a separate virtualization control system, to which the present system may provide access.

Figure 5E:
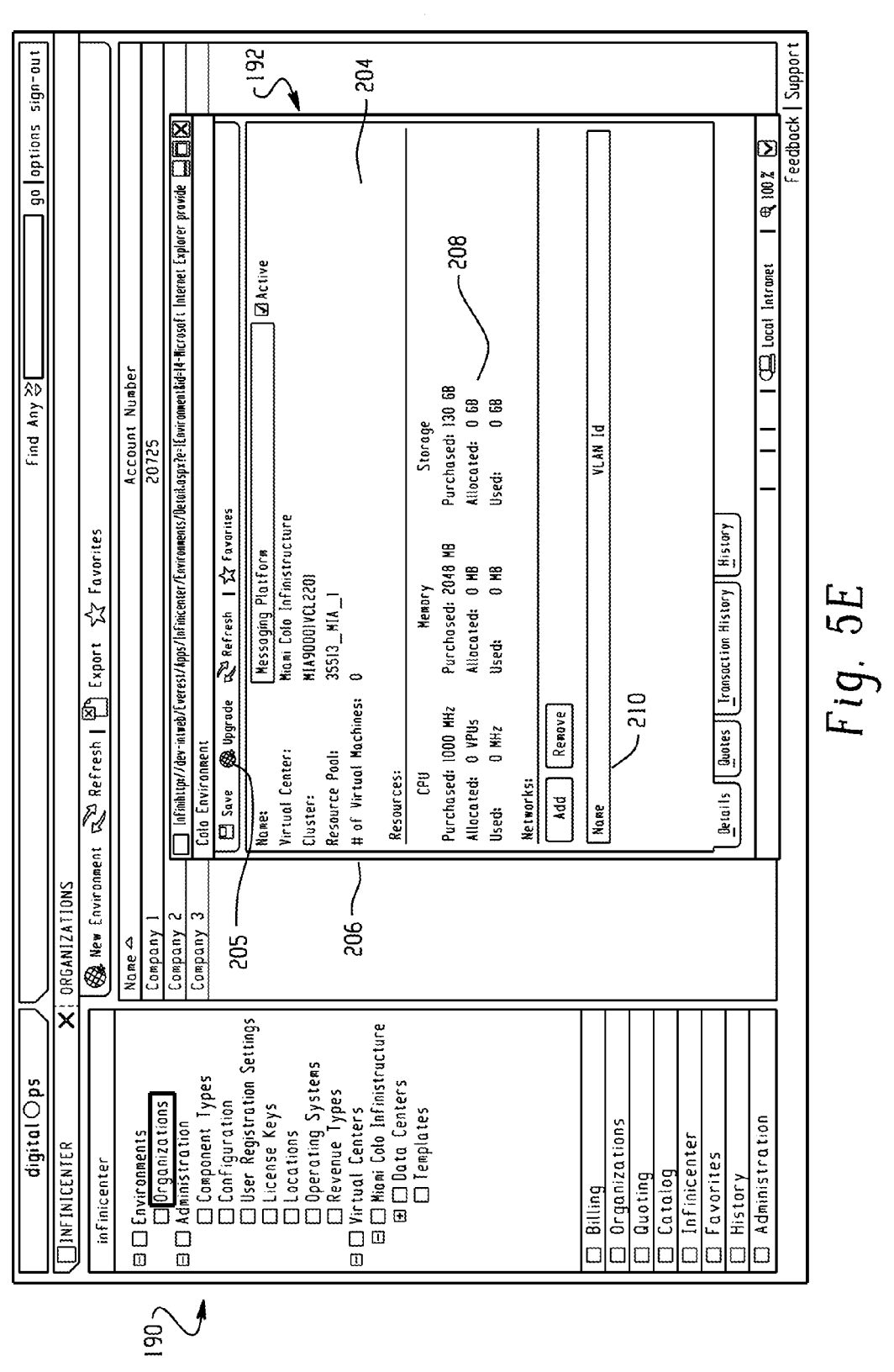

Finally, FIG. 5E is an interface screen 204 depicting the details of the created environment. The top portion of this interface screen indicates the name of the environment and indicates whether it is active or not, lists the virtual center where the environment is physically located, lists the cluster of the virtual center associated with the environment, and identifies a resource pool and a number of virtual machines. In this example, no virtual machines have been associated with this new environment yet. The middle portion of the interface screen provides details regarding the purchased virtual resources 208 associated with the new environment and also lists the amount of such resources that have been allocated and used. The bottom portion of the screen enables the system administrator to associate a particular network connection with the new environment. Additional information regarding the environment, such as related quotes, transaction history and history information is accessible via the tabs located at the very bottom of the interface screen 204. One additional feature shown in FIG. 5E is the "Upgrade" selector 205, which is used to upgrade or otherwise modify an existing customer environment. This "Upgrade" process is described in more detail in FIGS. 4B, and 7A-7C, and accompanying descriptions set forth herein.

Figure 6A:
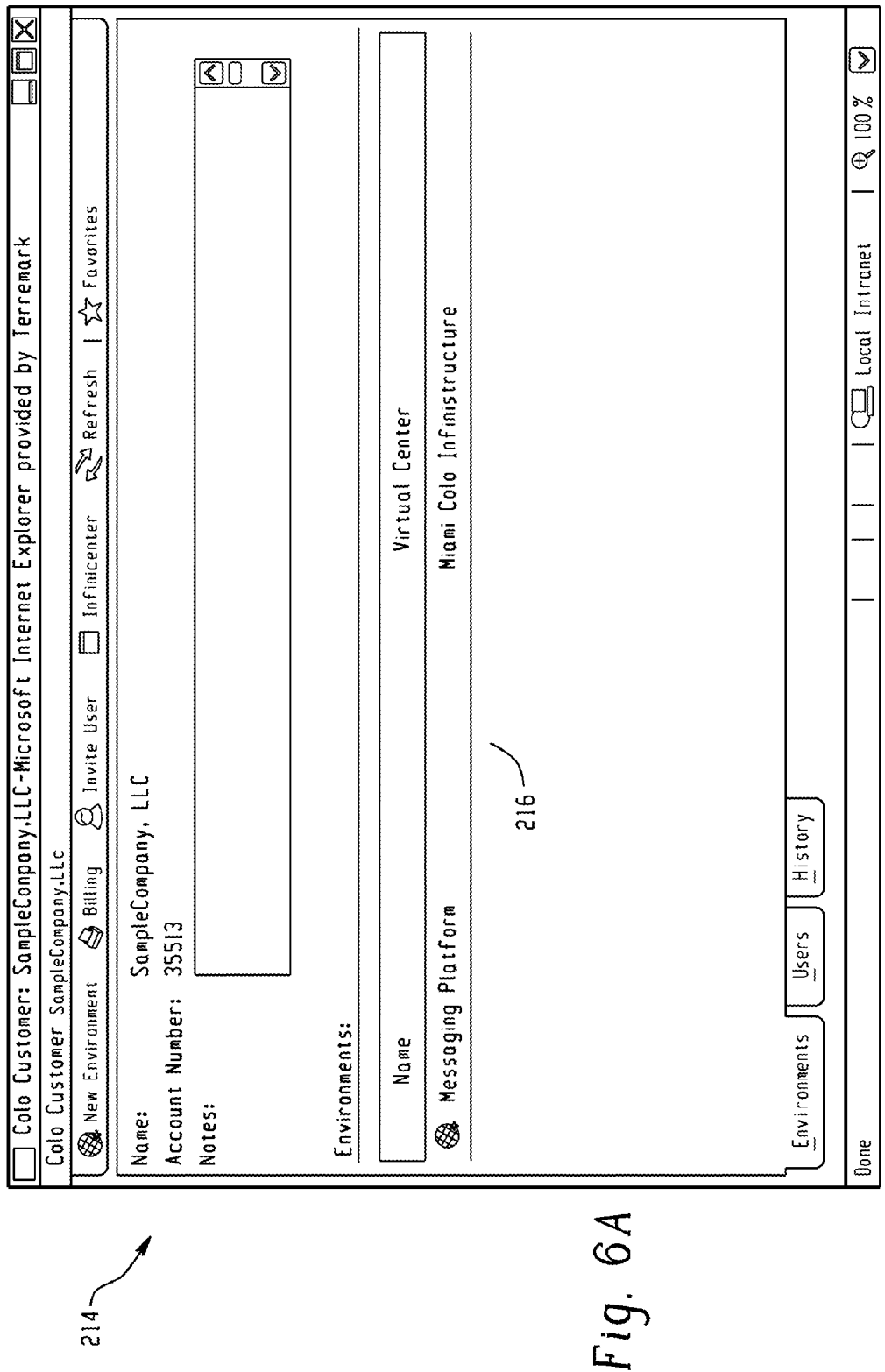
Figure 6C:
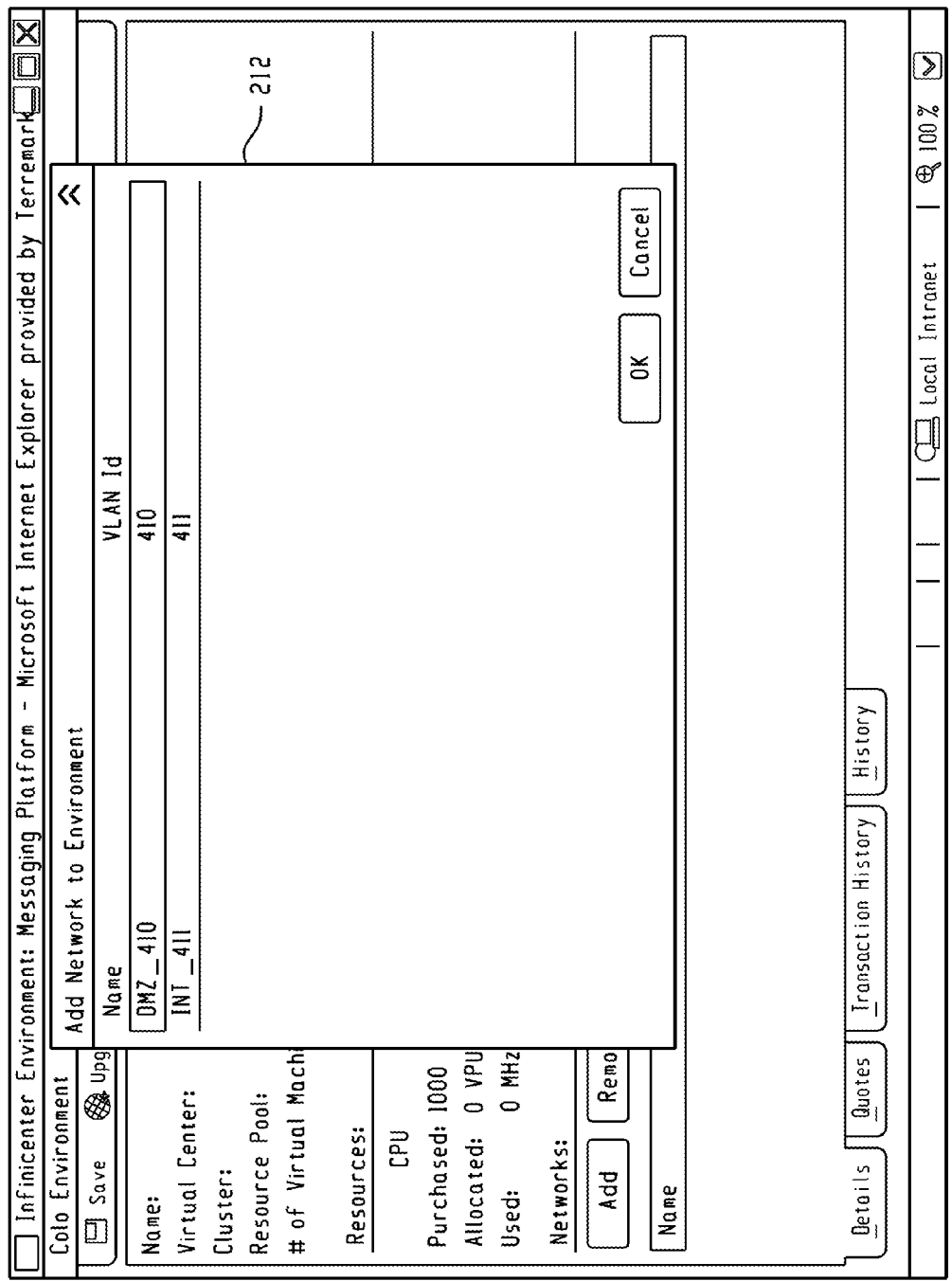
Figure 6D:
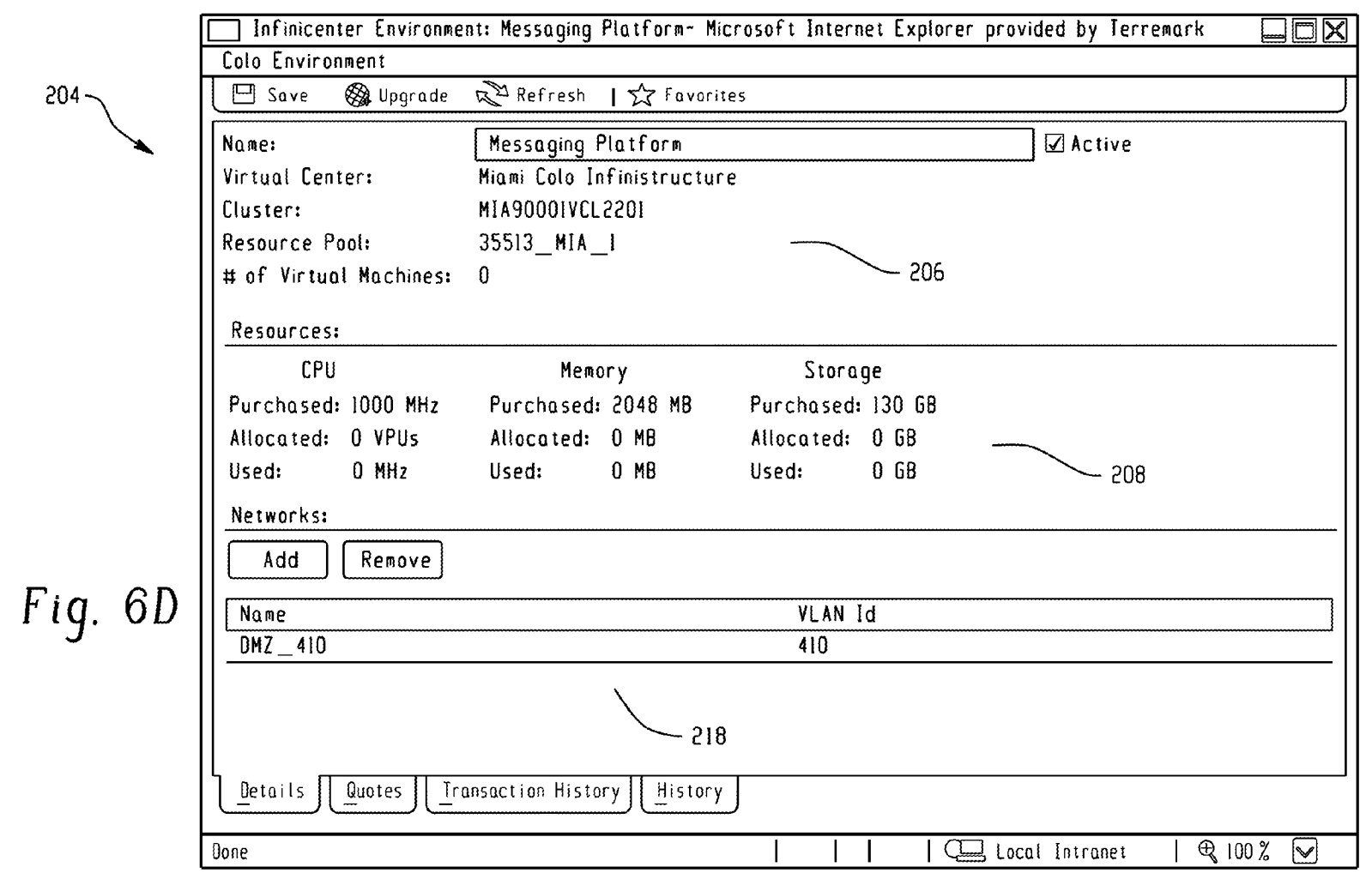

FIGS. 6A-6D depict graphical user interface screens of an exemplary administration console for adding a network connection to a customer environment. In FIG. 6A, a particular customer is selected, and the environments 216 associated with that customer are listed for selection. FIG. 6B depicts the interface screen 204 before the system administrator has completed the steps needed to associate a particular network connection with a selected customer environment. In FIG. 6C, the system administrator is able to add a network 212 to a newly-created customer environment. Once an environment is selected, FIG. 6D depicts the interface screen showing the details of the selected environment, as discussed above, and also showing that a particular network 218 has now been associated with the selected customer environment.

Figure 7B:
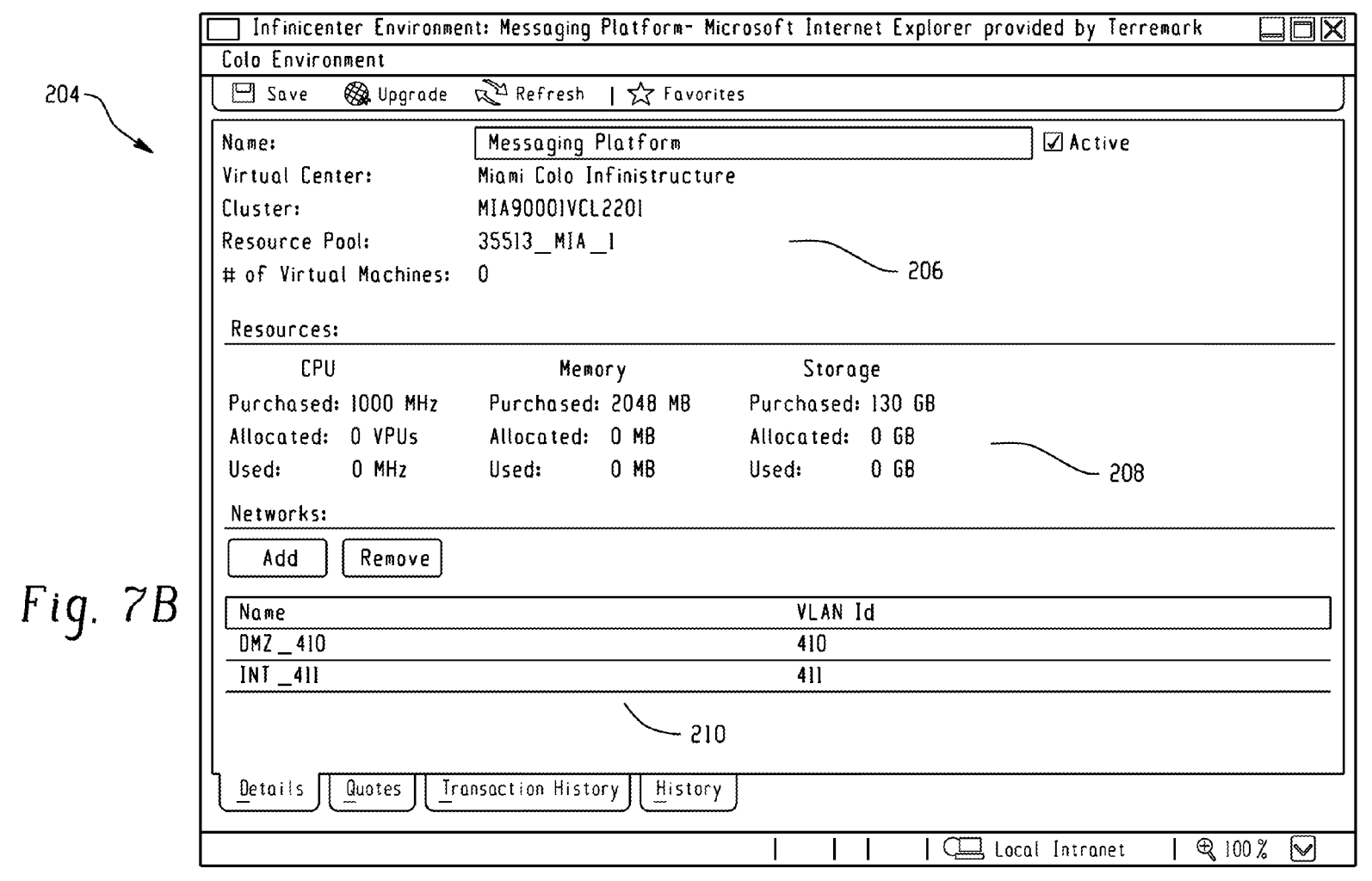
Figure 7C:
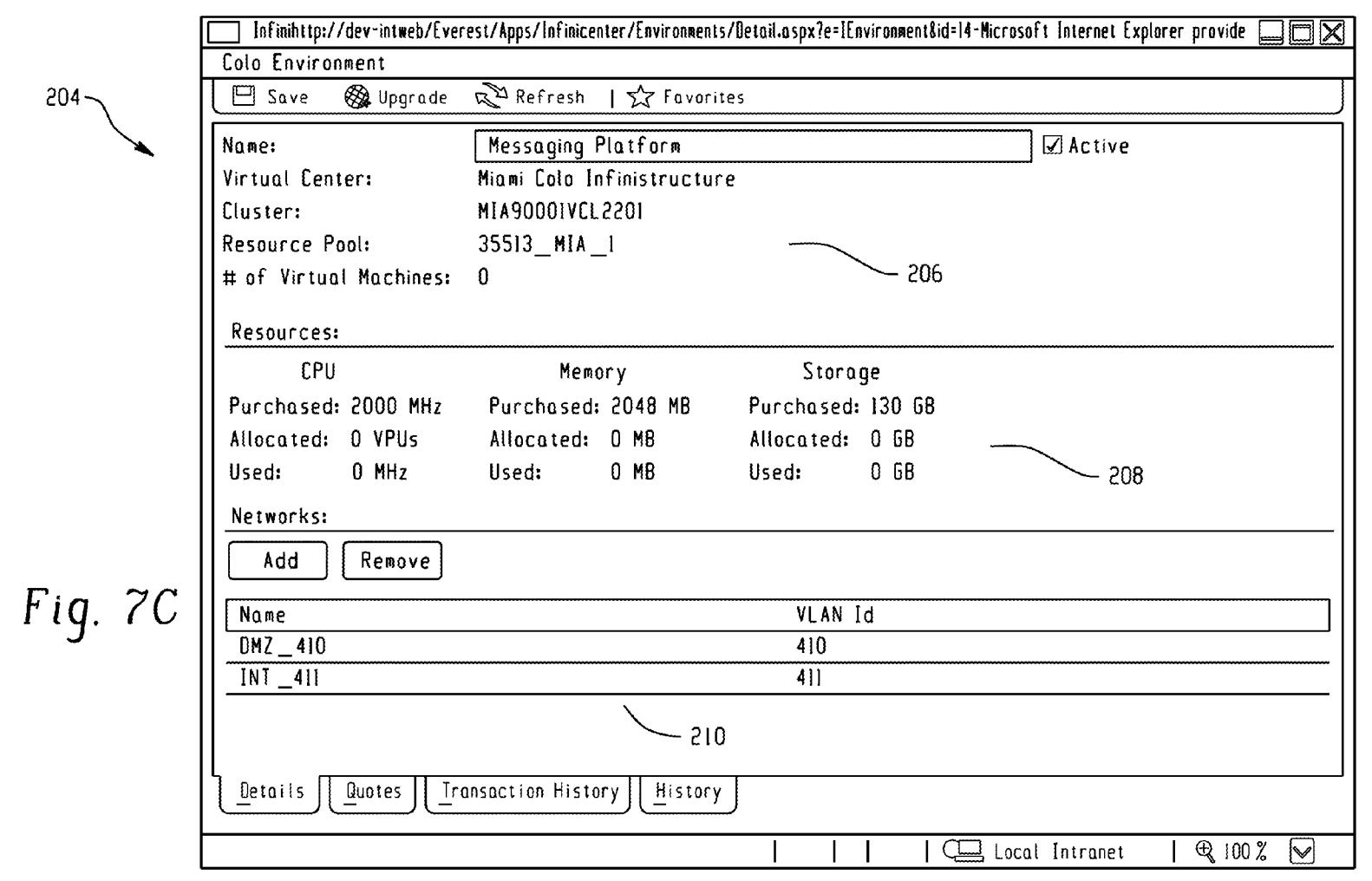

FIGS. 7A-7C depict graphical user interface screens of an exemplary administration console for upgrading a customer environment. FIG. 7A depicts an interface screen 220 providing details of a selected customer environment to be upgraded. In addition to the customer and environment name, listed at the top of the interface screen, this screen 220 includes a listing of available new quotations 222, current and upgraded resources associated with the environment 224, and options 226 such as activation date for the upgrade, and a selector to indicate whether this new upgrade quotation is co-terminus with an existing previously configured quotation. If the upgrade quotation is co-terminus, then a selector is provided for selecting the previous quotation with which to associate this new upgrade quotation for termination purposes. In FIG. 7A, an upgrade quotation listed in area 222 has been selected, which indicates that the customer has requested a 1000 MHz processor upgrade to be associated with this particular environment. By selecting this quotation in interface screen 220, the system upgrades the environment profile data associated with this customer environment such that the new processor configuration has been increased to 2000 MHz from the previously-configured amount of 1000 MHz. FIG. 7B depicts an interface screen 204 of the customer environment prior to being upgraded. Note here that the amount of CPU resource purchased and associated with this particular environment is 1000 MHz. FIG. 7C depicts the same interface screen 204 of the customer environment, but after the upgrade process has been completed through the interface screen 220. Here, the new upgrade processor amount of 2000 MHz is depicted.

Figure 8A:
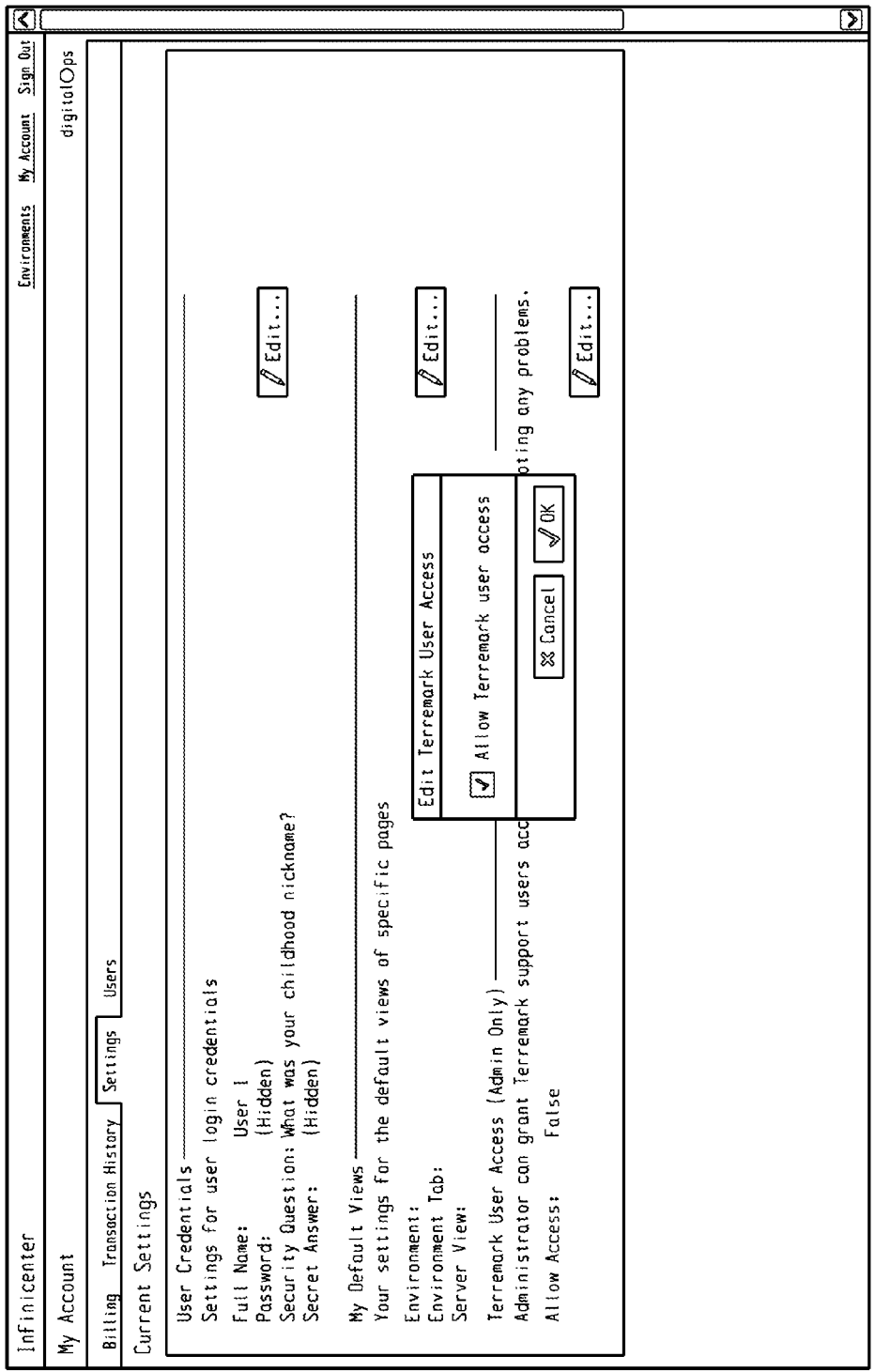
FIGS. 8A-8B depict graphical user interface screens of an exemplary customer provisioning console for enabling a customer administrator to grant access to the customer's environments by a system administrator of the customer provisioned utility computing platform.
Figure 8B:
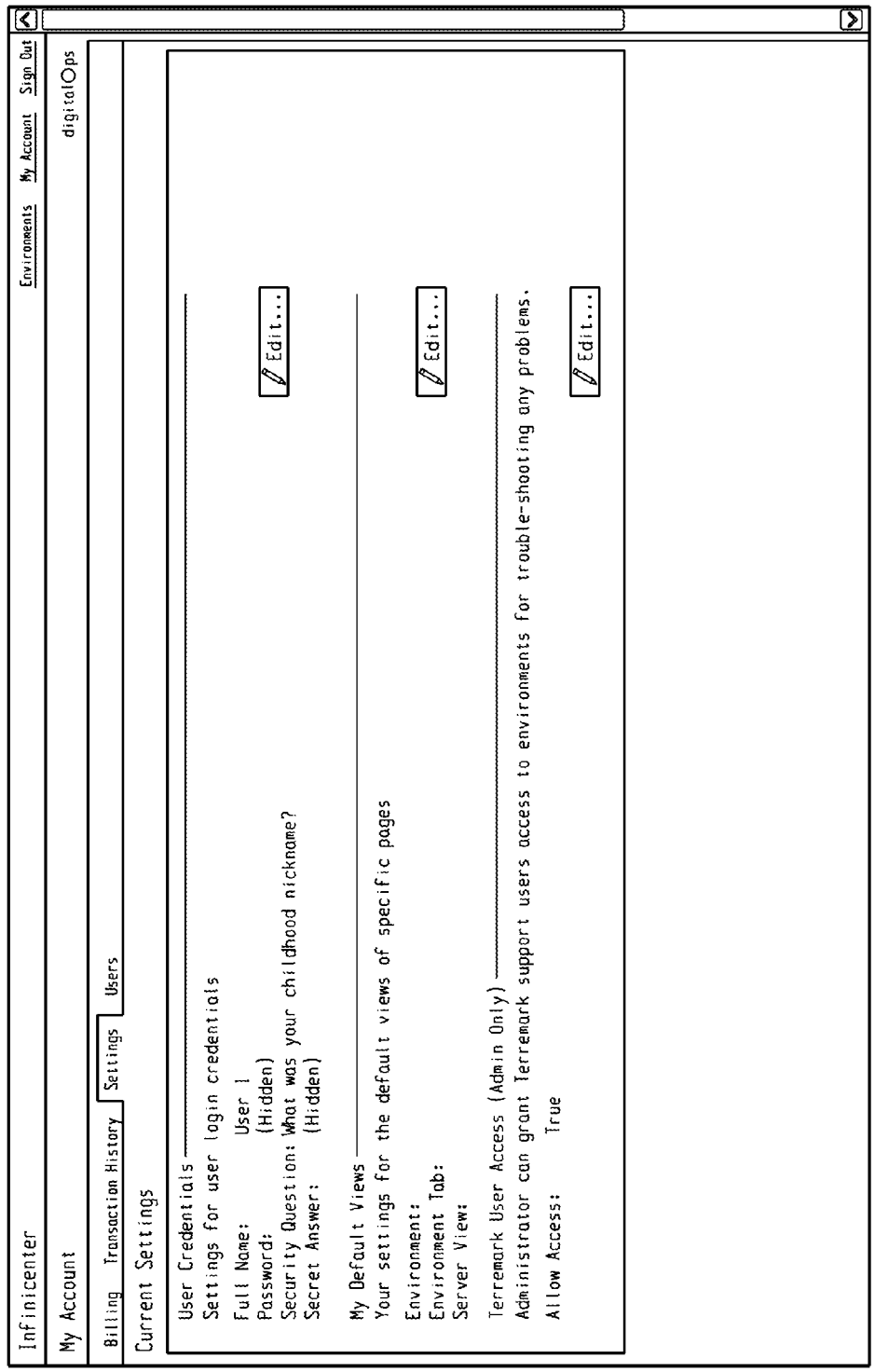

FIGS. 8A-8B depict graphical user interface screens 230 of an exemplary customer provisioning console for enabling a customer administrator to grant access to the customer's environments by a system administrator of the customer provisioned utility computing platform. The customer provisioning console is described in more detail below in connection with FIGS. 11-29.

Figure 9:
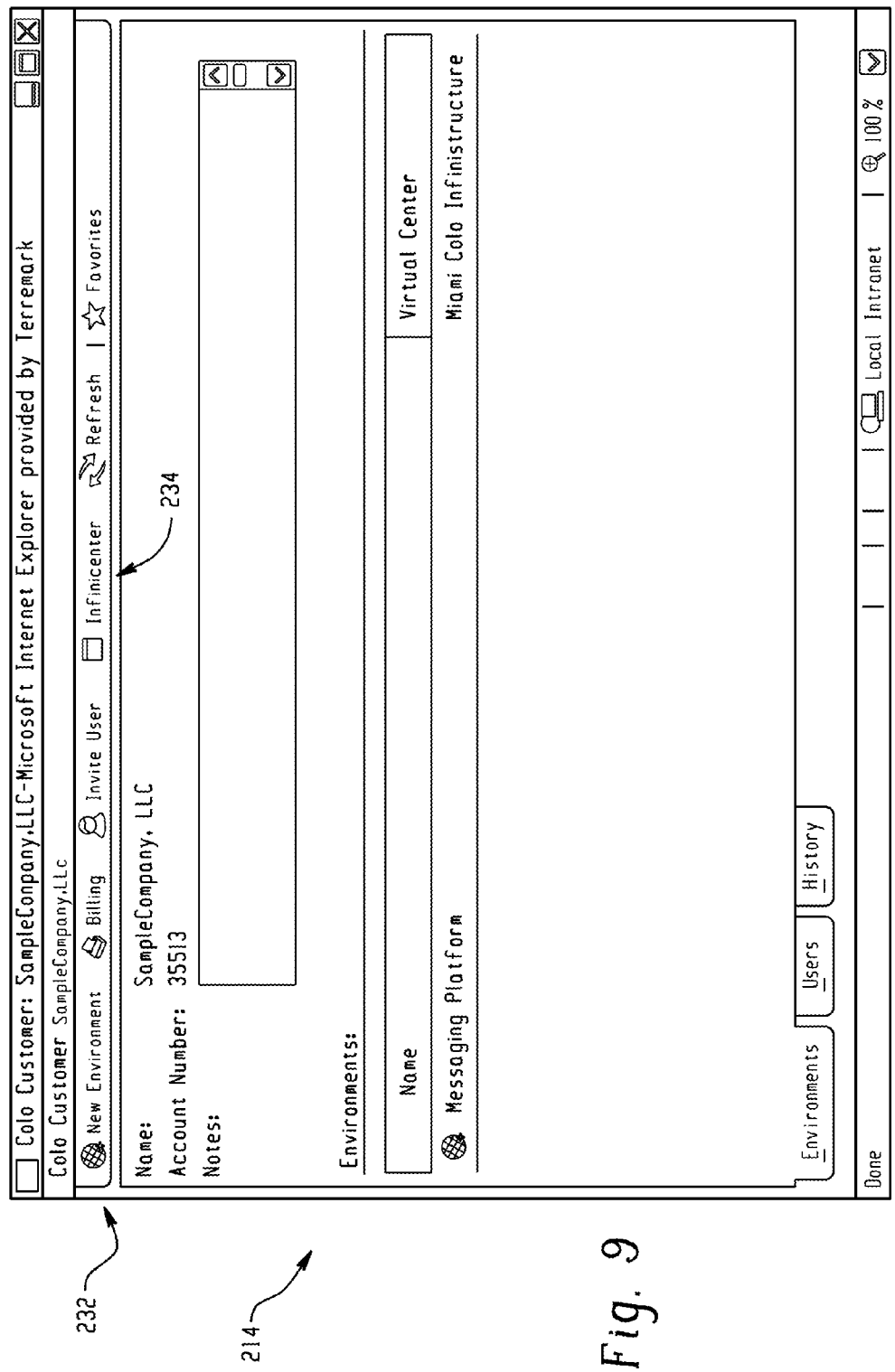
FIG. 9 depicts a graphical use interface screen of an exemplary administration console providing a system administrator access to customer environments through a customer provisioning console.

FIG. 9 depicts a graphical use interface screen 214 of an exemplary administration console providing a system administrator access to customer environments through a customer provisioning console. Here, assuming that the customer administrator has granted access rights to the system administrator (as shown in FIGS. 8A-8B), when the system administrator selects a particular customer environment through the administration console, as shown in FIG. 9, a new selector 234 is presented that enables the system administrator to access the customer's virtual environment through the customer provisioning console described in more detail below in connection with FIGS. 11-29.

Figure 10:
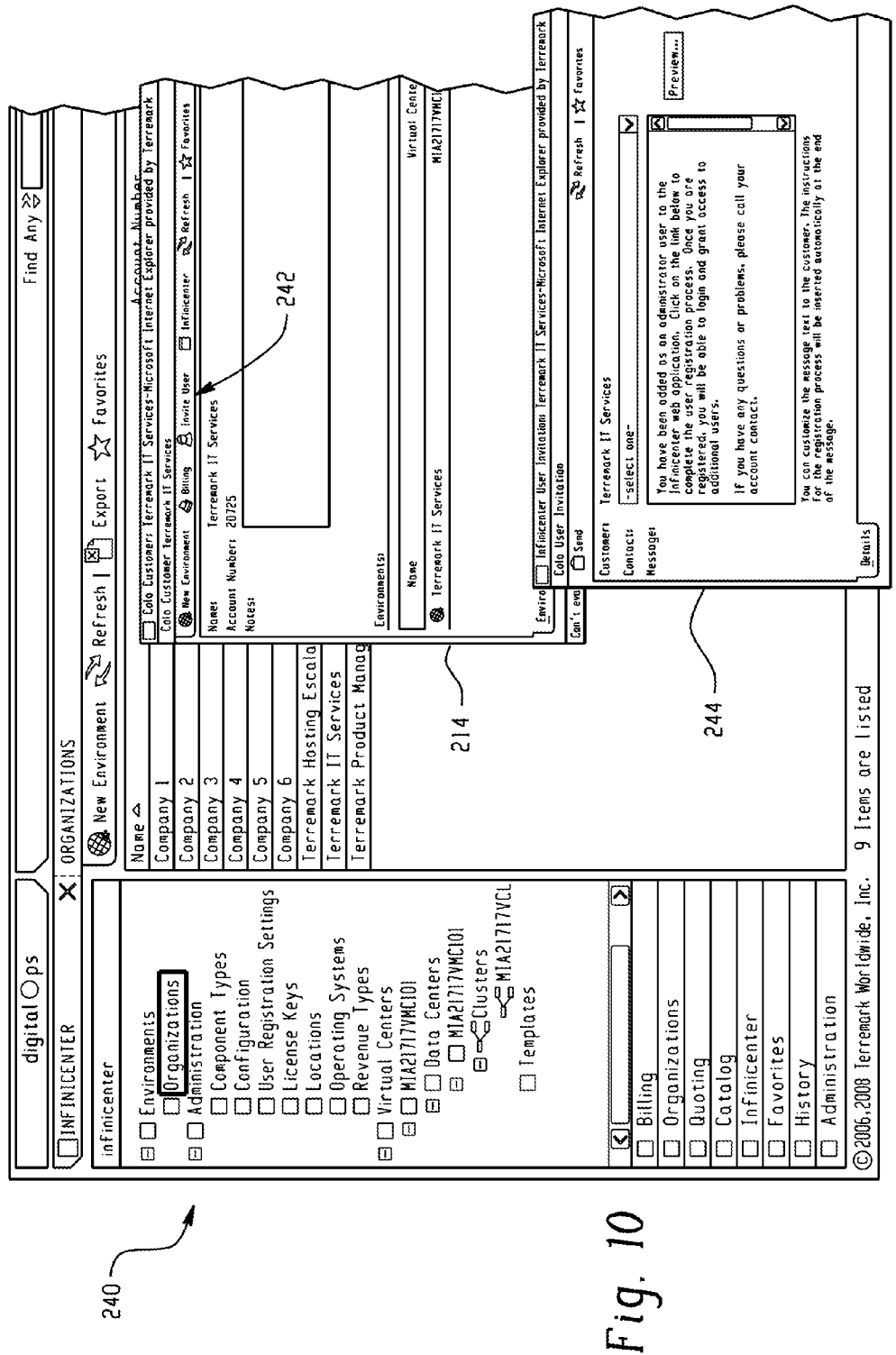
FIG. 10 depicts a graphical user interface screen of an exemplary administration console for inviting a customer contact to become a customer virtual system administrator.

FIG. 10 depicts a graphical user interface screen 240 of an exemplary administration console for inviting a customer contact to become a customer virtual system administrator. Here, the system administrator has selected a particular customer environment as shown in 214. From this screen 214, the system administrator selects the "Invite User" selector 242 in order to send an electronic message 244 to a particular customer contact that enables that contact person to complete a registration process in order to be able to access and configure a particular customer environment.

FIGS. 11-29 describe in further detail the operations of the customer provisioning console.

Figure 11A:
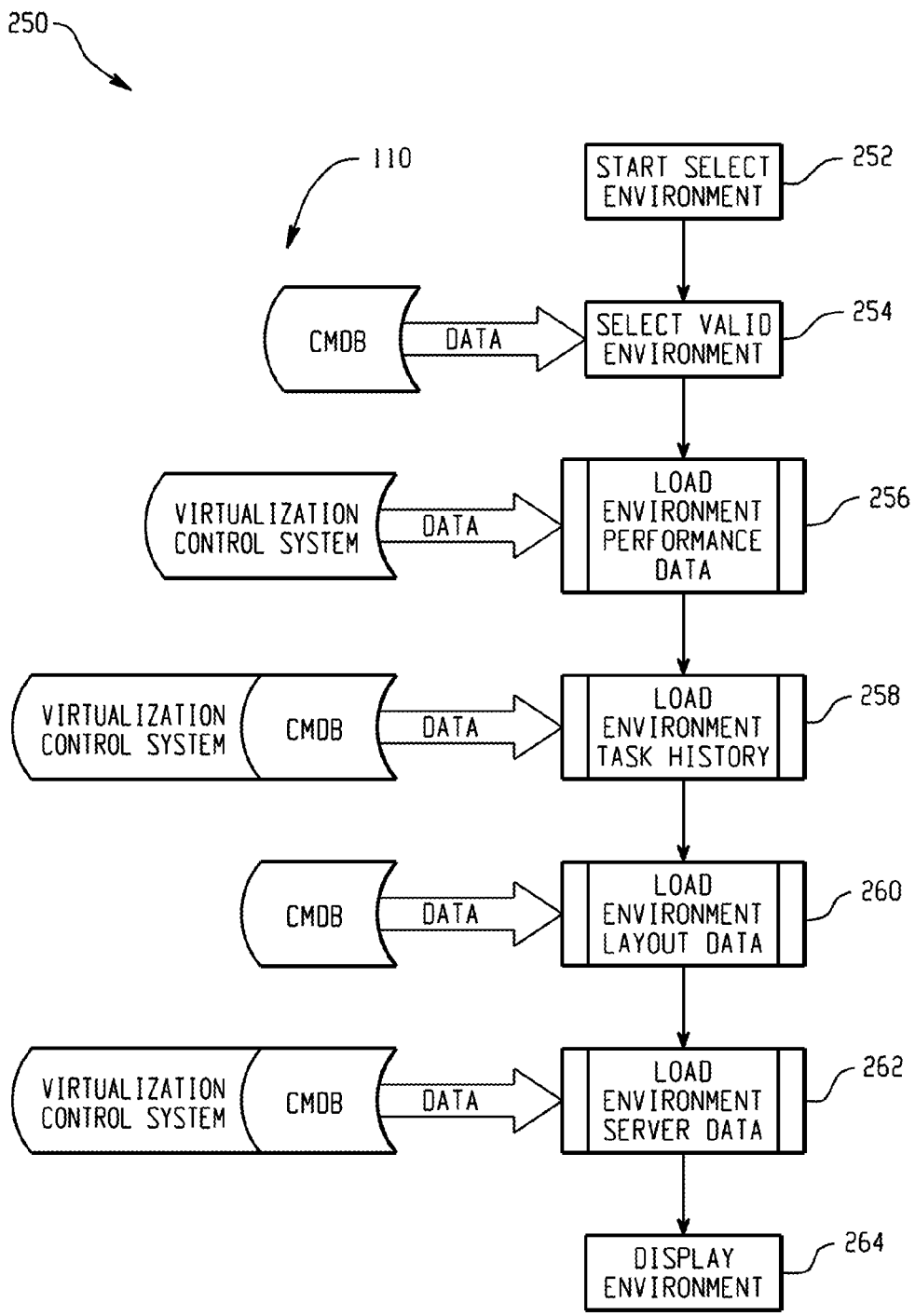
FIG. 11A is an exemplary flow diagram depicting a method for selecting a customer environment in a customer provisioned utility computing platform.

FIG. 11A is an exemplary flow diagram 250 depicting a method for selecting a customer environment in a customer provisioned utility computing platform. The method begins at 252. At step 254 the customer selects a valid environment from the available customer environments stored in the CMDB 110. Having selected a valid environment, performance data regarding the virtual resources associated with the selected environment is then obtained from the virtualization control system at step 256. At step 258 task history information is retrieved from the CMDB/Virtualization Control system. This task history information may include data regarding the creation, modification, upgrading and configuration of the virtual resources associated with the selected environment. Following this step, graphical layout information regarding the selected environment is obtained from the CMDB, which may include information regarding the look-and-feel of the graphical user interface displaying the information previously obtained regarding the selected environment, such as the positioning of virtual servers in a user-defined organization or rows and groups of virtual servers. This user-defined organization, which is described in more detail below, enables the customer to organize their virtual server resources associated with the selected environment in any manner the user desires. Finally, at step 262 the specific details of the virtual server resources associated with the selected environment is obtained from the CMDB/Virtualization control system 110, and at step 264, all of the previously obtained information from steps 254-262 is then used to display the selected environment to the customer. (FIG. 13, discussed below, depicts a graphical user interface screen of an exemplary customer provisioning console for selecting an environment.)

Figure 11B:
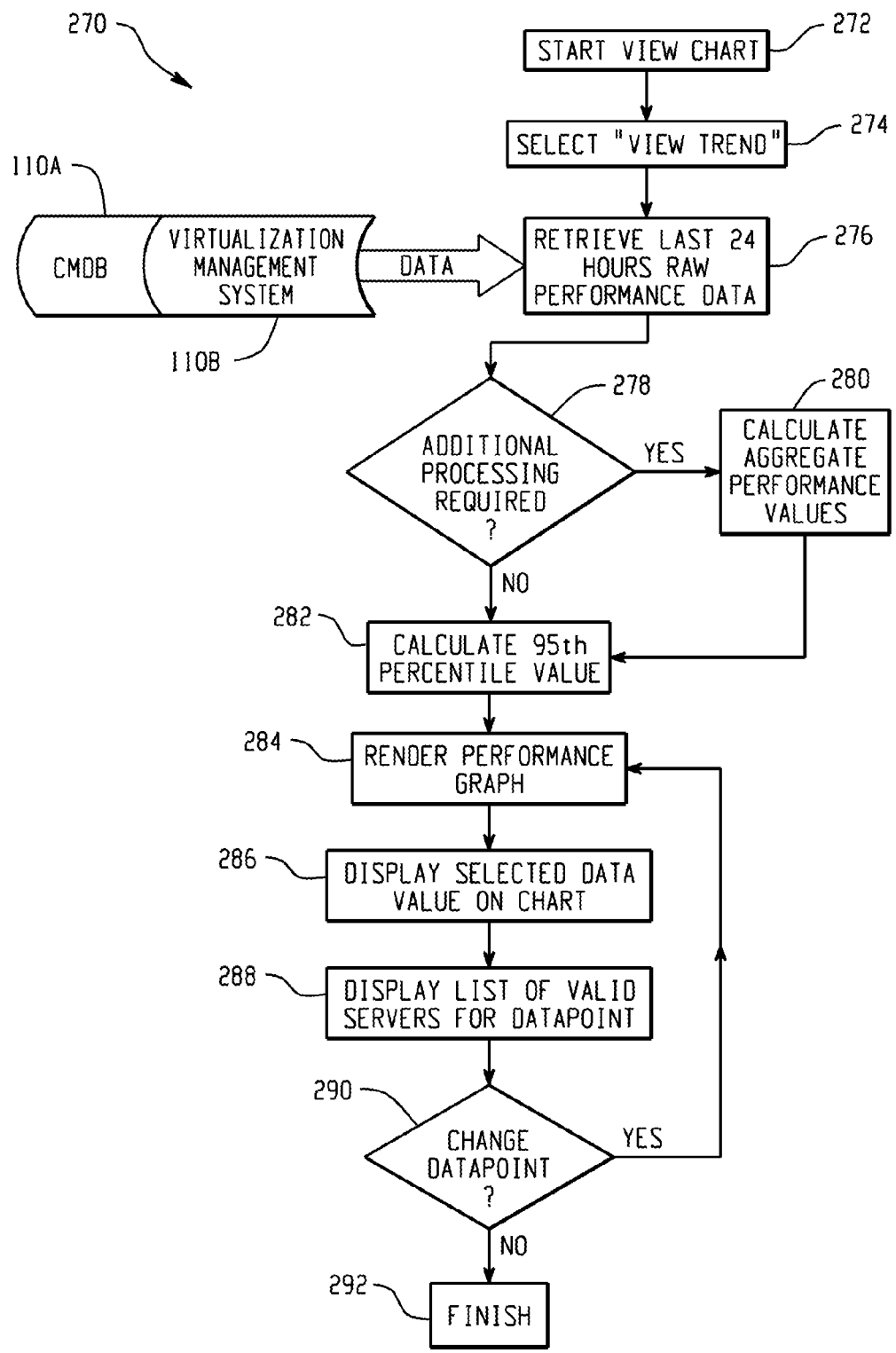
FIG. 11B is an exemplary flow diagram depicting a method for viewing and analyzing customer processor and memory resources associated with one or more customer environments.

FIG. 11B is an exemplary flow diagram 270 depicting a method for viewing and analyzing customer processor and/or memory resources associated with one or more customer environments. The method begins at 272, where the customer selects a chart to view, such as a processor chart or a memory chart. At step 274 the customer selects to "view trend" information regarding the processor or memory resource. Following this, performance data regarding the selected virtual resource (processor or memory) is retrieved from the CMDB/Virtualization control system 110A/110B at step 276. Step 278 determines whether additional processing is required of the obtained performance data, depending on the type of data and the type of calculations that the system needs to perform. If additional processing is required, then control passes to step 280, where, for example, aggregate performance values may be calculated from the performance data obtained from the system. Following this step, control passes to step 282, wherein the system calculates the 95$^{th}$ percentile value of the obtained performance data.

In this step 282, the system samples the performance data, sorts it from high to low, and then identifies the top five percent of data samples, which are discarded. The remaining highest value sample is identified as the 95$^{th}$ percentile value for the obtained performance data. In making this percentile calculation, data spikes that occur for a very short duration in time, representing high resource utilization but for very short time durations, are essentially ignored as the system attempts to locate high resource utilization that also lasts for a significant duration in time. This high utilization/long duration activity is much more relevant to the customer analyzing the performance of their virtual resources than brief spikes in usage.

Figure 14:
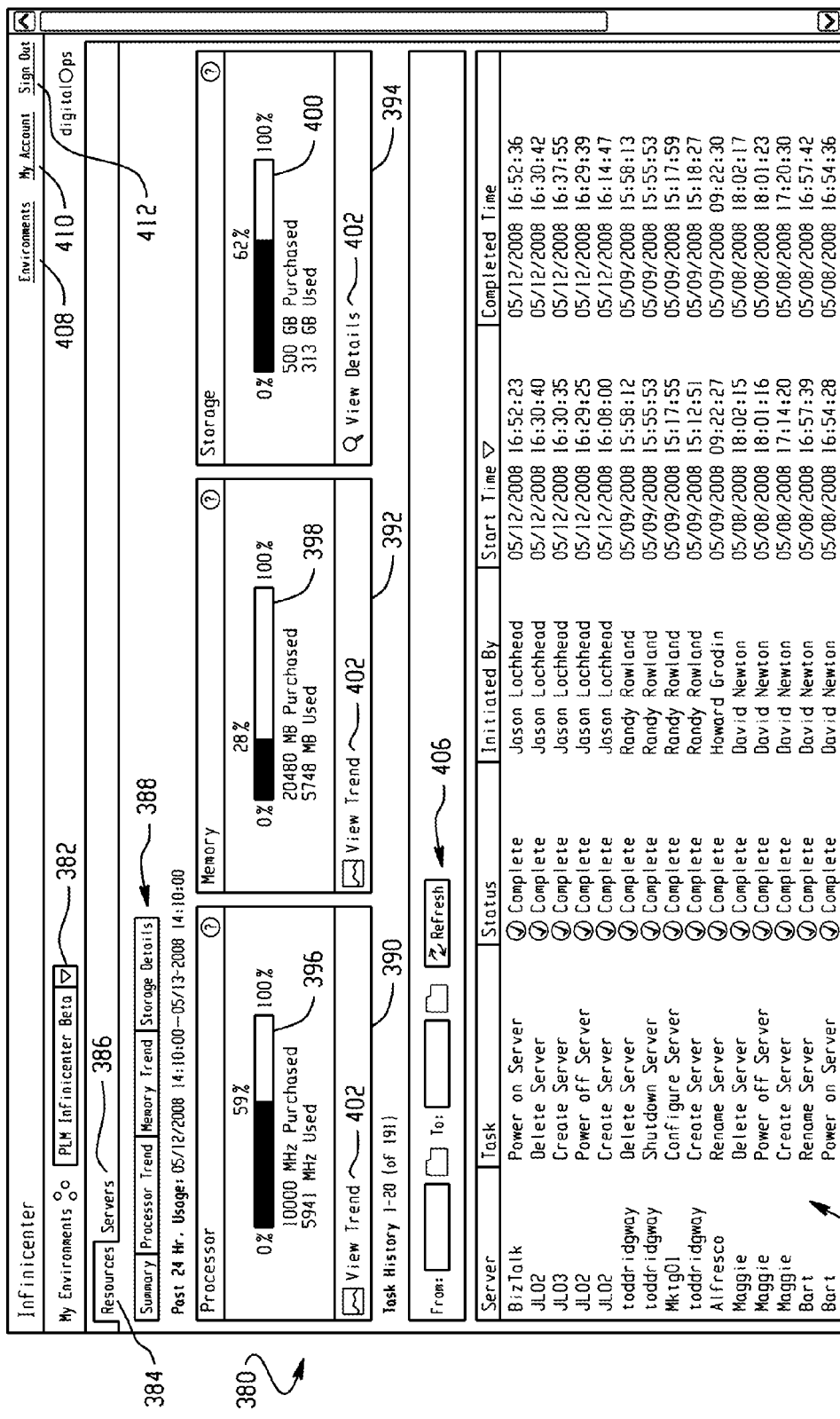
FIG. 14 depicts a graphical user interface screen of an exemplary customer provisioning console for viewing the virtual resources associated with a selected customer environment.
Figure 15:
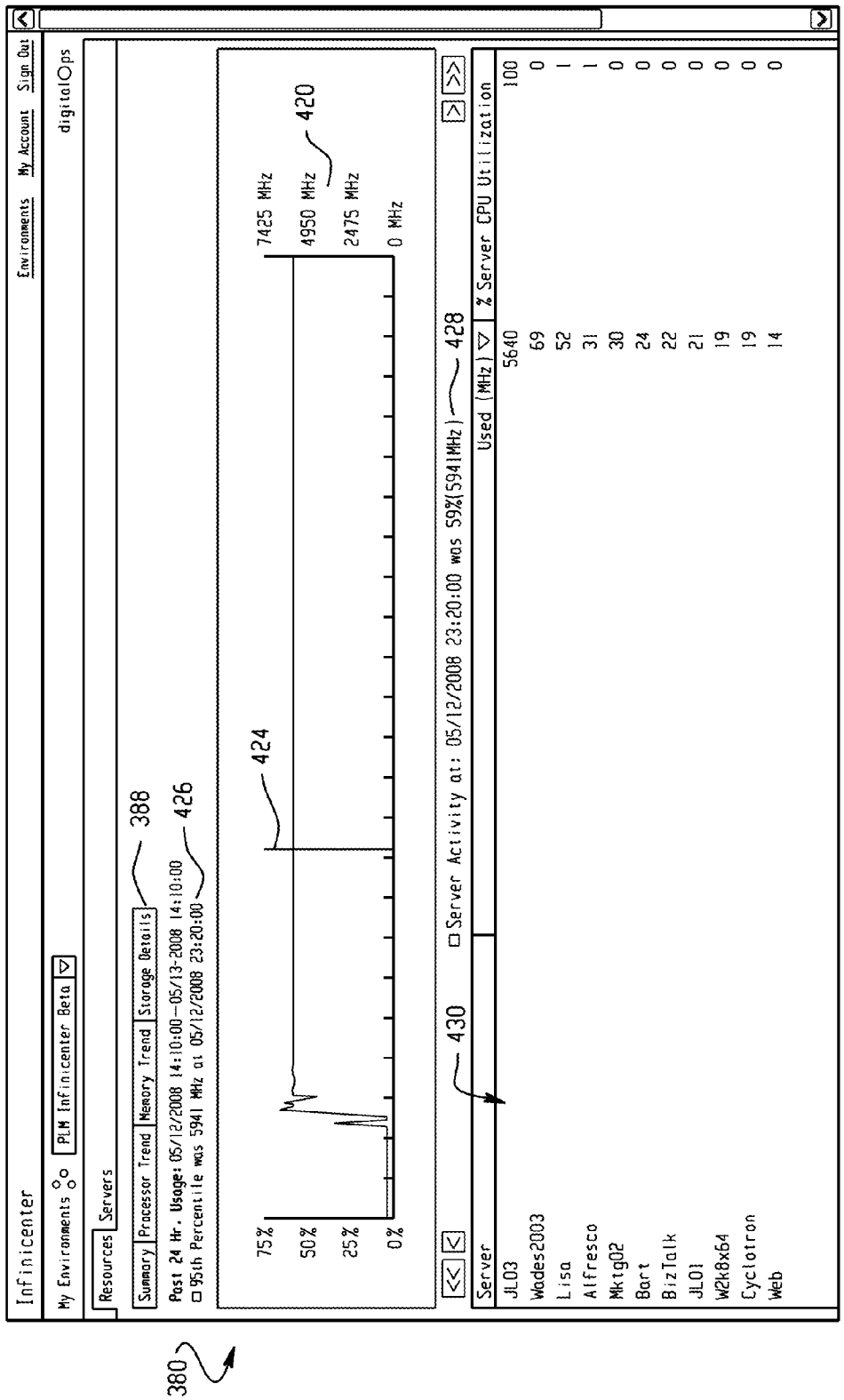
FIG. 15 depicts a graphical user interface screen of an exemplary customer provisioning console for viewing processor trend data associated with a selected customer environment.
Figure 16:
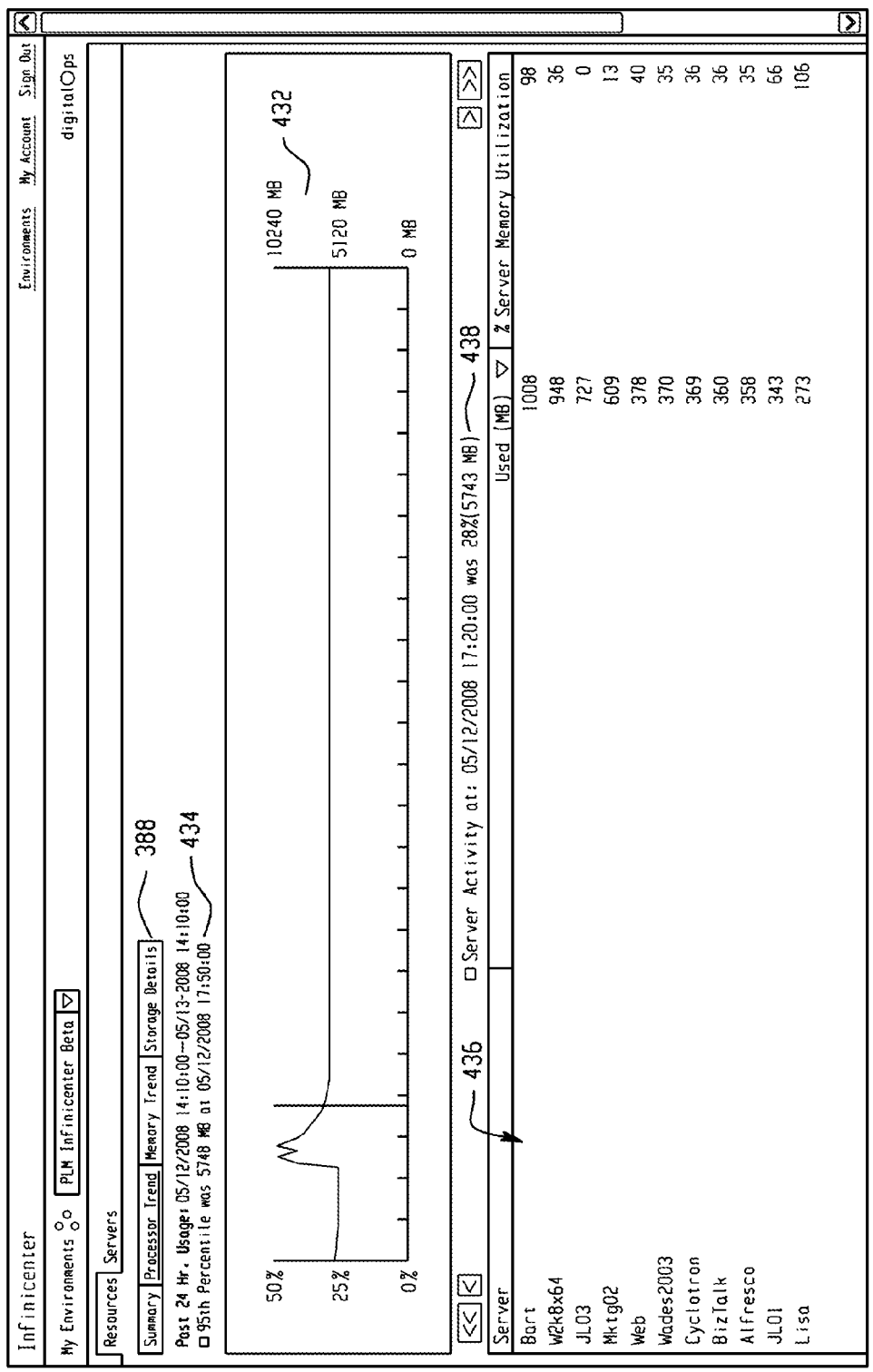
FIG. 16 depicts a graphical user interface screen of an exemplary customer provisioning console for viewing memory trend data associated with a selected customer environment.

Having made the 95$^{th}$ percentile calculation, control then passes to step 284, where the system renders a performance graph of the obtained performance data. The customer is then able to highlight/select and display selected performance data values on the rendered chart (step 286) and/or display a list of valid virtual servers associated with a selected data point (step 288). The customer may also select a particular virtual server associated with a particular selected performance data point in order to obtain additional information from the virtualization control system regarding the performance and operation of the selected virtual server in order to further analyze and diagnose any performance problems. At step 290 the customer is able to change the selected data point to another point on the displayed graph and control passes back to step 284. The method ends at 292. (FIG. 14 depicts a graphical user interface screen of an exemplary customer provisioning console for viewing the virtual resources associated with a selected customer environment; FIGS. 15 and 16 depict graphical user interface screens for rendering, viewing, manipulating and analyzing virtual resource trend data associated with virtual processor (FIG. 15) and memory (FIG. 16) resources associated with a customer's selected environment).

Figure 11C:
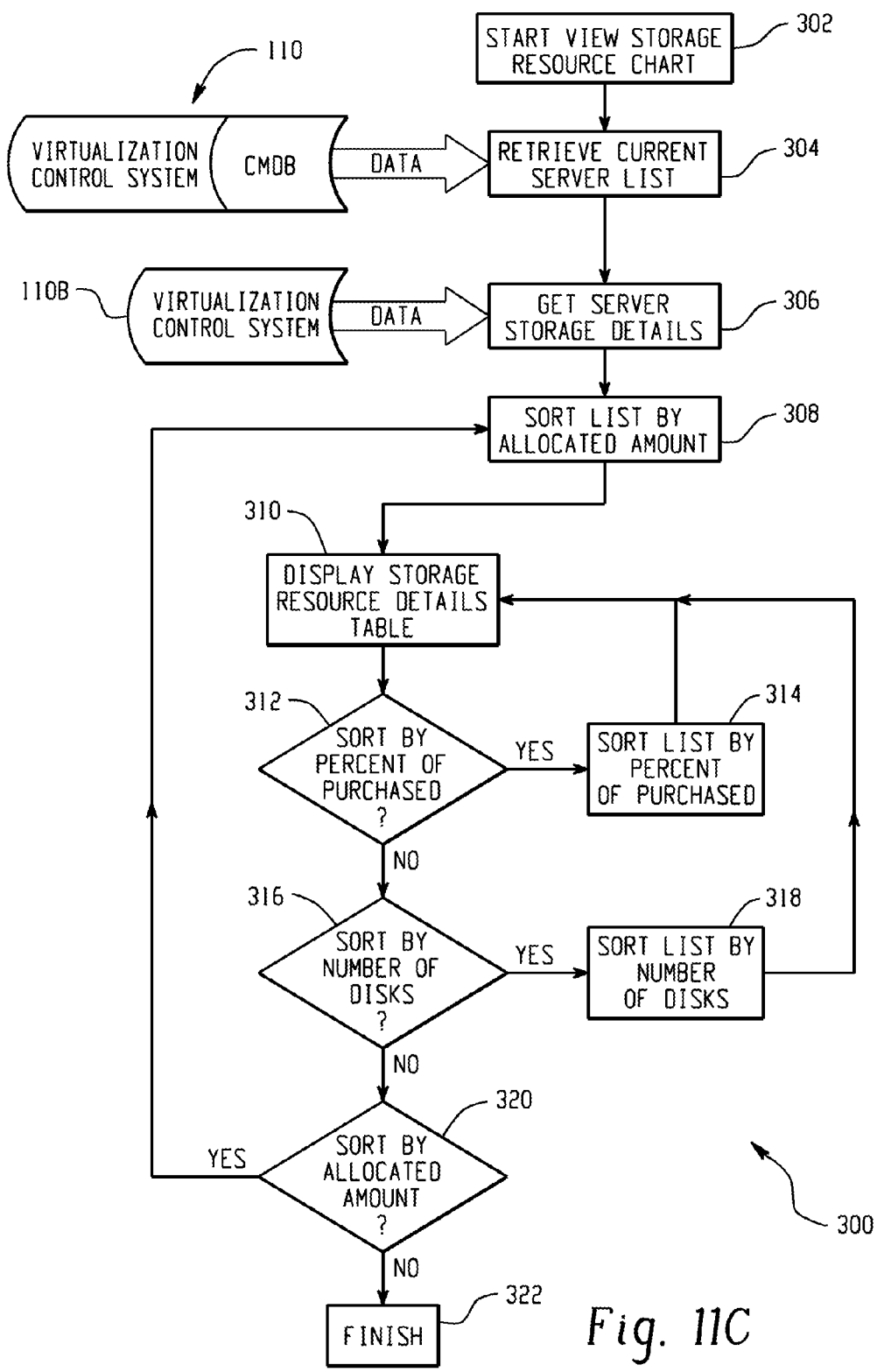
FIG. 11C is an exemplary flow diagram depicting a method for viewing and analyzing customer storage resources associated with one or more customer environments.
Figure 17:
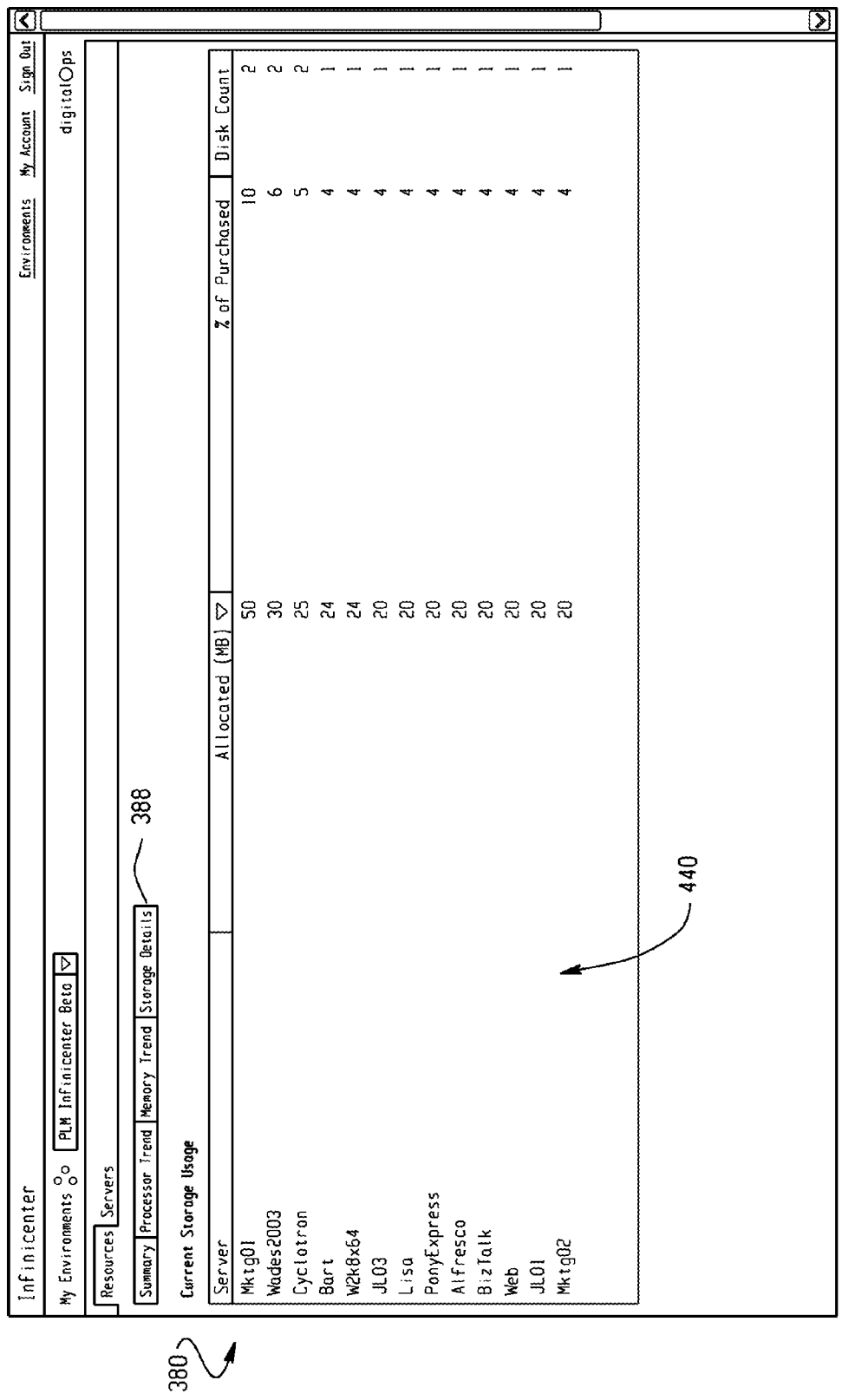
FIG. 17 depicts a graphical user interface screen of an exemplary customer provisioning console for viewing storage detail data associated with a selected customer environment.

FIG. 11C is an exemplary flow diagram 300 depicting a method for viewing and analyzing customer storage resources associated with one or more customer environments. The method begins at 302. At step 304 the system retrieves a current virtual server list from the CMDB/Virtualization control system 110. Storage details associated with the obtained list of virtual server resources is then obtained from the virtualization control system 110B at step 306. A list of storage resources is then sorted at step 308 by the amount of storage allocated to each resource. A table showing the sorted list of virtual storage resources is then displayed at 310. The customer, viewing the table of virtual storage resources, is then able to re-sort the list of storage resources by percentage of purchased virtual storage resources at step 312, which causes a resorting of the virtual storage resources at step 314, or the customer can re-sort the list of storage resources by the number of disks, which causes a resorting of the virtual storage resources at step 318. If neither of the re-sorting operations is executed at steps 312 or 316, then the obtained data on the virtual storage resources may be sorted by allocated amount at step 320. The method ends at 322. (FIG. 17 depicts a graphical user interface screen of an exemplary customer provisioning console for viewing storage detail data associated with a selected customer environment.)

Figure 11D:
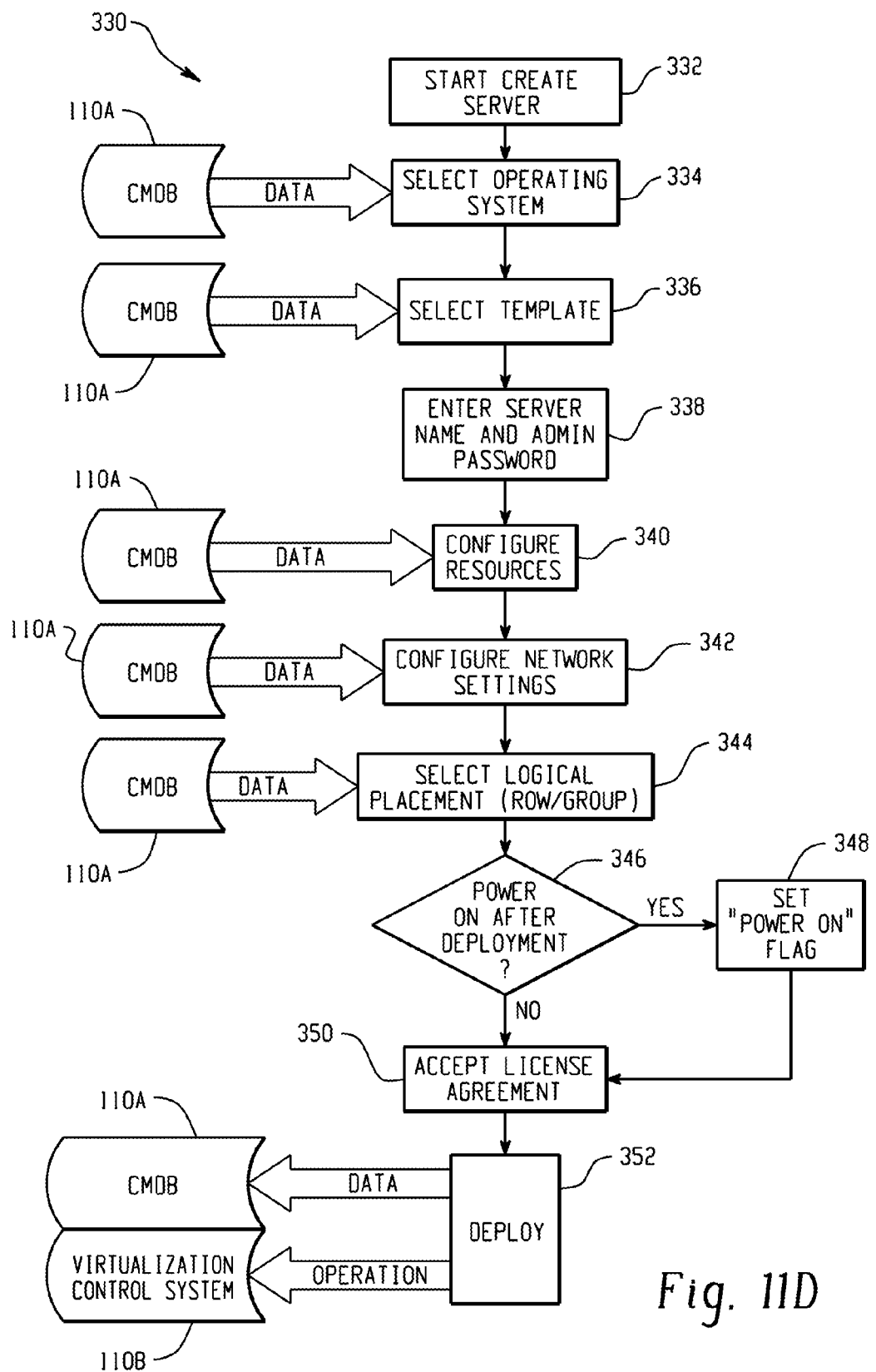
FIG. 11D is an exemplary flow diagram depicting a method for creating a virtual server within a customer environment of a customer provisioned utility computing platform.

FIG. 11D is an exemplary flow diagram 330 depicting a method for creating a virtual server within a customer environment of a customer provisioned utility computing platform. The method begins at 322 where the customer selects the create server function from within a selected customer environment. At step 334 the customer selects an operating system to be associated with the virtual server resource. In doing so, information regarding the available operating systems, such as various Windows, Unix, Linux, or other forms of server operating systems, is obtained from the CMDB 110A. Having selected an operating system for the virtual server, the customer then selects from an available template for the selected operating system, the template information also coming from the CMDB 110A. An operating system template, broadly speaking, is a pre-configured collection of software components or modules that are associated with a particular operating system. For example, an operating system template may include various ancillary administration applications associated with the selected operating system, database applications, or other types of system or user applications that are to be installed and used with the virtual server resource being created by the customer.

At step 338, the customer enters a virtual server name and provides an administration password to be used in configuring and managing the virtual server. At step 340, the customer configures the processing, memory, and storage resources to be associated with the virtual server being created. Instead of provisioning a virtual server having a fixed set of virtual resources, however, the methodology described herein enables the customer to associate a specific user-defined amount of processor, memory and storage resources to each virtual server, up to and including the total amount of resources that have been associated with the selected customer environment within which the virtual server is to exist. If additional resources are required for a particular server beyond the allocated amount, then the customer can upgrade the selected environment to include additional resources and return to the customer console application in order to upgrade the resources associated with a particular virtual server. In addition, although a predetermined amount of virtual resources are configured and associated with each virtual server, the system described herein may allow dynamic upgrading to a particular virtual server based on a particular contract arrangement with the customer, or based on a particular agreed-upon time interval for accessing the additional resources. Following this step, the network settings for the virtual server are configured at step 342, and at step 344 the customer selects a logical placement for the virtual server within the graphical user interface environment displayed through the customer console that depicts the overall virtual server implementation of the selected customer environment. This is typically accomplished by selecting a particular row and group for placement of the virtual server being created.

Figure 18A:
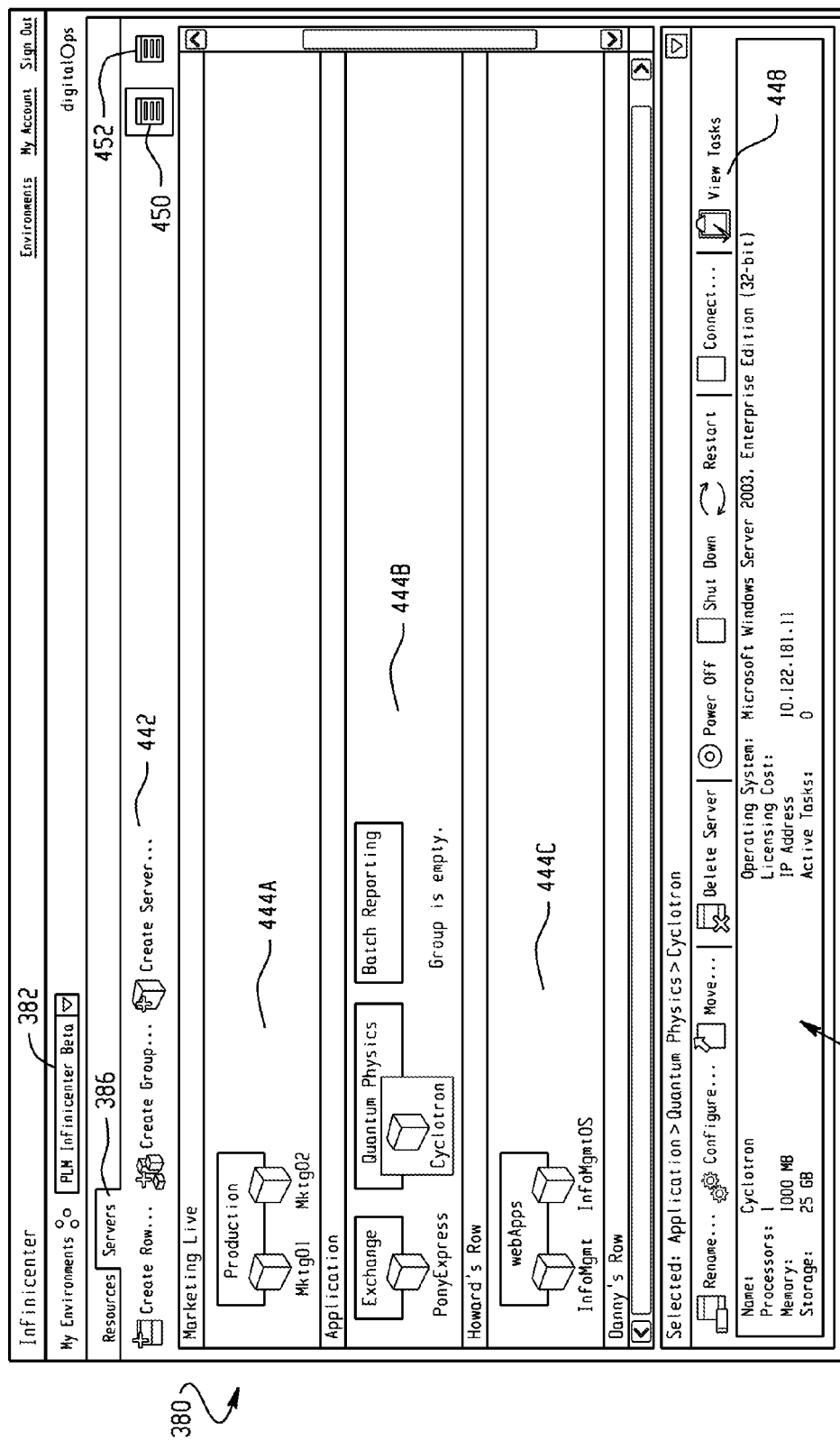
FIGS. 18A-18B depict graphical user interface screens of the exemplary customer provisioning console for viewing virtual servers within a customer environment.
Figure 18B:
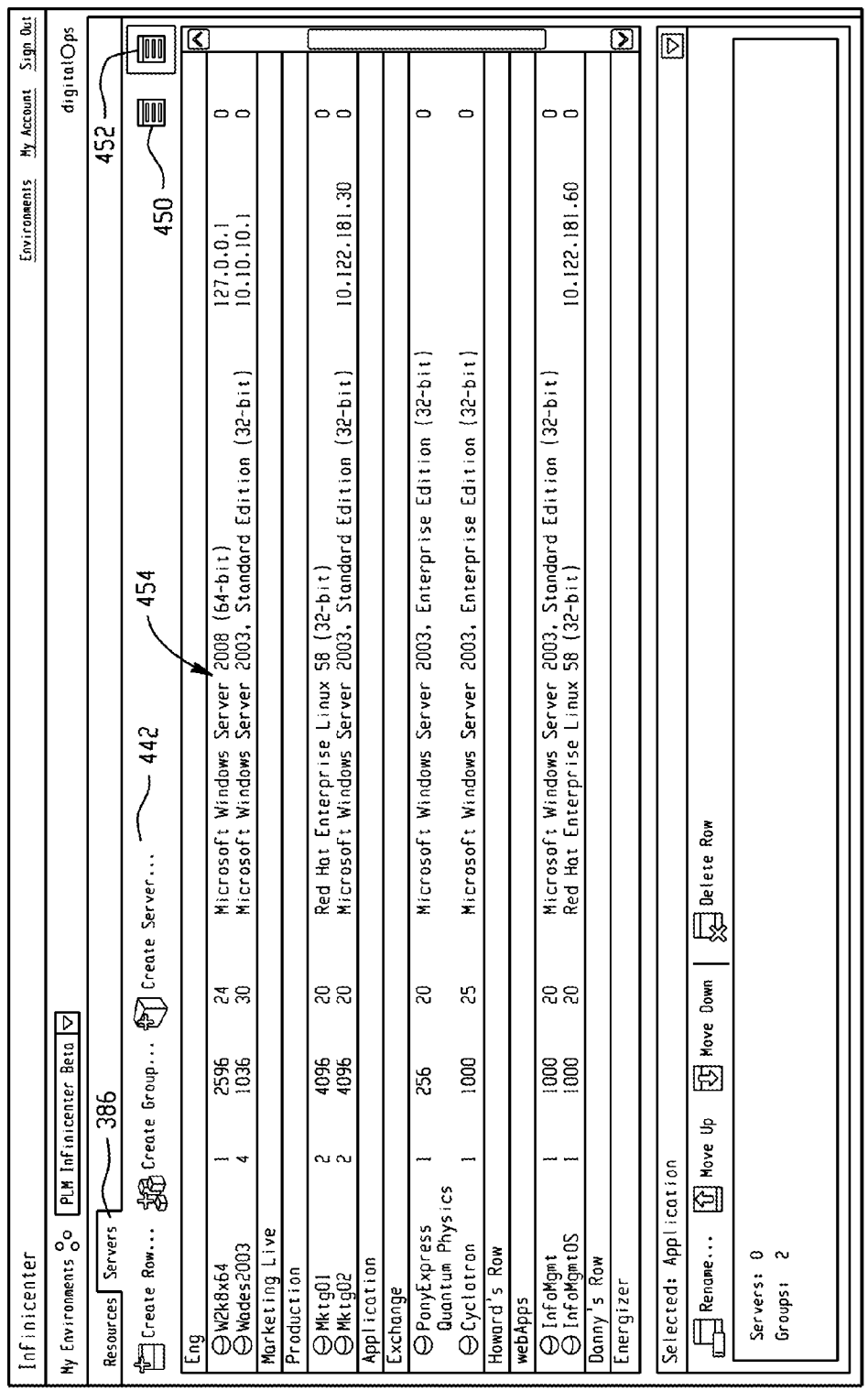

Having provisioned the resources of the virtual server and determined its graphical location within the selected customer environment, the customer then determines whether to power on the virtual server after deployment to the customer environment. If so, then a "power on" flag is set at step 348. Control passes to step 350, where the customer must accept the licensing terms for the created virtual server as configured using the selected operating system template. The virtual server is then deployed at step 352, and the configuration, provisioning and location data is then written to the CMDB and the Virtualization control system 110A, 110B. (FIGS. 18A-18B depict graphical user interface screens of the exemplary customer provisioning console for viewing virtual servers within a customer environment. FIGS. 20A-20J depict graphical user interface screens of the exemplary customer provisioning console for creating a new server within a customer environment).

Figure 12:
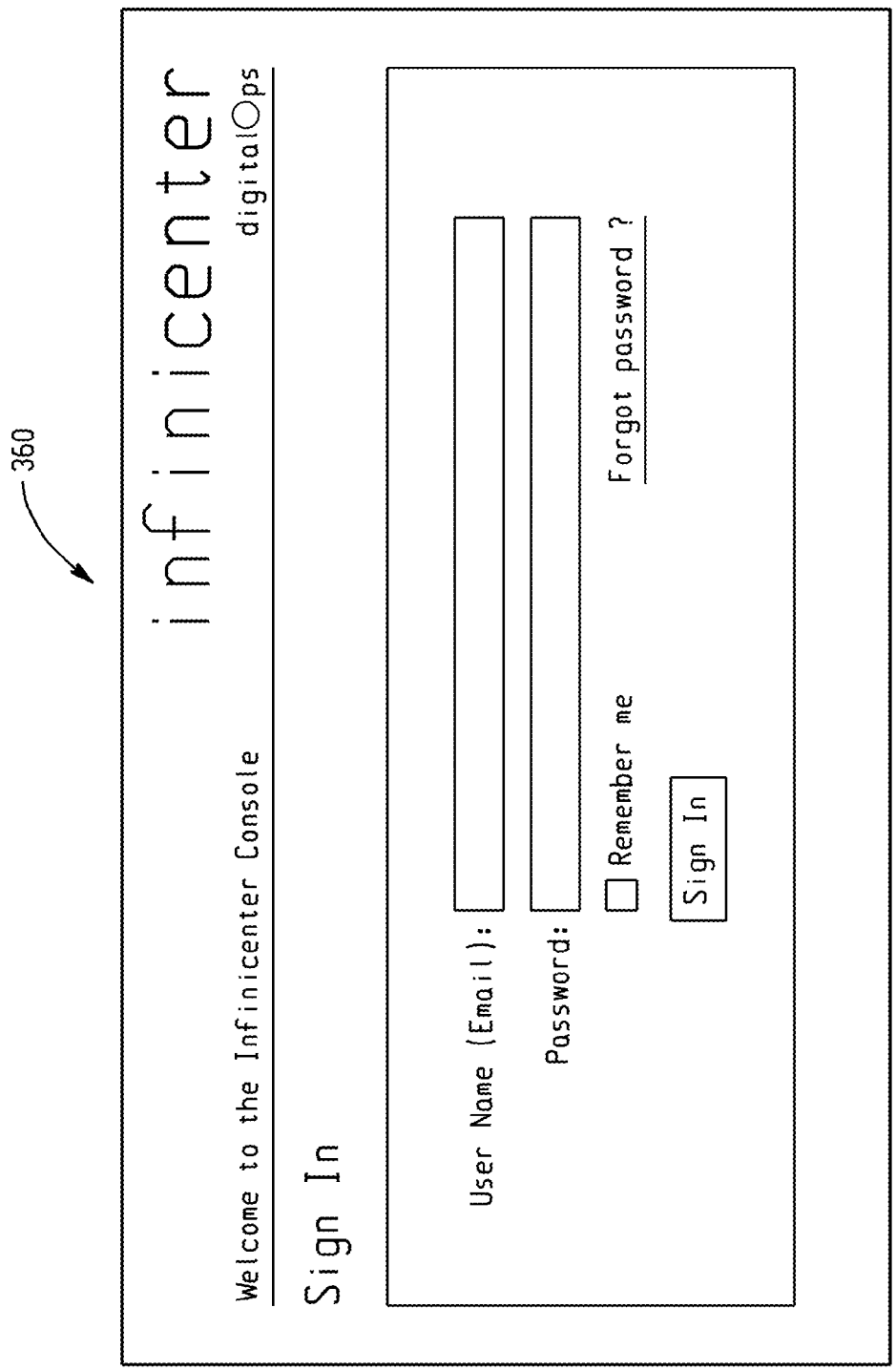
FIG. 12 depicts a graphical user interface screen of an exemplary customer provisioning console for logging into the customer provisioned utility computing platform.

FIG. 12 depicts a graphical user interface screen 360 of an exemplary customer provisioning console for logging into the customer provisioned utility computing platform. This interface screen 360, as well as the remaining interface screens described herein with respect to the customer provisioning console, are preferably accessed and rendered in a standard web browser application capable of accessing the system via a standard Internet connection.

Figure 13:
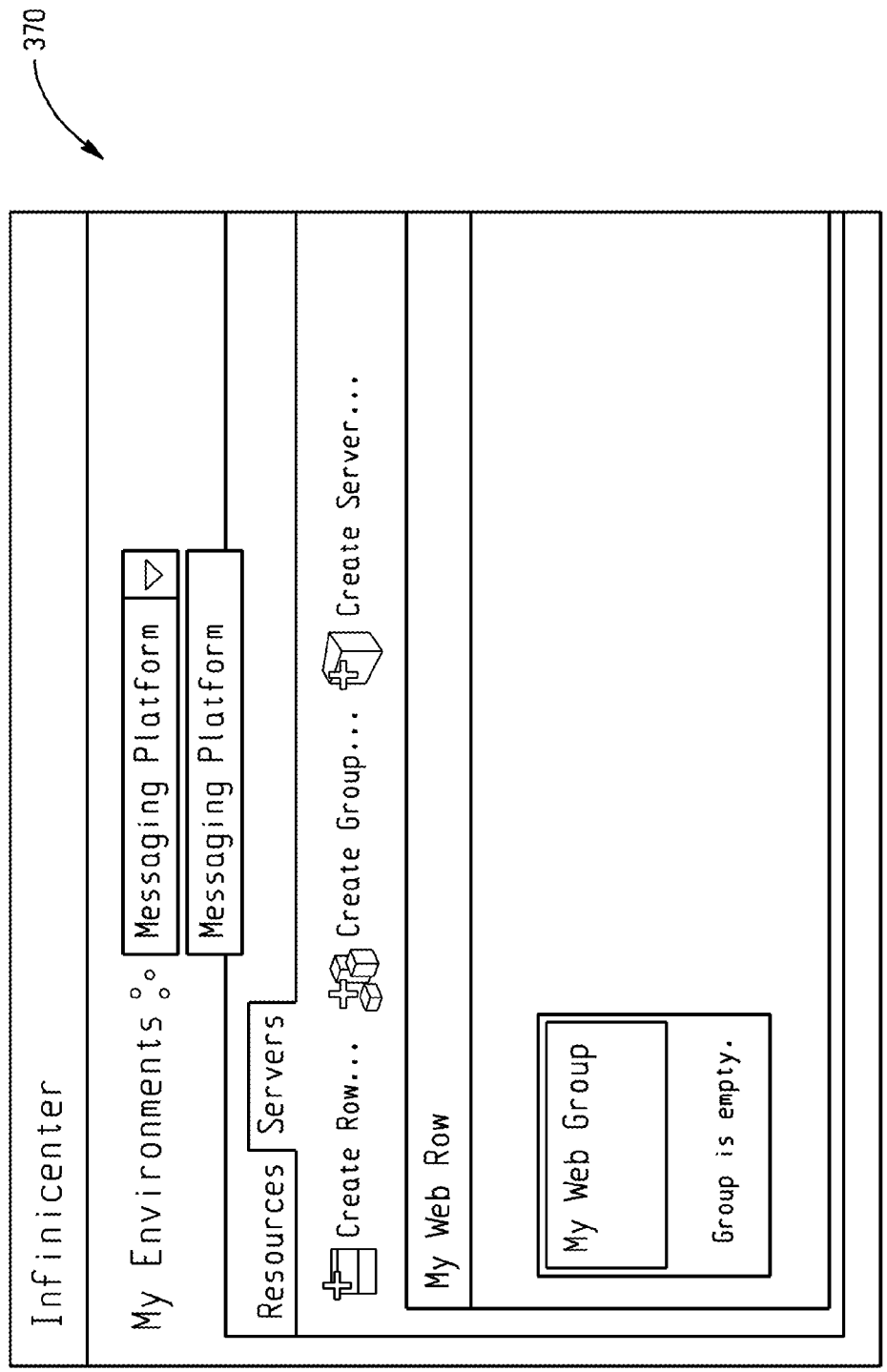
FIG. 13 depicts a graphical user interface screen of an exemplary customer provisioning console for selecting an environment.

FIG. 13 depicts a graphical user interface screen 370 of an exemplary customer provisioning console for selecting an environment. This figure depicts only the top left portion of the complete customer provisioning console interface (see, FIG. 14), in order to highlight the environment selector drop-down box. Here, when a user logs into the system the customer environments associated with that user are presented to the user in the "My Environments" drop down selector box. Although only one environment is shown in FIG. 13, named "Messaging Platform," there may be multiple environments associated with each customer and therefore multiple environments will be individually selectable from this initial screen of the customer provisioning console.

FIG. 14 depicts a graphical user interface screen 380 of an exemplary customer provisioning console for viewing the virtual resources associated with a selected customer environment. This screen is the primary interface that the customer administrator will utilize to review, analyze, and configure a selected environment. The very top portion of the interface screen lists the customer administrator, and provides a selector to change back to view customer environments 408, a selector to view account information for the customer 410, and a selector to sign out of the customer provisioning console 412. Just below this is the "My Environments" drop down selector 382, which the customer administrator uses to select a particular customer environment for analysis, review and configuration.

The customer provisioning console screen 380 shown in FIG. 14 is partitioned into two main functional areas called "Resources" and "Servers." These two main functional areas are selected using the "Resources" and "Servers" tabs 384, 386. In FIG. 14, the "Resources" tab has been selected. (The "Servers" tab screen is shown and discussed in connection with FIGS. 18A-18B) When the "Resources" tab 384 is selected, the graphical user interface of the customer provisioning console provides overall virtual resource data regarding the selected customer environment. The resource data is viewable by "Summary," "Processor Trend," "Memory Trend," and "Storage Details," using the secondary tabs 388. Also depicted here is a graphical and numerical representation of the resource utilization for the selected customer environment, displayed by Processor, Memory and Storage virtual resources. For example, the Processor Utilization Graph 396 indicates that for this particular environment, 10000 MHz has been purchased but only 5941 MHz is being utilized. Graphically, this is shown by the percentage utilization graph 396. The color of the percentage utilization graph can be configured so that as the resource utilization approaches the amount purchased, the color of the graph may change from green, to yellow and then to red as the buffer between the amount purchased and the amount utilized for any particular resource diminishes. Other graphical and/or audiovisual mechanisms may also be utilized herein to quickly signal to the customer administrator that a particular environment is approaching maximum utilization. This may then prompt the customer administrator to communicate with the system administrator in order to purchase and have allocated additional virtual resources for the particular customer environment.

Similar to the Processor virtual resources 396, for the Memory and Storage virtual resources 398, 400 allocated to this particular environment, the customer provisioning console interface 380 provides graphical and numerical depictions of the purchased resource and the percentage of that resource that is presently being utilized by the environment. For each of the Processor and Memory resources, trend data can be visualized by selecting the "View Trend" selector 402. (FIGS. 15 and 16 depict this trend data interface) For the Storage resource, additional detailed information regarding the virtual storage resources associated with the selected environment can be viewed by selecting the "View Details" selector 402. (FIG. 17 depicts the storage detail data view).

Also shown in the customer provisioning console interface 380 shown in FIG. 14 is a Task History panel 404 and a task history time selector 406. Using this part of the interface 380, the customer is able to view the configuration and management tasks that have been executed by the system in relation to the selected customer environment. For example, as shown in FIG. 14, the acts of powering on a virtual server, deleting a virtual server, creating a virtual server, renaming a virtual server and configuring a virtual server are all tasks that are listed in the task history panel 404. Along with the type of task, the interface lists the friendly name of the virtual server to which the task is associated, the person initiating the task as the customer, and the start and completion times of the particular task.

FIG. 15 depicts a graphical user interface screen 380 of an exemplary customer provisioning console for viewing processor trend data associated with a selected customer environment. This screen is accessed from either the secondary tabs 388, by selecting the "Processor Trend" tab, or by selecting the "View Trend" selector 402 located just beneath the processor utilization graph 396 (shown in FIG. 14). The processor trend data includes a graphical representation 420 of the processor utilization for the selected environment over a particular 24 hour usage period. This graph depicts processor utilization as a function of percentage and as a function of allocated MHz. The $95^{th}$ percentile data point 426 is listed just above the graph 420. A data selector bar 424 by default is set at the $95^{th}$ percentile point by the system, although this data selector bar 424 can be moved throughout the graph 420 using a pointing device by selecting a point of interest on the graph. As the data selector bar is moved by the customer, the server activity is listed 428 just below the graph 420. Also depicted in this interface screen 380 immediately below the graph is a listing 430 of the virtual servers associated with this particular environment. This listing sorts the virtual servers by percentage CPU utilization so that the customer can quickly identify the virtual server or servers that are contributing to the particular data point selected on the graph 420. In addition, the customer can select one or more of the virtual servers listed in the server listing 430 and obtain more detailed information about the performance and utilization of the selected server.

FIG. 16 depicts a graphical user interface screen 380 of an exemplary customer provisioning console for viewing memory trend data associated with a selected customer environment. This screen is accessed from either the secondary tabs 388, by selecting the "Memory Trend" tab, or by selecting the "View Trend" selector 402 located just beneath the memory utilization graph 398 (shown in FIG. 14). The memory trend data includes a graphical representation 432 of the memory utilization for the selected environment over a particular 24 hour usage period. This graph 432 depicts memory utilization as a function of percentage and as a function of allocated MB. The 95th percentile data point 434 is listed just above the graph 432. A data selector bar by default is set at the 95th percentile point by the system, although this data selector bar can be moved throughout the graph 432 using a pointing device to select and drag the data selector bar to a point of interest. As the data selector bar is moved by the customer, the server activity is listed 436 just below the graph 432. Also depicted in this interface screen 380 immediately below the graph is a listing 436 of the virtual servers associated with this particular environment. This listing sorts the virtual servers by percentage memory utilization so that the customer can quickly identify the virtual server or servers that are contributing to the particular data point selected on the graph 432. In addition, the customer can select one or more of the virtual servers listed in the server listing 436 and obtain more detailed information about the performance and utilization of the selected server.

FIG. 17 depicts a graphical user interface screen 380 of an exemplary customer provisioning console for viewing storage detail data associated with a selected customer environment. This screen is accessed from either the secondary tabs 388, by selecting the "Storage Details" tab, or by selecting the "View Details" selector 402 located just beneath the storage utilization graph 400 (shown in FIG. 14). This interface screen includes a listing 440 of the virtual servers associated with this particular environment and sorts the virtual servers by percentage storage utilization and disk count.

FIGS. 18A-18B depict graphical user interface screens 380 of the exemplary customer provisioning console for viewing virtual servers within a customer environment. FIG. 18A depicts the main "Servers" screen, which is displayed when the customer selects the "Servers" tab 386 at the top portion of the interface. Selecting this tab causes the customer provisioning console application to display more detailed information regarding the virtual servers that have been provisioned for the selected customer environment. The "Servers" main screen includes an action bar selector 442, row and group placement areas 444A, 444B, 444C, and a selected virtual server display area 446. Also shown in FIG. 18A is a pair of icons 450, 452 that enable the customer to toggle the Server interface between an Icon display mode (450) as shown in FIG. 18A and a List display mode (452) as shown in FIG. 18B.

The action bar selector 442 includes a plurality of Server actions, including "Create Row," "Create Group" and "Create Server." The "Create Row" action is used to add a new row to the row and group placement areas depicted below the action bar selector 442. The concept of "rows" and "groups" provides a very flexible way for each customer to custom design the organization and display of their virtual server resources through the Servers main screen. Using the row and group concept, customers can design rows of virtual servers, as shown in 444A, 444B and 444C, and then within each row of servers the customer can group virtual servers together, thus providing an additional level of organization to the structure of the customer's virtual assets. For example, the row and group 444C in FIG. 18A describes a row called "Howard's Row" with a single group labeled "webApps." Within the "webApps" group there are two virtual servers, one labeled "InfoMgmt" and the other labeled "InfoMgmtOS." Customers are able to use the concept of rows and groups to organize their virtual assets in any manner they desire. For example, customers may select to organize their virtual servers by responsibility, having a separate row for each customer administrator that is responsible for configuring and managing virtual server assets. Alternatively, the customer may decide to organize the virtual servers by function, for example by having a row of SQL servers, for example, or a row of web servers. There are no restrictions placed on the customer's ability to organize its virtual assets using this row and group paradigm.

The selected virtual server display area 446 provides additional details regarding the current configuration of the selected virtual server and also provides an action bar 448 for executing various console functions associated with the selected virtual server. These functions include renaming the virtual server, configuring the virtual server, moving the virtual server to a different row/group, deleting the virtual server, powering on/off the virtual server, shutting down the virtual server, restarting the virtual server, opening a connection to the virtual server and viewing a list of tasks associated with the selected virtual server.

FIG. 18B is the list view version of the Server main interface screen. When the icon 452 is selected, the interface toggles from the Icon view shown in FIG. 18A to the list view shown in FIG. 18B. The list view is similar to the icon view in that the virtual servers are displayed by rows and groups within a row, although in a list fashion that enables additional information associated with each virtual server to be displayed in the main display area 454 of the interface screen.

Figure 19A:
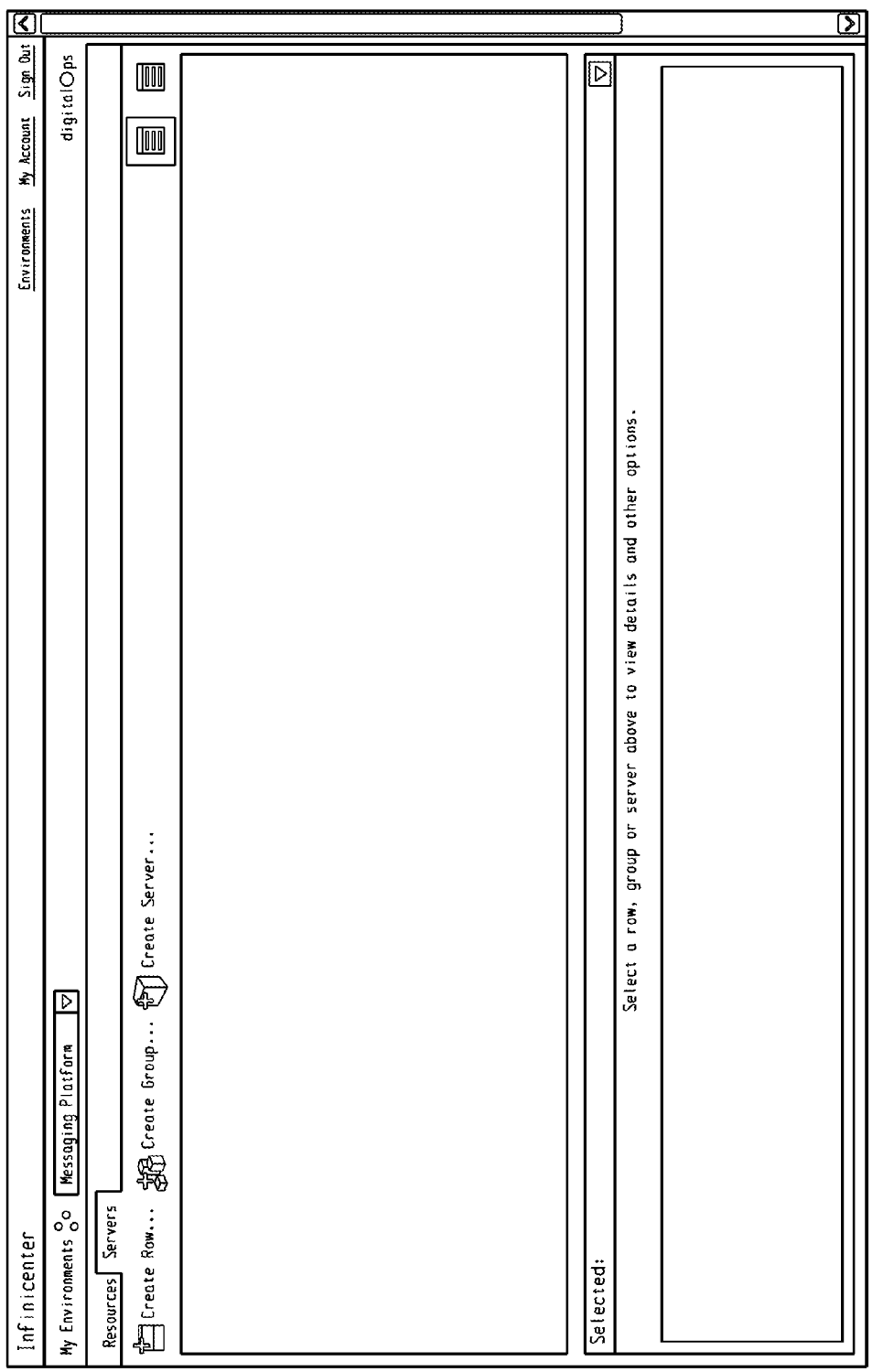
FIGS. 19A-19E depict graphical user interface screens of the exemplary customer provisioning console for creating rows and groups of virtual servers.
Figure 19B:
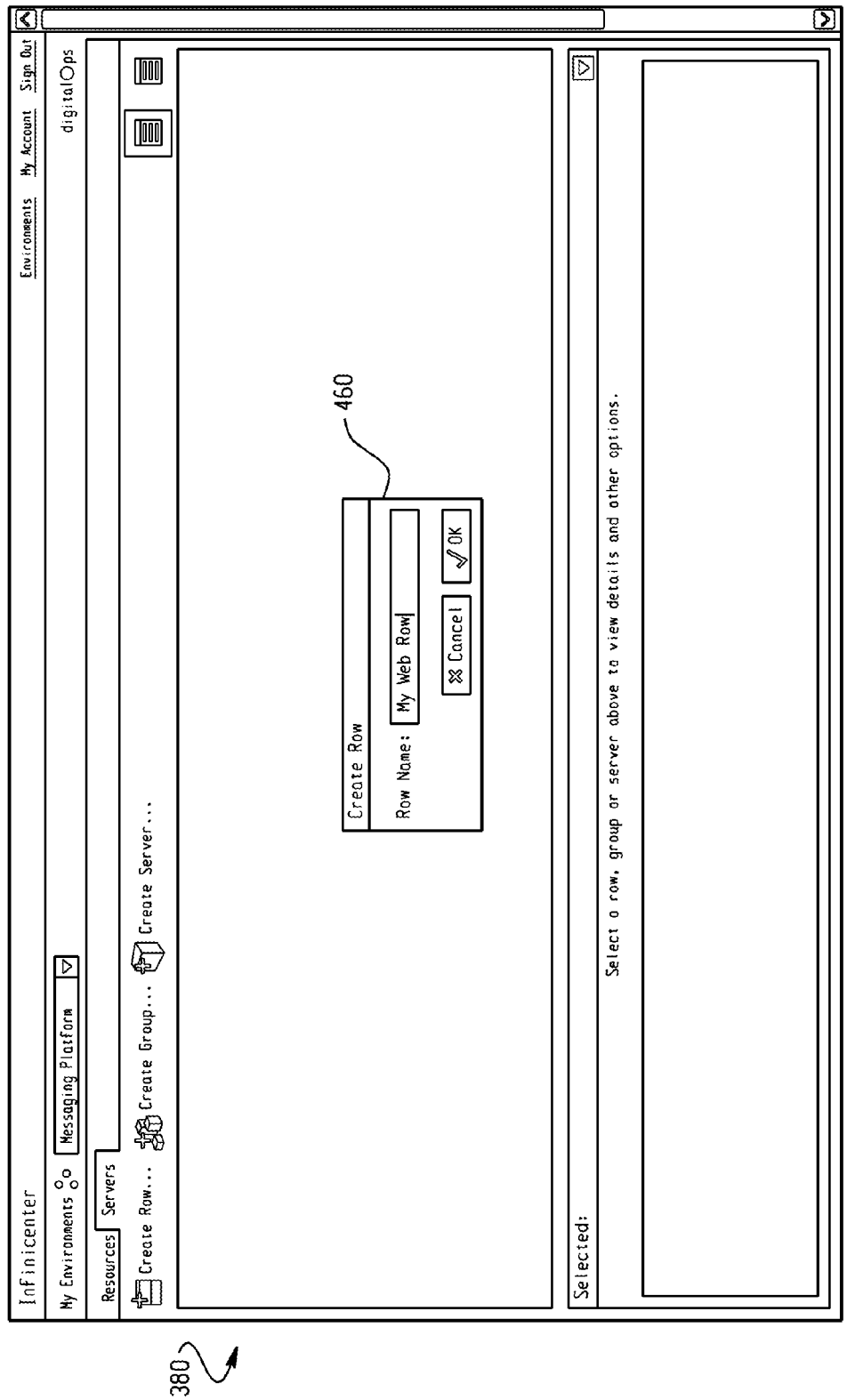
Figure 19C:
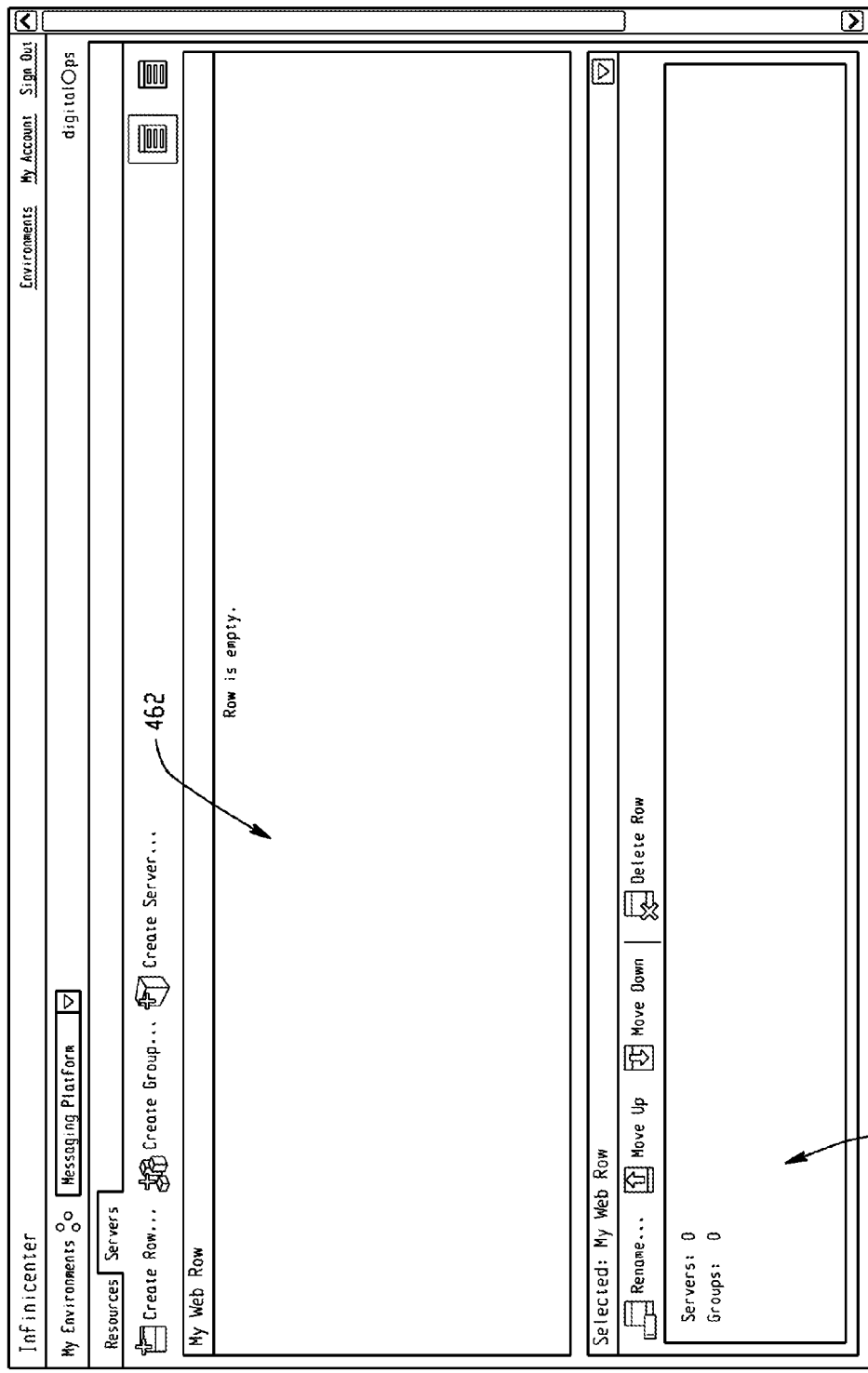
Figure 19D:
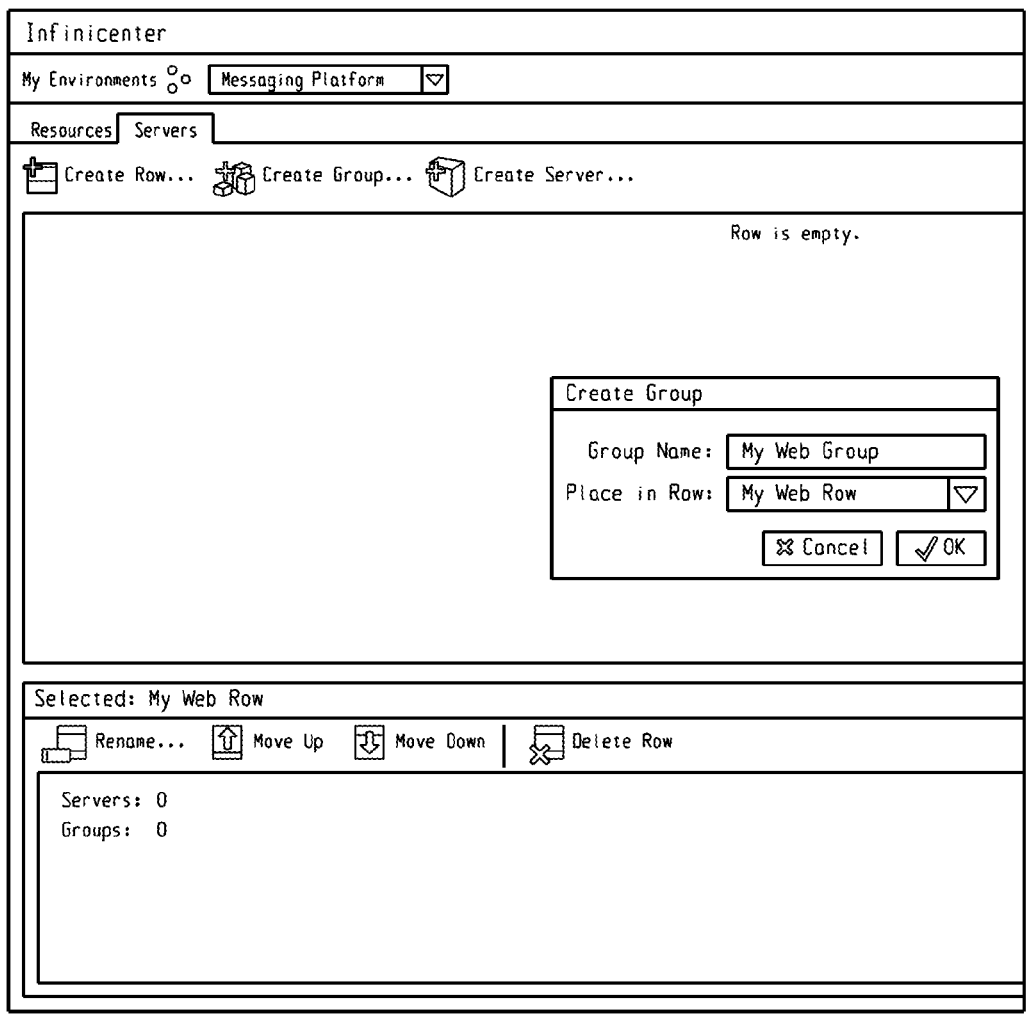
Figure 19E:
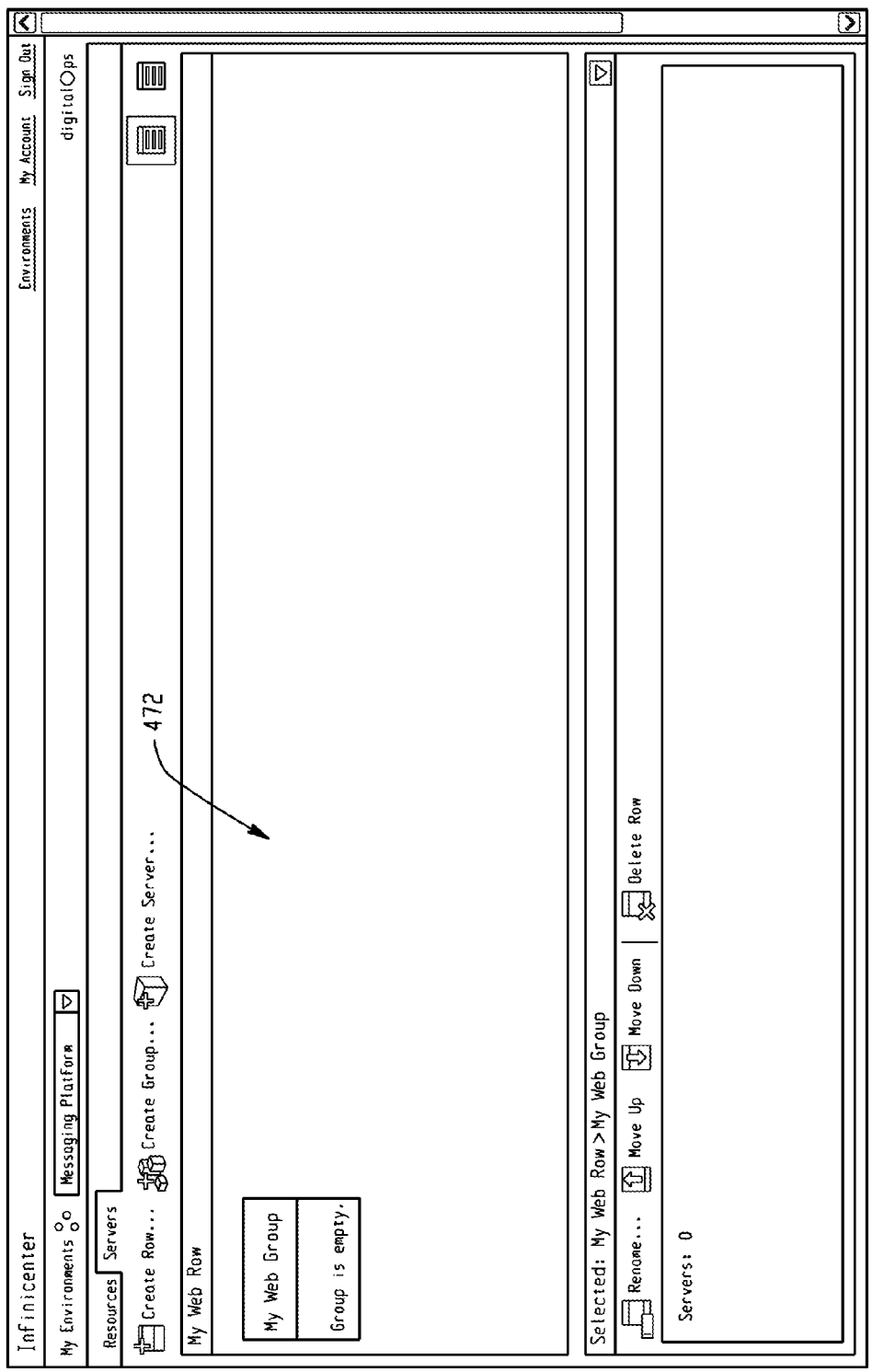

FIGS. 19A-19E depict graphical user interface screens of the exemplary customer provisioning console for creating rows and groups of virtual servers. FIG. 19A shows the Server main interface before a new row is created. In FIG. 19B, the customer has selected the "Create Row" button from the action bar selector 442 shown in FIG. 18A, and the dialog box 460 is displayed to enter the name of the new row. FIG. 19C shows the Server main interface after the new row called "My Web Row" 462 has been created and added to the main interface. The server selection area 464 set forth below the Row/Group interface display 462 is empty because the customer has not yet populated the row with any virtual server assets. In FIG. 19D, the customer has selected the "Create Group" function from the action bar selector 442, which displays the dialog box 470 where the customer can enter a group name and associate the new group with a particular row in the customer environment. In this example there is only one created row and so that is where the new group will be populated. And finally, FIG. 19E shows the main interface with the new group labeled "My Web Group" created within the single row labeled "My Web Row." The customer is now able to engage the "Create Server" function in order to populate the new row/group with virtual server assets, as further described herein in connection with FIGS. 20A-20J.

Figure 20A:
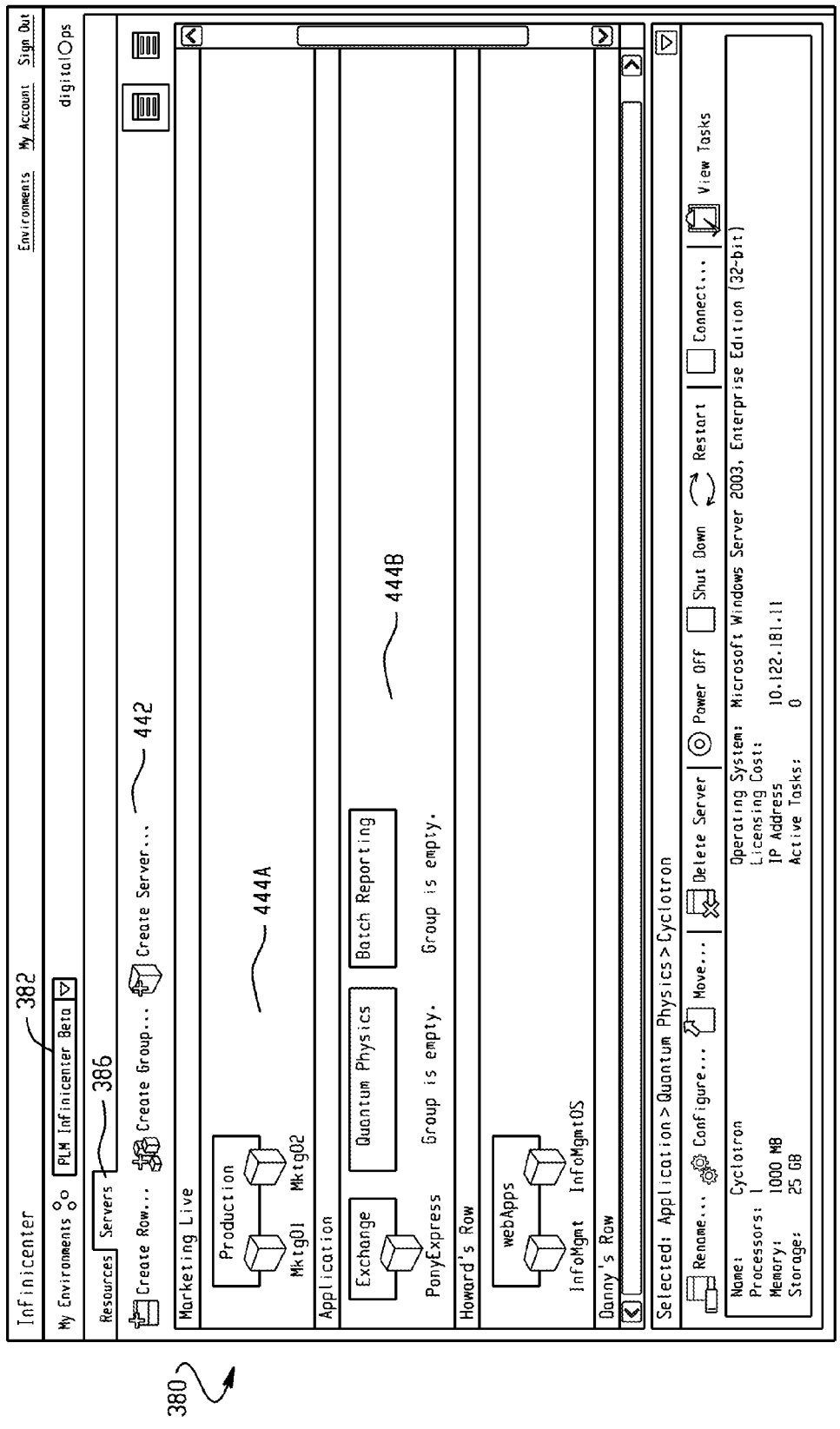
Figure 20B:
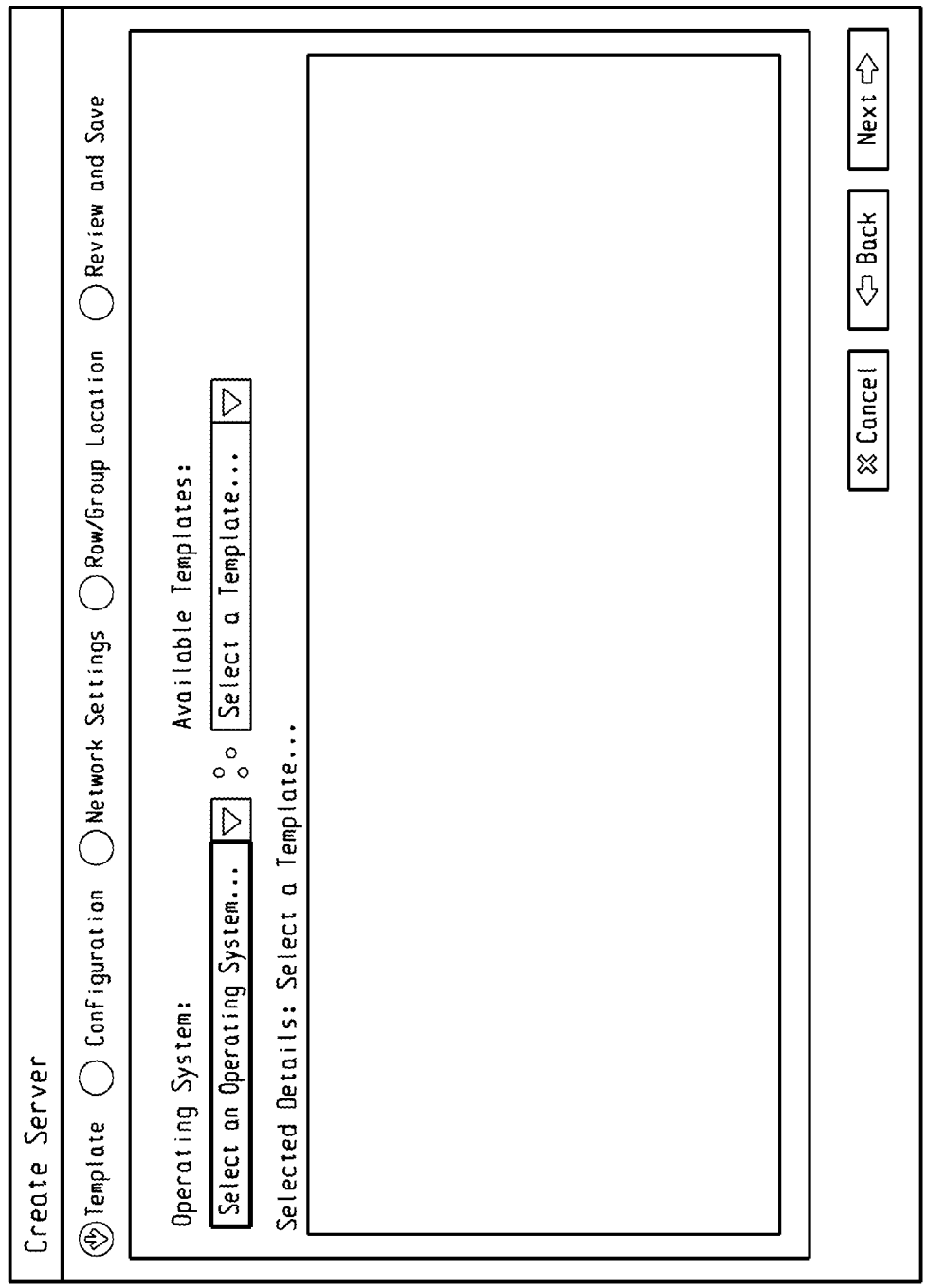

FIGS. 20A-20J depict graphical user interface screens of the exemplary customer provisioning console for creating a new server within a customer environment. FIG. 20A depicts the "Server" main interface screen described above in connection with FIG. 18A. In order to create and place a new virtual server within the selected customer environment shown in FIG. 20A, the customer selects the "Create Server" icon from the action bar selector 442. Having done so, the system then displays a create server dialog box 480, as shown in FIG. 20B, which is used by the customer to create the new virtual server. This dialog box 480 includes five main virtual server creation functions, labeled Template, Configuration, Network Settings, Row/Group Location and Review and Save. These five main virtual server creation functions are executed, in series, in order to complete the process of provisioning a new virtual server asset.

Figure 20C:
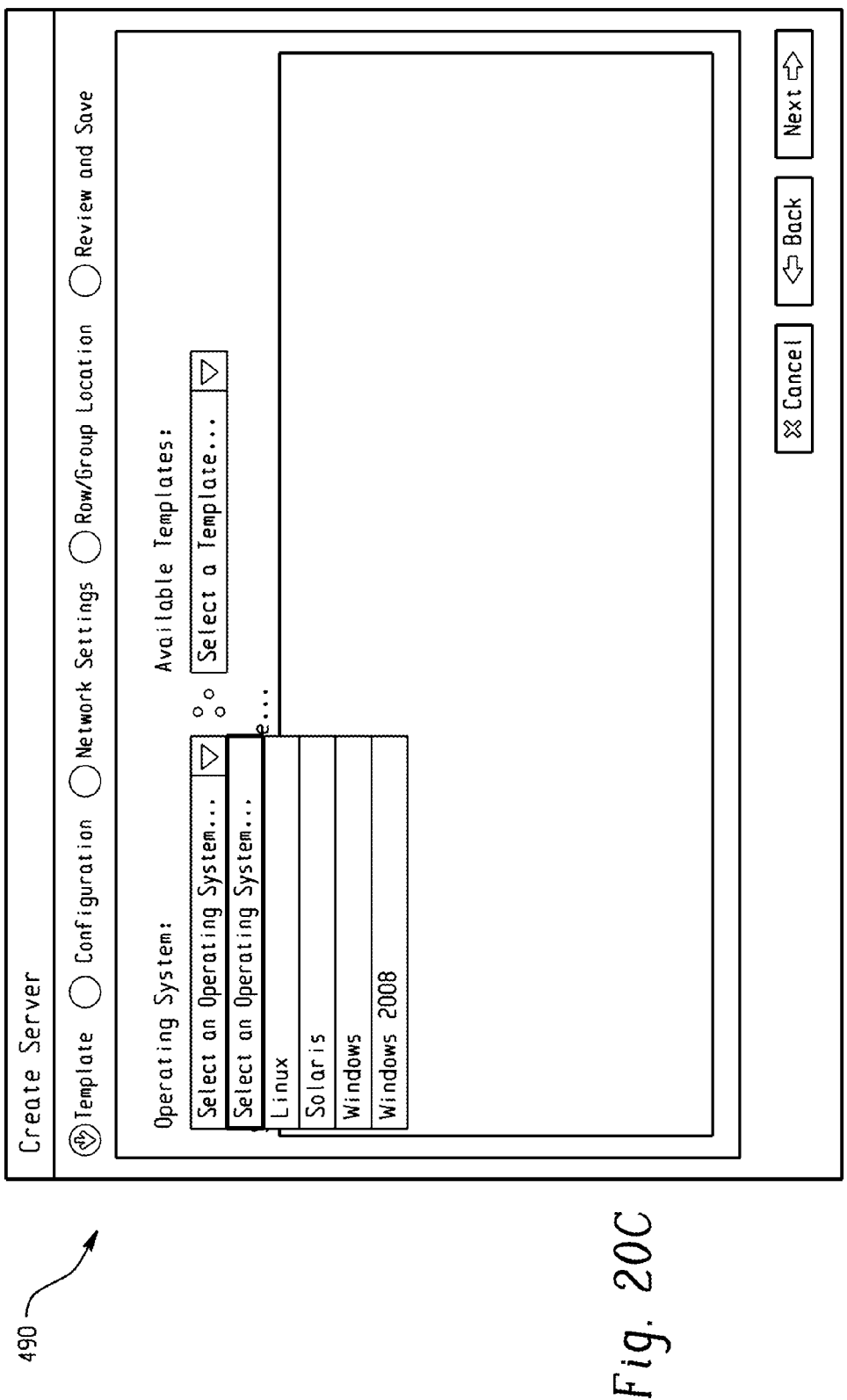
Figure 20D:
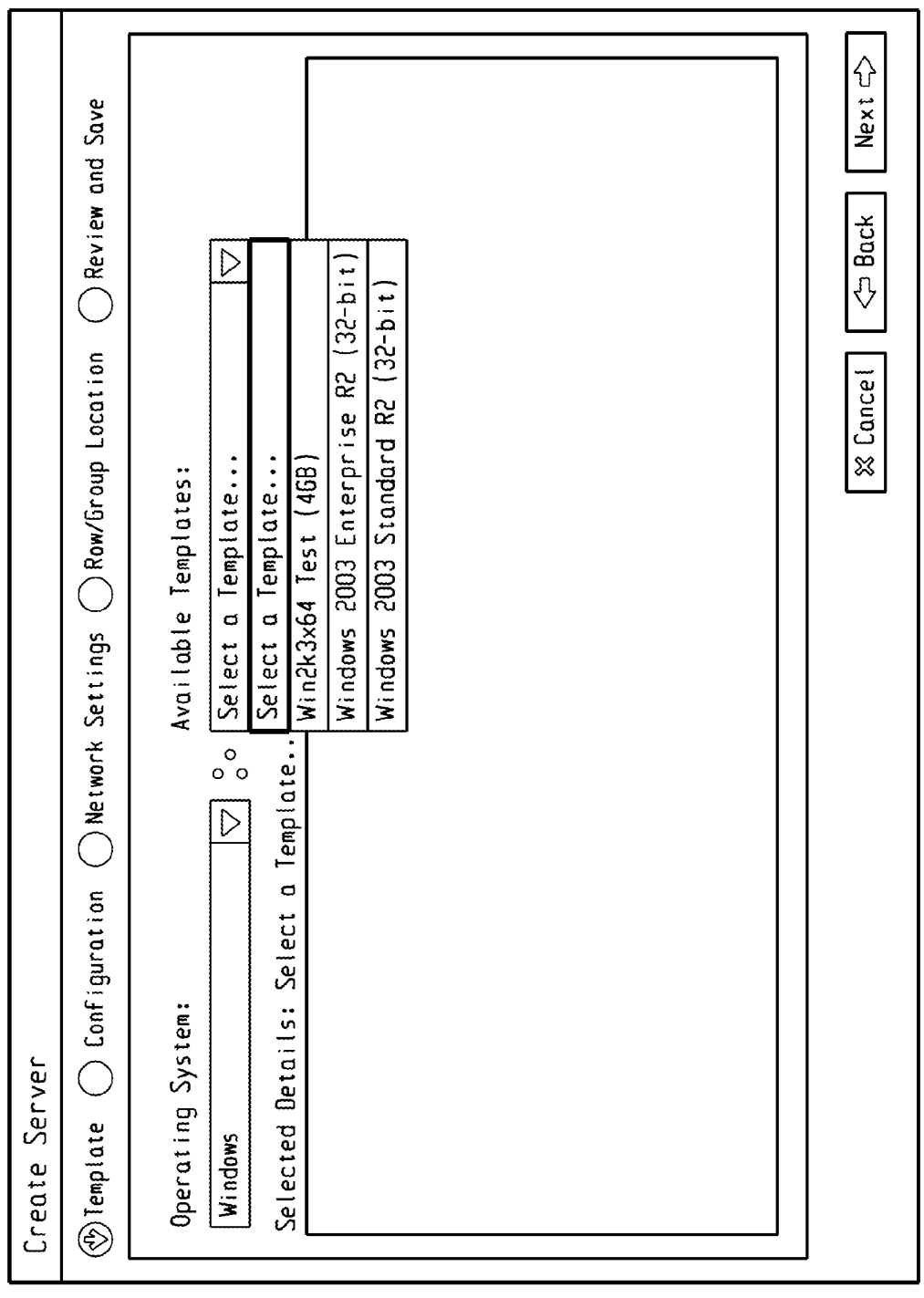
Figure 20E:
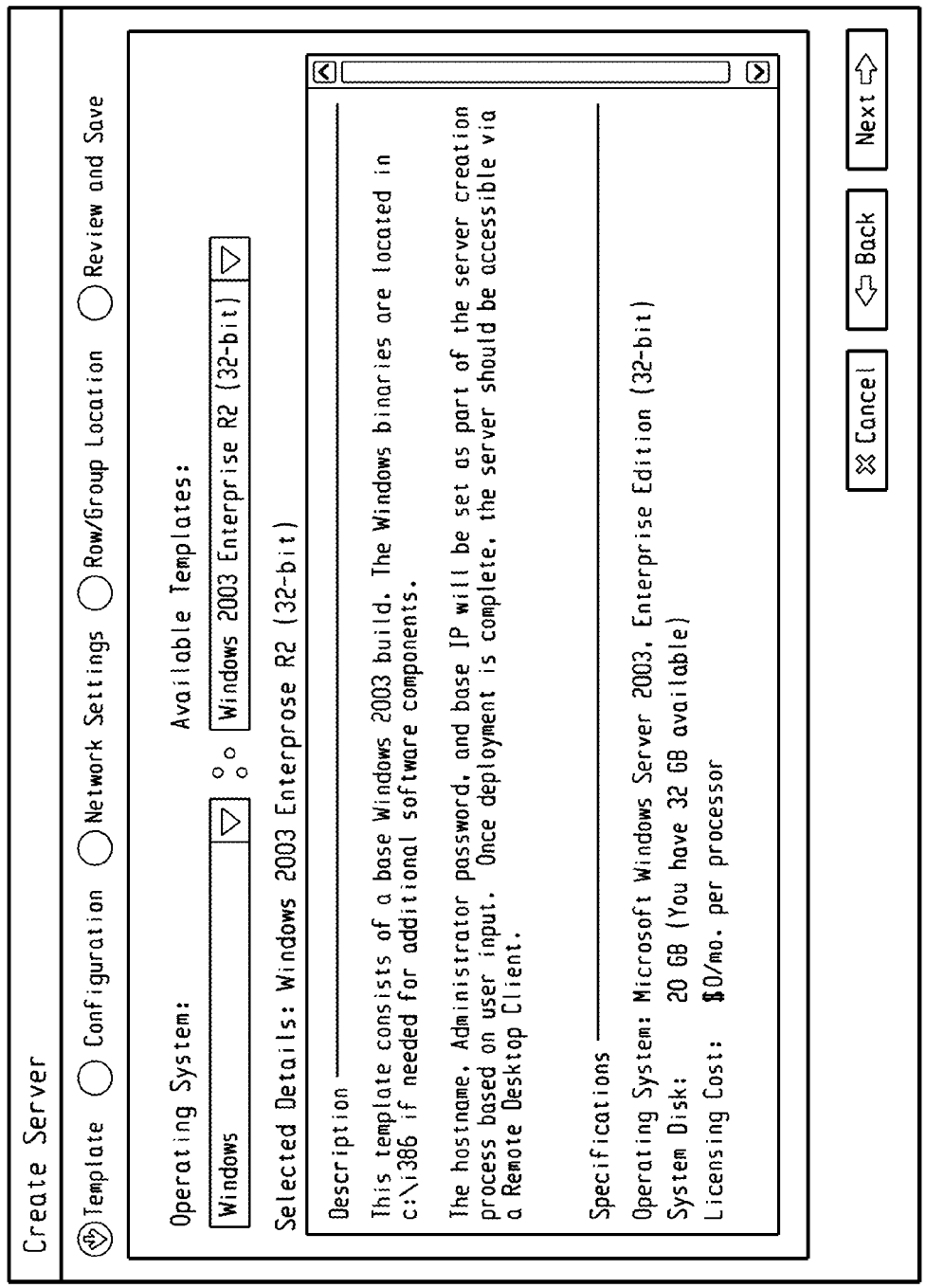

Beginning with FIG. 20B, the customer is prompted to first select an operating system to be associated with the new virtual server. FIG. 20C displays the Operating System drop-down list that provides a selection of available operating systems for the customer to choose from. Having selected a particular operating system, in this case the Windows operating system, the customer is then prompted to select from the available system templates that have been configured by the system administrator for the selected operating system. This is shown in FIG. 20D. After selection of a particular template for the selected operating system, the customer is then presented with the interface screen shown in FIG. 20E, which provides additional details regarding the template, the size of any system disk associated with the selected template, and the licensing cost for the customer to deploy the particular selected template. At this point the customer has completed the Template function.

Figure 20F:
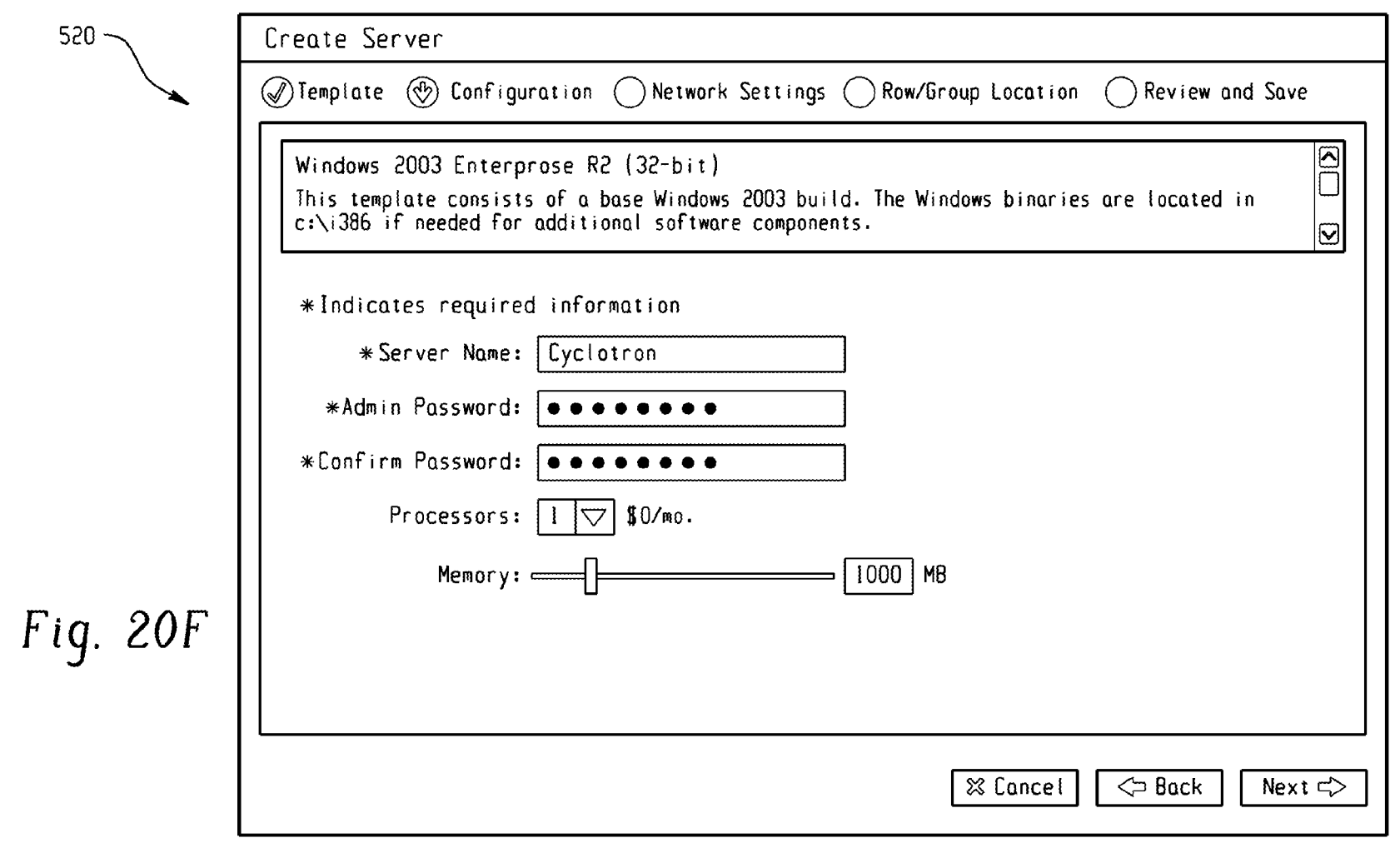

FIG. 20F depicts the display screen immediately following the customer's completion of the Template function in which the customer is now prompted to perform configuration tasks on the new virtual server. These tasks include providing a server name, providing an administration password for logging into the virtual server, selecting a number of processors to be associated with the virtual server, and selecting an amount of system memory to be associated with the virtual server. Using these controls, the customer is able to custom design each virtual server asset and to precisely control the amount of virtual processing power and memory for each virtual server. At this point the customer has completed the Configuration function.

Figure 20G:
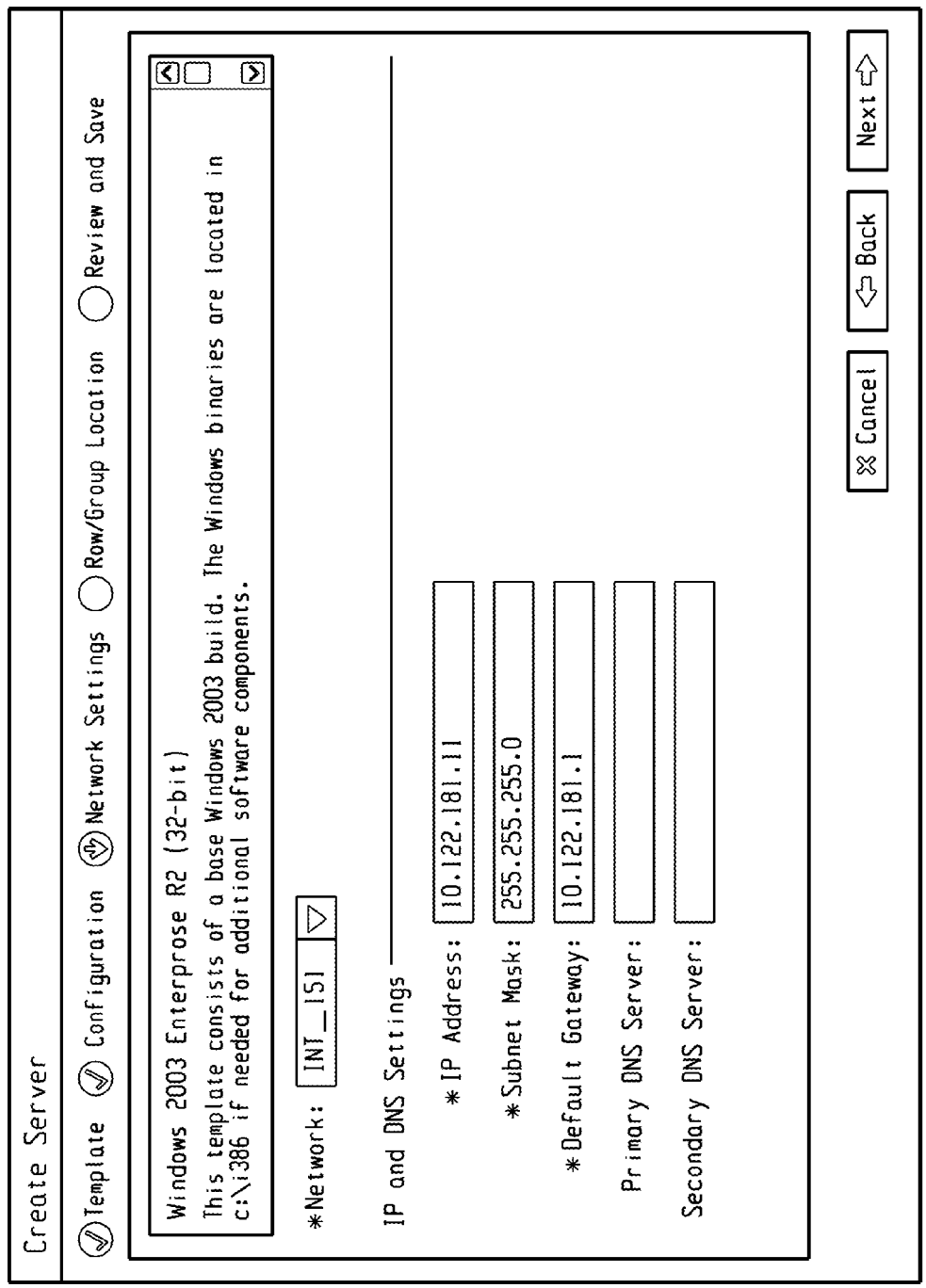
Figure 20H:
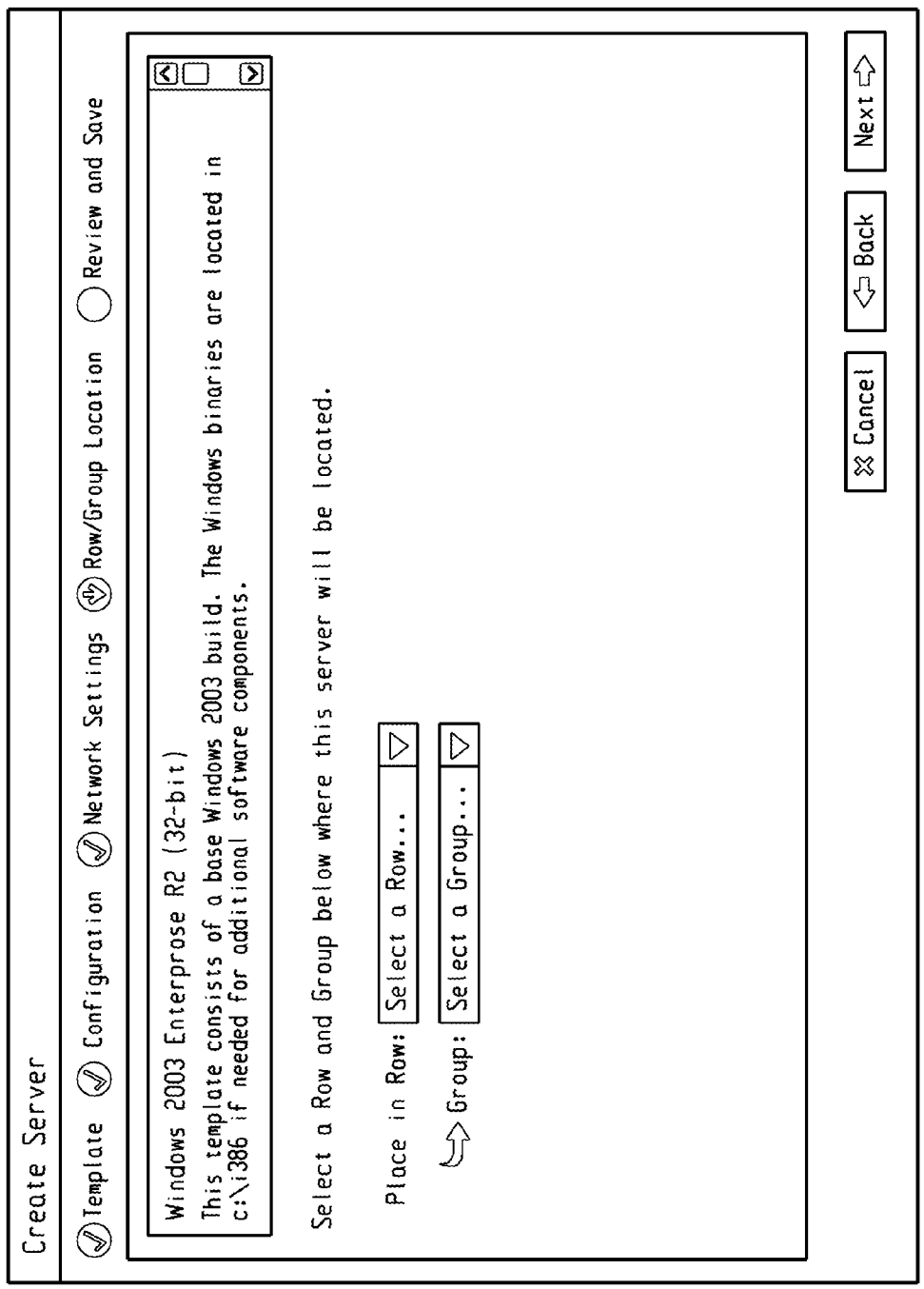

FIG. 20G depicts the display screen immediately following the customer's completion of the Configuration function in which the customer is now prompted to provide information regarding the network settings for the new virtual server. Using this display screen 530, the customer selects a particular network to associate with the virtual server and then provides details of the IP and DNS settings for the virtual server. Having completed this function, the customer in FIG. 20H is prompted to select a row and group associated with the customer's environment in which to place the newly-configured virtual server.

Figure 20J:
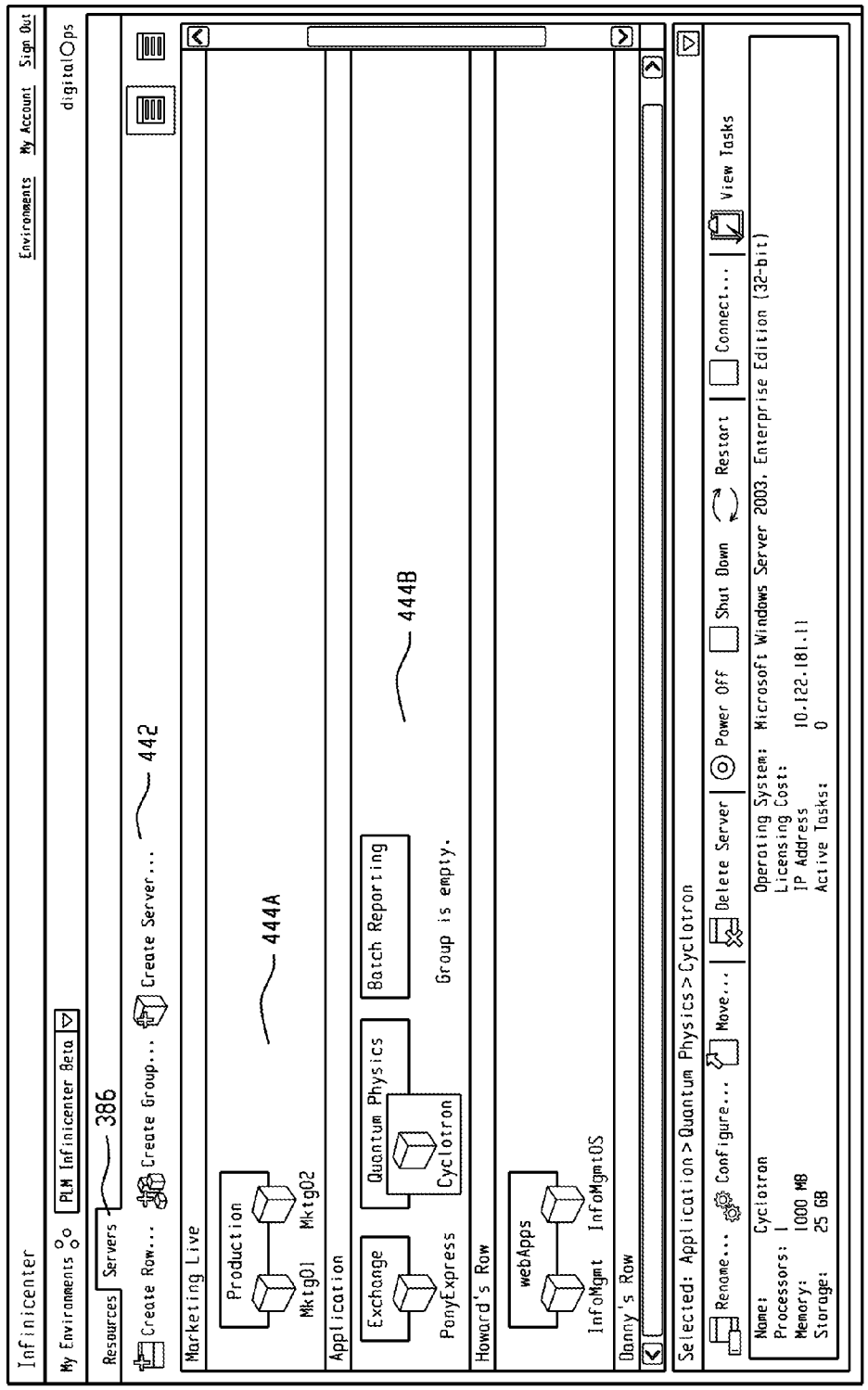

FIG. 20I depicts the display screen for reviewing and saving the new virtual server configuration prior to deployment. This interface screen 560 displays the configuration information for the virtual server as provided to the system through the prior interface screens and prompts the user to power on the server when it is created by the virtualization control system and also requires the customer to agree that they will be bound by any licensing and resource usage fees when the "Deploy" button (shown at the bottom of FIG. 20I but grayed out at the moment) is selected. After the user agrees to be bound by such fees, the Deploy button is activated, and once selected the newly-configured virtual server is then created within the customer's environment by the virtualization control system and appears in the customer's Server main interface for the environment as shown in FIG. 20J.

Figure 21:
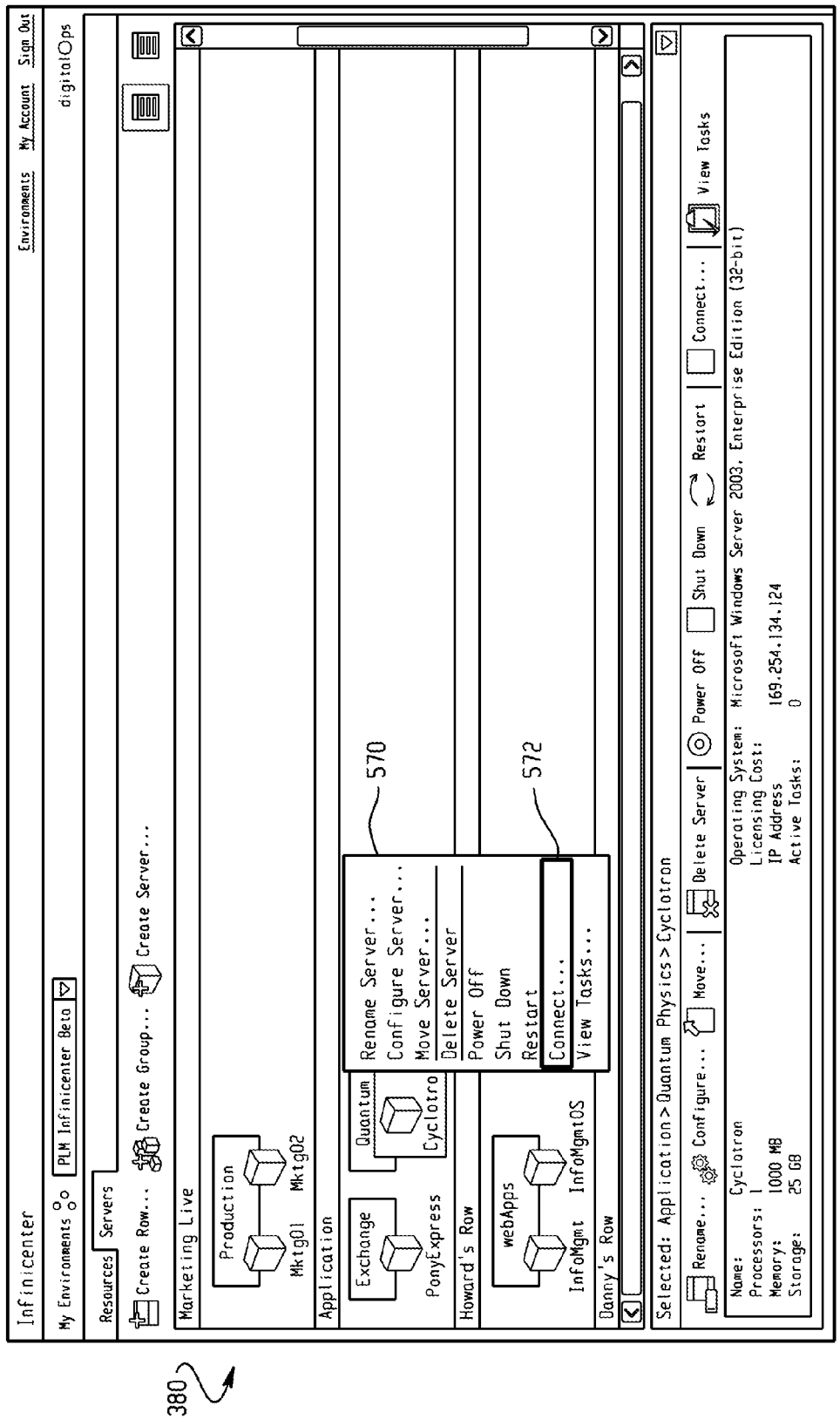
FIG. 21 depicts a graphical user interface screen of the exemplary customer provisioning console for connecting to a virtual server.
Figure 22:
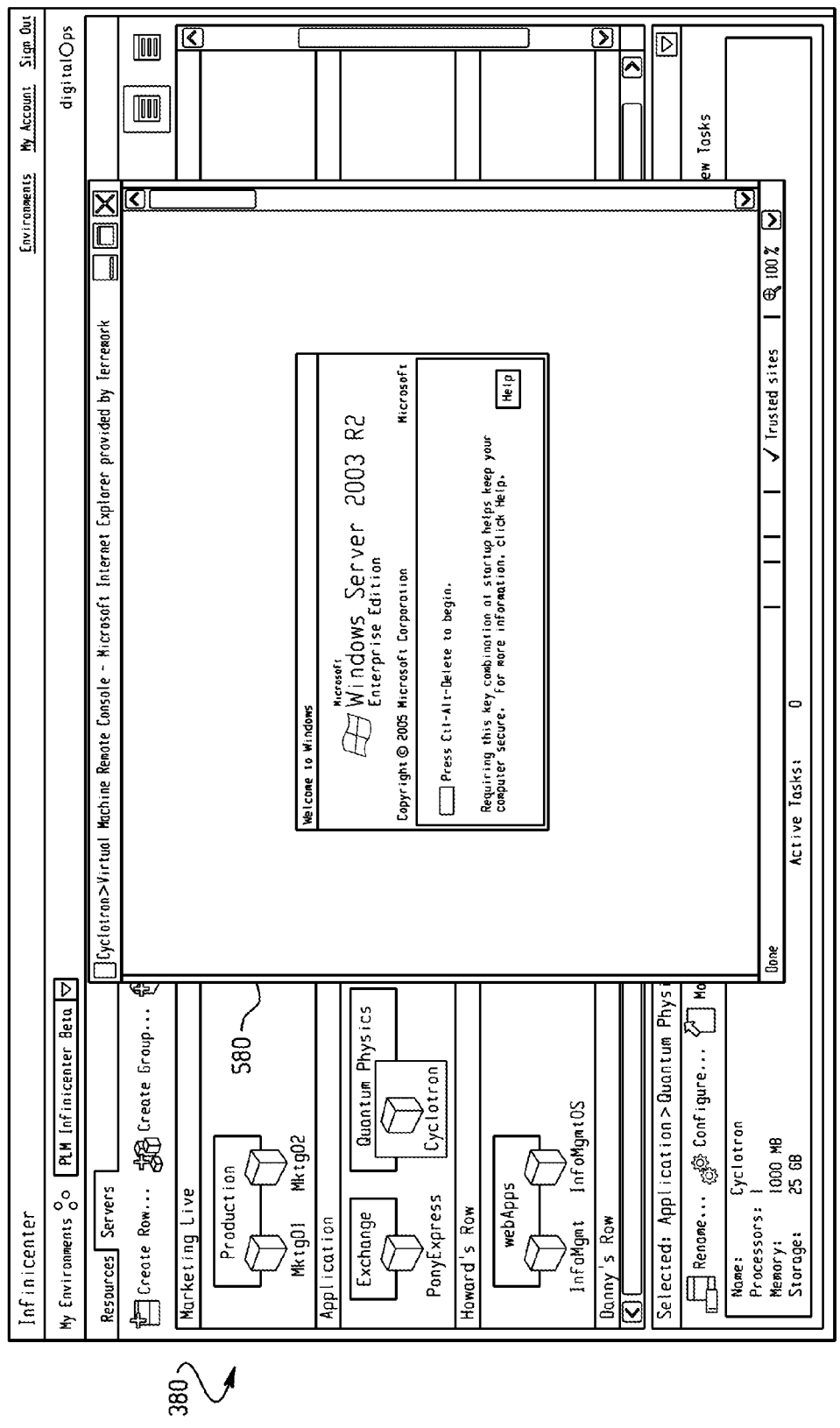
FIG. 22 depicts a graphical user interface screen of the exemplary customer provisioning console showing an open connection to a virtual server.

FIG. 21 depicts a graphical user interface screen of the exemplary customer provisioning console for connecting to a virtual server. In this figure, the customer has performed a "right click" operation with their pointing device, which opens a server function box 570 that enables the customer to perform virtual server functions including connecting 572 to a virtual server. Selecting this function opens a connection to the selected server as shown in FIG. 22. FIG. 22 depicts a graphical user interface screen of the exemplary customer provisioning console showing an open connection to a virtual server.

Figure 23:
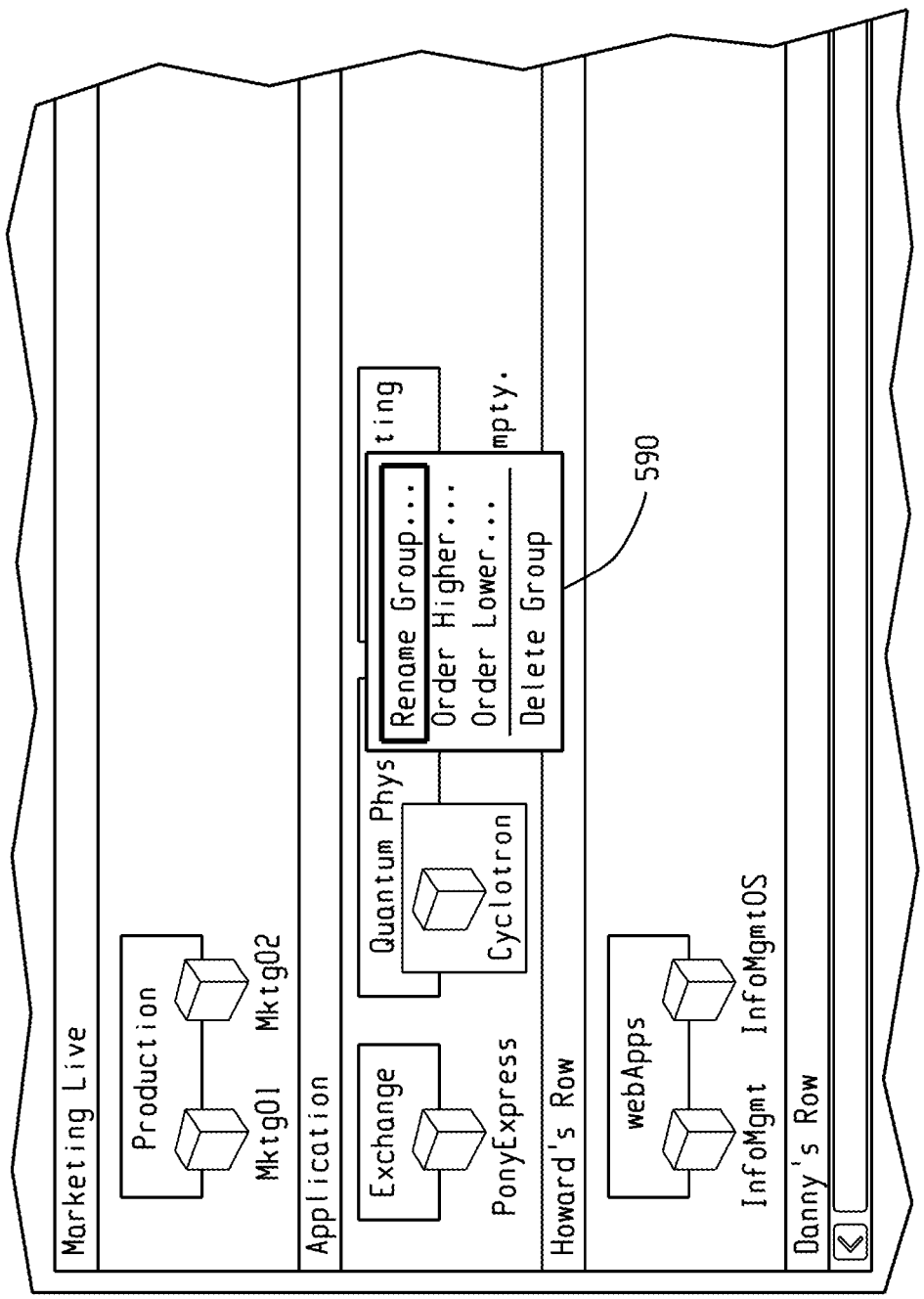
FIG. 23 depicts a graphical user interface screen of the exemplary customer provisioning console for selecting a virtual server group task.

FIG. 23 depicts a graphical user interface screen of the exemplary customer provisioning console for selecting a virtual server group task. This function list is activated using a "right click" selection from the customer's pointing device and enables the customer to perform one or more group tasks, such as renaming the group, ordering the group to a higher position within the row, which typically means moving the group leftward within a sequence of groups in a particular row, ordering the group to a lower position within the row, which typically means moving the group rightward within a sequence of groups in a particular row, and finally deleting the group from the selected row.

Figure 24:
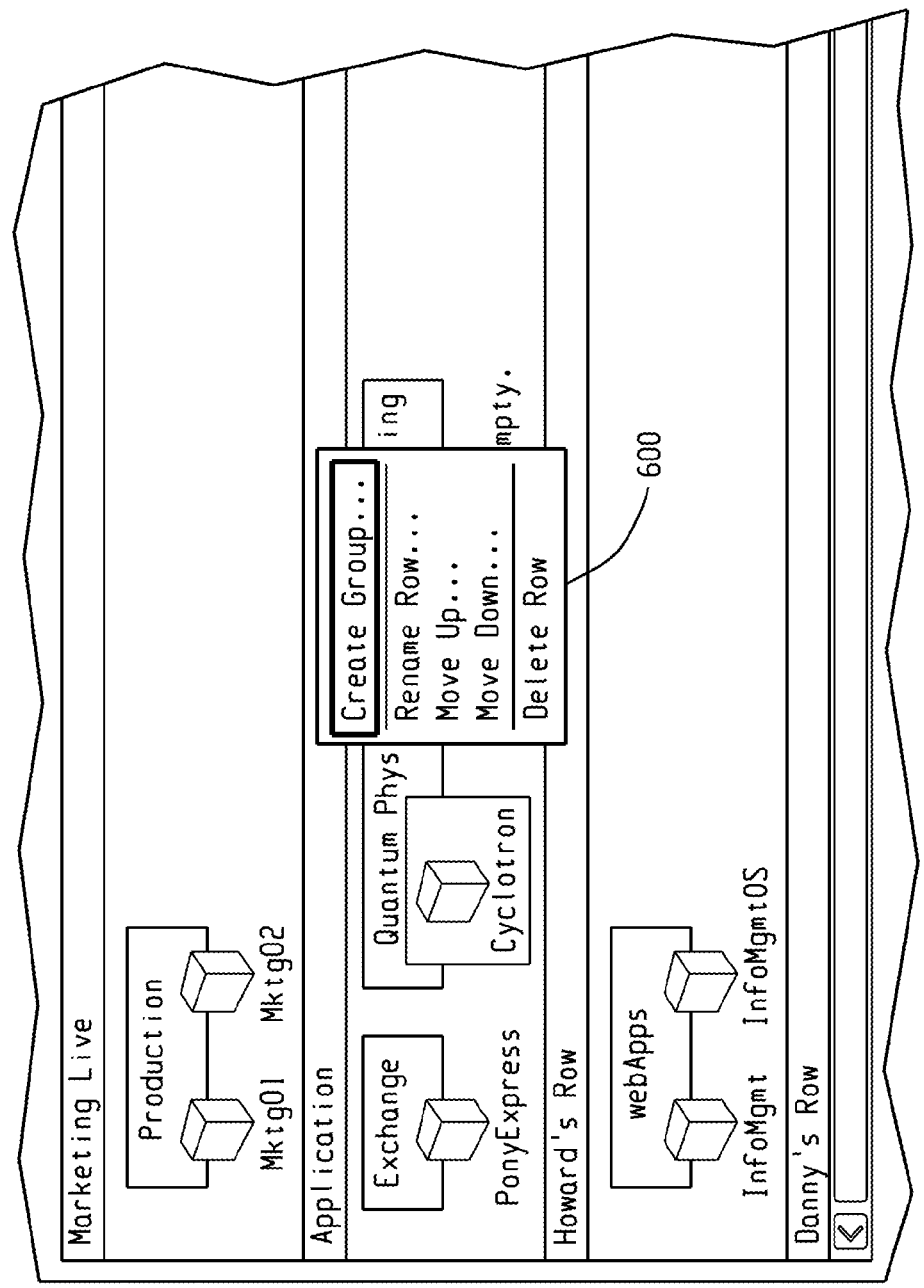
FIG. 24 depicts a graphical user interface screen of the exemplary customer provisioning console for selecting a virtual server row task.

FIG. 24 depicts a graphical user interface screen of the exemplary customer provisioning console for selecting a virtual server row task. This function list 600 is activated using a "right click" selection from the customer's pointing device and enables the customer to perform one or more row tasks, such as creating a group within the row, renaming the row, moving the row upwards towards the top of the display screen in a sequence of displayed rows of assets, moving the row downwards towards the bottom of the display screen, and deleting the row.

Figure 25:
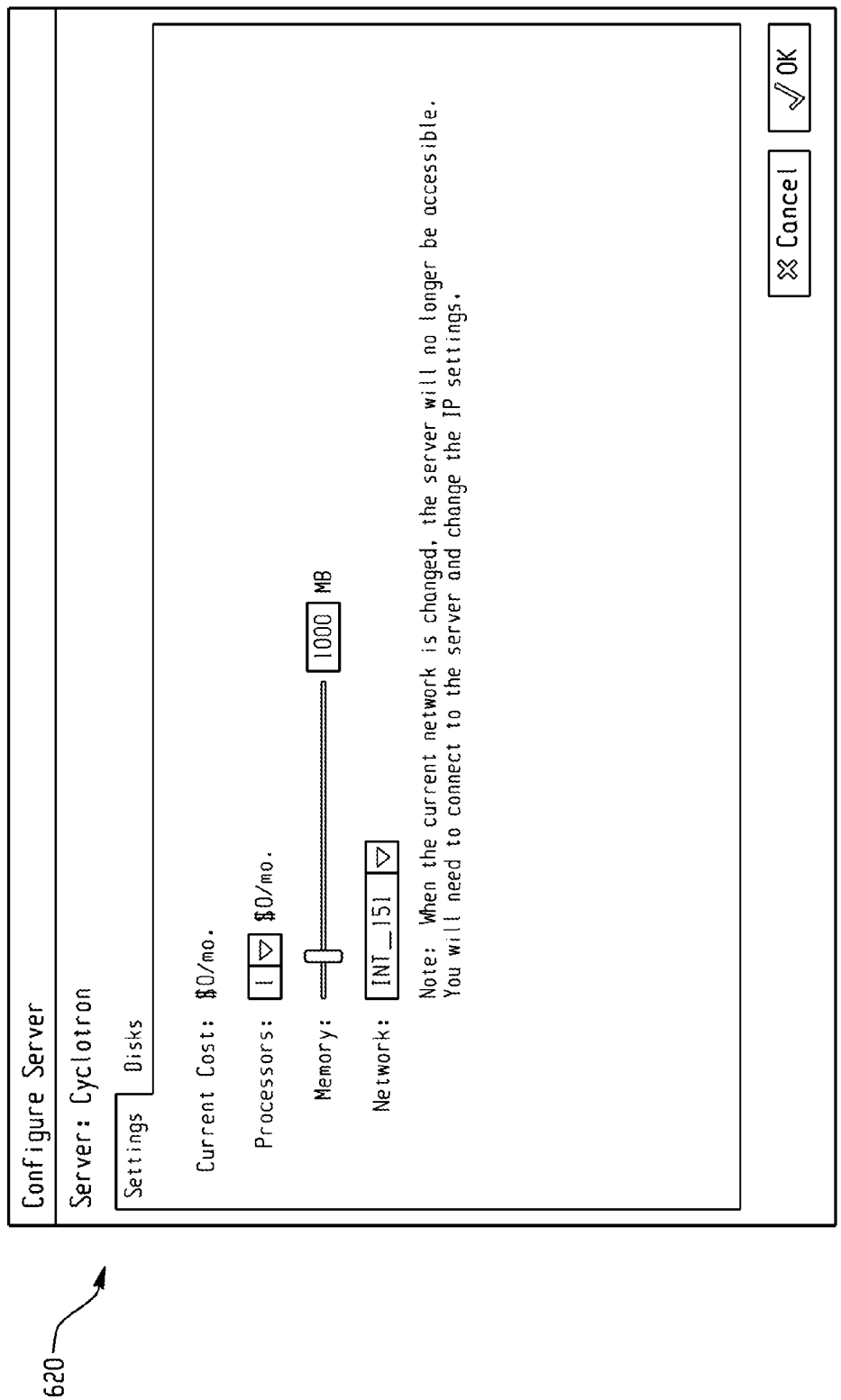
FIG. 25 depicts a graphical user interface screen of the exemplary customer provisioning console for configuring the processor, memory and network connectivity of a virtual server.
Figure 26:
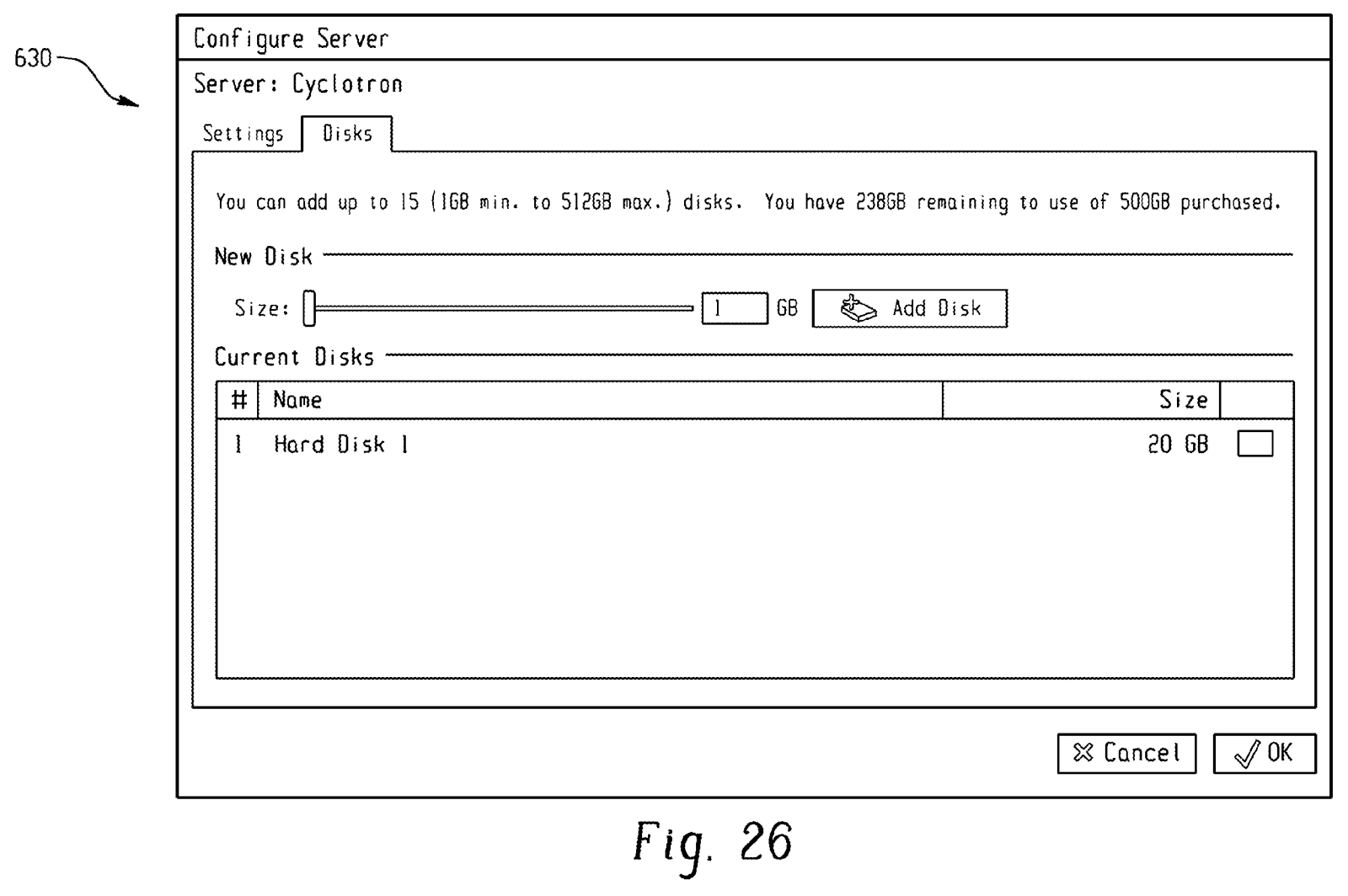

FIG. 25 depicts a graphical user interface screen of the exemplary customer provisioning console for configuring the processor, memory and network connectivity of a virtual server and FIG. 26 depicts a graphical user interface screen of the exemplary customer provisioning console for configuring the disk storage resource of a virtual server. Prior to displaying the interface screens in FIGS. 25 and 26, the customer has engaged the sever function selector associated with a particular virtual server by performing the "right click" operation on the selected server. This brings up the server function selector 570, and enables the customer to select the "Configure Server" function 610. This function may also be selected from the function bar associated with the selected virtual server displayed below the row/group area of the Server main interface. Selecting this function 610 causes the console provisioning application to display the virtual server configuration dialog box 620. This dialog box includes two main configuration tabs—Settings and Disks.

The Settings configuration tab is shown in FIG. 25 and the Disks configuration tab is shown in FIG. 26. Using the Settings configuration tab, the customer can change the number of processors associated with the selected virtual server, the customer can change the memory allocation associated with the virtual server using the sliding bar depicted in FIG. 25, and the customer can change the network settings associated with the virtual server. Using the Disks configuration tab shown in FIG. 26, the customer can add a new disk to the virtual server, and using the sliding bar mechanism, the customer can allocate a precise amount of disk memory to the newly created disk. Alternatively, the customer can select an existing disk from the display shown in the bottom portion of FIG. 26 and then modify the size of the selected disk using the slider bar mechanism. In this manner, the customer is able to precisely control the amount of disk memory and partitioning associated with each virtual server asset.

FIG. 27 depicts a graphical user interface screen of the exemplary customer provisioning console for viewing customer transaction history. This screen is activated when the customer selects the My Account link 640 at the top portion of the main interface screen. Selecting this link 640 causes the system to display an interface as shown in FIG. 27, in which the customer can select from four main functions—Billing, Transaction History, Settings and Users. The Transaction History function is shown in FIG. 27, and provides details regarding each customer transaction that may effect the configuration of the selected environment. For example, creating a server, deleting a server, upgrading and or modifying an existing server, and other transactions are displayed in this interface screen.

Figure 28:
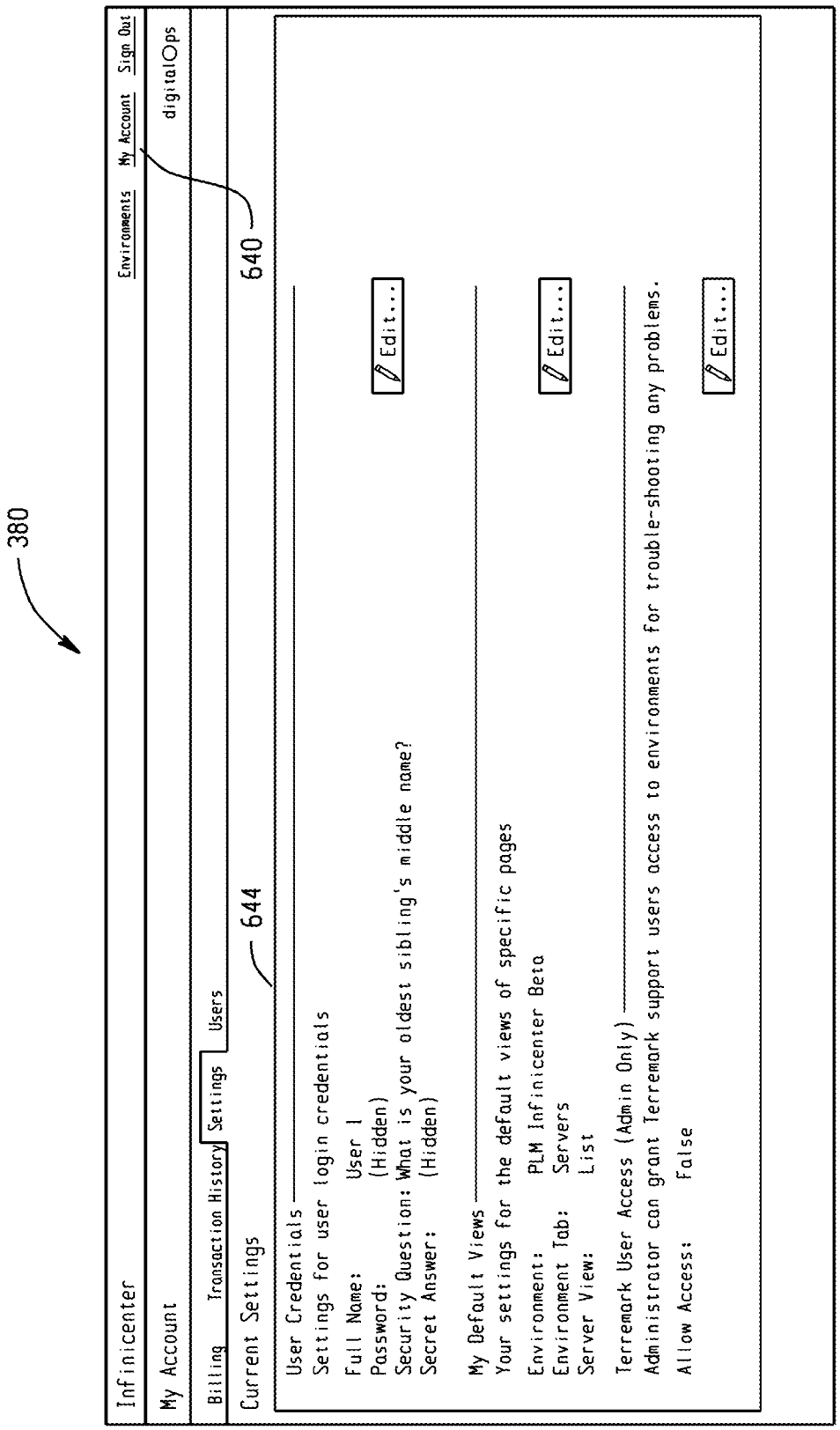
FIG. 28 depicts a graphical user interface screen of the exemplary customer provisioning console for viewing customer settings.

FIG. 28 depicts a graphical user interface screen of the exemplary customer provisioning console for viewing customer settings. Using this interface screen, the customer is able to change user credentials, change the default view settings for a particular user, and change the determination of whether the system administrator is able to access the particular customer environment. (This last function is described above in connection with FIGS. 8A-8B).

Figure 29:
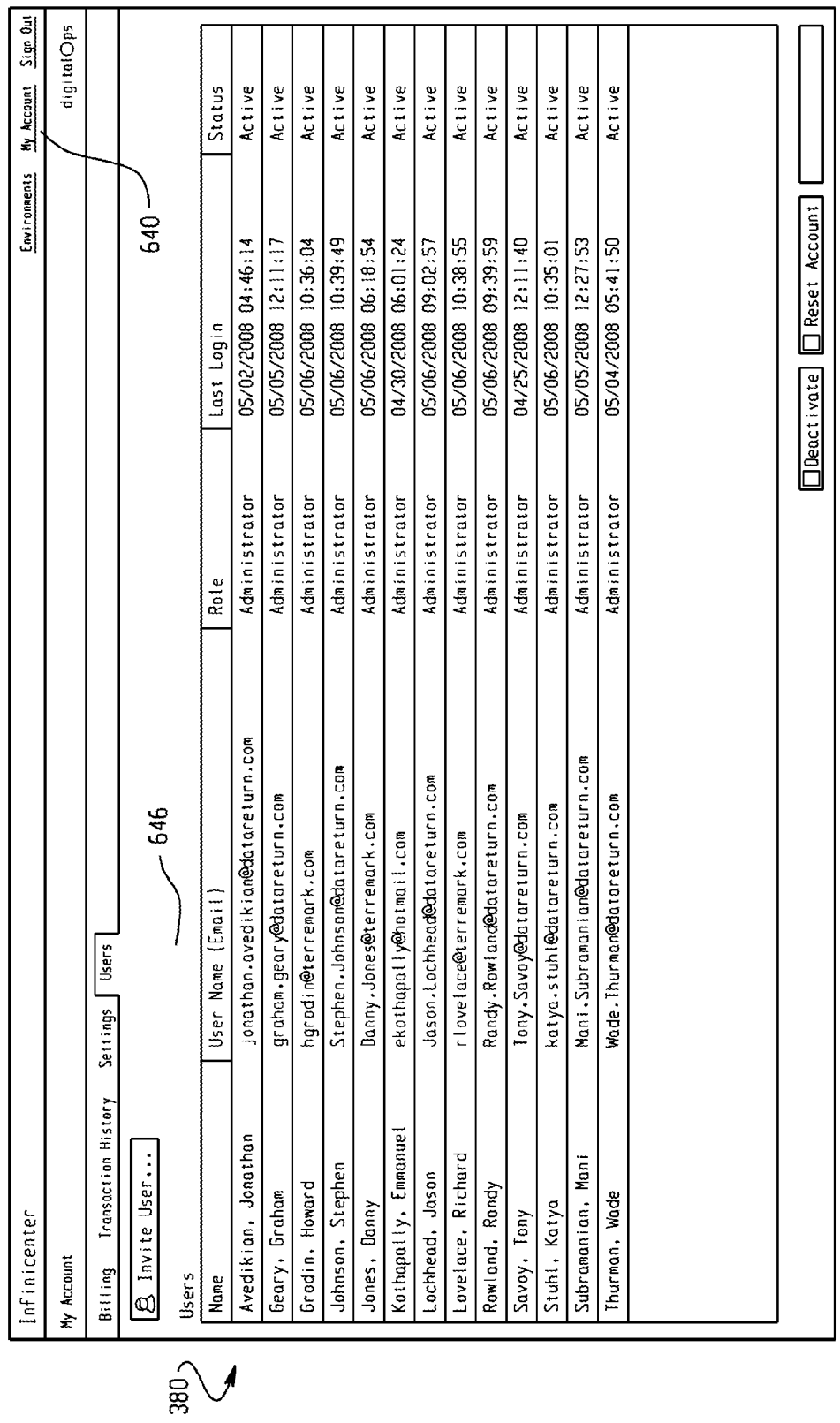
FIG. 29 depicts a graphical user interface screen of the exemplary customer provisioning console for viewing authorized customer users of the customer provisioned utility computing platform.

FIG. 29 depicts a graphical user interface screen of the exemplary customer provisioning console for viewing authorized customer users of the customer provisioned utility computing platform. This screen provides details of the authorized users, their email addresses, roles, last login time, and whether they have an active status. An "Invite User" selector 646 enables the customer to invite another person to have access to the selected customer environment.

Figure 30A:
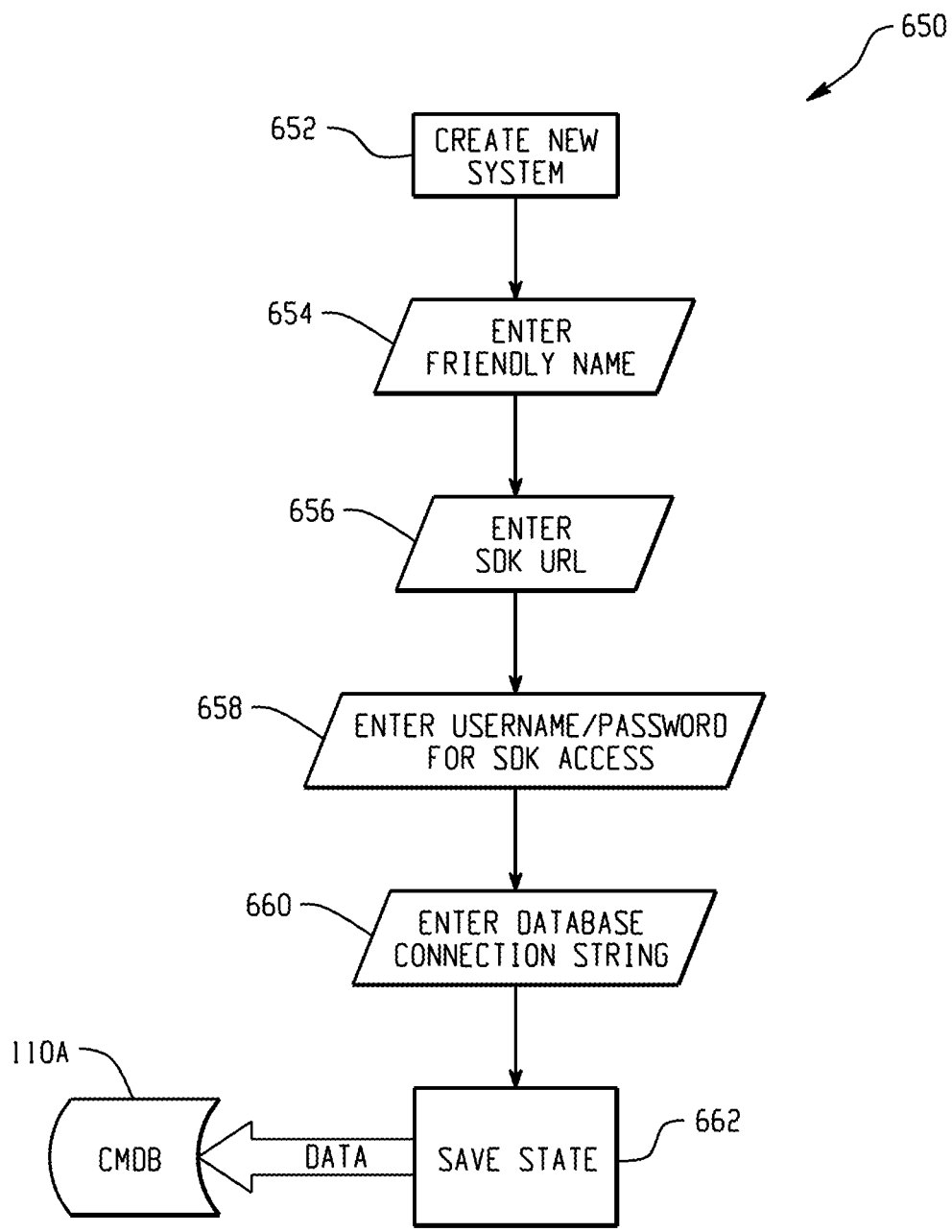
FIG. 30A is an exemplary flow diagram depicting a method for adding a virtualization control system to a customer provisioned utility computing platform.

FIG. 30A is an exemplary flow diagram 650 depicting a method for adding a virtualization control system to a customer provisioned utility computing platform. At step 652 a system administrator determines that a new virtualization control system should be created and added to the system. At step 654 a friendly name is associated with the new virtualization control system. An SDK URL is provided to the system at step 656, which is used by the system to access and communicate with the new virtualization control system. A username/password is then provided at step 658 to control system-level access to the virtualization control system, and at step 660 a database connection string is then entered into the system. This information regarding the new virtualization control system is then saved to the CMDB at step 662 and the method is complete. (FIG. 31 depicts a graphical user interface screen of an exemplary administration console for adding a virtualization control system to the customer provisioned utility computing platform).

Figure 30B:
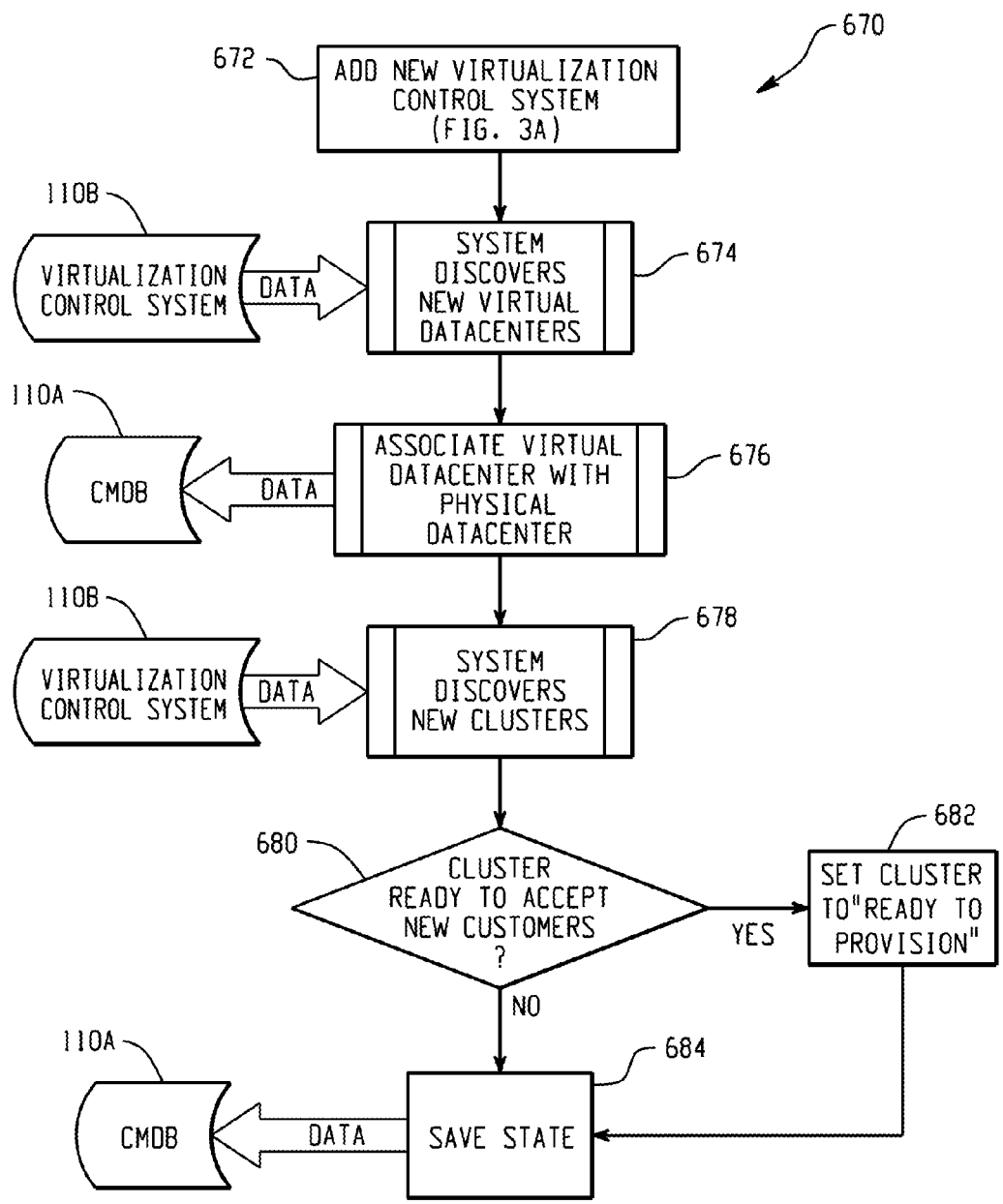
FIG. 30B is an exemplary flow diagram depicting a method for adding computing clusters to a virtualization control system in a customer provisioned utility computing platform.

FIG. 30B is an exemplary flow diagram 670 depicting a method for adding computing clusters to a virtualization control system in a customer provisioned utility computing platform. The method begins at 672, where a new virtualization control system is added to the system (see, FIG. 30A and accompanying description). Periodically the system will discover new virtual control system resources at step 674 and will obtain information regarding these resources. At step 676, the new virtualization control system is then associated with a particular physical data center, and information regarding this association is then stored in the CMDB 110A. At step 678, the system periodically discovers information regarding available physical clusters of computing resources (processor, memory, storage, network) from the virtualization control systems 110B. At step 680, the system determines whether the available cluster of resources is able to accept new or additional customers. If so, then the cluster is set to "ready to provision," 682, meaning that a customer can access and associate the physical resources of the cluster to one or more virtual servers existing within the customers one or more environments. If the cluster is not able to accept new or additional customers, then control passes to step 684, where data regarding the state of the available physical clusters of computing resources is stored in the CMDB 110A. (FIGS. 32A-32B depict graphical user interface screens of an exemplary administration console for provisioning a computing cluster).

Figure 30C:
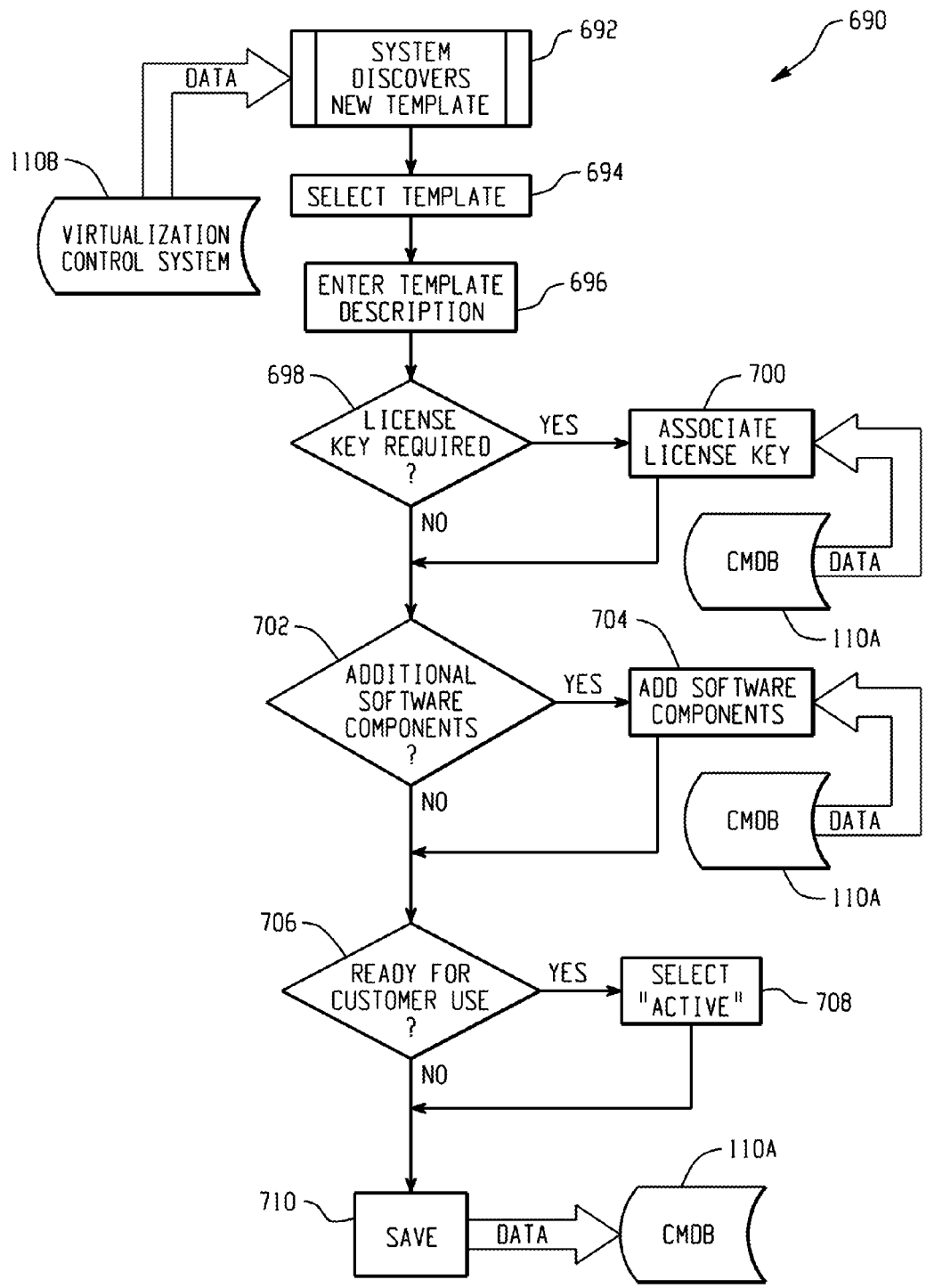
FIG. 30C is an exemplary flow diagram depicting a method for managing resource templates in a customer provisioned utility computing platform.

FIG. 30C is an exemplary flow diagram depicting a method for managing resource templates in a customer provisioned utility computing platform. At step 692 the system discovers new template information from the virtualization control system 110B. A template is then selected at step 694, and a description of the template is provided at step 696. If a license key is required for the one or more components of the template, as determined at step 698, then a license key is associated with the template at step 700, the license key information coming from the CMDB 110A. Otherwise control passes to step 702, where it is determined whether additional software components are to be associated with the template, and if so then at step 704 the additional software components are added to the template, wherein information regarding these additional software components is obtained from the CMDB 110A. Control then passes to step 706, where it is determined whether the configured template is now ready for customer use. If so, then the template is set to active in step 708, and data regarding the configured template is then saved to the CMDB 110A at step 710. (FIG. 33 depicts a graphical user interface screen of an exemplary administration console for managing resource templates).

Figure 31:
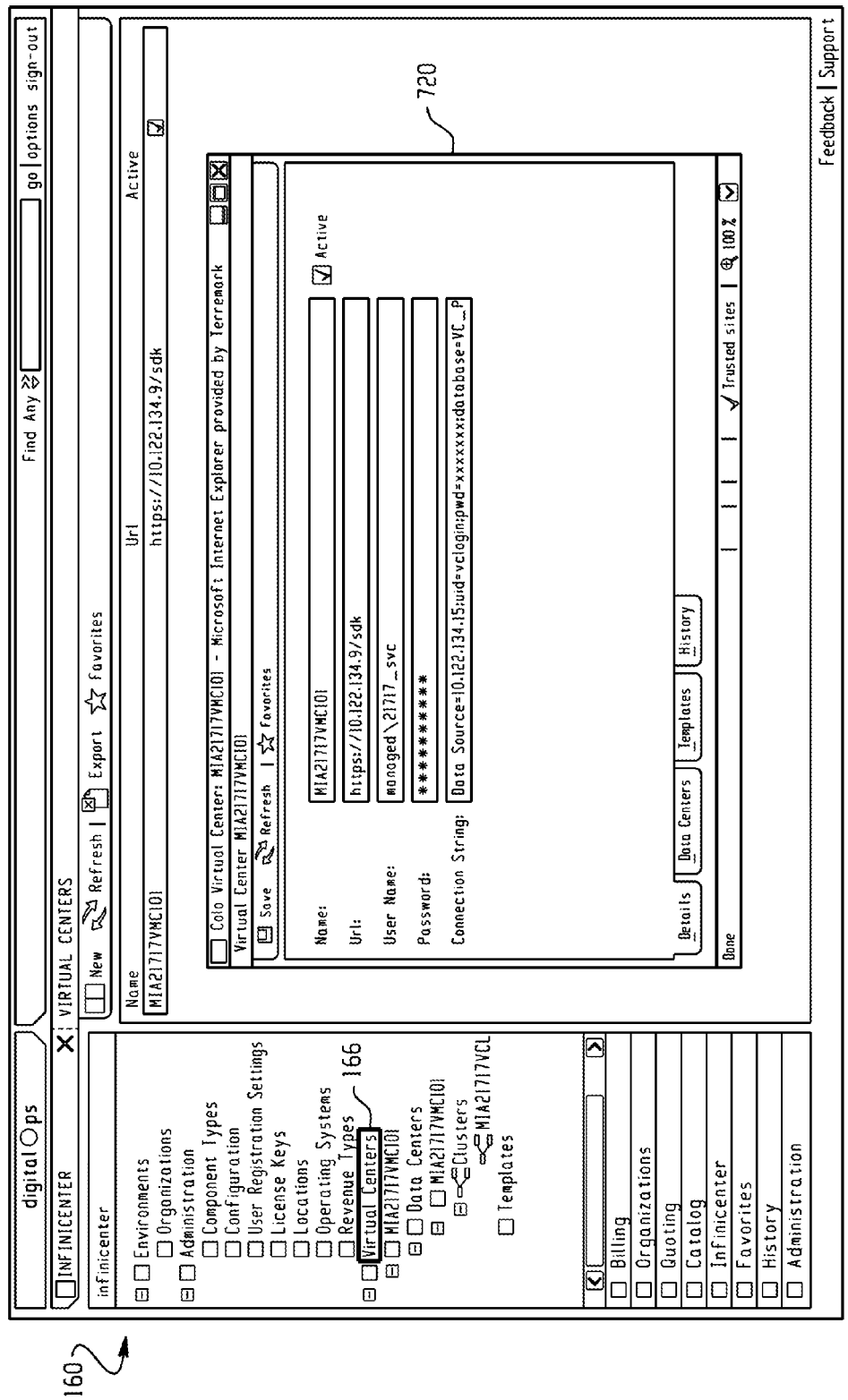
FIG. 31 depicts a graphical user interface screen of an exemplary administration console for adding a virtualization control system to the customer provisioned utility computing platform.

FIG. 31 depicts a graphical user interface screen of an exemplary administration console for adding a virtualization control system to the customer provisioned utility computing platform. In this screen 160, a system administrator has selected the Virtual Centers selector 166 and has added a new virtual center called MIA21717VMC101. In addition to naming the new virtual center via the dialog box 720, the system administrator provides the SDK URL of the new virtual center, provides a username and password, and enters a connection string for communicating with the new virtualization control system associated with this new virtual center.

Figure 32A:
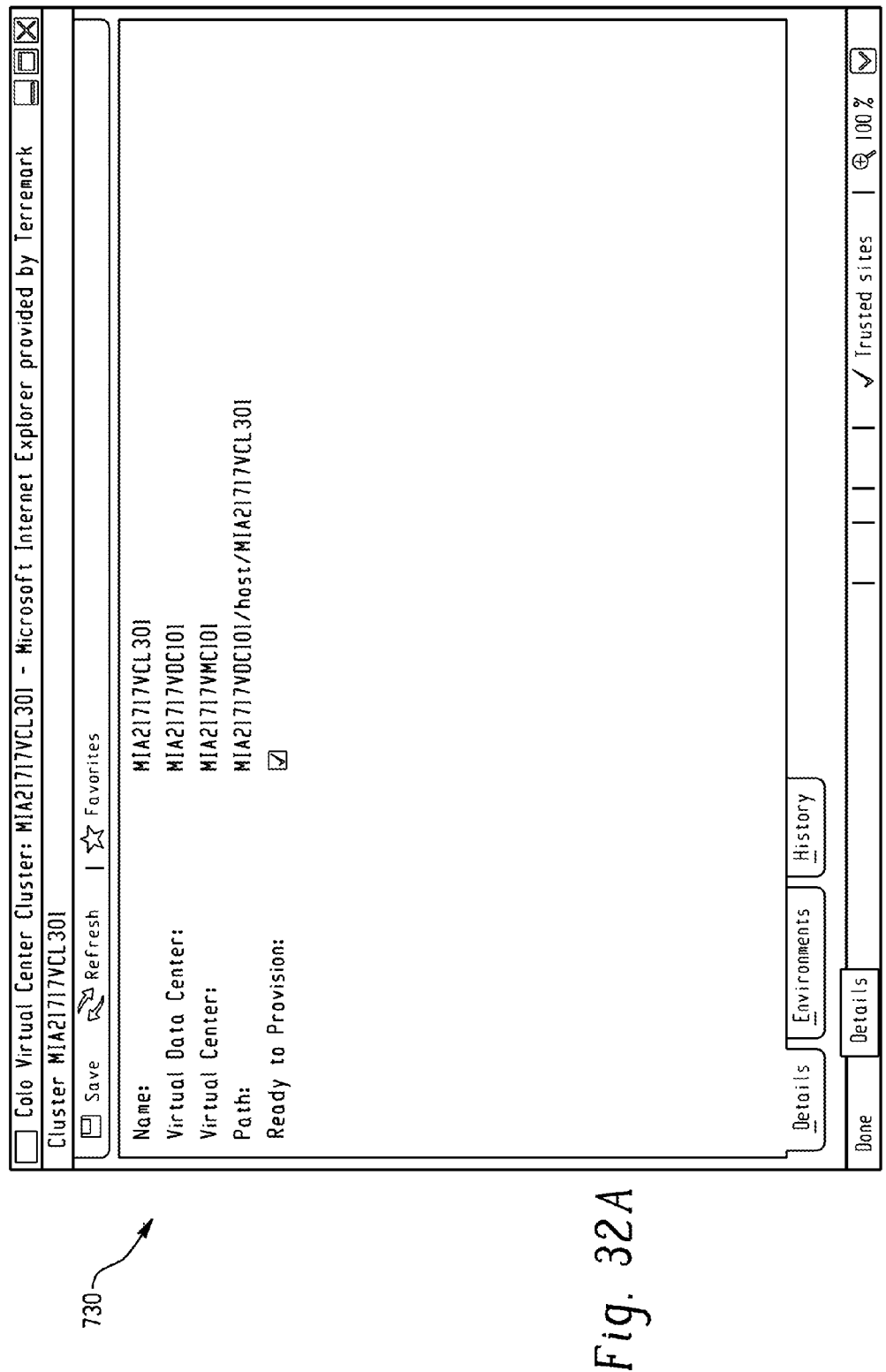

FIGS. 32A-32B depict graphical user interface screens of an exemplary administration console for provisioning a computing cluster. Each virtual center may be composed of one or more virtual data centers, each of which is composed of a plurality of computing clusters. The interface 730 shown in FIG. 32A is used to indicate that a particular cluster associated with a selected virtual data center is ready to provision through the virtualization control system so that it can be used to create customer environments. FIG. 32B depicts an interface screen 730 showing the present configuration of a particular computing cluster. This screen lists the customer environments that have been associated with this particular computing cluster of the virtual data center and also indicates the amount of memory, processor and disk storage virtual resources associated with each of the customer environments.

Figure 33:
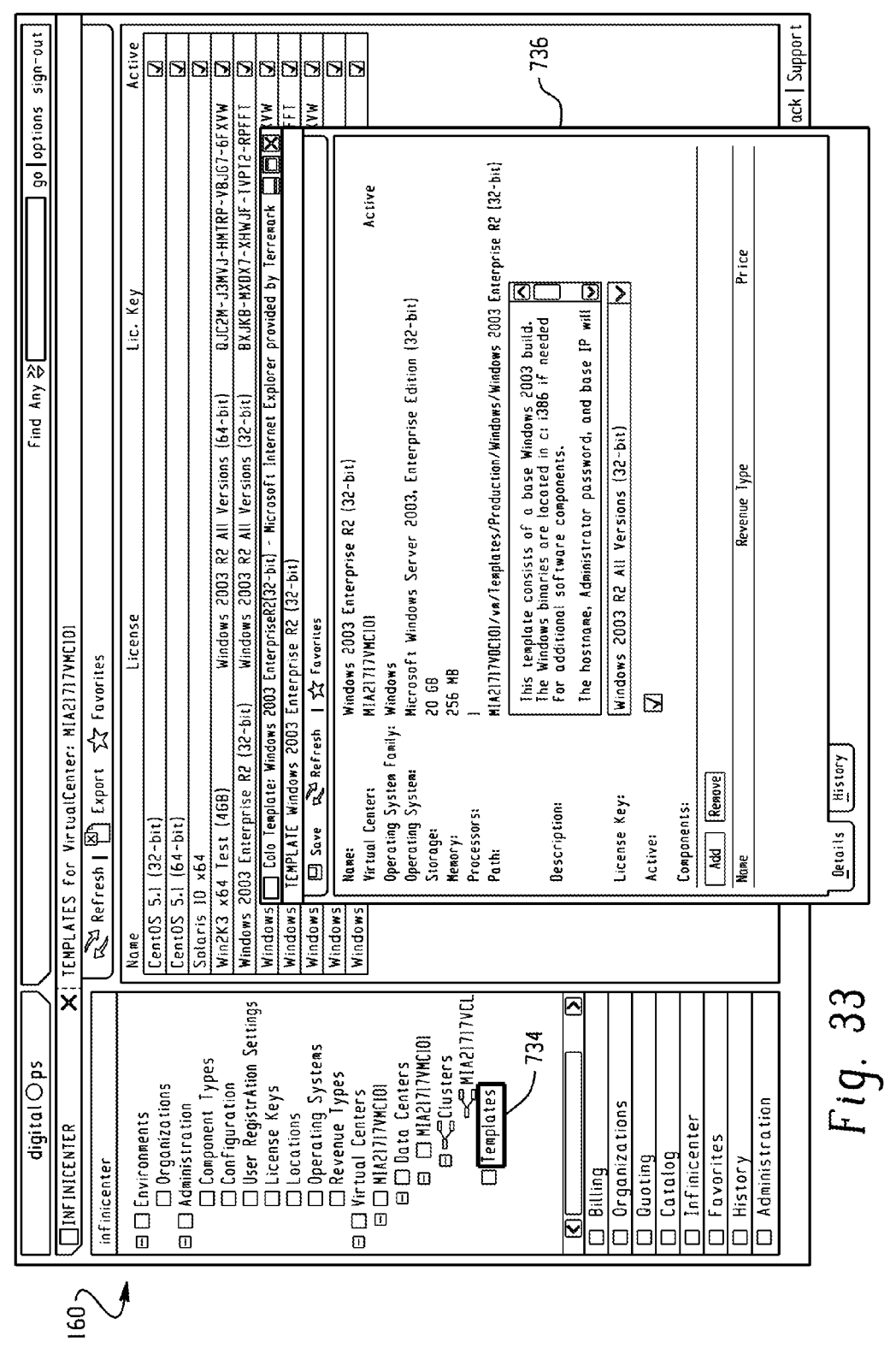

FIG. 33 depicts a graphical user interface screen of an exemplary administration console for managing resource templates. By selecting the Templates selector 734, a listing of the available templates associated with the data center is displayed in the main part of the interface screen. The system administrator can then select a template to obtain additional information through the display screen 736 regarding the selected template.

Figure 34A:
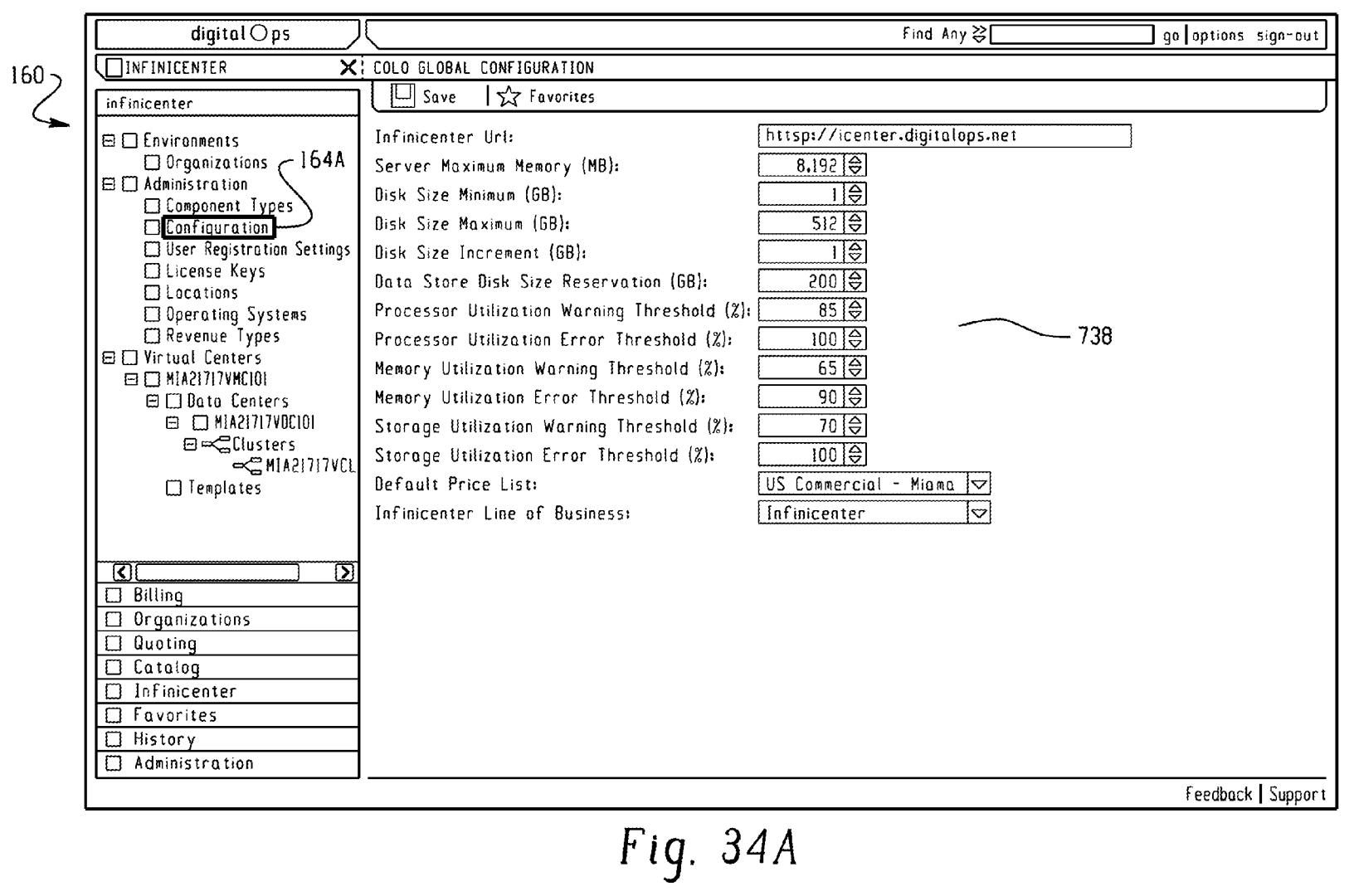
Figure 34C:
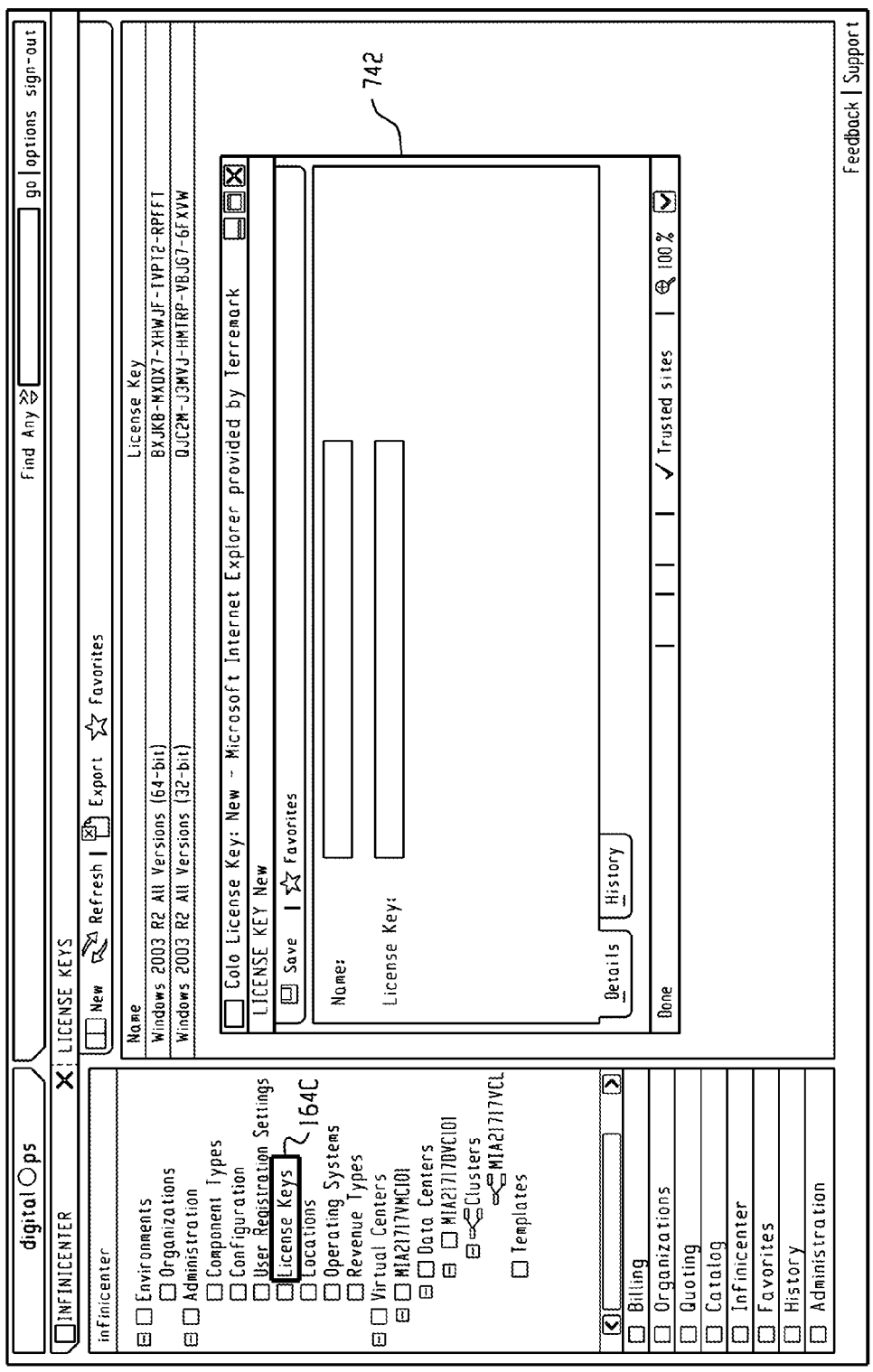
Figure 34D:
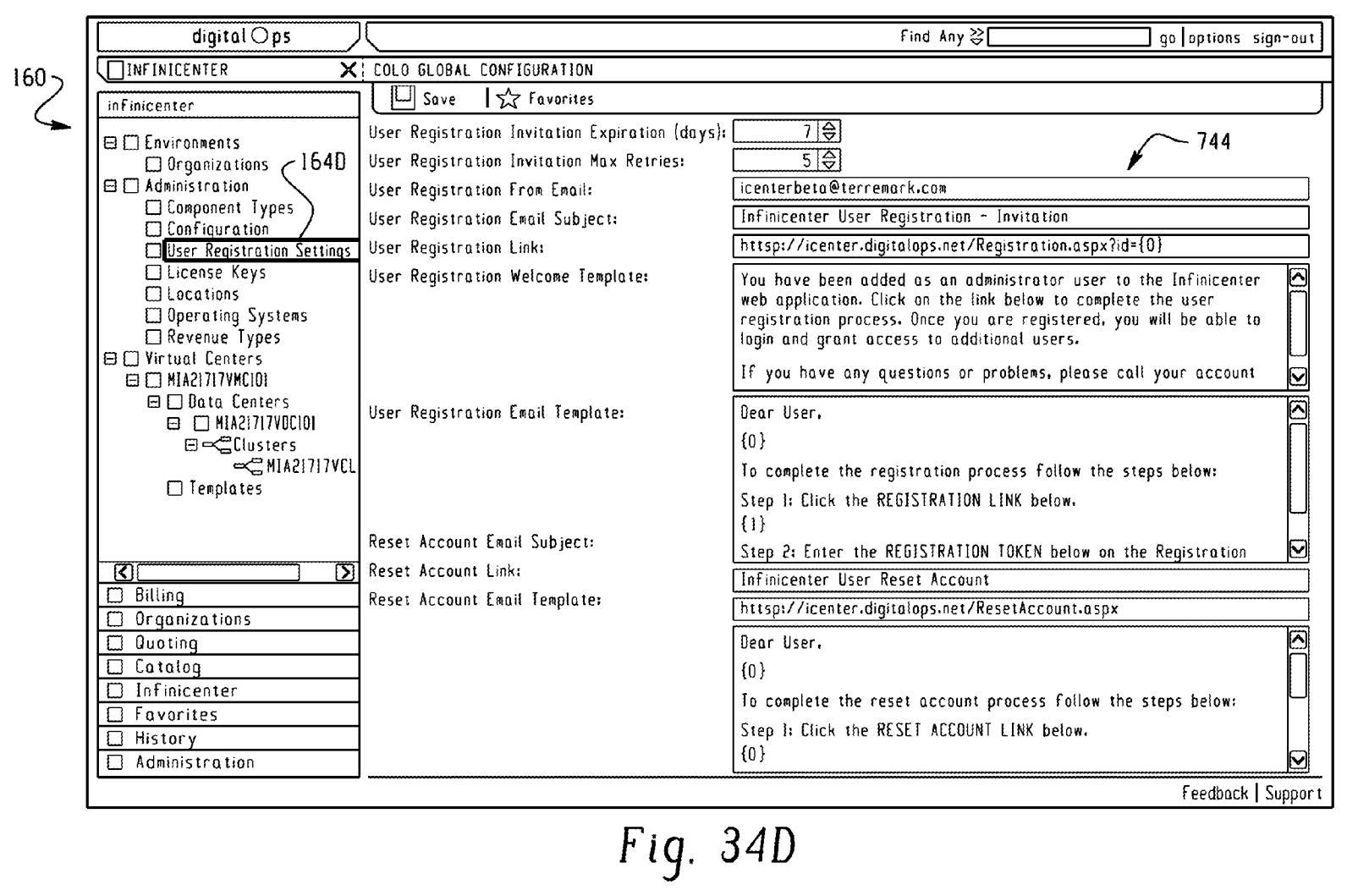

FIGS. 34A-34D depict graphical user interface screens of an exemplary administration console for performing various system administration tasks. FIG. 34A depicts the configuration interface screen 738. FIG. 34B depicts the Operating Systems interface screen 740. FIG. 34C depicts the License Keys interface screen 742. And FIG. 34D depicts the User Registration Settings interface screen 744.

Figure 35:
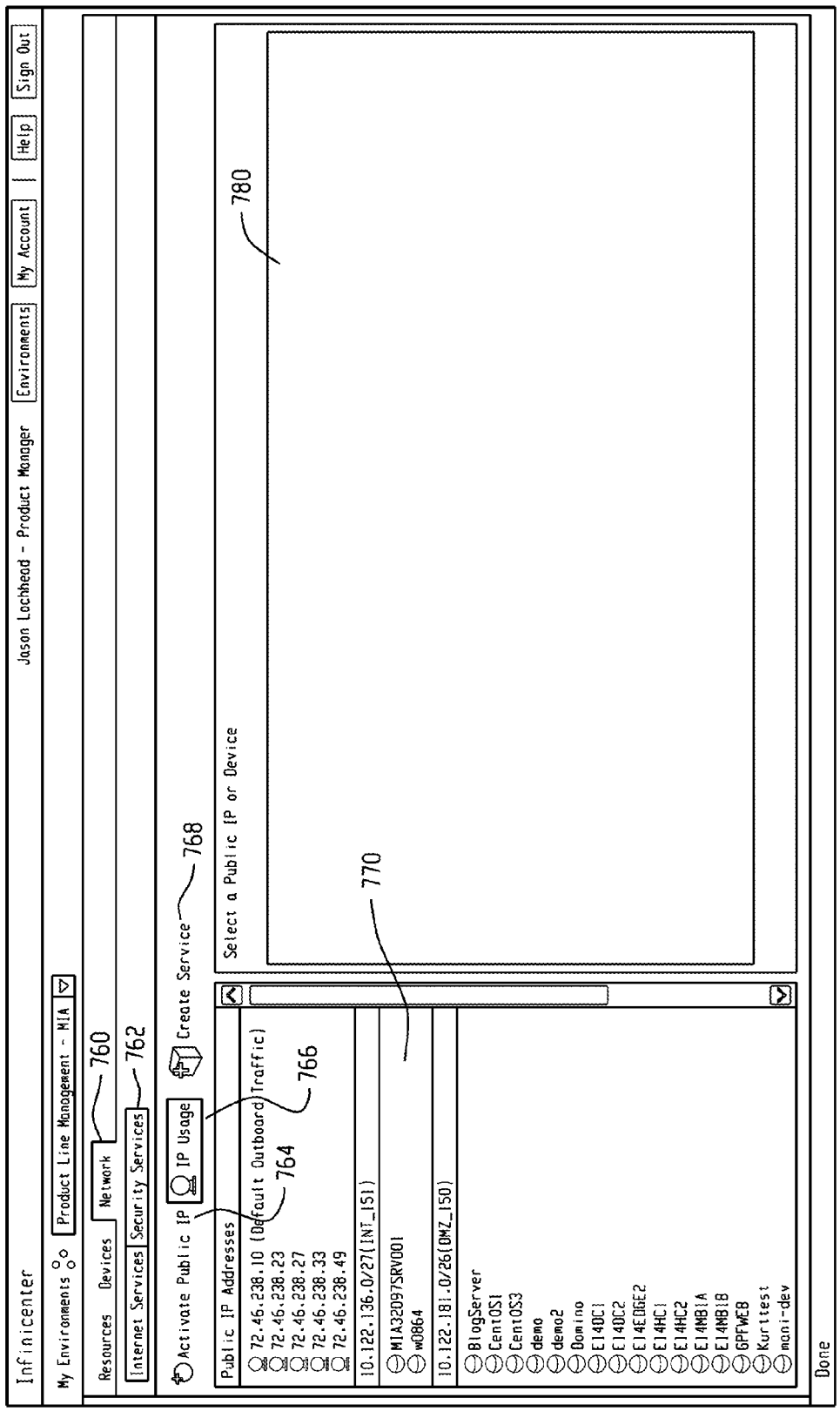
FIG. 35 depicts a graphical user interface screen of an exemplary customer provisioning console for selecting and provisioning network resources associated with a selected customer environment.

FIG. 35 depicts a graphical user interface screen 750 of an exemplary customer provisioning console for selecting and provisioning network resources associated with a selected customer environment. This interface screen adds a "Network" tab 760 to the "Resources" and "Devices" tabs that were seen in previous interface screens, such as shown in FIG. 14, above. Note that in FIG. 14 the "Devices" tab is labeled "Servers." When the Network tab 760 is selected from the interface screen 760, the main Network provisioning functions are shown. These main functions are labeled 762, and include an Internet Services tab for accessing and provisioning Internet services and a Security Services tab for accessing and provisioning security services. The Internet services tab relates to load balancer features whereas the Security Services tab relates to configuration of the network firewall.

In FIG. 35, the Internet Services tab has been selected. This causes several selectors to be activated, including "Activate Public IP" 764, "IP Usage" 766, and "Create Service" 768. Also shown is an address space display 770 and a display area 780 for selecting a Public IP or device. The Activate Public IP 764 selector is greyed out in FIG. 35, but this selector would be activated when a customer has pre-purchased a block of IP address. Here, the customer has already purchased a block of IP address, which are listed in the address display 770 under the Public IP Addresses heading. The IP Usage selector 766 will bring up a display screen that allows a user to examine the assignments of private IPs to different virtual servers that have been configured. This display is further shown in FIGS. 41A-41B, below. The Create Service selector 768 is used to identify a port that supports a protocol on the load balancer that is going to be tied to a virtual server inside the customer environment. Also shown in the address display area 770 is an internal network that is behind the load balancer and behind the firewall (labeled INT_151) in FIG. 35, and a listing of virtual servers coupled to a DMZ network (labeled DMZ_150).

FIGS. 36A-36B depict graphical user interface screens for creating an Internet service. FIG. 36A depicts the initial screen 800 that is displayed when a user selects the Create Service selector 768 from FIG. 35. From here, the user selects a public IP address 802 and a protocol 804. The user may then select or provide a port value 806 and a service name 808. A service description may then be provided in 810. The state of the service (Enabled or Disabled) is controlled by the radio buttons 812. FIG. 36B shows the create internet service screen after the user has provided the required data.

Figure 37:
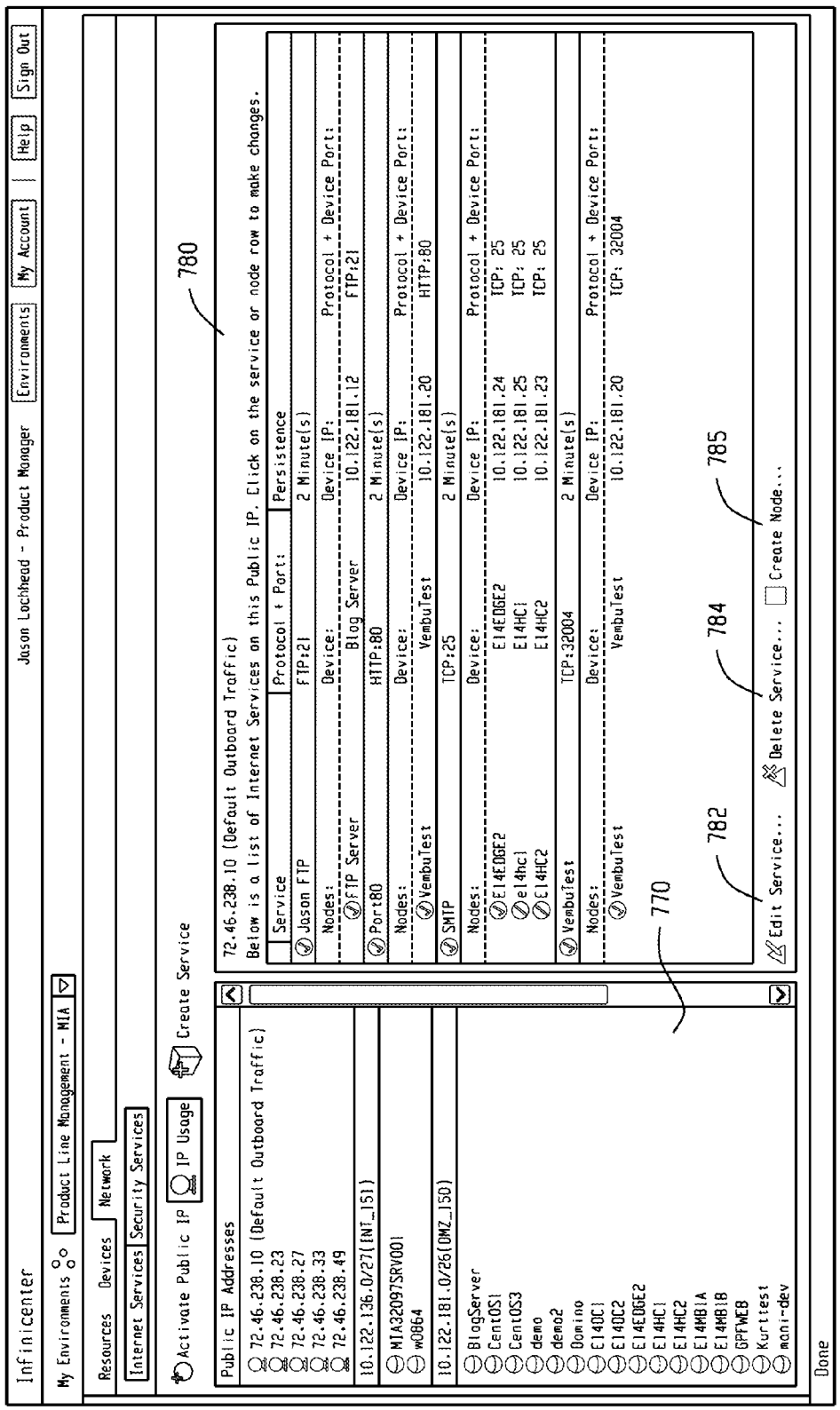
FIG. 37 depicts a graphical user interface screen of an exemplary customer provisioning console for selecting an Internet service and creating a node service.

FIG. 37 depicts a graphical user interface screen 820 of an exemplary customer provisioning console for selecting an Internet service and creating a node service. Here, the public IP address 72.46.238.10 has been selected by a user and a list of Internet services that have been provisioned for that IP address is displayed in the right portion 780 of the interface screen. The provisioned services in this example include an FTP service, a Port80 service, and SMTP service and a Test service. Within each service are listed the nodes (i.e., virtual servers) that have been created and associated with a particular Internet service, as well as the protocol and port, and the persistence. Also shown in FIG. 37 are three additional selectors associated with Internet services. These selectors are Edit Service 782, Delete Service 784 and Create node 785. The Edit Service selector 782 is used to edit the configuration of a provisioned service displayed in the display are 780. The Delete Service selector 784 is used to delete a provisioned service. And the Create Node selector 785 is used to create a node for a particular Internet service, as described in more detail below.

Figure 38:
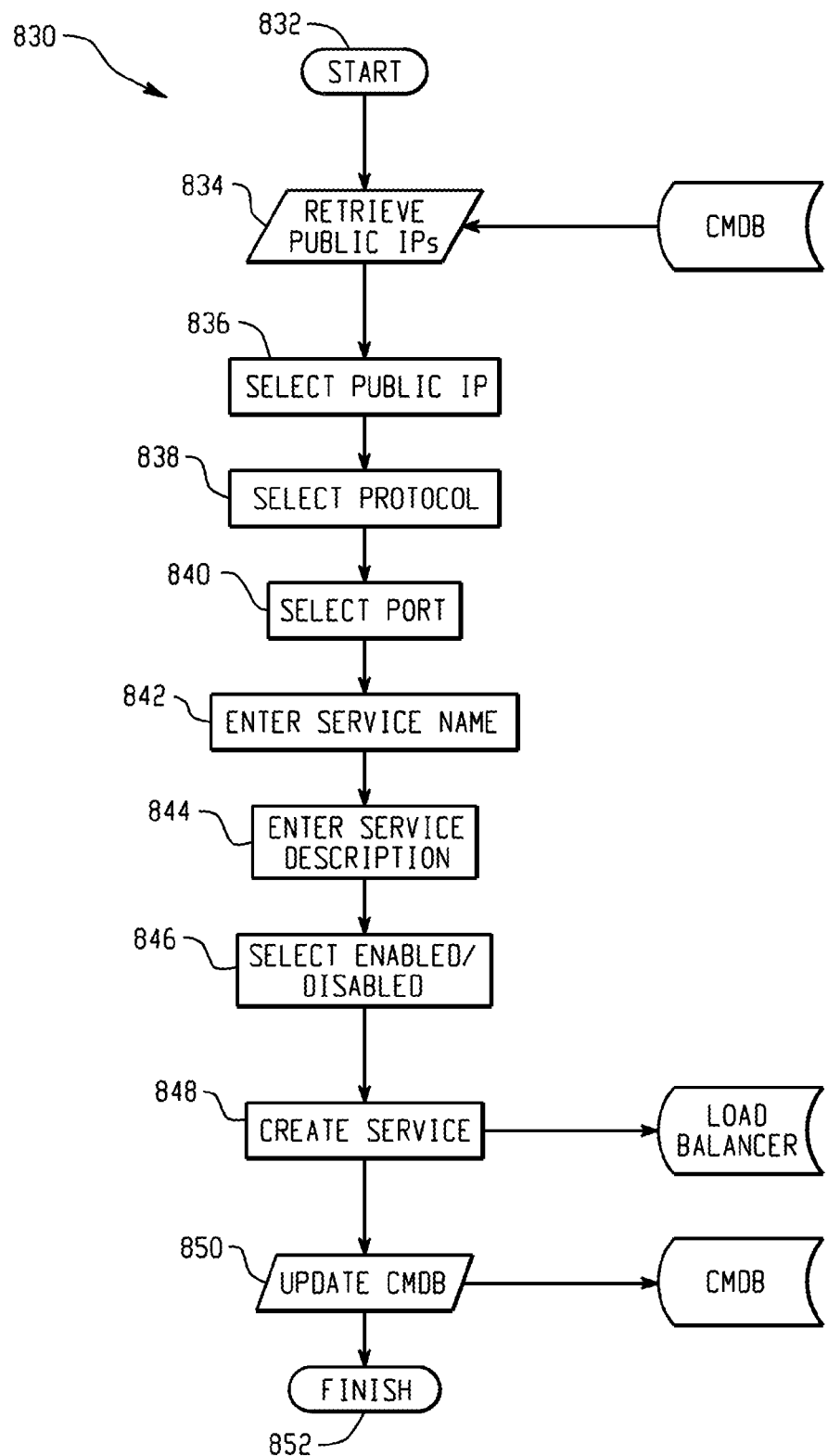
FIG. 38 is an exemplary flow diagram for creating an Internet service.

FIG. 38 is an exemplary flow diagram 830 for creating an Internet service. This flow diagram corresponds to the graphical user interface screens shown in FIGS. 35-37. The method begins at 832. At step 834 public IP addresses that have been associated with the particular customer environment are retrieved from the CMDB. A public IP address is then selected at step 836 and a protocol and port are selected at steps 838 and 840. Following these steps a descriptive service name is entered at step 842 and, optionally, a service description is input at step 844. The service is then enabled or disabled at step 846. Enabling the service at step 846 then causes the service to be created at step 848, and the necessary commands and configuration data is provided to the load balancer in order to affect the created service. Following creation of the service at step 848, the CMDB is then updated at step 850 and the method ends at 852.

FIGS. 39A-39B depict graphical user interface screens 860 for creating a node service. These screens are displayed after the user has selected the Create node selector 785 shown in FIG. 37 and associated with a particular Internet service. As shown in FIGS. 39A-39B, the internet service FTP has been selected from FIG. 37. This service has a public IP address of 72.46.238.10 as displayed in the top portion of FIG. 39A. Also shown here are the protocol and port description as well as the persistence associated with this particular Internet service. In order to create a node service for this Internet service, the user first selects a network using drop down selector 862. A device, typically a provisioned virtual server, is then selected from the drop down selector 864, and a device IP address is then selected using the drop down selector 866. Following these selections, the device port is provided at 868, and a node name and description is then provided in text boxes 870 and 872. Following these steps the particular node service is then enabled or disabled using the radio buttons

874. FIG. 39B shows the same interface screen but after a user has made certain selections and provided information needed in order to define and create a node service.

Figure 40:
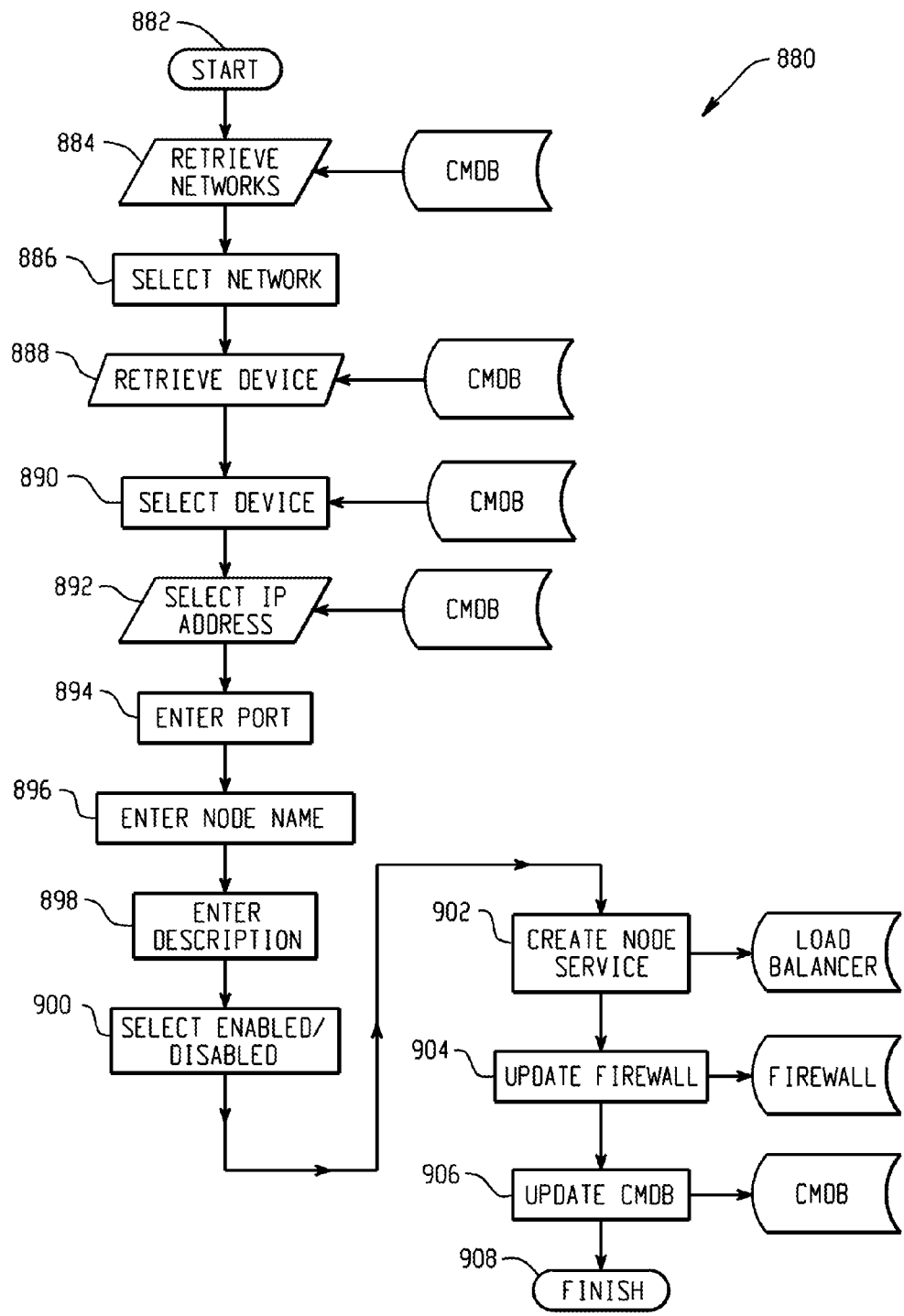
FIG. 40 is an exemplary flow diagram for creating a node service.

FIG. 40 is an exemplary flow diagram 880 for creating a node service. The method begins at 882. At step 884 the available networks are retrieved from the CMDB for the particular customer environment. The user then selects a network at step 888, and the devices (typically virtual servers) associated with the selected network are then retrieved from the CMDB. A particular device is then selected at step 890. Having selected the device in which to create the node service, an IP address of the device is then selected at 892. Following this step, the port, node name and description are then provided at steps 894, 896, and 898. The user then enables the node service at step 900. Following enablement of the node at step 900, the node service is then created at 902 and the appropriate commands and configuration data is then provided to the load balancer. The firewall is then updated, if necessary at step 904, and the CMDB is updated to reflect the new node service configuration at step 906. The method ends at 908.

Figure 41A:
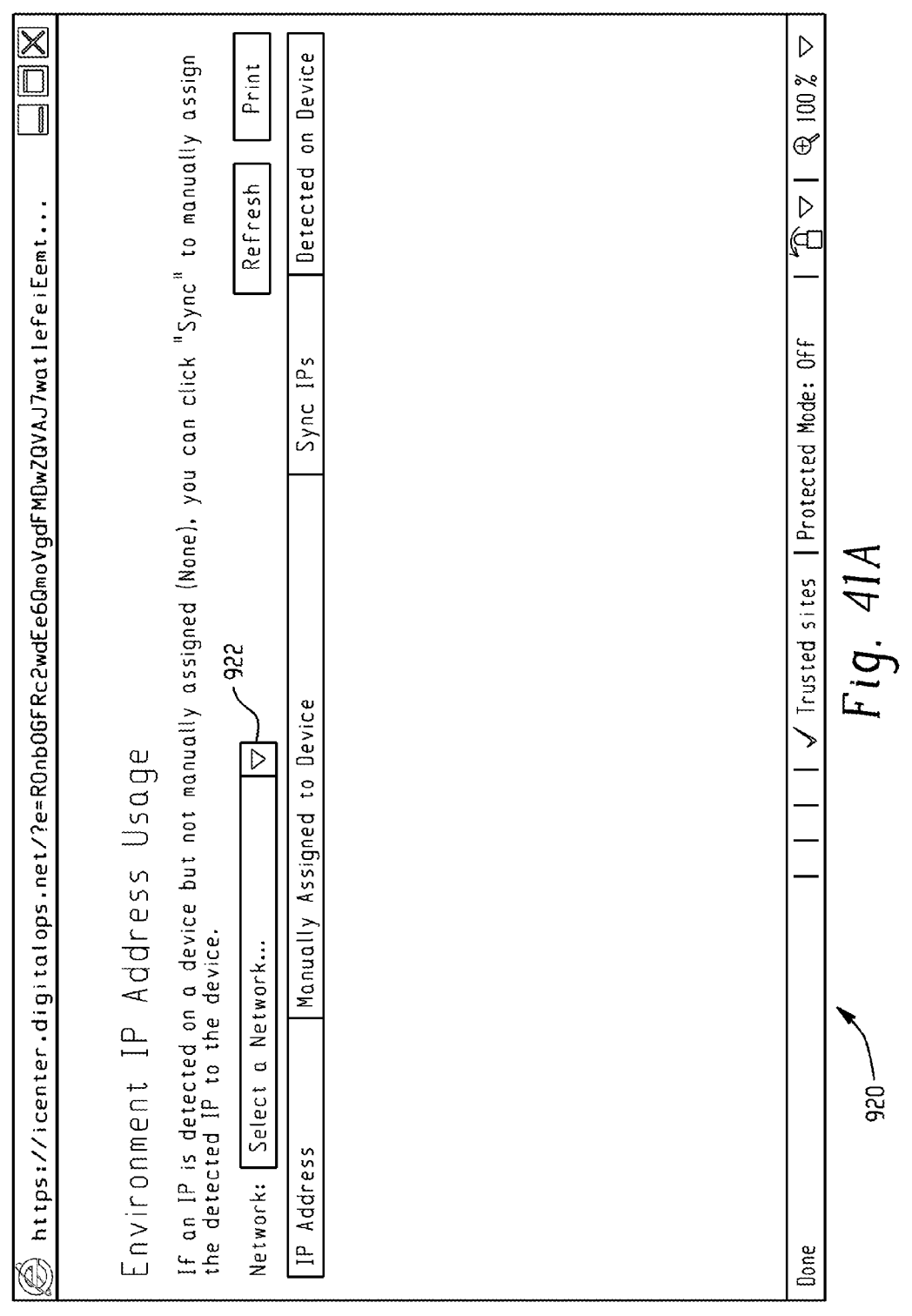
Figure 41B:
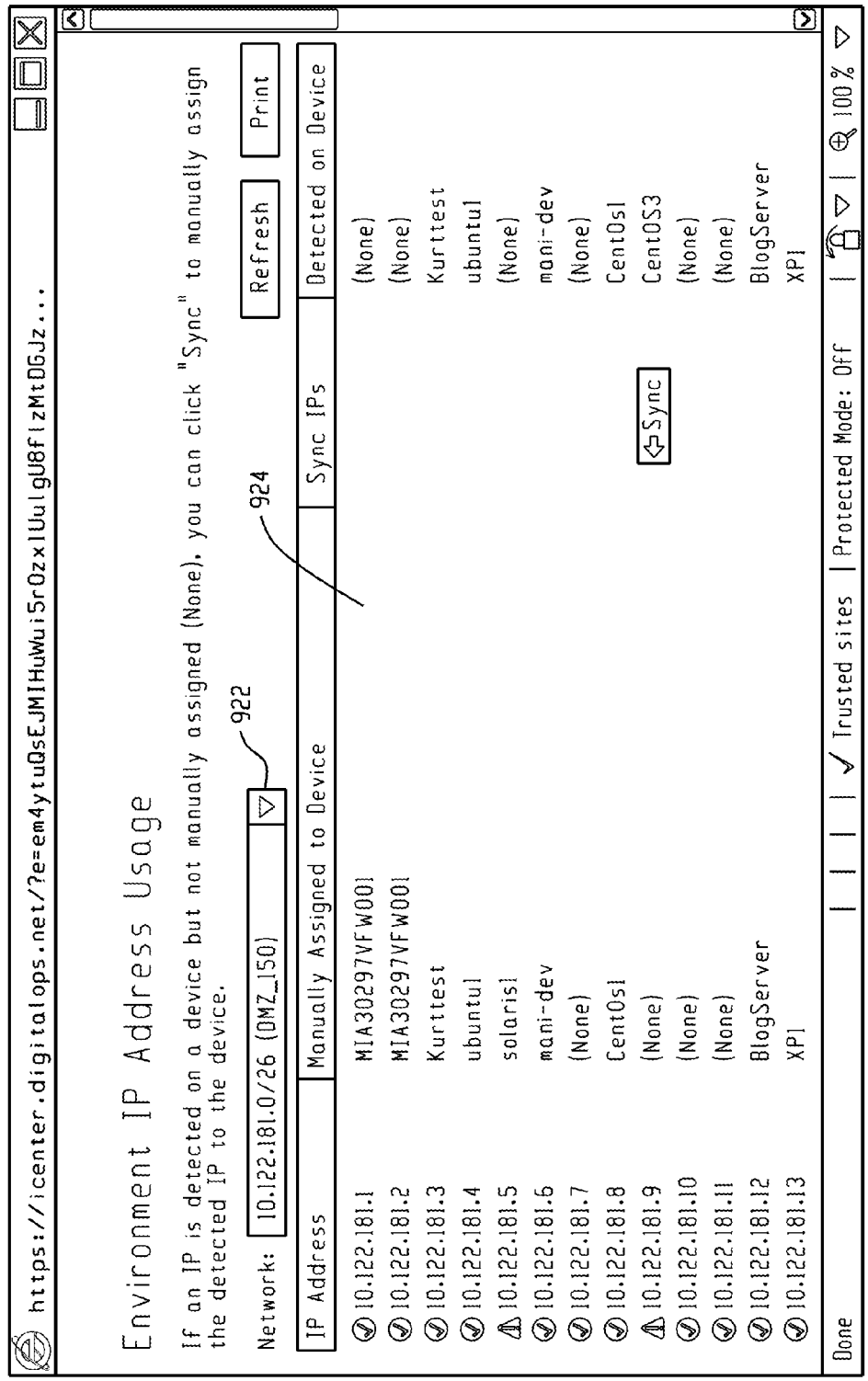

FIGS. 41A-41B depict graphical user interface screens for checking an environment IP address usage. In FIG. 41A, the network is selected using the drop down selector 922. Following selection of a particular network, FIG. 41B shows the IP addresses associated with the particular selected network in the display panel 924. This panel 924 also shows the device that is assigned to the IP address, an SYNC IPs, and an indication of the detection on device. Warning icons are displayed (yellow triangles) next to the IP address if a device has been assigned but it was not detected during the process of detection. If an IP is detected on a device, but it has not been manually assigned, then the SYNC IP button is presented so that the user can manually assign the detected IP to the appropriate device.

Figure 42:
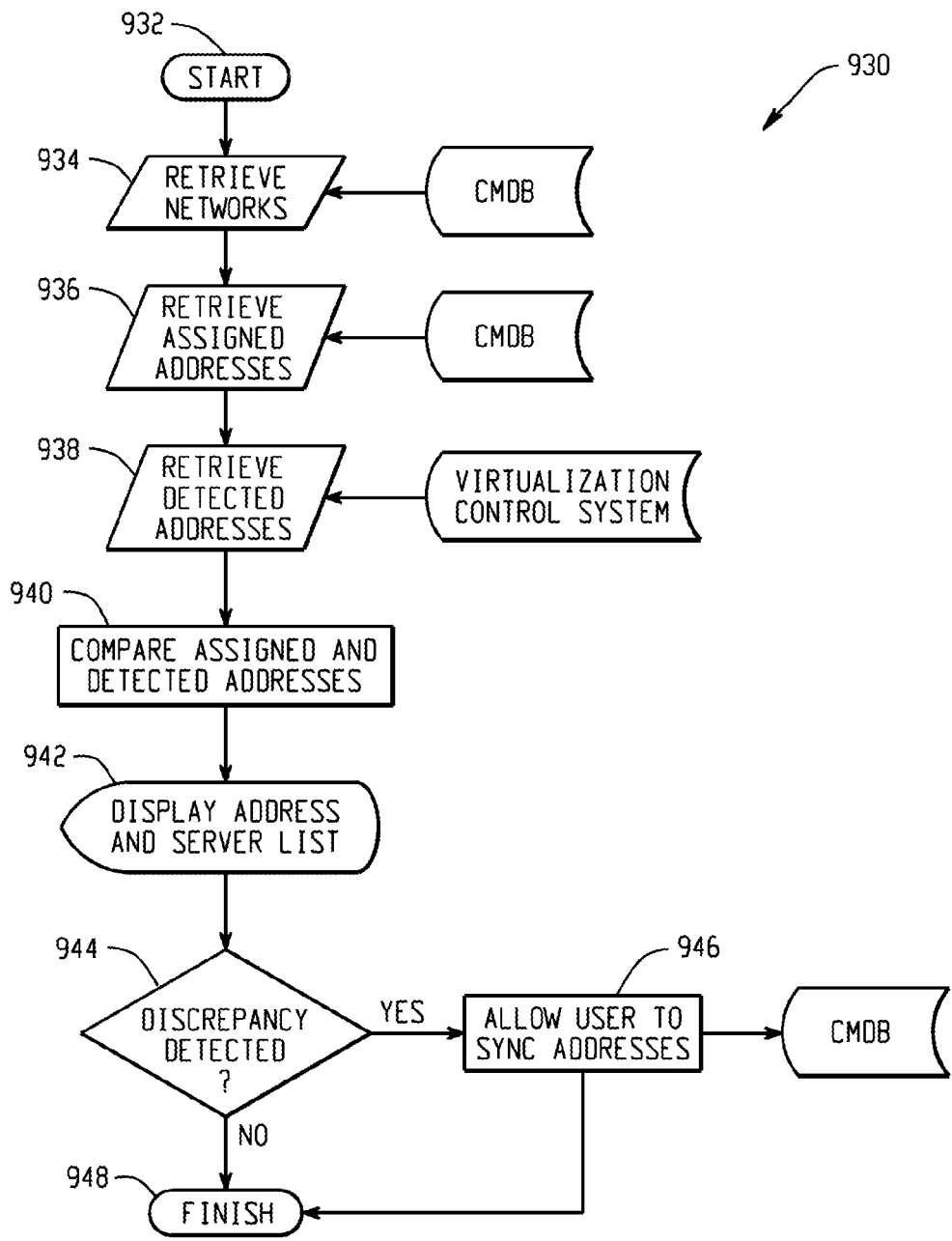
FIG. 42 is an exemplary flow diagram for displaying an environment IP address usage.

FIG. 42 is an exemplary flow diagram 930 for displaying an environment IP address usage. The method begins at 932. At step 934 the available networks for the particular customer environment are retrieved from the CMDB. Assigned IP addresses are then retrieved from the CMDB at step 936, and at step 938, the system retrieves any detected IP addresses from the virtualization control system. At step 940 the assigned and detected IP addresses are then compared and the display list (as shown in FIG. 41B) is then displayed to the user at step 942. If a discrepancy is detected at step 944, then the user is able to sync addresses to devices at step 946, which then causes configuration data to be written to the CMDB. The method ends at 948.

Figure 43:
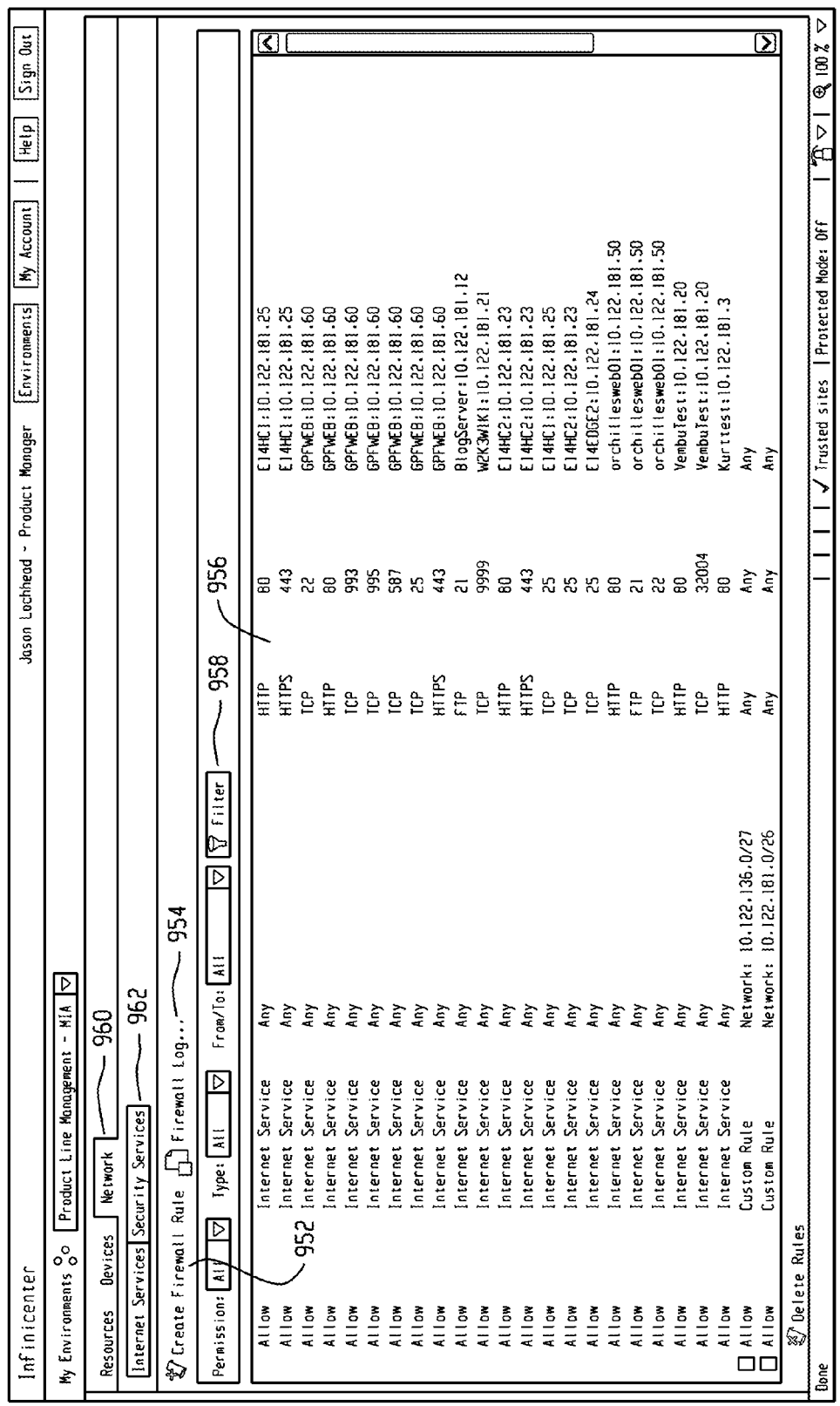
FIG. 43 depicts a graphical user interface screen of an exemplary customer provisioning console for displaying and provisioning security services.

FIG. 43 depicts a graphical user interface screen 950 of an exemplary customer provisioning console for displaying and provisioning security services. Here, the security services tab 762 has been selected. This causes two main security selectors to be displayed, Create Firewall Rule 952 and Firewall Log 954. In addition, currently configured rules are displayed in a display are 956, which can be filtered using the filter tools 958. The filter tools 958 enable filtering of the configured rules by permission, type, and from or to.

Figure 44A:
FIGS. 44A-44D depict graphical user interface screens for setting a firewall allow rule.
Figure 44B:
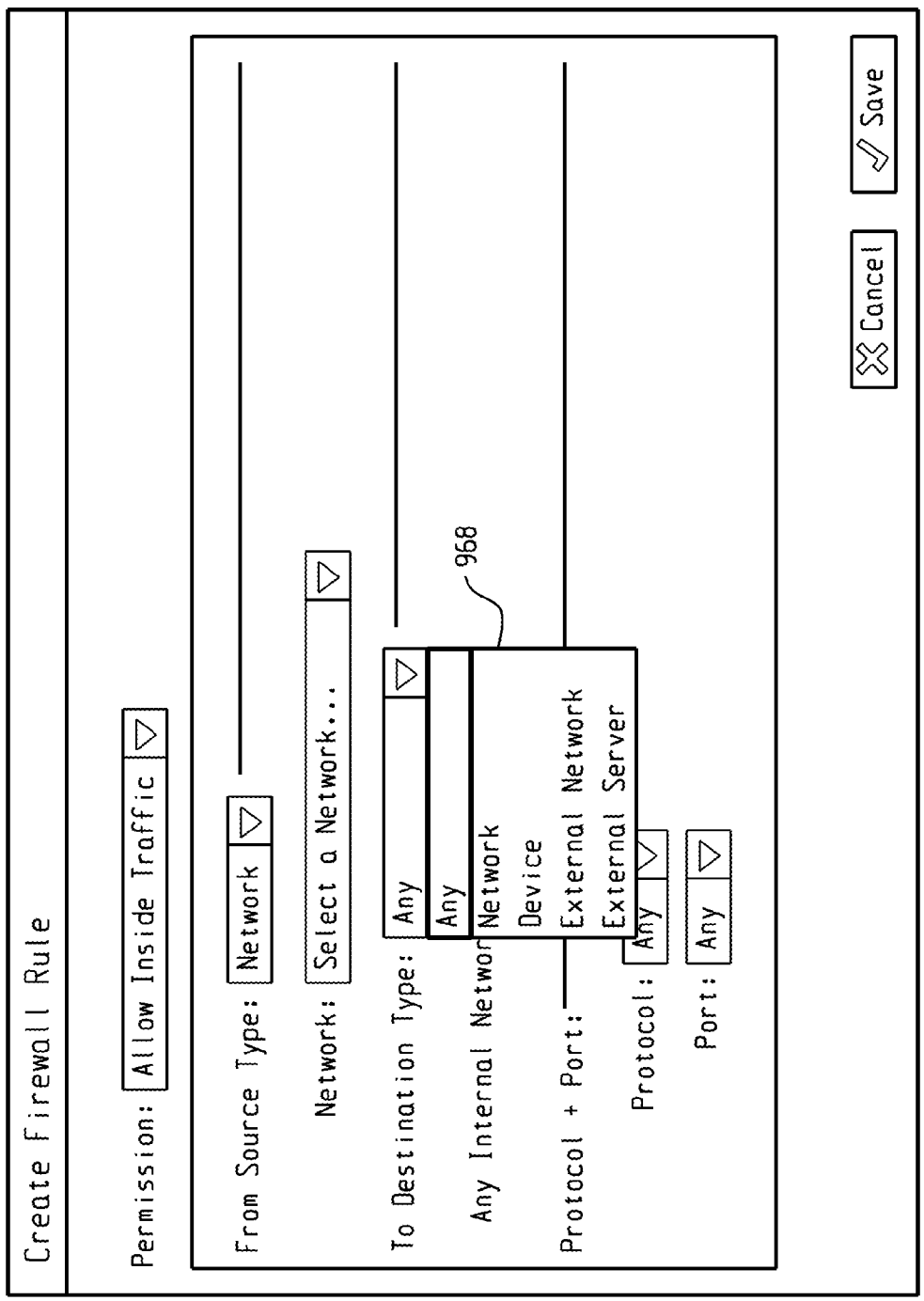
Figure 44C:
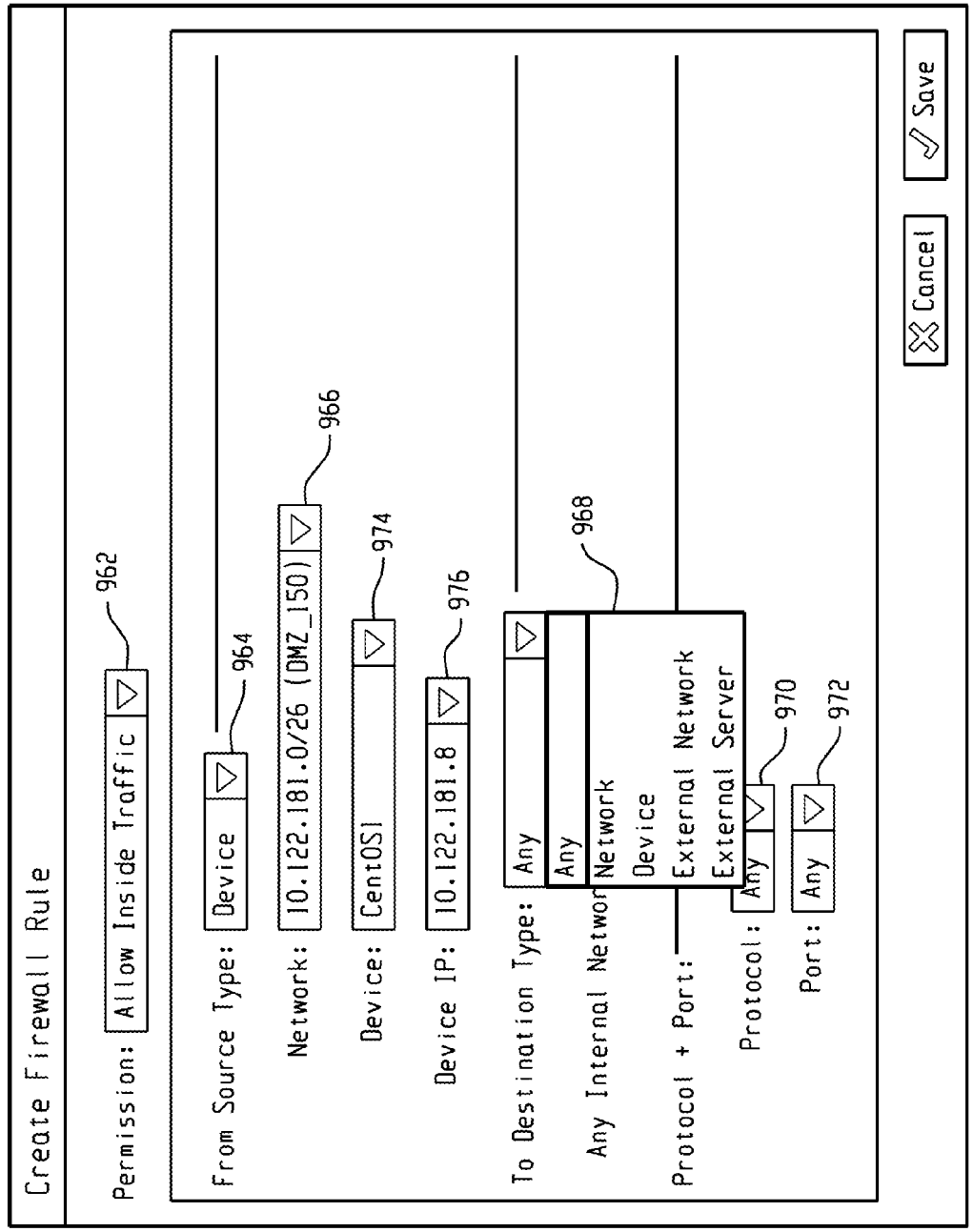
Figure 44D:
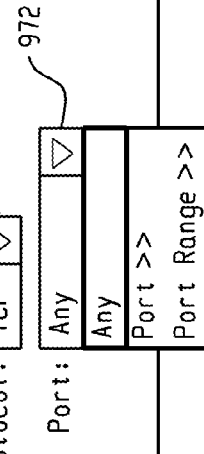

FIGS. 44A-44D depict graphical user interface screens 960 for setting a firewall allow rule. In FIG. 44A, the user first selects the permission type, either allow or deny 962. Here, the user has selected the allow inside traffic type of firewall rule. The user is then provided with selectors for picking the source type and destination type of the traffic to be monitored by the firewall rule. If a Network type is selected as the from source type 964, then the user can select the particular network from the drop down selector 966. Having selected the source type, the user then selects the destination type using selector 968. This type could be "Any," as shown in FIG. 44A, or it could be a specific type of destination, such as an internal network or a device, such as a virtual server device. Finally, the user can select the protocol and port for the rule using selectors 970 and 972. In FIG. 44B, the user has selected a source type of Network, and is then in the process of selecting the destination type for the firewall rule from the drop down selector 968. Here, the choices are Network, Device, External Network and External Device. In FIG. 44C, the user has selected a source Device for the firewall allow rule using the selector 964, which causes the display of additional selections for the Network 966, Device 974, and Device IP address 976 of the particular device that is attributed as the source for this particular rule. FIG. 44D shows the user selecting a particular protocol, in this case TCP, using the protocol selector 970 and a port using the port selector 972.

Figure 45A:
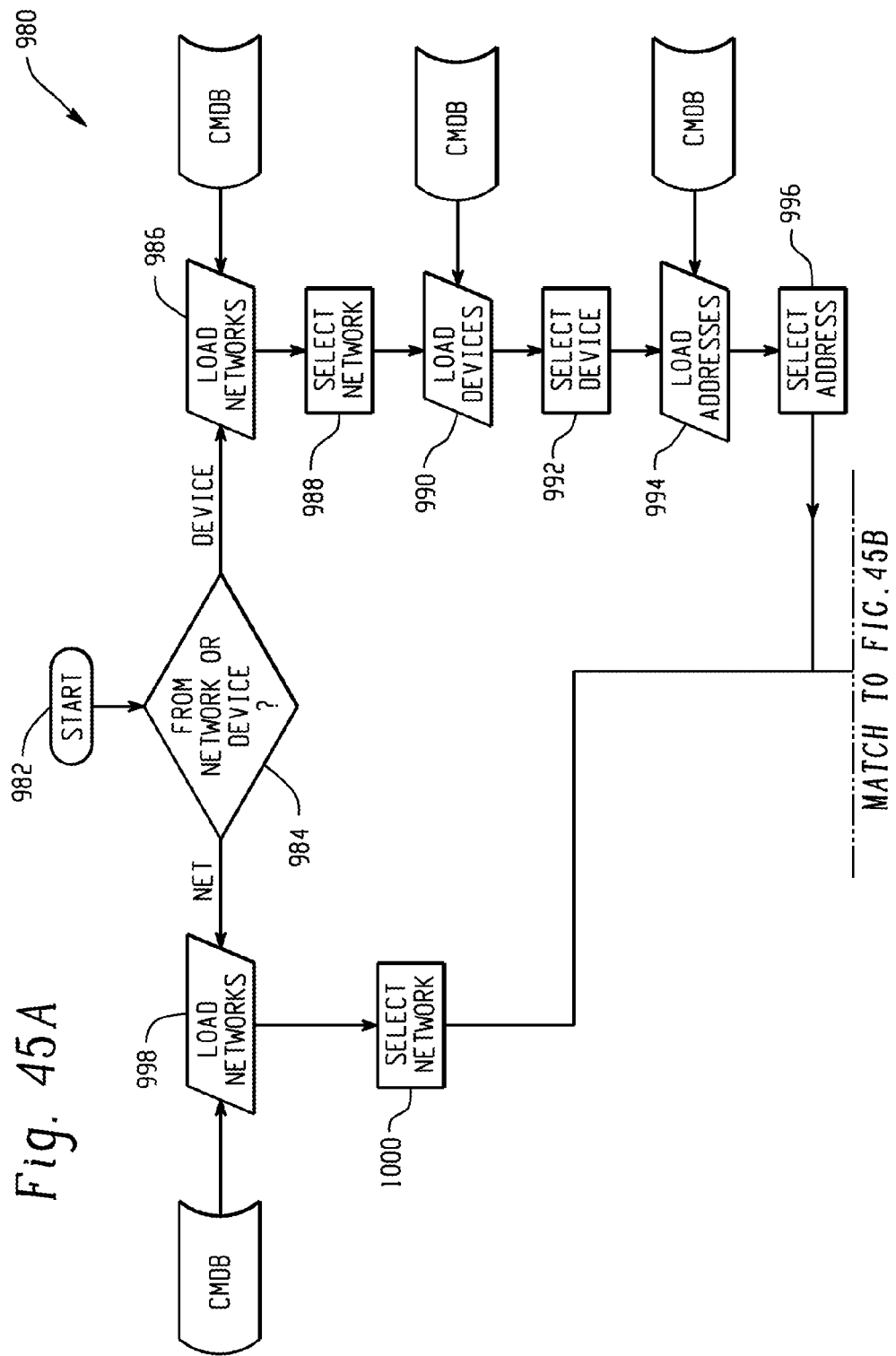
FIGS. 45-47 describe an exemplary flow diagram for setting a firewall allow rule.
Figure 45B:
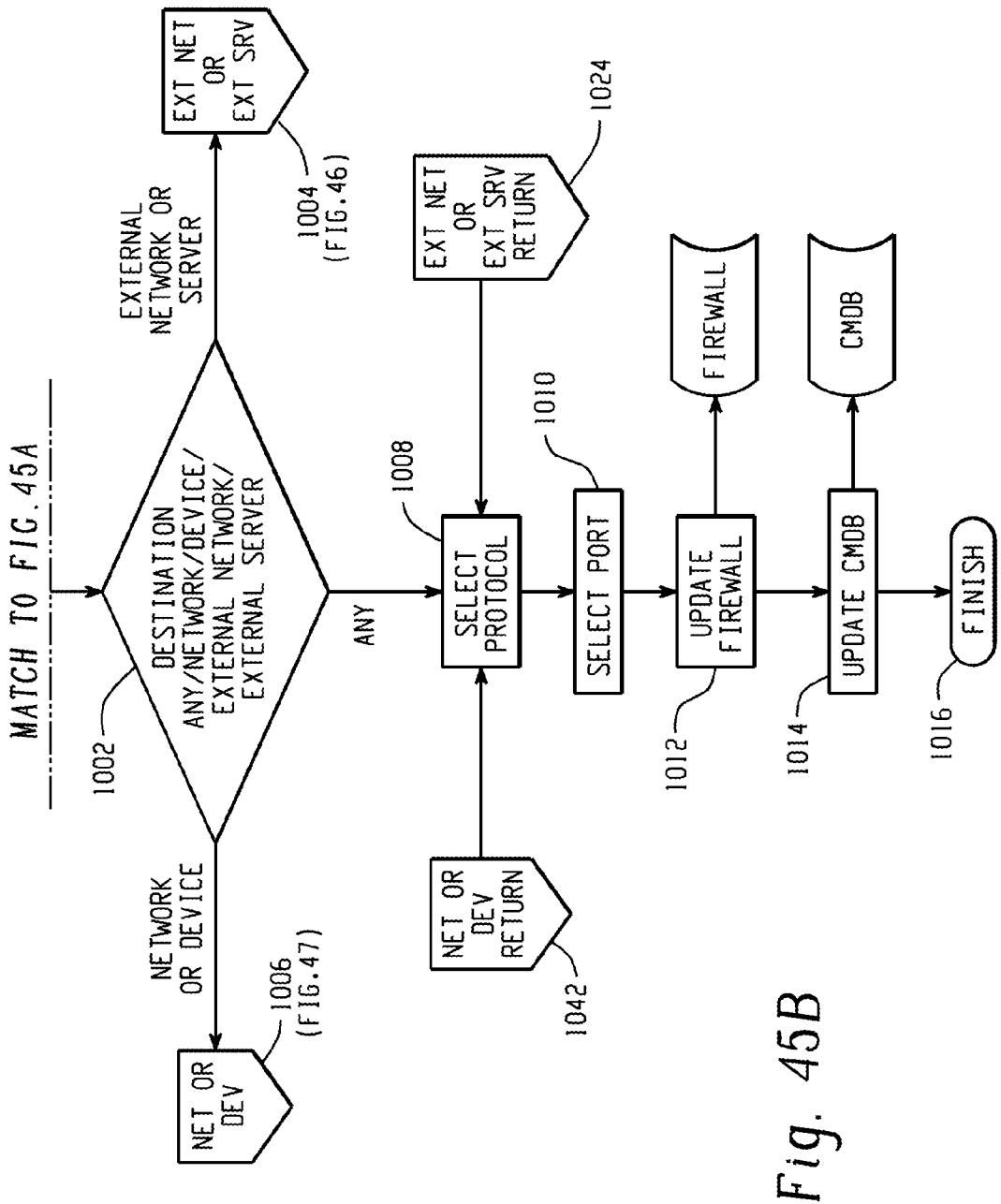
Figure 46:
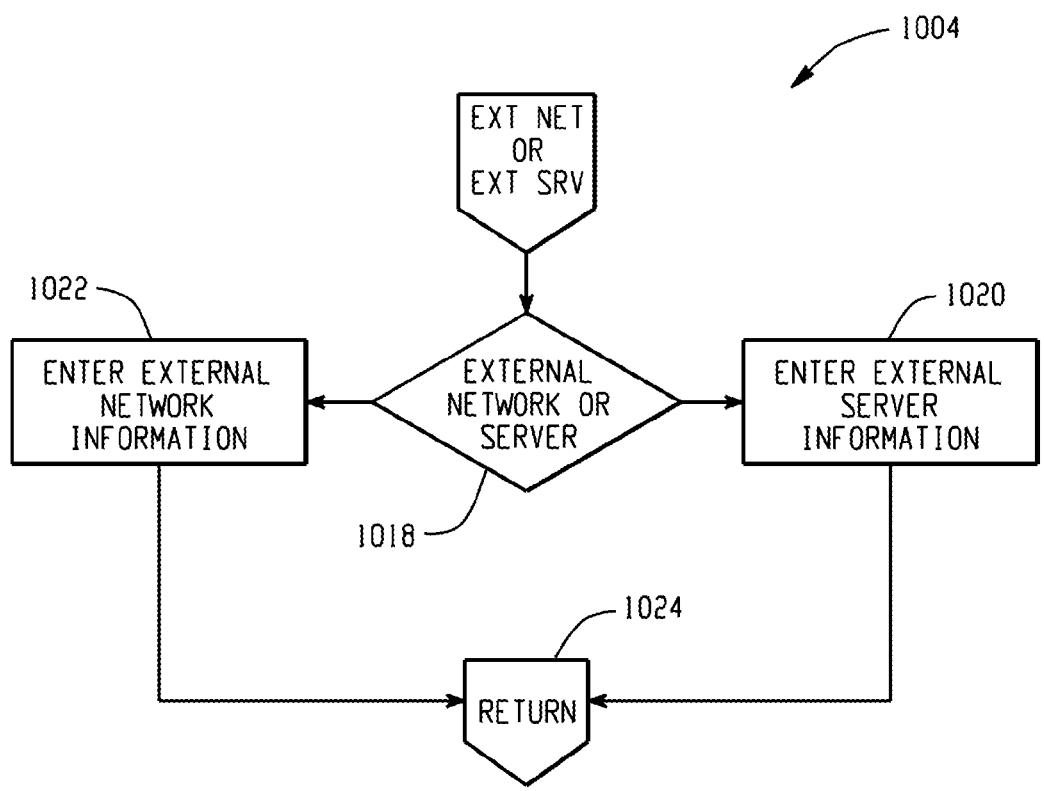
Figure 47:
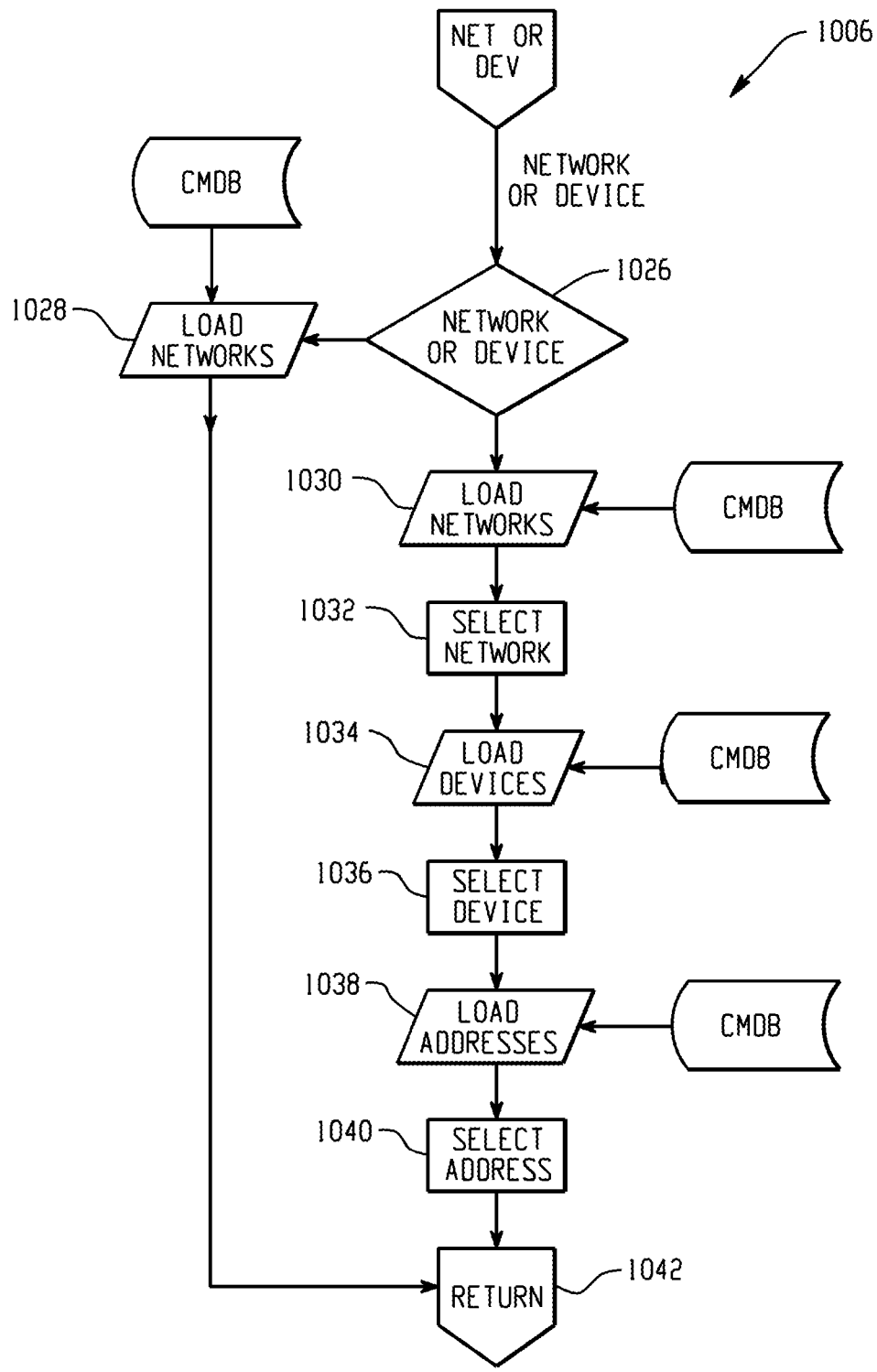

FIGS. 45-47 describe an exemplary flow diagram 980 for setting a firewall allow rule. The method begins at 982. At step 984, the system determines if the source is a network or a device. If the source is a device, then control passes to step 986. If, however, the source is a network, then control passes to step 998. Assuming a device is selected as the source, then at step 986, the system loads the available networks associated with the customer environment at step 986. The user then selects a network at 988, and the devices (i.e., typically virtual servers) associated with that network are then loaded from the CMDB at step 990. The user then selects a device at 992, and the IP addresses associated with the selected device are then loaded from the CMDB at 994. The IP address is then selected at 996 and control passes to step 1002. Assuming, however, that a network is selected as the source device in step 984, then control passes to step 998, where the available networks associated with the particular customer environment are loaded from the CMDB. The user then selects a particular network at step 1000, and control passes to step 1002.

Step 1002 is where the user selects the destination for the firewall rule from the available choices of Any, Network, Device, External Network or External Device. If the user selects external network or device at step 1002, then control passes to step 1004, which is further described in reference to FIG. 46. If the user selects network or device at step 1002, then control passes to step 1006, which is further described with reference to FIG. 47. If "any" is selected, however, then control passes to step 1008. Note here that if the other selections were made, then control passes to the steps shown in either FIG. 46 or 47, both of which return to step 1008. At step 1008 a protocol is selected by the user, and at step 1010 a port is selected. The firewall is then updated at step 1012, and the CMDB is updated with the appropriate configuration data at step 1014. The method ends at 1016.

If the user had selected an External Network or Device, then control passes to FIG. 46. Here, at step 1018, the system determines if the external device is a Network or Device. If the external device is a server, then at step 1020, the user enters the external server information and the method returns to step 1008 at 1024. If the external devices is a network, then at step 1022 the user enters the external network information and the method returns to step 1008 at 1024.

If the user had selected network or device at step 1002, then control passes to FIG. 47. Here, at step 1026, the system determines if the user selected a network or a device. If the user selected a network, then the available networks are loaded from the CMDB at 1028 and the user makes a particular selection. Control then returns at 1042 to step 1008 shown in FIGS. 45A and 45B. If the user had selected a device, however, then at step 1030 the system loads the available networks from the CMDB associated with the customer environment. A particular network is then selected at step 1032, and the devices (typically virtual servers) associated with the selected network are then loaded from the CMDB at step 1034. The user then selects a device at step 1036, and the IP addresses associated with that device are then loaded from the CMDB at step 1038. The user then selects the IP address at step 1040 and control returns to FIGS. 45A and 45B at step 1042.

Figure 48A:
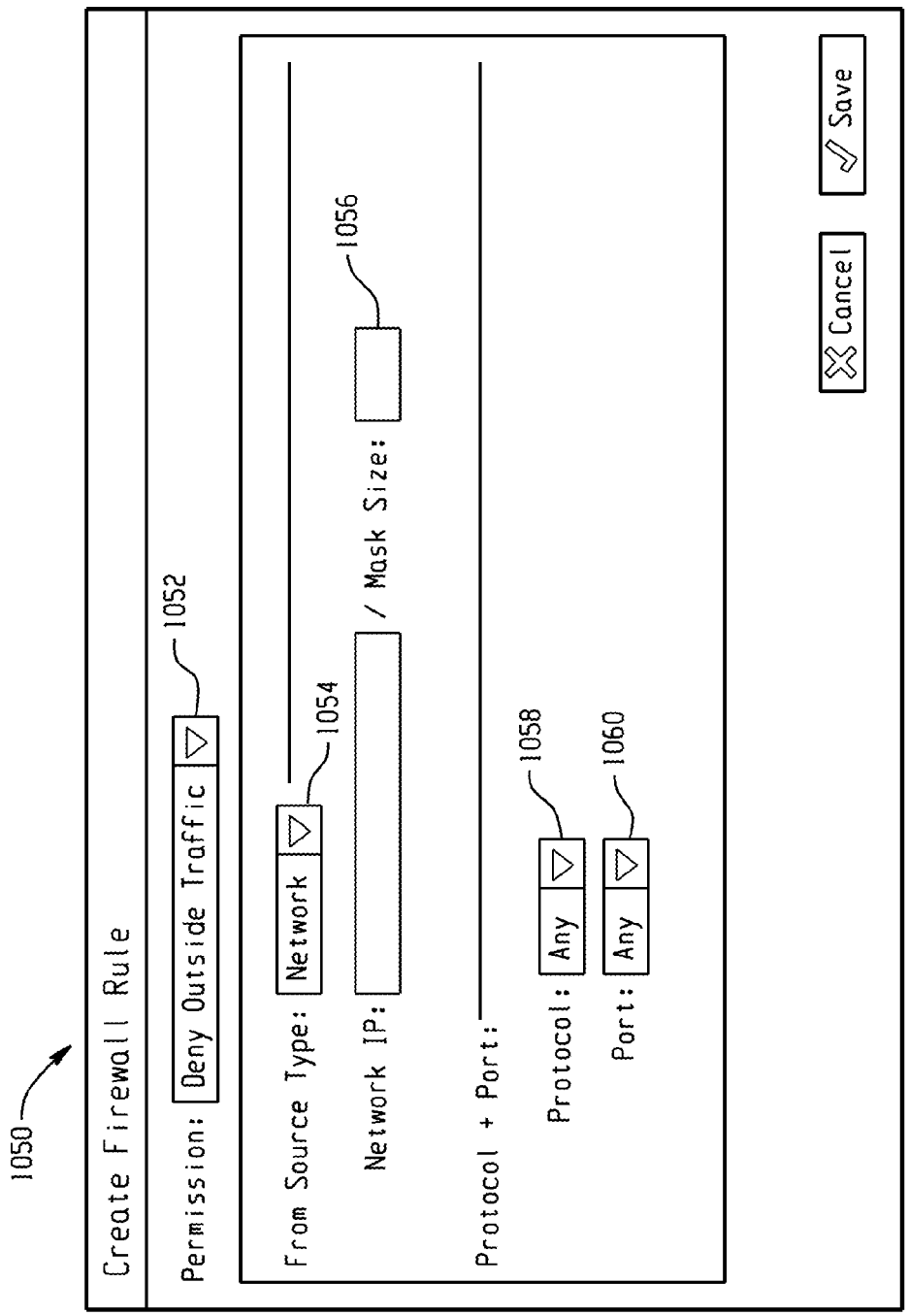
Figure 48B:
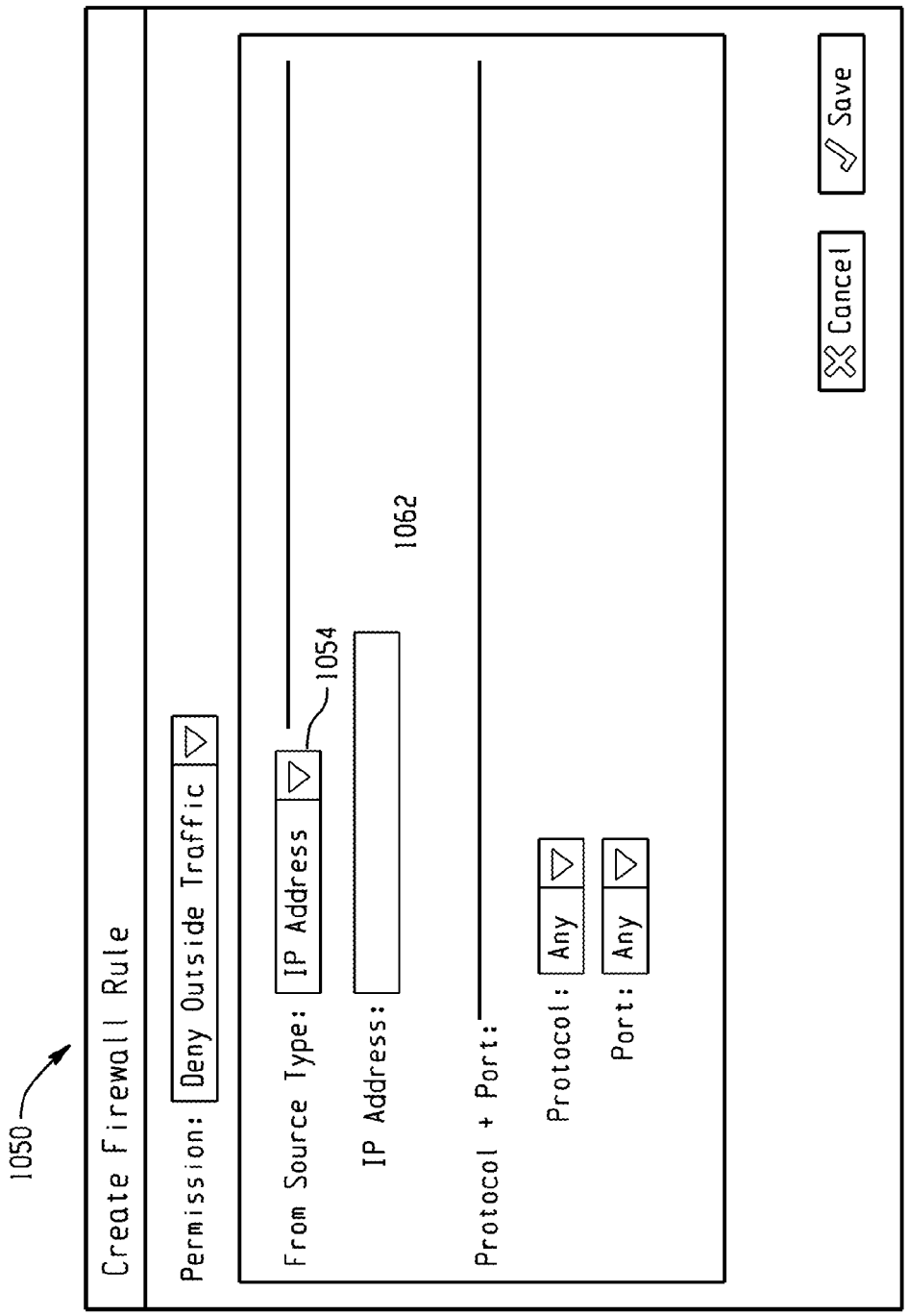
Figure 48C:
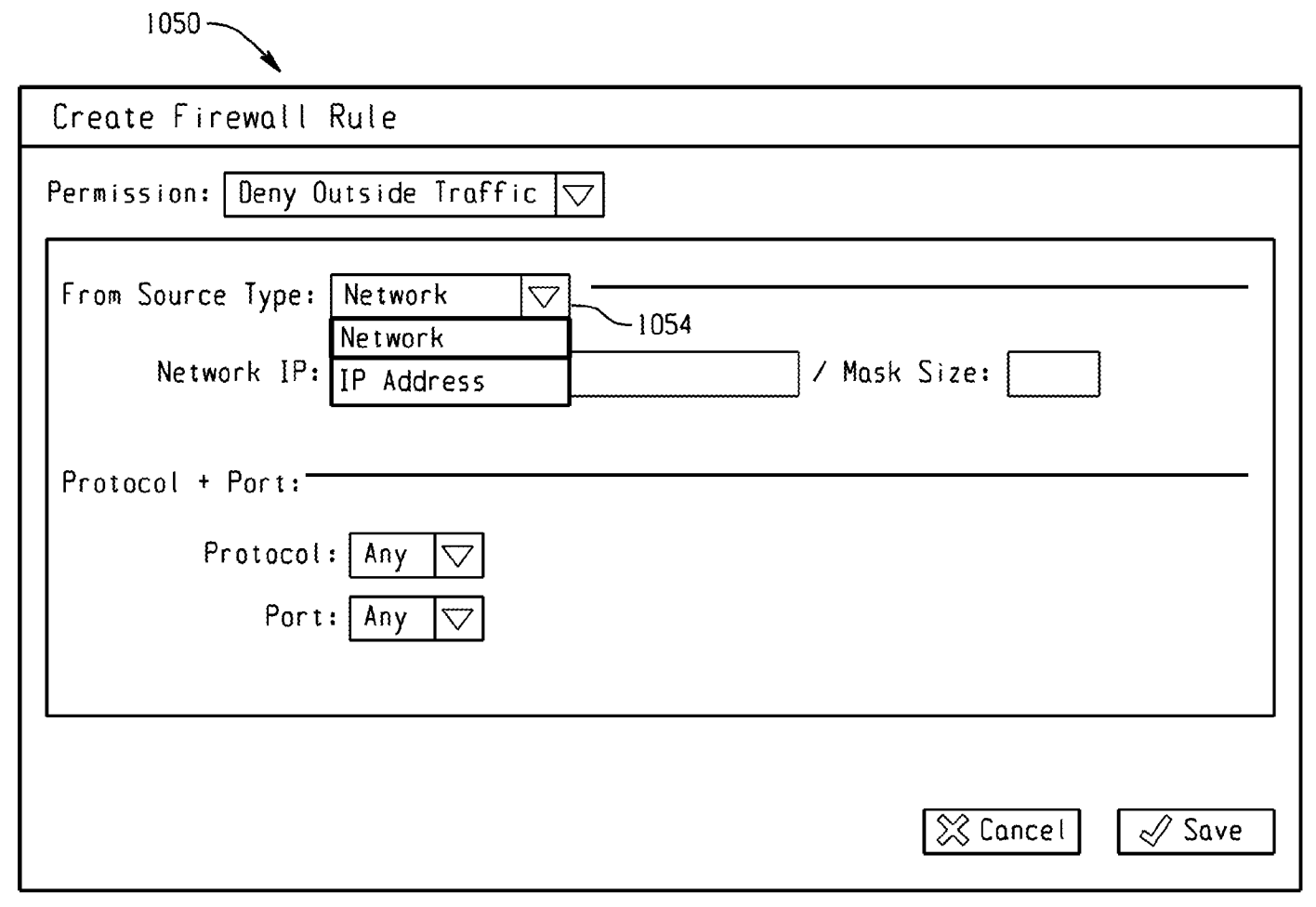

FIGS. 48A-48C depict graphical user interface screens 1050 for setting a firewall deny rule. In FIG. 48A, the user first sets the permission to deny outside traffic using the drop down selector 1052. Other forms of deny rules could also be selected using this drop down selector. The user then selects a source type using the selector 1054, and if Network is selected here, then the Network IP and mask size are provided using 1056. Finally, the protocol and port may be set using the drop down selectors 1058, 1060. In FIG. 48B, the source type has been set to IP address using selector 1054, which causes an entry box 1062 to be displayed for input of the IP address to deny traffic from. FIG. 48C shows the operation of the source type selector 1054.

Figure 49:
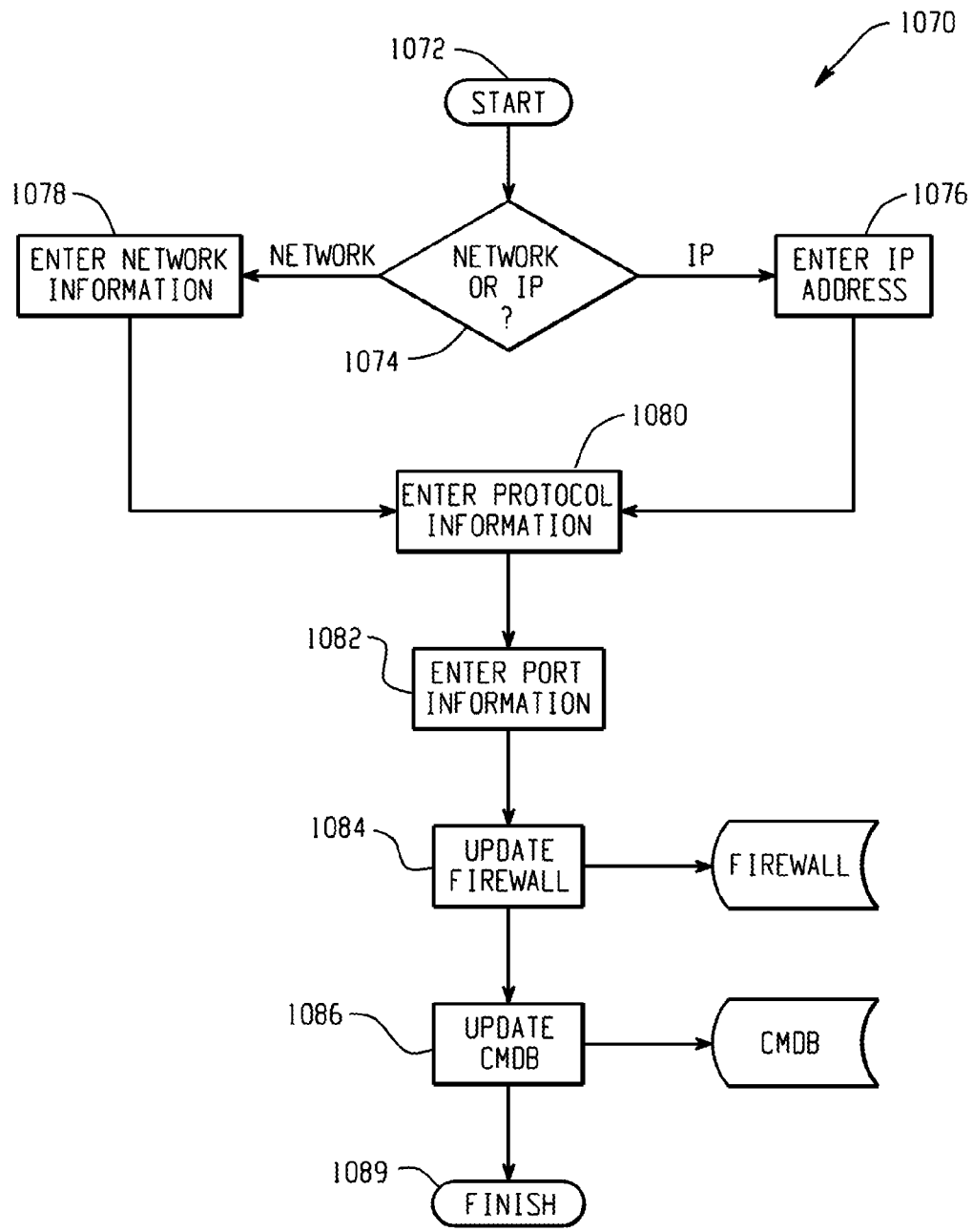
FIG. 49 is an exemplary flow diagram for setting a firewall deny rule.

FIG. 49 is an exemplary flow diagram 1070 for setting a firewall deny rule. The method begins at 1072. If network is selected at 1074, then the user enters the appropriate network information at 1078. If IP is selected at 1074, then the user enters the appropriate IP address information at 1076. The protocol and port information is then selected at 1080 and 1082, and the firewall is updated at 1084. The CMDB is then updated at 1086 and the method ends at 1088.

Figure 50:
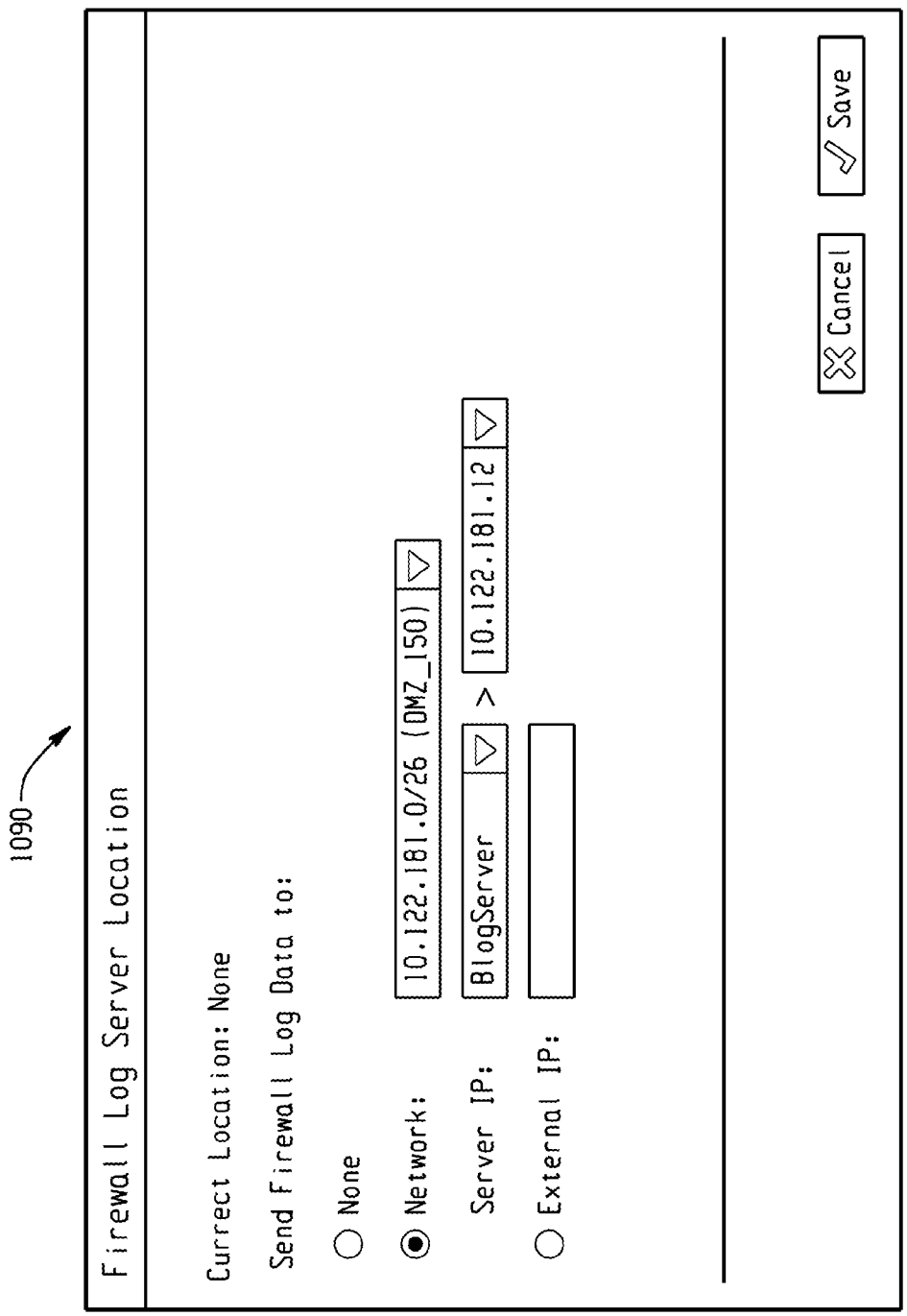
FIG. 50 depicts a graphical user interface screen for setting a firewall log server location.

FIG. 50 depicts a graphical user interface screen for setting a firewall log server location. Here the user can chose to send the firewall log data to a particular server on an internal network, or to an external IP address.

As described herein, a novel utility computing platform is provided that enables customers to perform configuration and provisioning of their own virtual assets, including processing, memory, networking and disk storage assets. Using this system, customers acquire a dedicated resource pool of virtual assets from which they can deploy servers on demand through a web-based customer provisioning console application and can thereafter perform a variety of configuration, management and analysis functions on their virtual resources without necessarily enlisting the assistance of system administrators. Using the software interfaces and functionality described herein, customers are able to precisely control the amount of acquired virtual processing, memory, disk and networking resources from the utility computing platform, and to precisely control the allocation of those resources among one or more virtual servers. Each customer environment is further logically partitioned into a row and group structure that provides an additional level of flexibility for customizing the organization of the customer's virtual resources.

Figure 51:
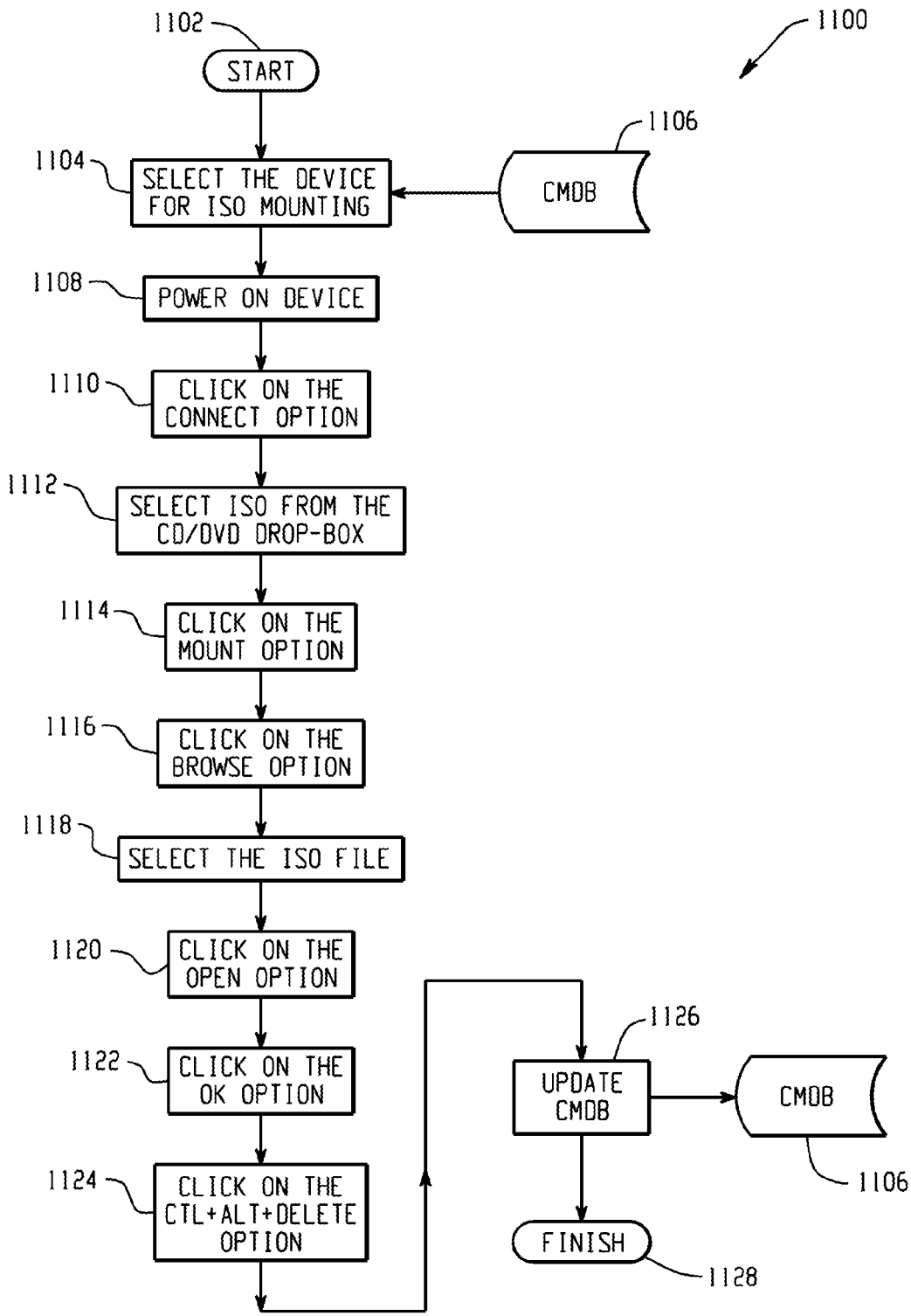
FIG. 51 is an example flow diagram for performing ISO image mounting.

FIG. 51 is an example flow diagram 1100 for performing ISO image mounting. As context, once a virtual machine is created, an operating system needs to be loaded on to the virtual machine. The disclosed ISO mounting feature allows a user to take an image of a CD (which is on the user's local machine and remote from the environment) and begin to load an operating system or a piece of software on to the remote virtual environment. It is noted that an ISO image is an archive file of an optical disc, whose format is established by the International Organization for Standardization (ISO).

In the example flow diagram 1100, the method begins at 1102. At step 1104, a device (e.g., a virtual server) is selected for ISO mounting. The available devices that can be made available to a user for selection are determined, in this example, according to server configuration data contained in a CMDB 1106. At step 1108, the device (which was selected in step 1104) is powered on. Step 1110 allows the user via a graphical user interface to click on a connect option, and at step 1112, the ISO image is selected from a drop-down box, such as through a drop-down box labeled "CD/DVD."

At step 1114, the user clicks the mount option, and at step 1116, the user clicks the browse option. At step 1118, the ISO file is selected and is opened at step 1120 by being clicked upon through the open option provided by the graphical user interface. If the desired ISO file has been selected, then the user clicks on the OK option at step 1122. Step 1124 allows the user to click on the Ctl+Alt+Delete option, and the CMDB 1106 is then updated at step 1126 with the new configuration. The method completes its processing at 1128. It should be understood that similar to the other process flows contained herein, the order of the steps can be altered and modified and still provide the desired result.

This feature has many uses, such as in a situation where users (e.g., customers of a cloud environment) have their own respective internal IT and application standards and they wish to mount virtual machines with varying configurations. This feature removes the requirement that the owner of the cloud environment must individually configure each customer's machine or at least the perception that a customer is locked into the owner's specific configuration. Instead, an individual customer is enabled to configure a blank VM, within the cloud, in real time to their own individual specification and requirement (e.g., their own operating system, applications, etc.). As shown by the foregoing, this feature can operate within a multi-tenant environment and secure one customer's configuration and data from being accessed in an unauthorized manner by a different customer.

Figure 52:
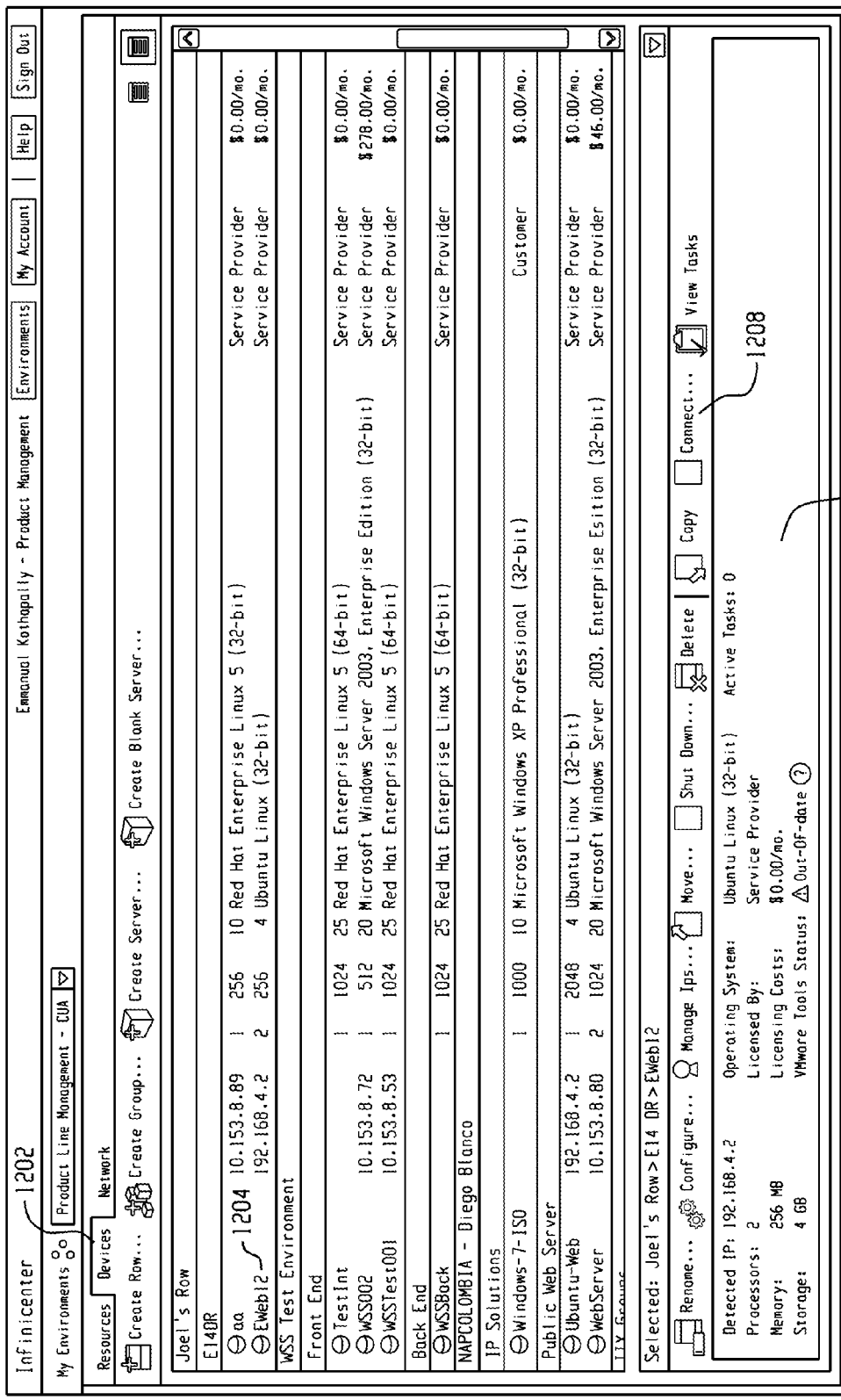
FIGS. 52-57 depict graphical user interface screens for ISO mounting.

FIGS. 52-57 depict graphical user interface screens 1200 for ISO mounting. In FIG. 52, a devices tab 1202 has been activated to show available devices. In this example, a user selects the device "EWeb12" 1204 for ISO mounting and the device's information from the CMDB is shown within window region 1206. After the EWeb12 device is powered on, the user clicks on the connect button 1208.

Figure 53:
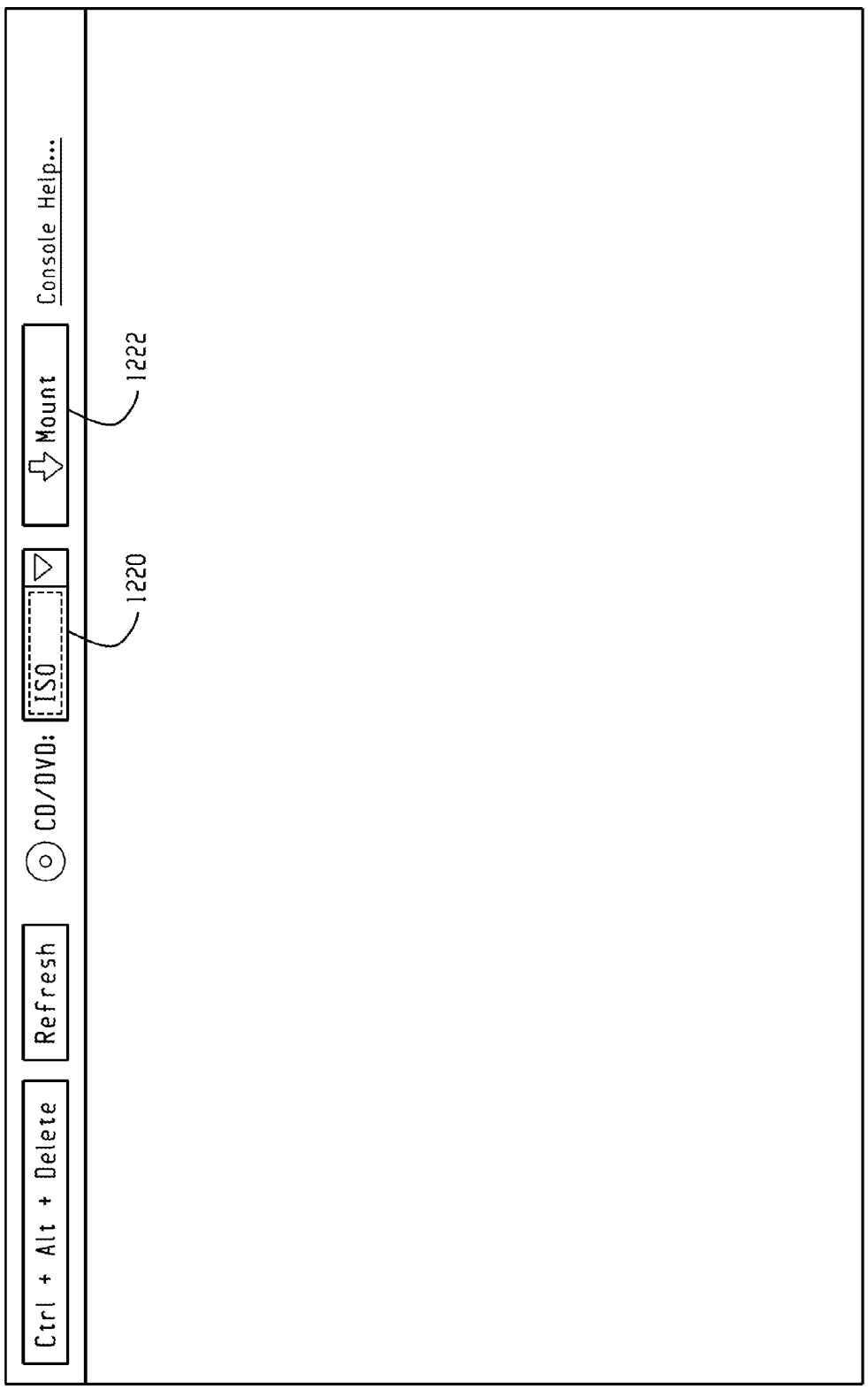
Figure 54:
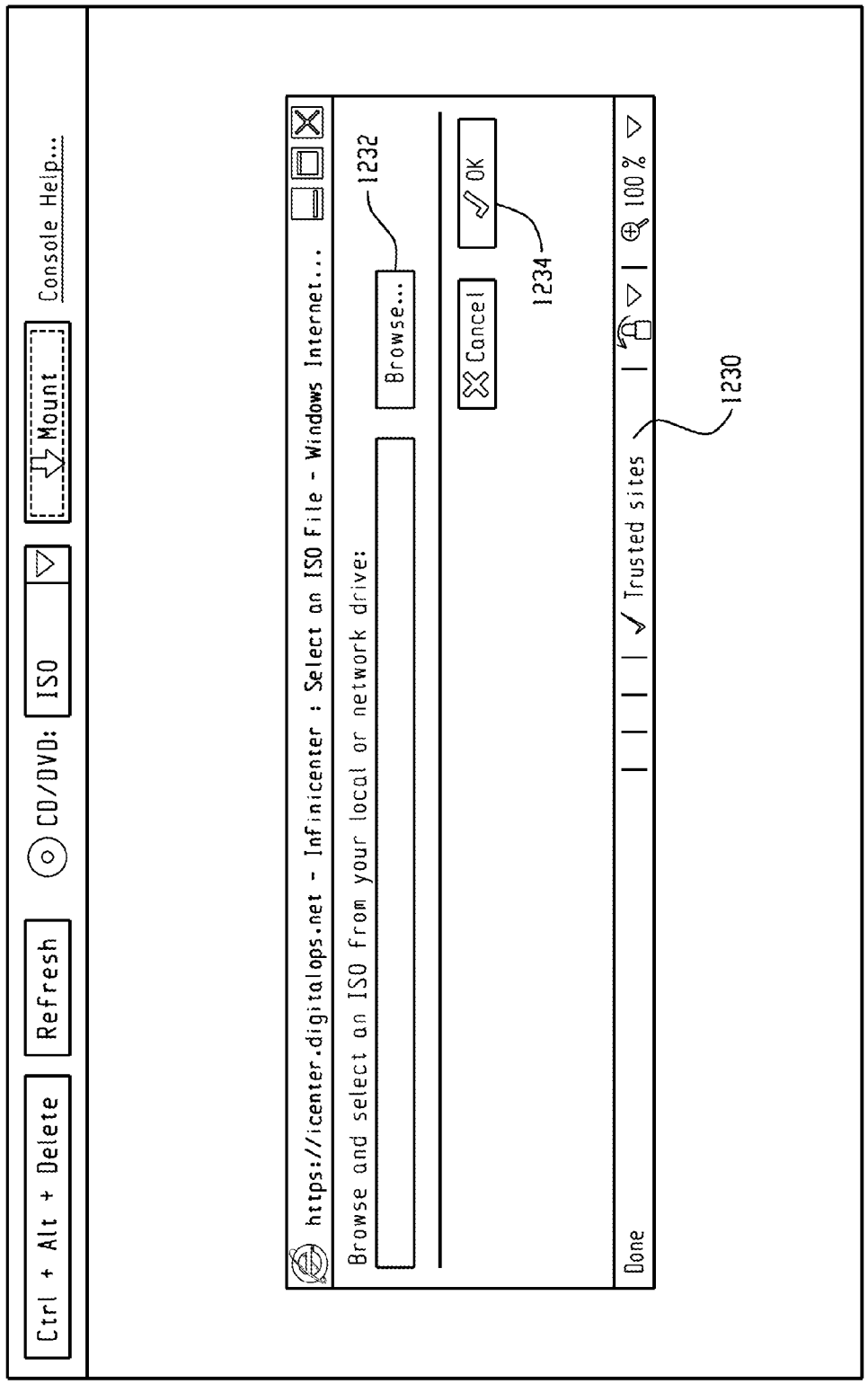

After the connect button 1208 is activated, the graphical user interface of FIG. 53 is shown to the user so that an ISO image can be selected from the "CD/DVD" drop-down box 1220. After the mount button 1222 is activated by the user, the graphical user interface of FIG. 54 is shown to the user. More specifically, window 1230 is shown to the user so that the user can select an ISO image from a particular location (e.g., a local or network drive).

Figure 55:
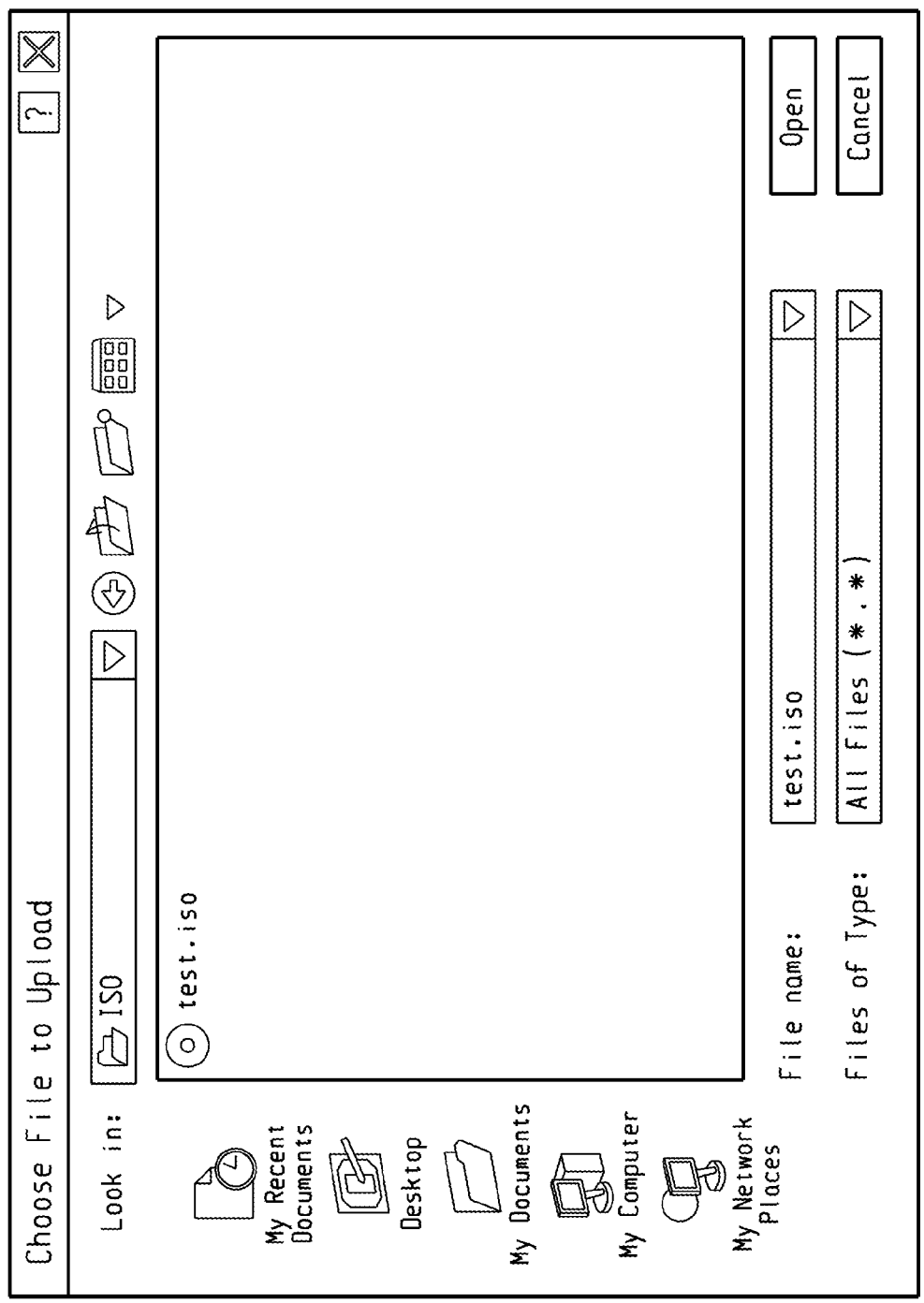
Figure 56:
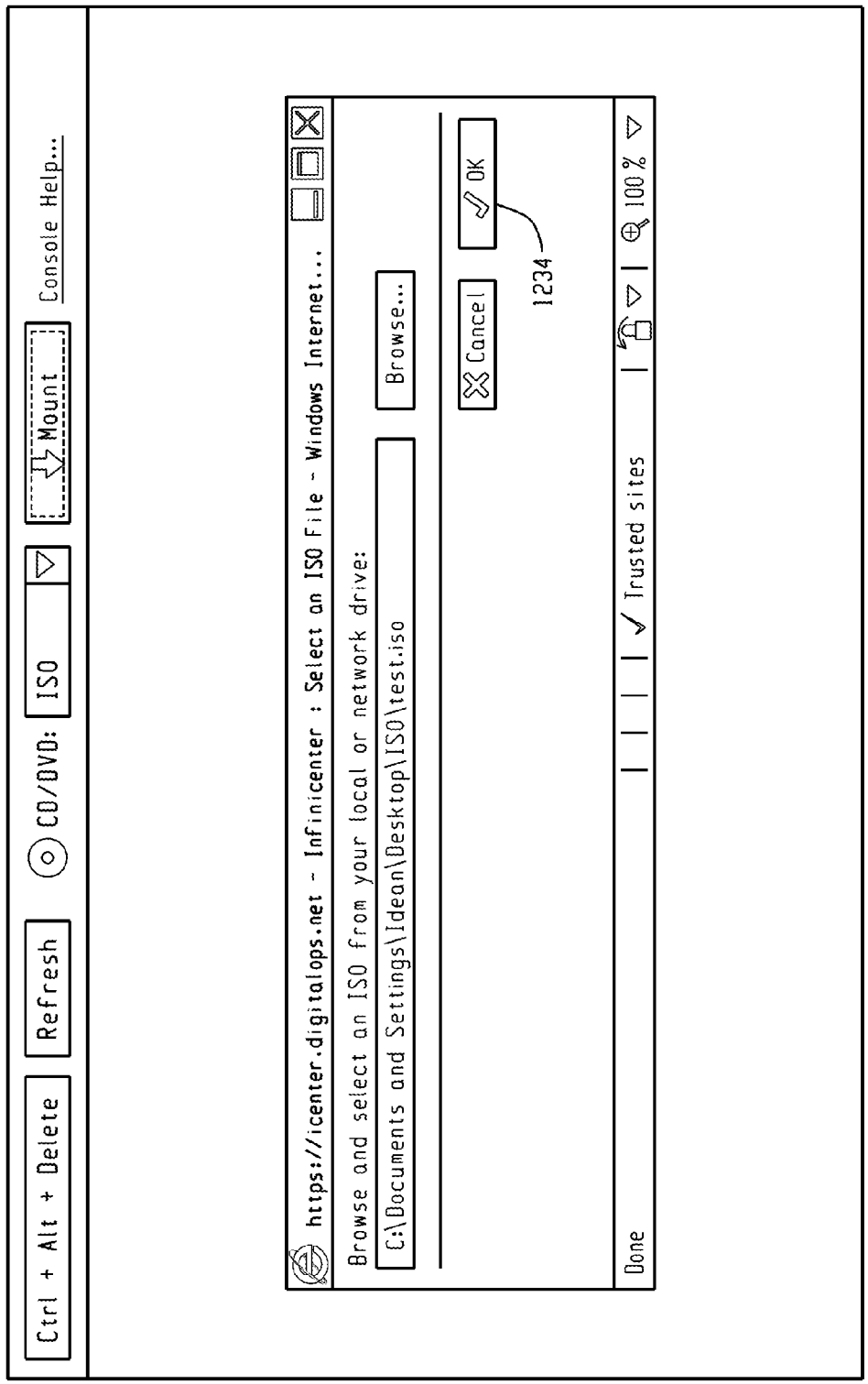

When the user clicks on the browse button 1232, the graphical user interface of FIG. 55 is shown to the user. Through the graphical user interface of FIG. 55, the user can select an ISO image to upload. In this example, the ISO image to be uploaded is "test.iso." After the ISO image is selected, the user is shown the graphical user interface of FIG. 56 which indicates the selected ISO image. The user completes the file selection process by clicking the OK button 1234.

Figure 57:
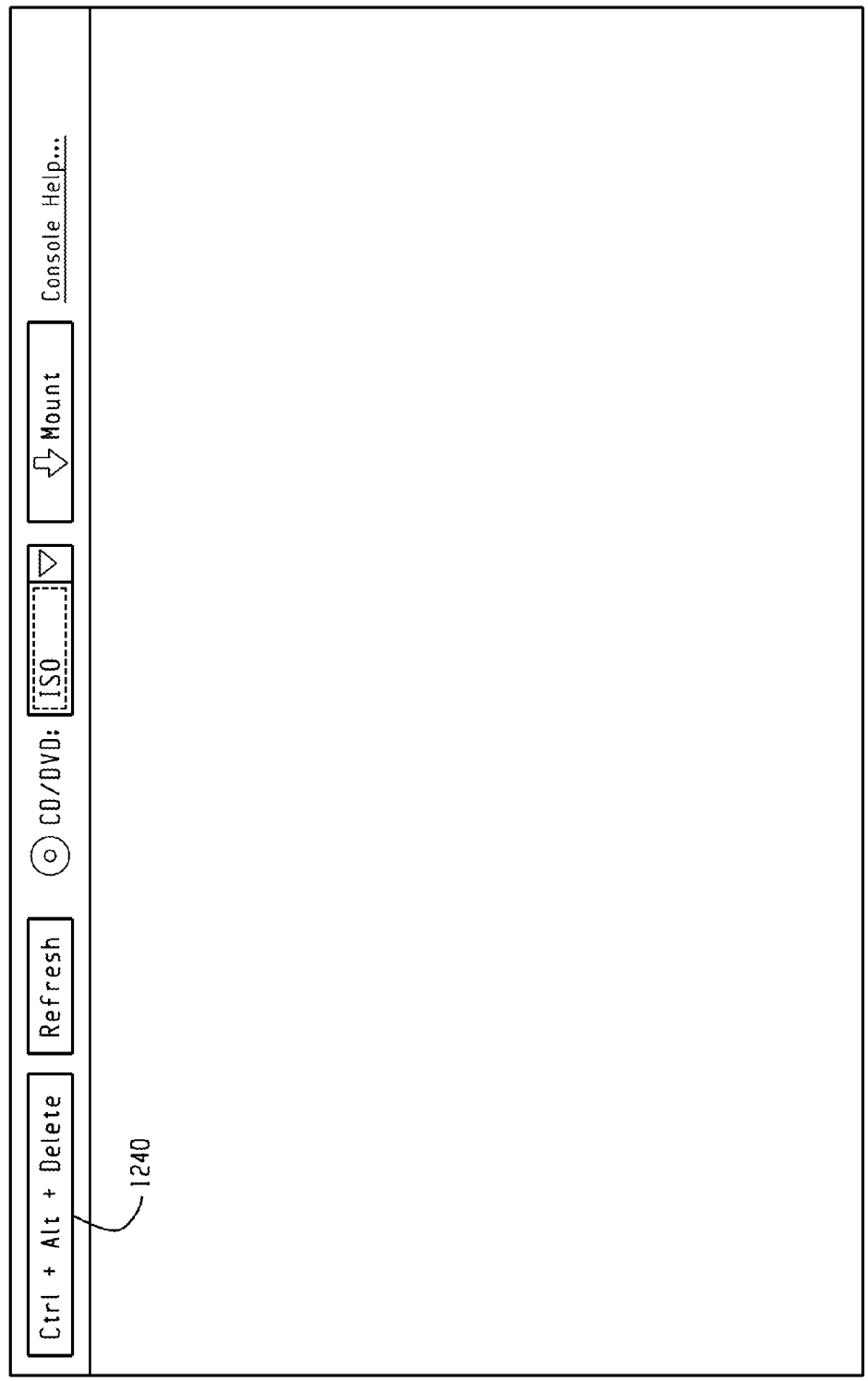

After clicking the OK button 1234, the user is shown the graphical user interface of FIG. 57 to complete the ISO mounting process. The user activates the Ctl+Alt+Delete option 1240 and then the CMDB is updated with the new configuration.

Figure 58:
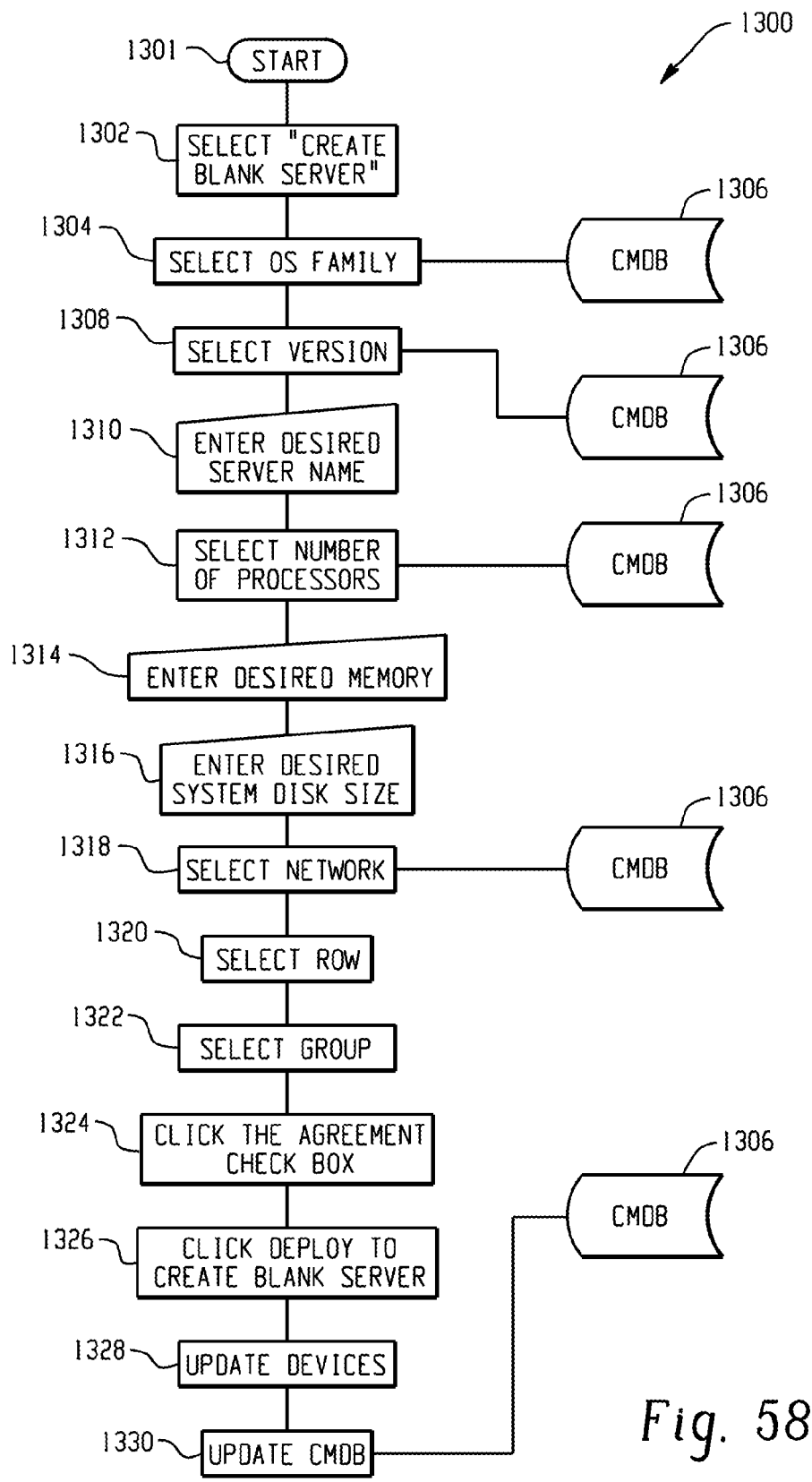
FIG. 58 is an example flow diagram for creating a blank server.

FIG. 58 is an example flow diagram 1300 for creating a blank server. The method begins at 1301. At step 1302, the user selects the option to create a blank server which allows the user to specify characteristics of a blank server to be created. At step 1304, the user selects an operating system family, such as Windows, Linux, etc. Furthermore, the user provides additional characteristics, such as the following:

an operating system version at step 1308
a server name at step 1310
number of processors at step 1312
desired memory at step 1314
desired system disk size at step 1316
a network at step 1320

In this example, data from the CMDB constrains which data options a user can provide for the information obtained via steps 1304, 1308, 1312, and 1318.

Steps 1320 and 1322 allow a user to select respectively a row and a group within which the created blank server is to be placed. For example, a user can indicate that the created blank server should be placed in the "Web servers" row under the "test" group.

After the user clicks the agreement checkbox at step 1324, the user then activates the deploy option so that the created blank server can deployed. Steps 1328 and 1330 then respectively update the devices and the CMDB 1306.

Figure 59:
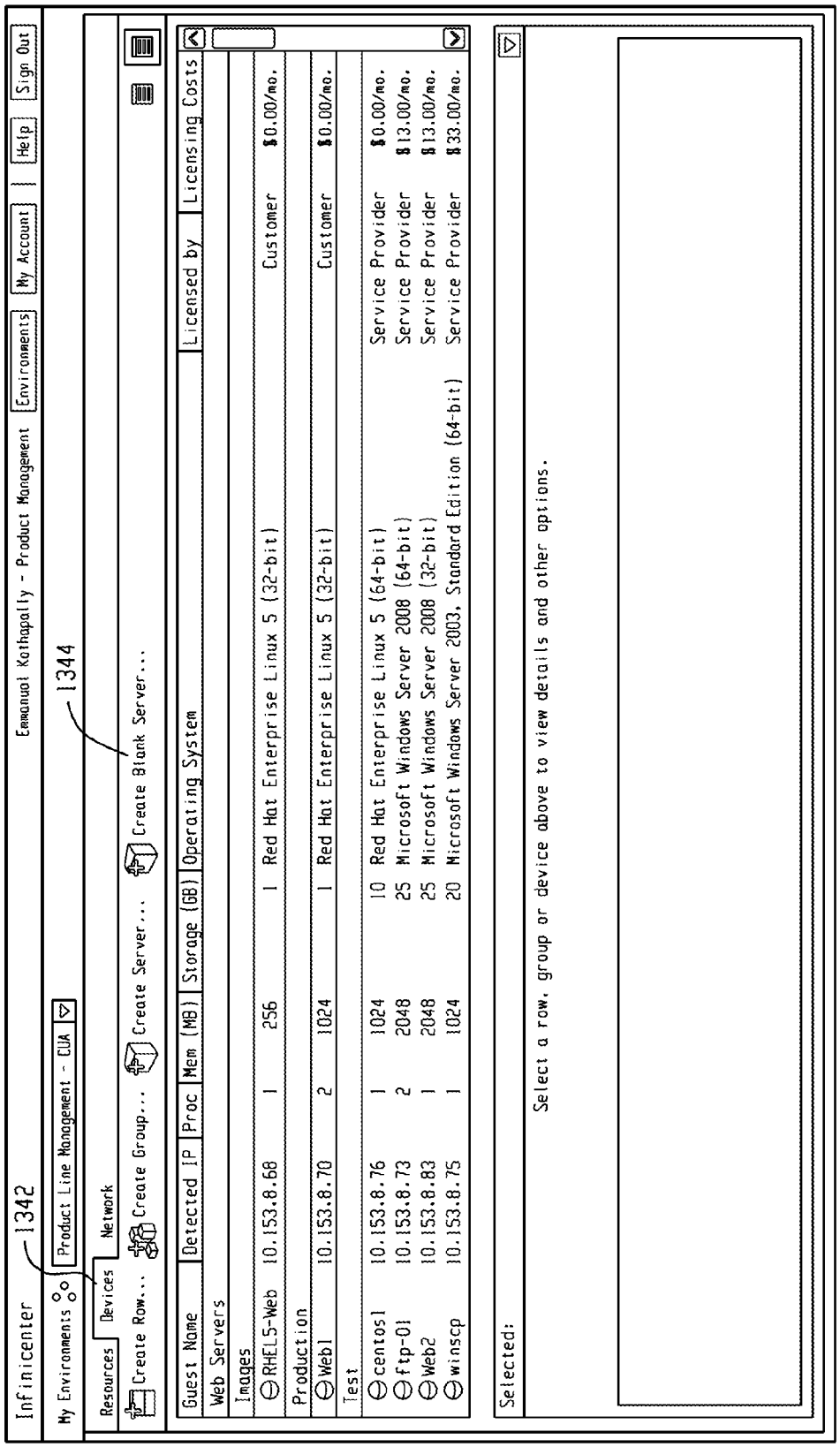

FIGS. 59 and 60 depict graphical user interface screens 1340 for creating a blank server. In FIG. 59, the devices tab 1342 has been activated. By clicking on the create button 1344, a blank server creation process is initiated by the user. The graphical user interface of FIG. 60 depicts multiple fields within which a user can designate characteristics about the blank server to be created. In this example, the user has provided the following information:

Windows as the operating system family at 1350
Microsoft Windows NT 4 as the version at 1352
Test123 as the server name at 1354
one processor at 1356
64 MB of memory at 1358
1 GB of system disk size at 1360
10.153.8.48/28 (INT_153) as the network at 1362
Web Servers as the row at 1364
Test as the group at 1366

After the user has assented to the agreement by clicking on the agreement checkbox 1368, the user can click the deploy button 1370 in order to have the blank server created and deployed with the specified characteristics.

Figure 61A:
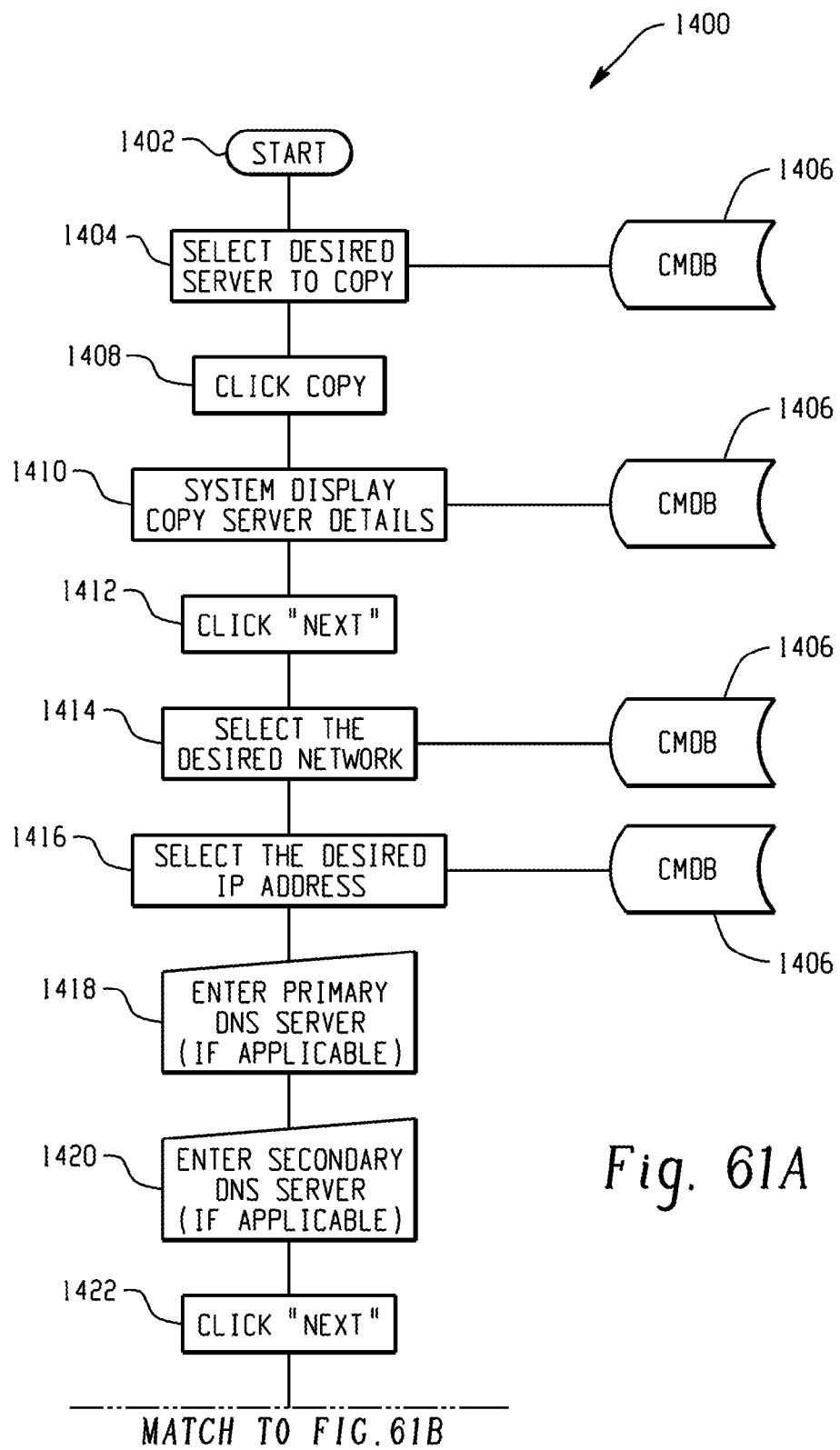
FIGS. 61A and 61B are an example flow diagram for copying a server.
Figure 61B:
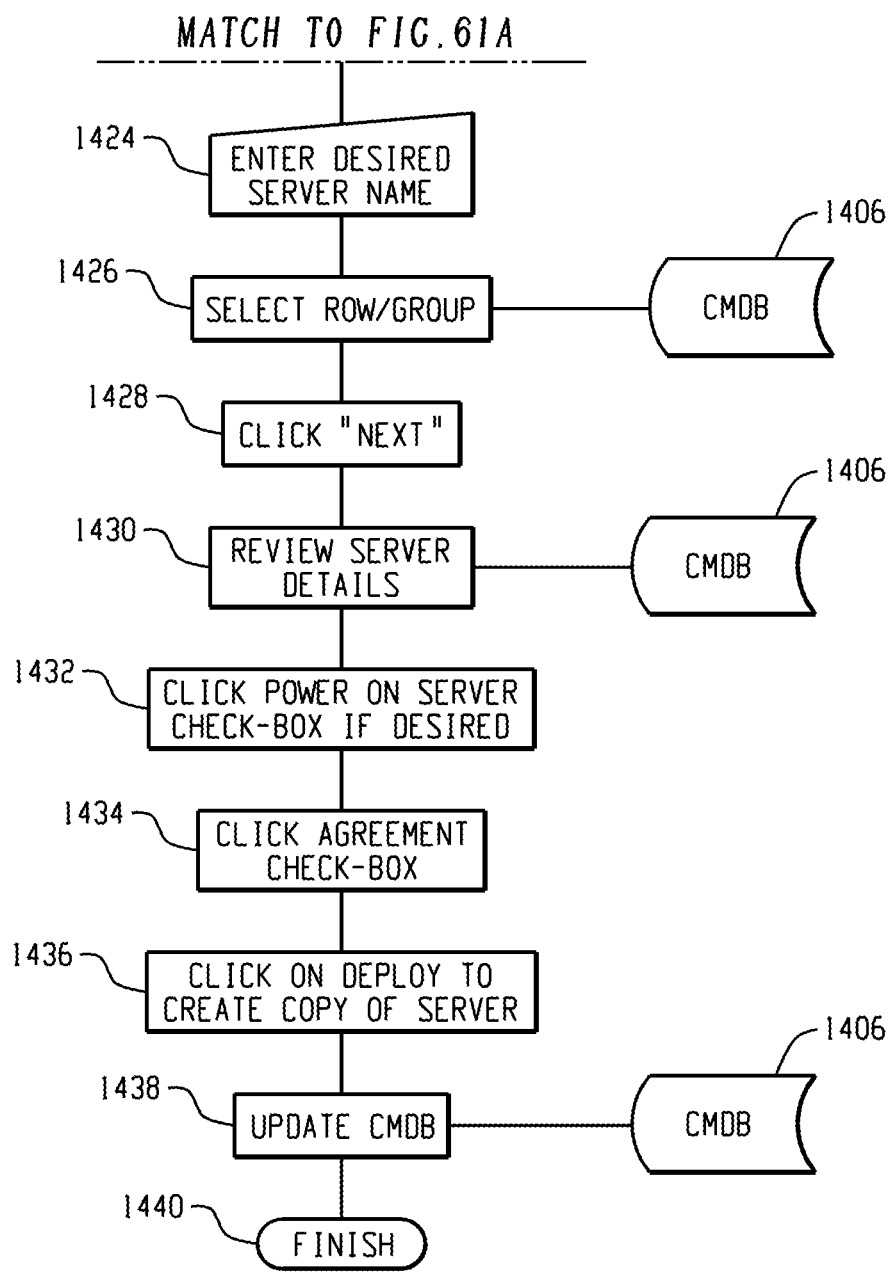

FIGS. 61A and 61B are an example flow diagram 1400 for copying a server. The method begins at 1402. The user at step 1404 selects a desired server to copy and clicks the copy button at step 1408. At step 1410, the system displays characteristics about the desired server to copy. The characteristics information of the server is obtained from the CMDB. Processing continues after the user selects at step 1412 the "next" button. The user provides additional information for use in copying the server, such as the following:

the desired network at step 1414
the desired IP address at step 1416
the primary DNS server (if applicable) at step 1418
the secondary DNS server (if applicable) at step 1420

Processing continues at step 1424 after the user selects the "next" button at step 1422. At step 1424, the user enters the desired server name and selects the row and group within which the copied server is to appear. In this example, data from the CMDB 1406 constrains what options a user can provide for the information obtained via steps 1404, 1414, 1416, and 1426. Processing continues at step 1430 after the user selects the "next" button at step 1428. In step 1430, the user reviews the details of the servers that have been stored in the CMDB 1406.

At step 1432, the user clicks the power-on server checkbox if desired and further clicks the agreement checkbox at step 1434. The user then activates at step 1436 the deploy button to create, based upon the information specified by the user, the copy of the server. The CMDB 1406 is updated at step 1438 with the copied server information before processing completes at 1440.

This feature has many uses, such as in a situation where a customer has established a master version of its virtual machine and would like to replicate it relatively effortlessly into multiple copies. This feature can operate within a multi-tenant environment and secure one customer's configuration and data from being accessed in an unauthorized manner by a different customer.

Figure 62:
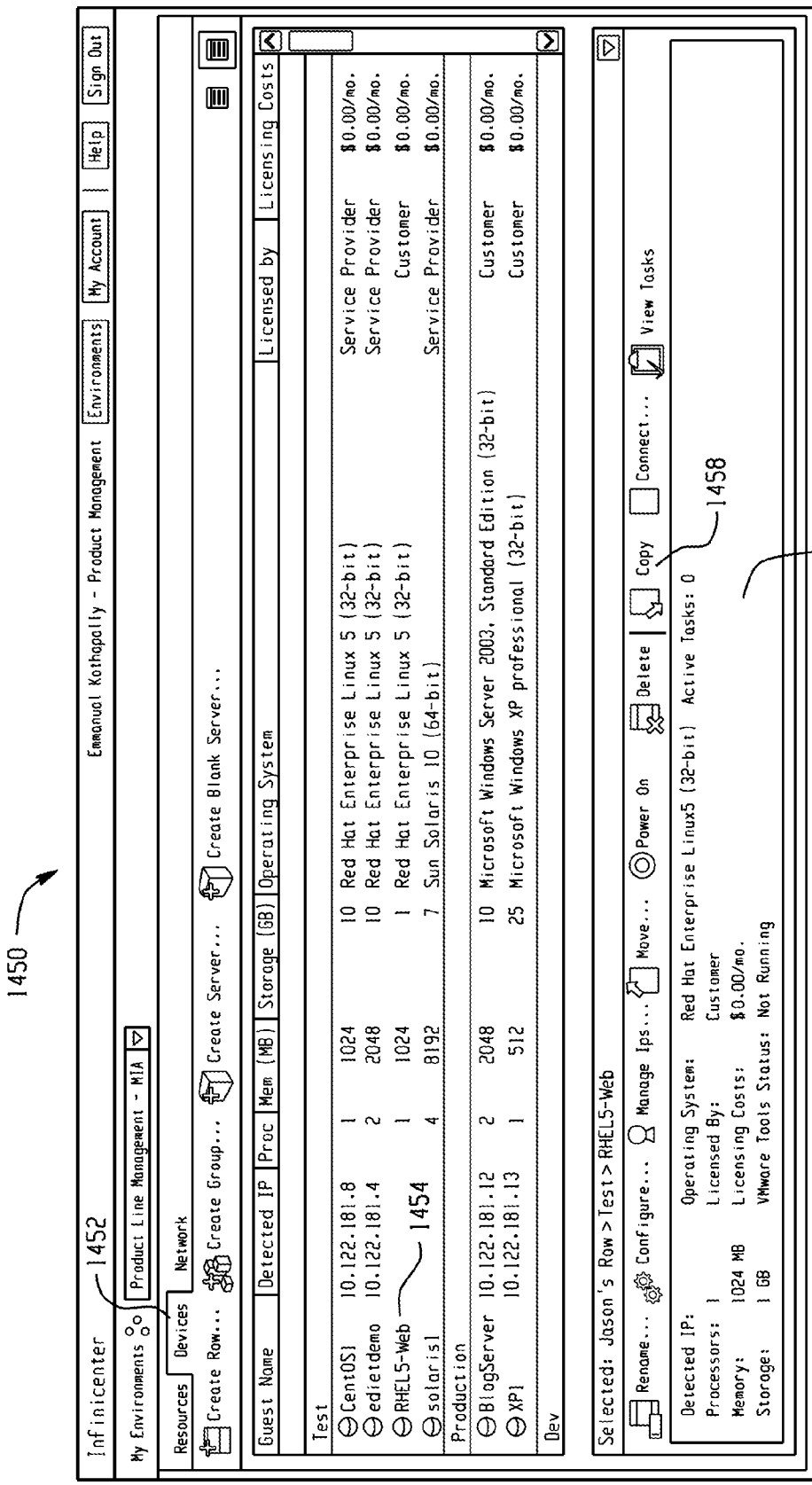
Figure 63:
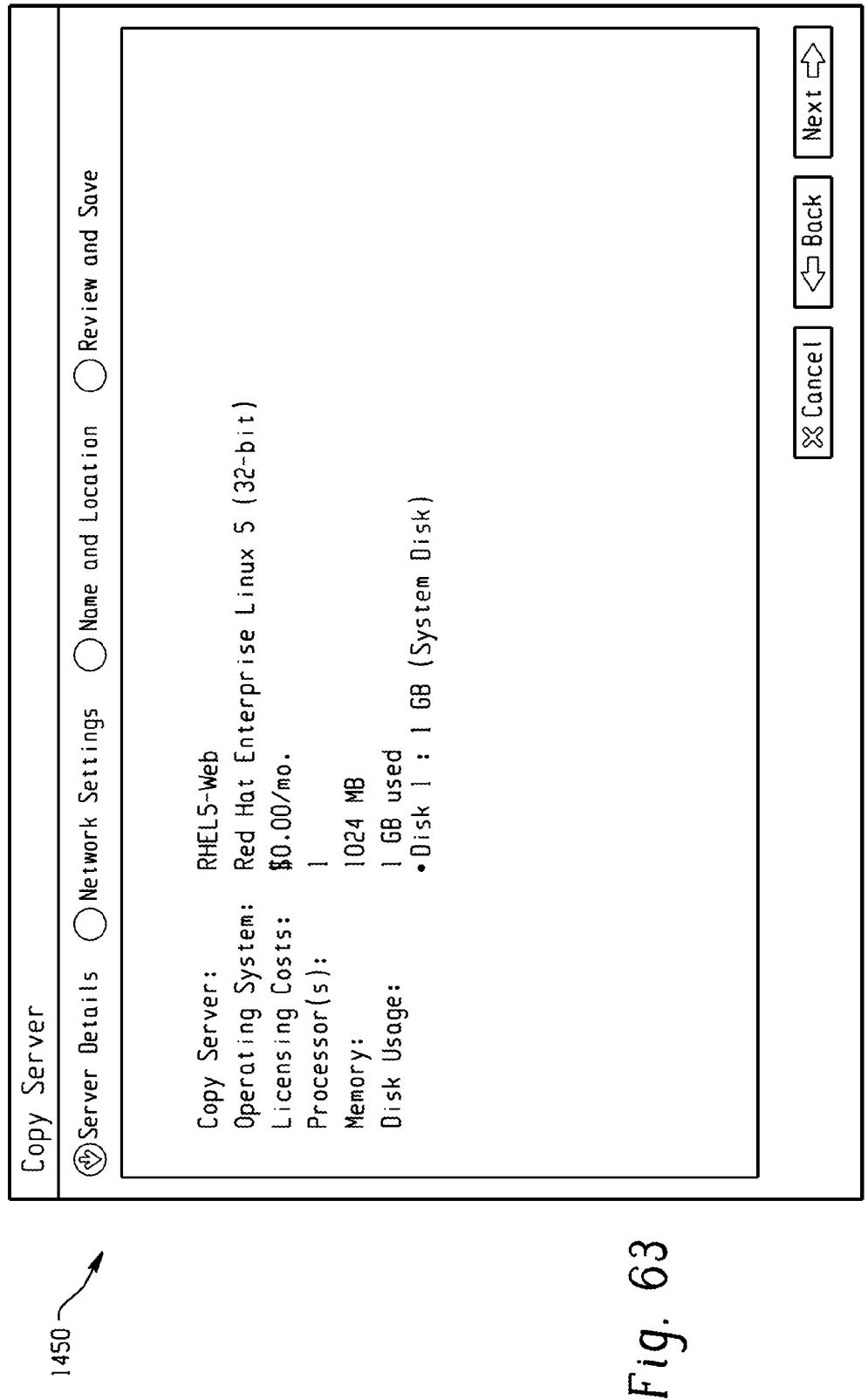

FIGS. 62-66 depict graphical user interface screens 1450 for copying a server. In FIG. 62, the devices tab 1452 has been activated to show available devices. In this example, a user selects the device "RHEL5-Web" 1454 for copying, and the device's information from the CMDB is shown within window region 1456. To begin the server copying process, the user clicks on the copy button 1458. The graphical user interface of FIG. 63 shows the details of the server which is to be copied, such as the name of the server, operating system, licensing costs, number of processors, memory amount, and disk usage amount.

The graphical user interface of FIG. 64 is shown to the user so that the user can provide server information for the server copying process to occur. In this example, the user has specified that the following network is to be used: 10.122.136.0/27 (INT_151). The user has also specified that the IP address to be used is: 10.122.136.3.

The graphical user interface of FIG. 64 has been configured in a wizard-like manner. For example as shown at 1470, the user is apprised of the progress with respect to the process of copying the server. A check mark at 1470 indicates steps in the wizard that have already been completed, whereas a down arrow indicator signifies the current step of the process that needs to be completed. The remaining indicators at 1470 signify the steps which will occur after the user clicks the next button 1472.

Figure 65:
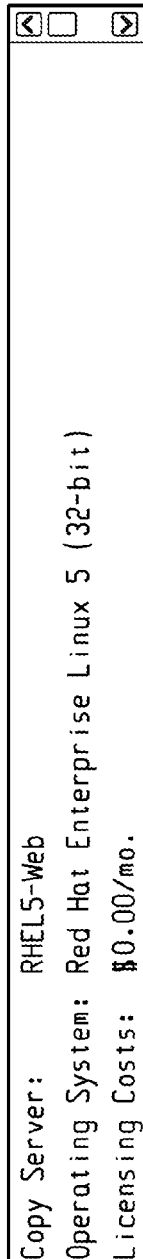

As the next step in the process, the graphical user interface of FIG. 65 is shown to the user so that the user can provide name and location information. In this example, the user has specified that the server name is "Cojo123" and that the copied server is to appear in the following row/group: "Jason's Row"/"Test."

The last step in the process is for the user to review and save the values provided by the user. In FIG. 66, after the user indicates at 1480 whether the server is to be powered on when created and after the user indicates at 1482 assent to the agreement, the user can click the deploy button 1484 to have the server copied.

Figure 67:
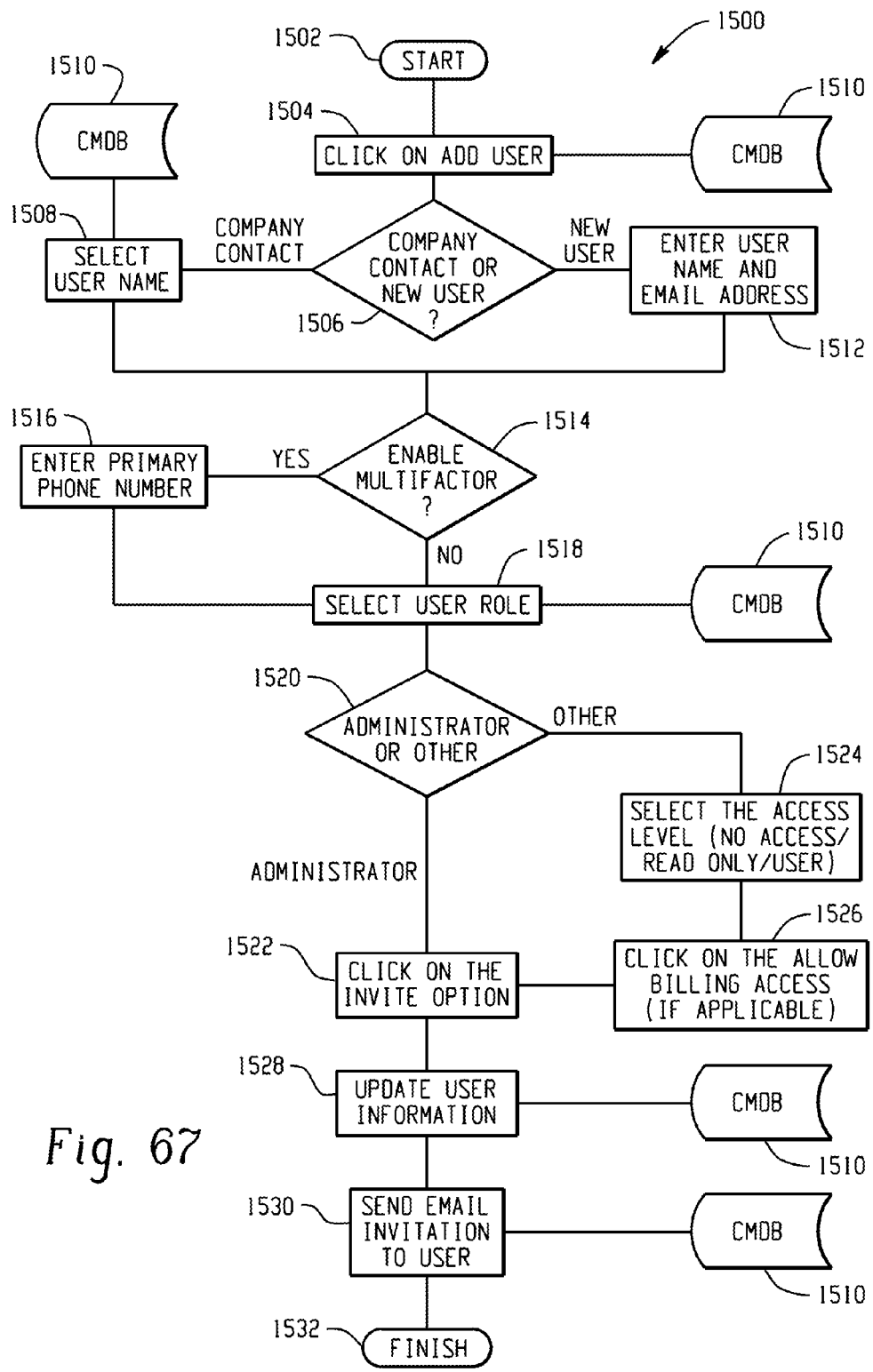
FIG. 67 is an example flow diagram for performing role-based security.

FIG. 67 is an example flow diagram 1500 for performing role-based security. The process flow illustrates how an administrator can invite others to utilize the resources within a cloud environment, while specifying what level of access they should have (e.g., permission to only read the information on the device, permission to modify parameters on the device, etc.). The method begins at 1502. In this example, a new user is to be added with security characteristics being specified with respect to the new user.

To indicate to the system that a new user is to be added, the "add user" button is selected at 1504. The CMDB 1510 provides a list of customer contacts from which a new user might be selected.

If it is determined at decision step 1506 that the user to be added is in the CMDB 1510, then the new user's name is provided by the CMDB 1510 as the new user to be added. After step 1506, processing continues at decision step 1514. However if it is determined at step 1506 that the user to be added is not in the CMDB, then the new user's name is manually specified. Processing continues at decision step 1514.

At decision step 1514, a determination is made as to whether to enable multi-factor authentication for the new user. If multi-factor authentication is not to be enabled, then processing continues at step 1518. However if multi-factor authentication is to be enabled, then a primary phone number is entered at step 1516 before processing continues at step 1518.

At step 1518, the user role is selected. A list of which user roles are acceptable for use in step 1518 is provided by the CMDB 1510. For example, if the user role is "other," then the access level (e.g., no access, read-only access, or user access) is selected for the new user at step 1524, and an option is presented to determine whether to allow billing access for the new user (if applicable). If the user role is "administrator," then processing continues at step 1522.

After this data is provided, the invite option is clicked upon at step 1522, which triggers an update at step 1528 of the user information within the CMDB 1510. Also, an invitation e-mail is sent to the user at step 1530 before processing ends at 1532. As shown by the foregoing, this feature allows a customer to specify, within a cloud environment, its own level of security for its different users as well as specify if a particular user has access to billing information.

Figure 68:
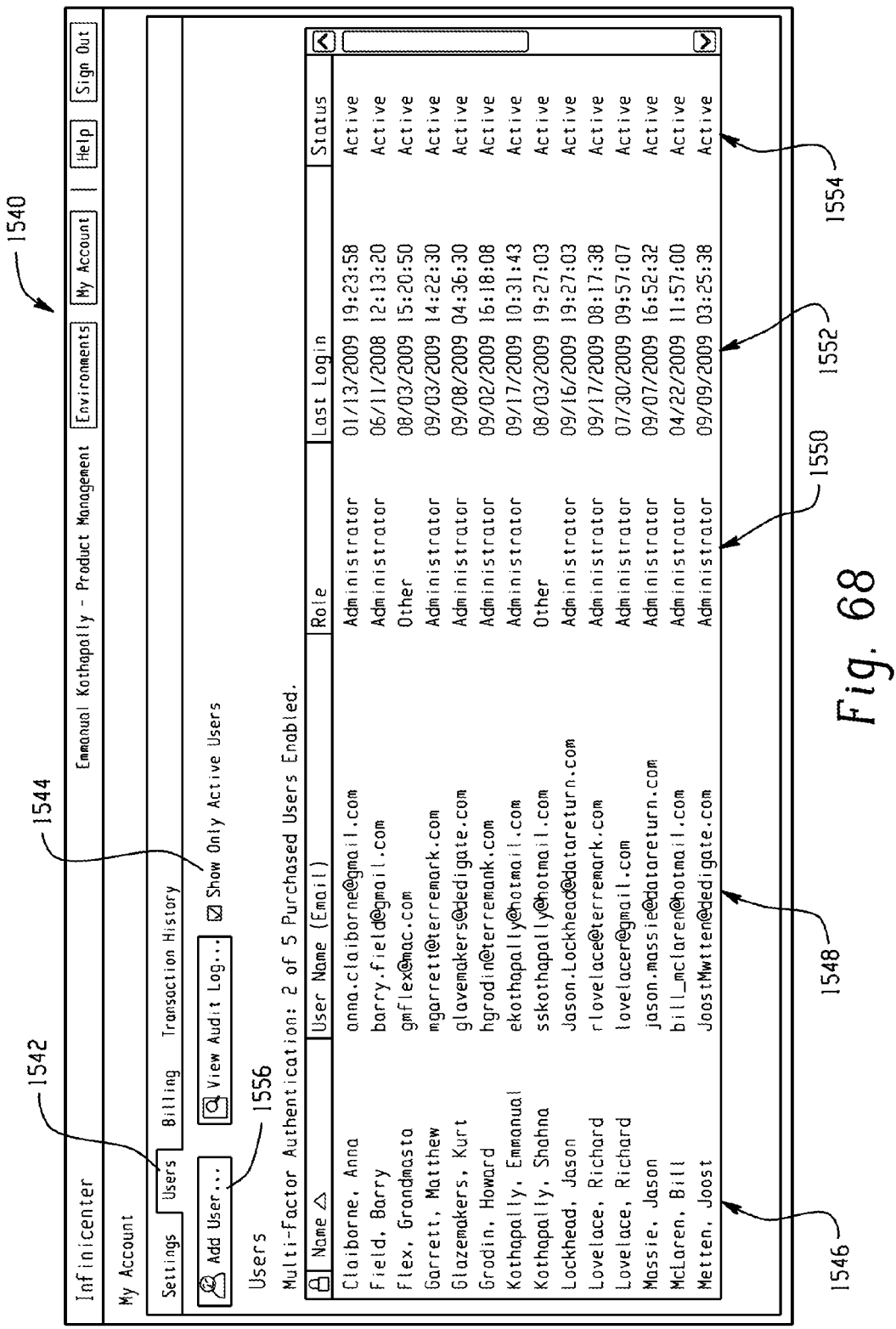
Figure 69:
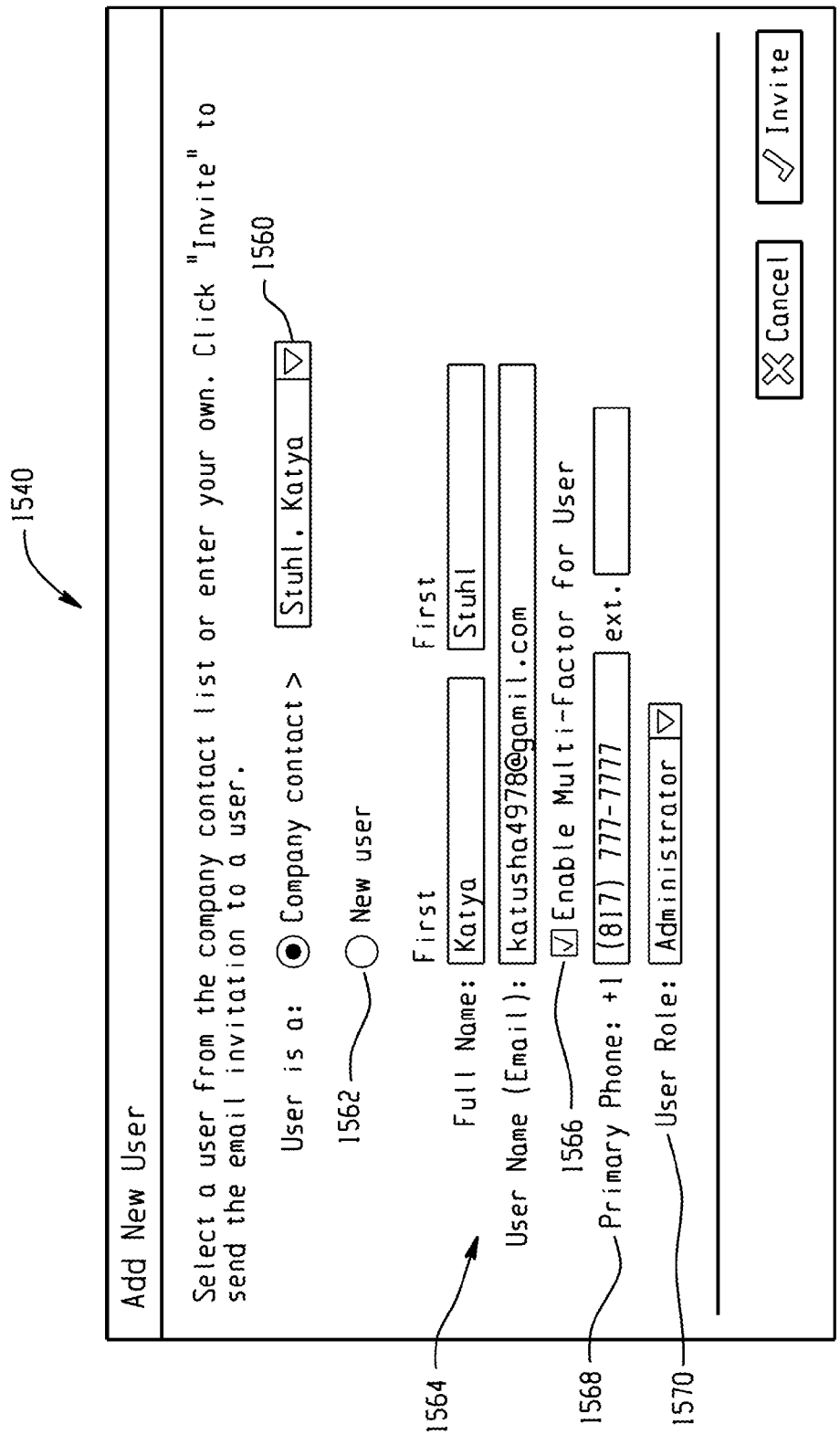

FIGS. 68-70 depict graphical user interface screens 1540 for performing role-based security. In FIG. 68, users tab 1542 and checkbox 1544 have been activated, which results in only the active users being displayed in the graphical user interface. The names of the active users are shown in column 1546 as well as the following information: email address in column 1548, the user's role in column 1550, a last login date and time in column 1552, and an active status indicator in column 1554. To start the process of adding a user, the add user button 1556 is activated.

FIG. 69 displays a graphical user interface for adding a new user. In this example, a user can be selected from the company contact list at 1560 or a new user can be selected at 1562. If the user is selected from the company contact list, then the user's information stored in the CMDB can be used to populate the fields at 1564, otherwise this information may be manually entered. A checkbox 1566 indicates whether multi-factor authentication is to be enabled for this particular user. Additionally, this user interface allows a primary phone to be indicated at 1568 as well as the role of the user at 1570 (e.g., an administrator role, other role, etc.).

FIG. 70 displays a graphical user interface wherein the "other" user role option has been selected at 1570. This results in the display of region 1572 within the graphical user interface. Within region 1572, the access level (e.g., no access, read-only access, etc.) as well as billing access can be respectively specified at 1574 and 1576.

Figure 71:
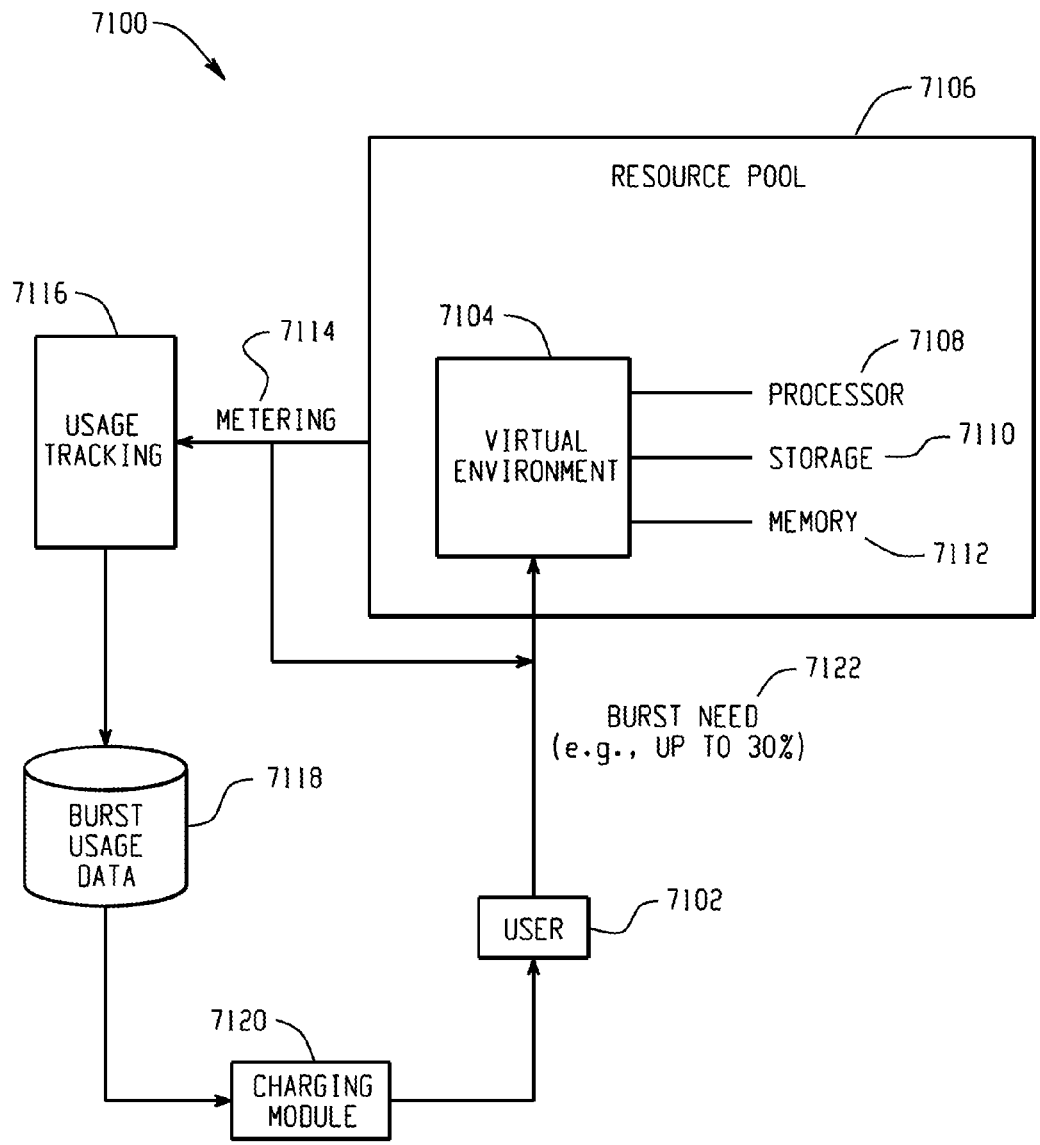
FIG. 71 is a block diagram depicting a computer-implemented system for providing resource capacity on demand to user applications.

FIG. 71 is a block diagram depicting a computer-implemented system for providing resource capacity on demand to user applications. A user may enter into a contract with a virtual platform provider for the ability to utilize up to a certain amount of resources on the provider's one or more servers for a flat rate. For example, a user may pay a flat rate per month for the ability to use 4 GHz of processing power, 20 GB of random access memory, and 180 GB of hard drive memory space. The user may utilize these resources in many different ways, which may result in the user needing a varying amount of resources at one or more points in time. For example, the user may utilize the paid-for resources to run an online shopping application that sells goods or services over the Internet. For most of the year, the paid-for resources are sufficient for successfully running the online shopping application. However, for certain days or periods of the year (e.g., the day after Thanksgiving, the last week before Christmas, the month of December), demand for access to the online shopping application and associated back-end databases may be much greater. As another example, a user may utilize the paid-for resources to run a company website. When that company suddenly comes into the news (e.g., the company is bought out by a large multi-national competitor), the company website may have a very large spike in accesses.

These increased demands may require more resources than the user has paid for via the flat rate contract. While the user has agreed to pay the flat rate for the agreed to resources, rather than experience a slowdown or crash in application functionality, the user may desire to pay for additional resources from the virtual platform provider as needed during times of increased resource demand to better ensure application performance. Such capability may be provided to a user by the enabling of burst mode operations.

With reference to FIG. 71, a user 7102 may contract with a virtual platform provider to provision a virtual environment 7104 within a resource pool 7106 (e.g., resources contained on one or more servers of the virtual platform provider) on which to run user applications, such as a user's online shopping application. The user may contract to pay a flat rate for a certain amount of processing power 7108, hard drive memory storage 7110, as well as random access memory 7112. The user may additionally contract for the ability to use burst mode for use when additional resources beyond those provided for in the flat rate contract are needed by an application in the virtual environment. Via the burst mode, those additional resources are provided from the resource pool 7106 to the user's virtual environment 7104. The usage of additional resources in burst mode is metered, as depicted at 7114. The metering values may be tracked as usage tracking 7116 and stored as burst usage data 7118. The burst usage data 7118 may be utilized by a charging module 7120 that may bill the user 7102 based on the burst resource usage above that provided by the flat rate. For example, samples of the virtual environment's 7104 resource usage may be taken during metering and averaged to identify an average burst resource usage. A user may then be charged based the average burst resource usage. For example, a user's flat rate contract may provide for random access memory usage at $10 per GB per month, and burst rate usage may be charged at $15 per GB per month used by the virtual environment 7104.

In some examples, a virtual environment 7104 may be permitted access to any resources available in the resource pool 7106 that are not spoken for by other virtual environments. In other configurations, the metering 7114 may also be used in determining whether a user is permitted to be allocated more resources during burst operations. As indicated at 7122, a virtual environment may be limited in the amount of burst resources that it may consume. Such a limit prevents a virtual environment 7104 from using too much of the resource pool 7106, such that other user's environments do not have sufficient resources. Thus, in one example, each virtual environment may be guaranteed at least a certain threshold (e.g., 30%) of burst resource availability. In other words, the virtual environment 7104 may be guaranteed access to 130% of its flat rate contract allocations of processing power 7108, hard drive memory storage 7110, and random access memory 7112 in burst mode. Additional resources above the guaranteed threshold may then only be available if the resource pool has enough resources to meet all other virtual environments' guaranteed resource amounts.

Figure 72:
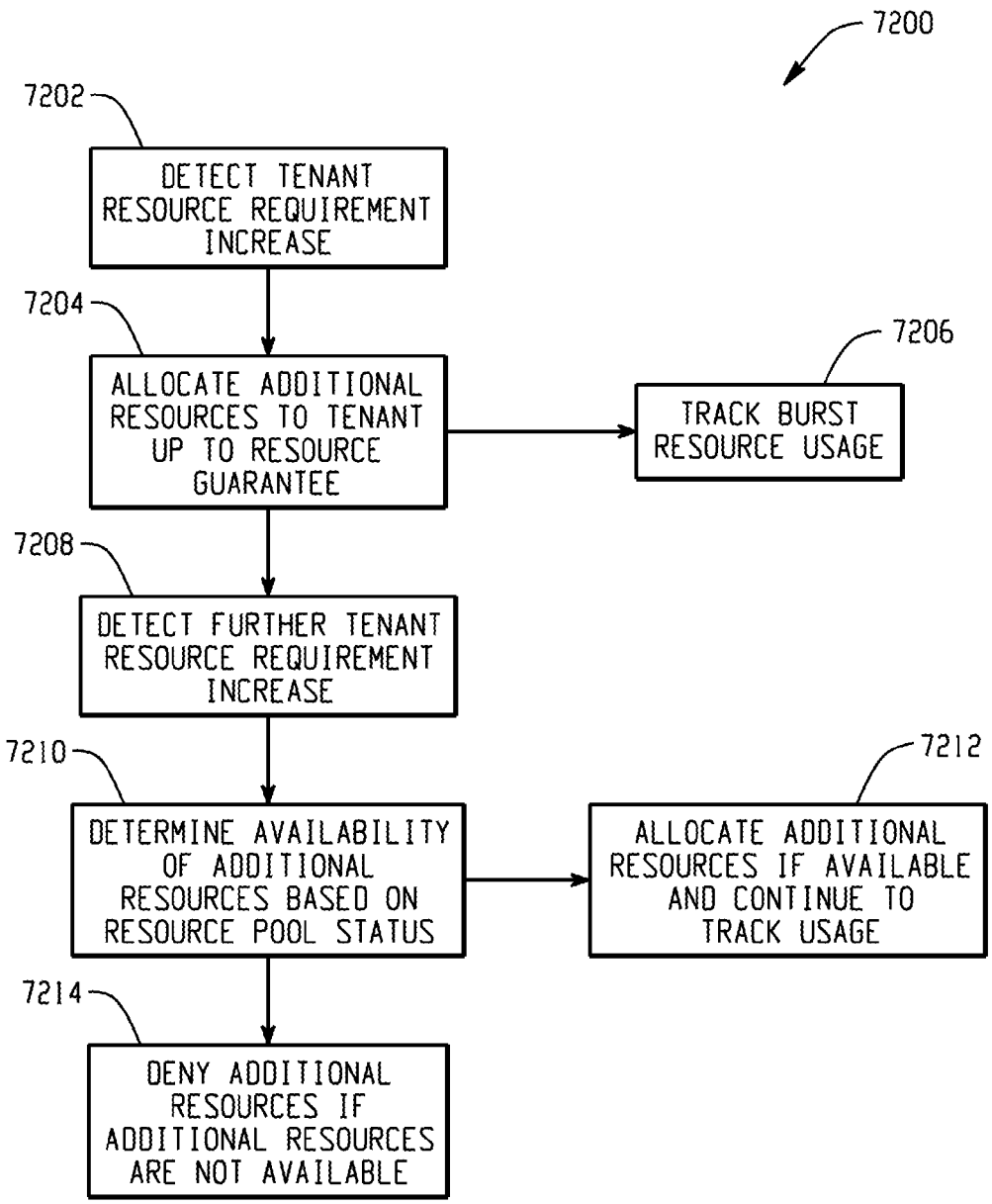
FIG. 72 is a flow diagram depicting the allocation of burst mode resources to a virtual environment.

FIG. 72 is a flow diagram depicting the allocation of burst mode resources to a virtual environment. At 7202, the one or more servers housing the resource pool detects that a tenant virtual environment has a resource requirement increase to keep up with current usage demands. At 7204, the servers allocate additional resources to the tenant virtual environment, up to the amount of the virtual environment's guaranteed threshold value. For example, a virtual environment having a 100 GB hard drive memory base allocation may be guaranteed and allocated up to 130 GB of hard drive storage during a burst mode. The resource pool system tracks the burst resource usage at 7206 so that the user may be billed for the burst usage accordingly. At 7208, the system may detect a further tenant resource requirement increase. For example, the user's virtual environment may require 150 GB of hard drive storage memory. In such a case, the system determines the availability of additional resources based on the current status of the resource pool 7210.

For example, the system may look at the size of the resource pool, the number of virtual environments using the resource pool, and the guaranteed resource thresholds for each of those virtual environments. If the resource pool contains sufficient resources so that other virtual environments may be allocated their guaranteed burst resources even if the requesting virtual environment is provided with resources beyond its guaranteed resource threshold, then the request may be granted. Otherwise, the request may be denied. In another example, a statistical method may be utilized to predict the maximum number of virtual environments that can be expected to utilize their burst resource budgets at a time (e.g., based on past performance or other data), and requests for resources beyond a virtual environment's guaranteed resource threshold may be granted if the resource pool has enough resources to fulfill the maximum expected resource needs following granting of the request.

As shown in FIG. 72, upon granting of a request for resources beyond a guaranteed resource threshold, the system allocates the additional resources at 7212 and tracks usage of the additional resource. If sufficient resources are not present in the resource pool, then the additional resource request may be denied at 7214.

Figure 73:
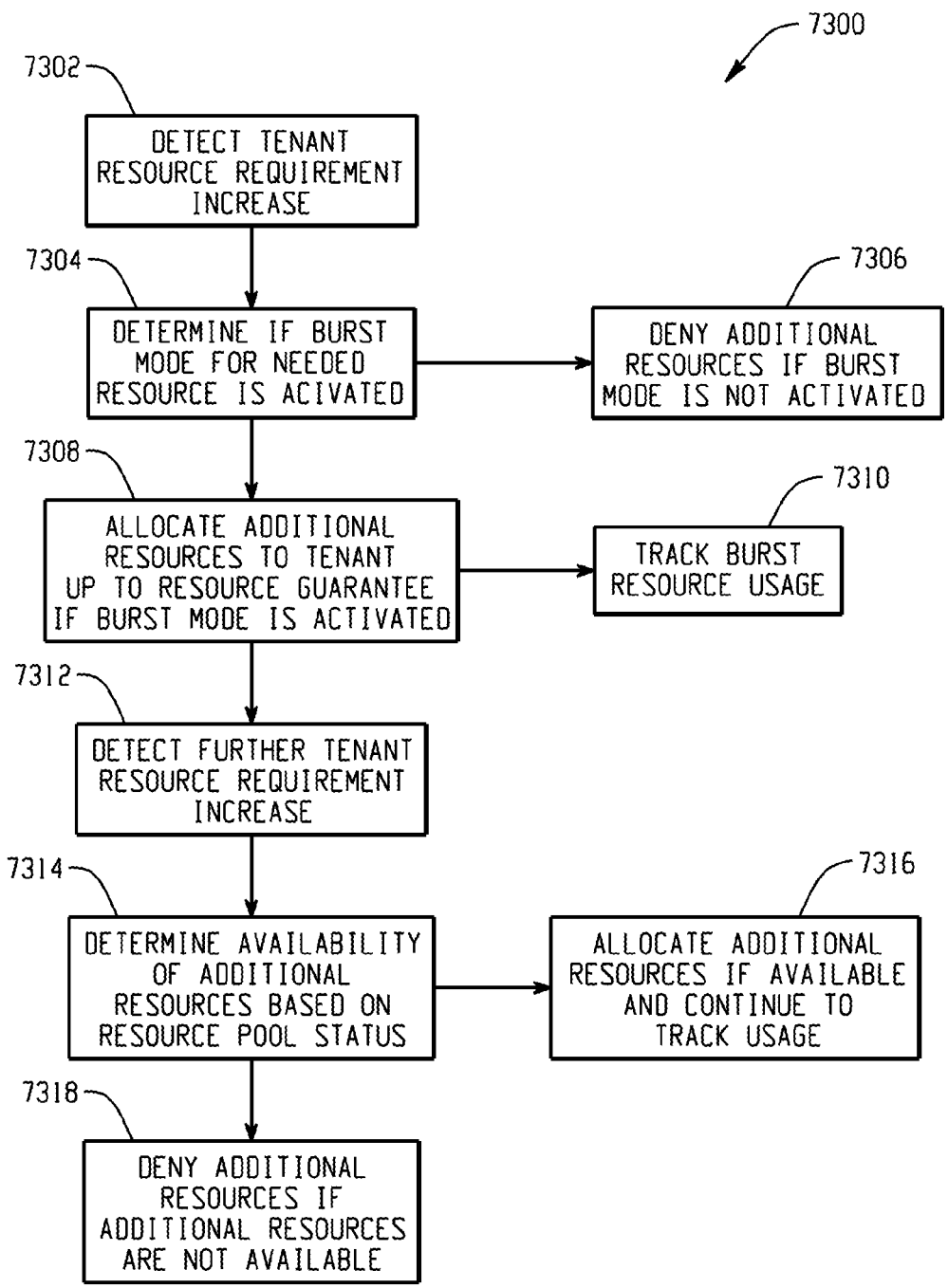
FIG. 73 is a flow diagram depicting the allocation of burst mode resources to a virtual environment including a check to see if burst mode is enabled.

FIG. 73 is a flow diagram depicting the allocation of burst mode resources to a virtual environment including a check to see if burst mode is enabled. At 7302, the system detects a tenant resource requirement increase. At 7304, the system determines whether burst mode for the needed resource is activated. Burst mode may be turned on or off for all resources or resources individually (e.g., processing power, hard drive memory space, random access memory), and burst mode may require administrator approval to be made available as a user option. If burst mode is not activated for a resource for which the resource requirement increase is detected, then additional resources are denied at 7306. If burst mode is activated for the resource associated with the request, then additional resources are allocated at 7308 up to the guaranteed resource threshold amount, and burst resource usage is tracked at 7310. Further tenant resource requirement increases may be detected at 7312. The system may determine the availability of additional resources based on the status of the resource pool at 7314. If sufficient resources are available, then additional resources may be allocated and tracked at 7316. If sufficient resources are not available in the resource pool, then the additional resources may be denied at 7318.

Figure 74:
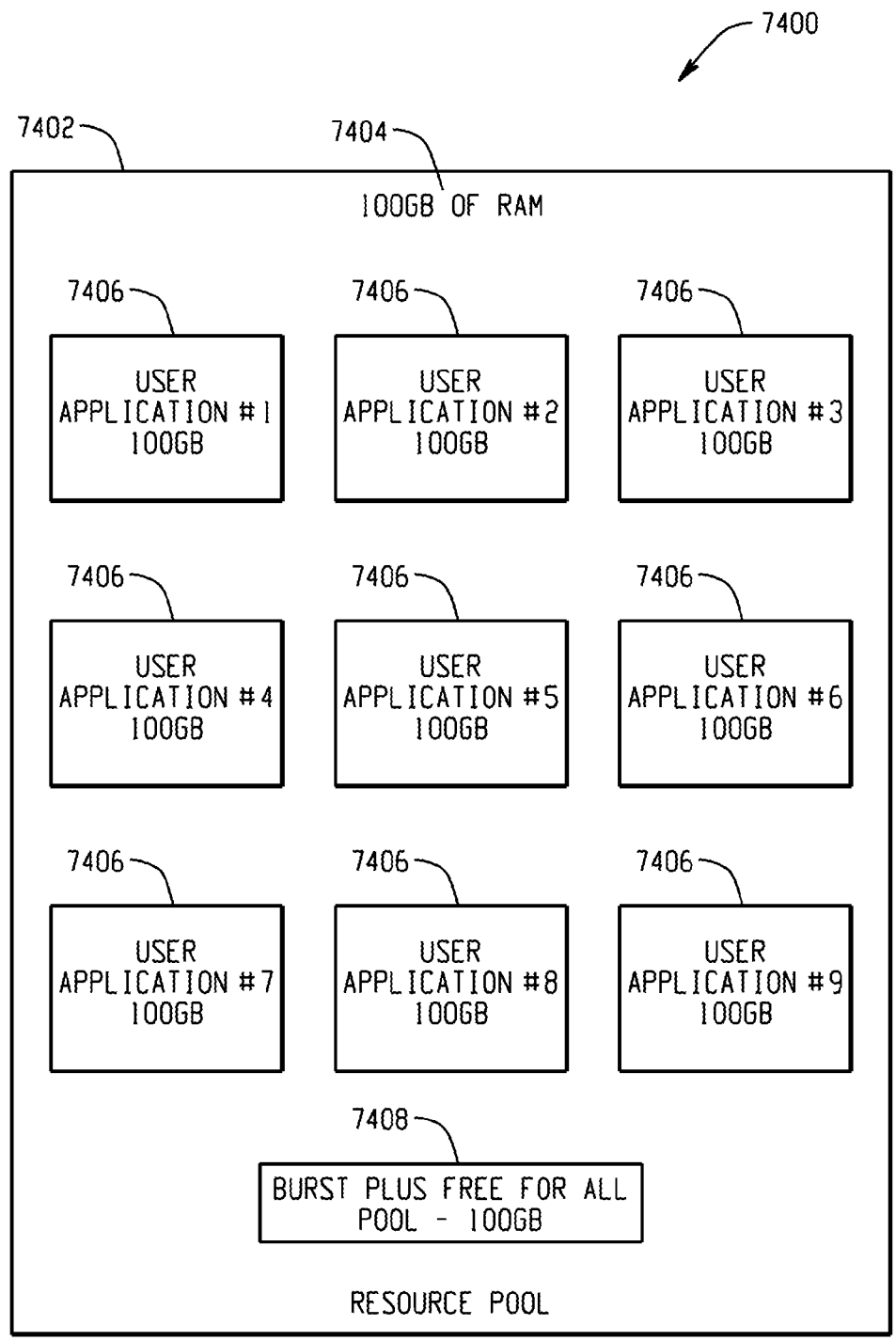
FIG. 74 is a block diagram depicting an example random access memory allocation of a resource pool.

FIG. 74 is a block diagram depicting an example random access memory allocation of a resource pool 7402. The resource pool contains 1000 GB of random access memory, as indicated at 7404. Each of the nine user virtual environments 7406 contain a user application and have a base allocation of 100 GB of random access memory, as may be detailed by contract. Such allocations use up 900 GB of the 1000 GB of random access memory contained in the resource pool, leaving 100 GB of random access memory available for burst modes and additional free-for-all access, as indicated at 7408. If the guaranteed resource threshold is set at 10%, then each of the nine virtual environments are guaranteed access to 110 GB of random access memory. If one of the virtual environments needs more than 110 GB of random access memory, then a determination is made as to whether such a request should be granted. The system may determine the amount of resources that will remain in a worst case scenario where all virtual environments that have burst mode activated need their guaranteed resource threshold amounts of 110 GB of random access memory. Assuming all virtual environments have burst mode activated, then 90 GB of the burst plus free-for-all pool 7408 is already reserved. This leaves 10 GB of random access memory available for access beyond the 110 GB guaranteed resource threshold on a first come first serve basis.

Figure 75:
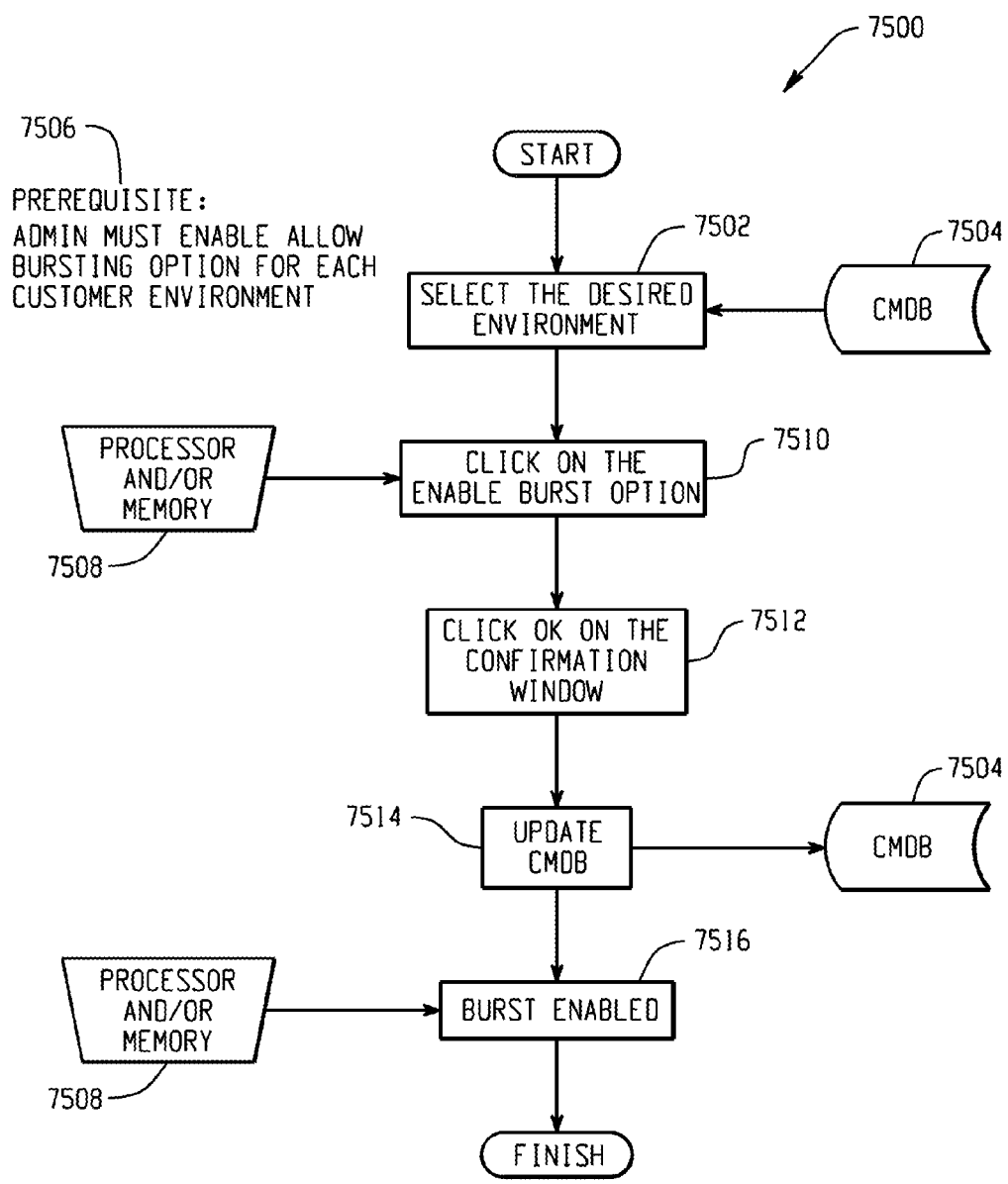
FIG. 75 is a flow diagram depicting the enabling of capacity on demand capabilities.

FIG. 75 is a flow diagram depicting the enabling of capacity on demand (burst mode) capabilities. Current settings for a virtual environment are received at 7502 from the configuration management database (CMDB) 7504 and provided to a user via an interface. In one example, three levels of access to change virtual environment settings may be provided to a user. An administrator level permits access to change all configuration settings and permits the setting of permission levels and allowable parameter settings for other users. For example, as indicated at 7506, in one configuration, an administrator must explicitly allow a bursting option for each customer's virtual environment. Other configurations may allow bursting by default. A user level of access permits access to change some or all settings for a virtual environment, and a read-only level access permits viewing but does not allow the changing of settings for a virtual environment. The user selects the desired environment for which to view settings at 7506 and is provided a view of the current processor and/or memory settings 7508. Should a user have sufficient permissions, the user may choose to enable bursting capabilities, such as for random access memory usage, by clicking the enable burst option at 7510. The user confirms this decision at 7512, and the configuration management database 7504 is updated at 7514. Upon confirmation, burst mode is enabled at 7516, which may be confirmed by a display of the current processor and/or memory settings 7508.

Figure 76:
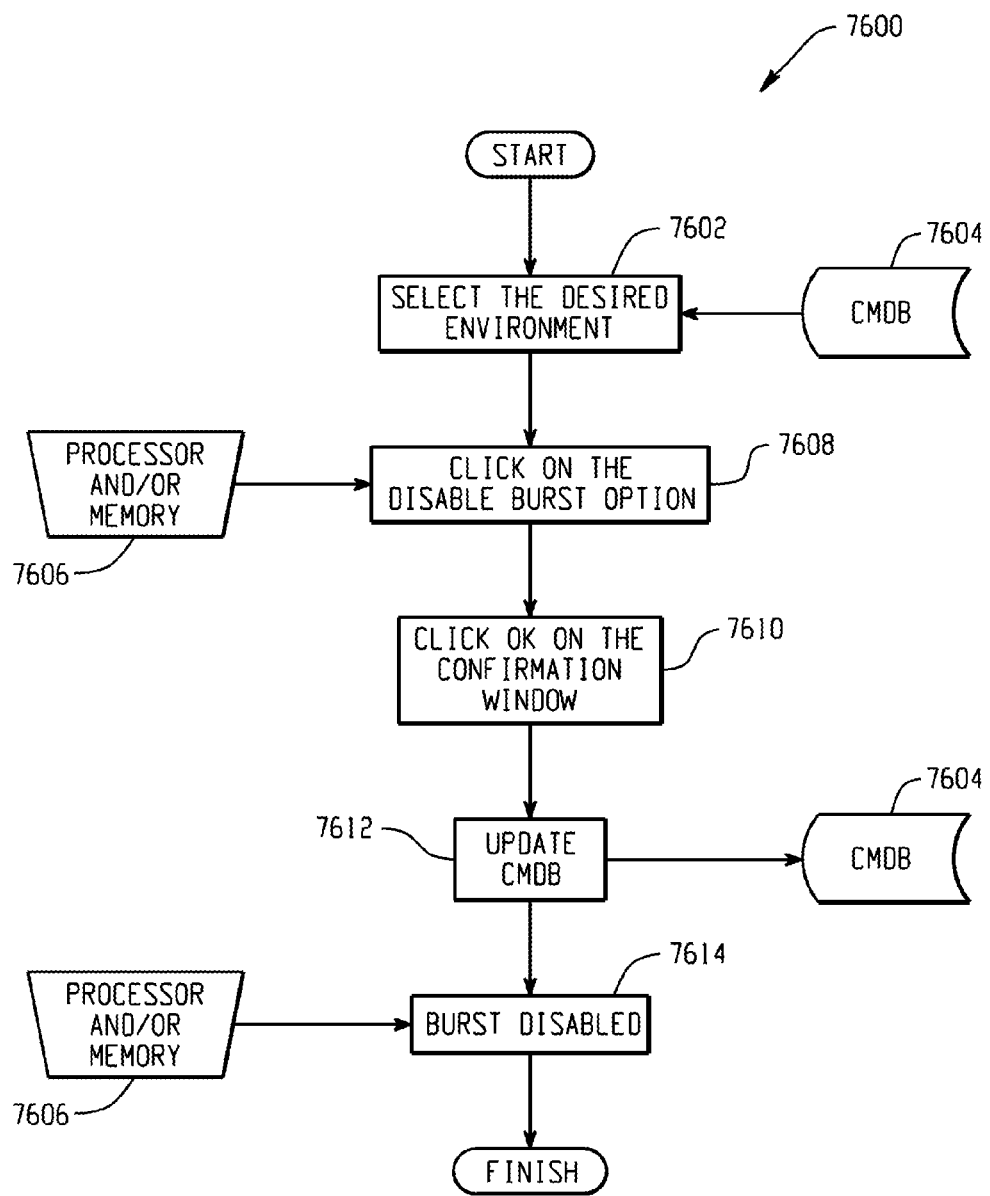
FIG. 76 is a flow diagram depicting the disabling of capacity on demand capabilities.

FIG. 76 is a flow diagram depicting the disabling of capacity on demand (burst mode) capabilities. Current settings for a virtual environment are received at 7602 from the configuration management database (CMDB) 7604 and provided to a user via an interface. A user is provided a display of the current state of the processor and/or memory 7606, and a user with sufficient permissions may choose to disable burst mode for one or more resources at 7608. The user is provided with a confirmation window at 7610, and upon confirming the disabling of burst mode, the configuration management database 7604 is updated at 7612. Burst mode is then disabled at 7614, which may be confirmed via a display of the status of the processor and/or memory 7606.

Figure 77:
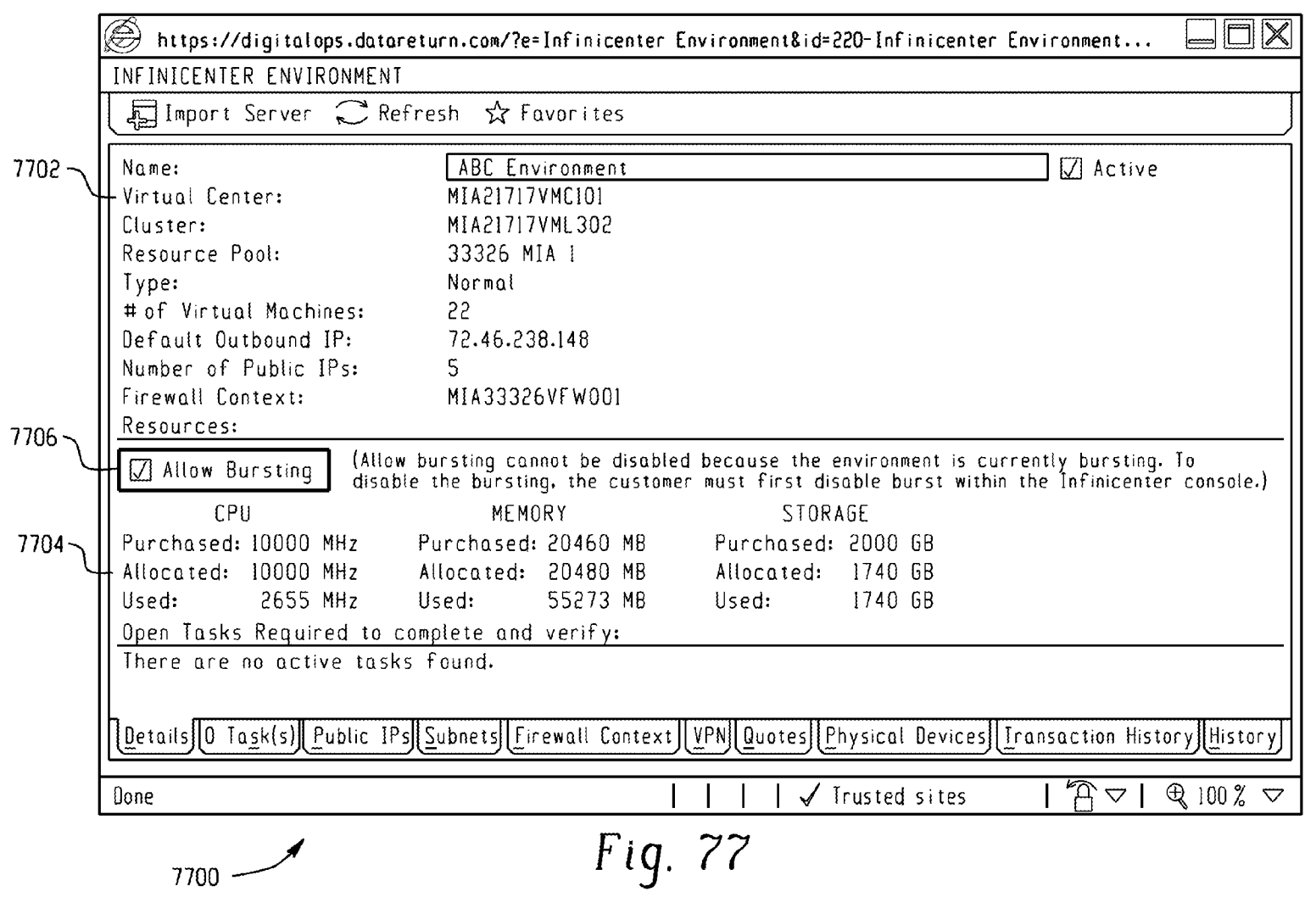

FIG. 77 is a configuration page provided to a user having an administrative level of access. The configuration page 7700 displays details of a virtual environment called "ABC Environment." The details of the servers and resources on which the virtual environment is housed are detailed in the Virtual Center, Cluster, and Resource Pool data provided at 7702. Usage, allocation, and purchase statistics for the virtual environment are provided at 7704. An option for whether bursting should be permitted for the virtual environment is provided at 7706. Based on the current state of the virtual environment, bursting cannot be turned off by the administrator because the virtual environment is currently in burst mode with respect to memory usage. In some configurations, burst mode may be toggled on or off by an administrator regardless of the current state of a virtual environment.

Figure 78:
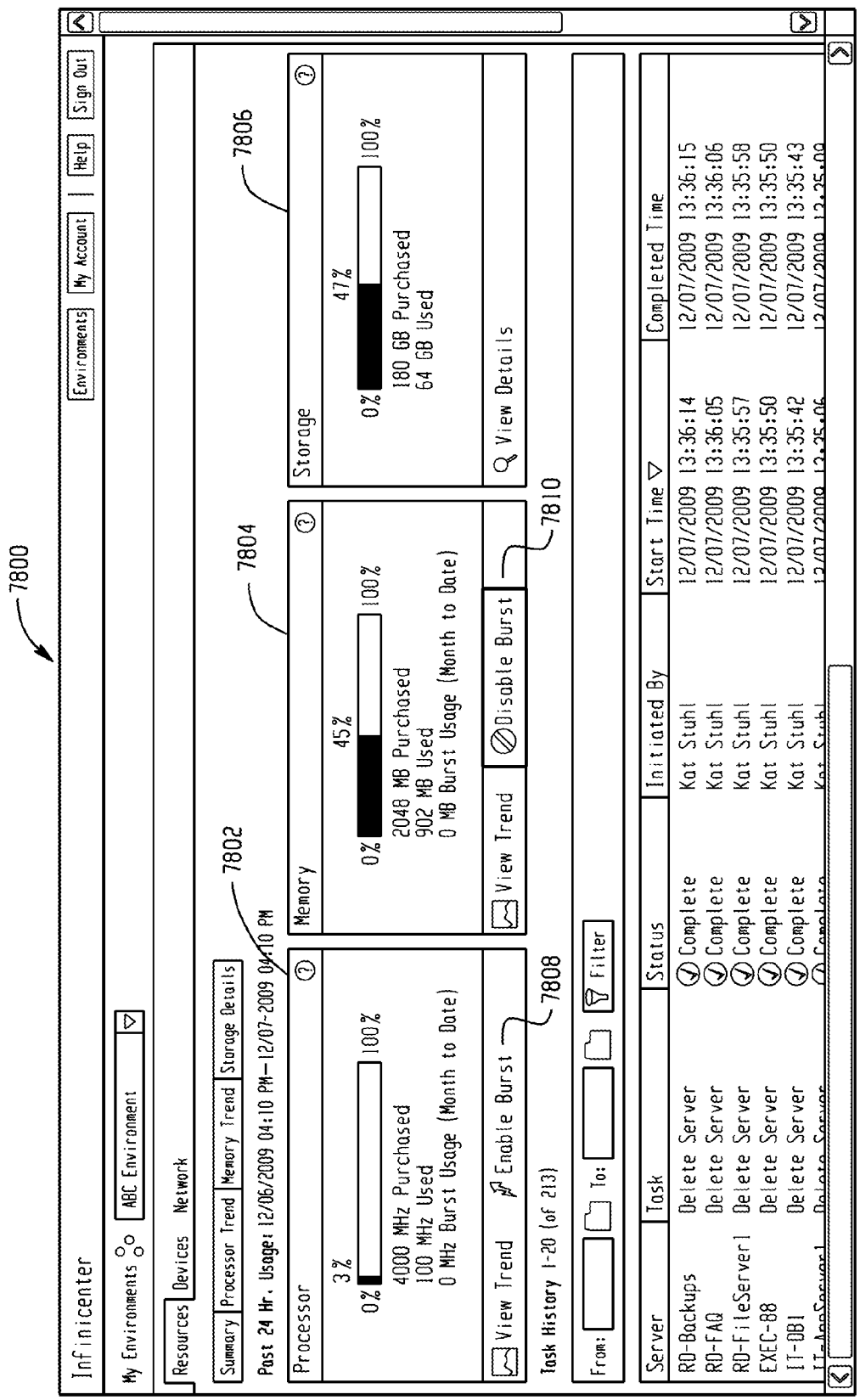
FIGS. 78-85 are example user interfaces for viewing the status of a virtual environment and for enabling or disabling burst modes for the virtual environment.
Figure 79:
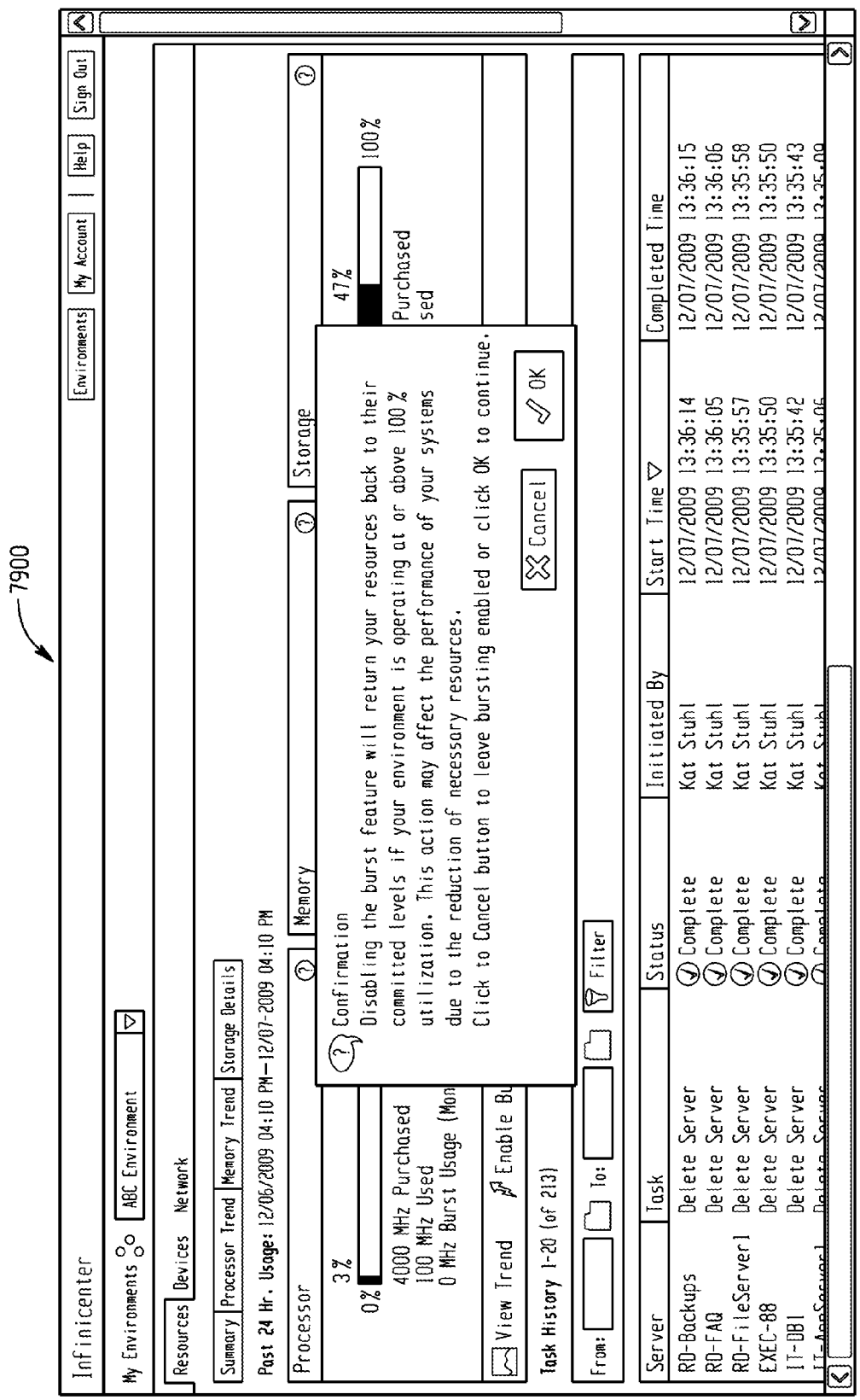
Figure 80:
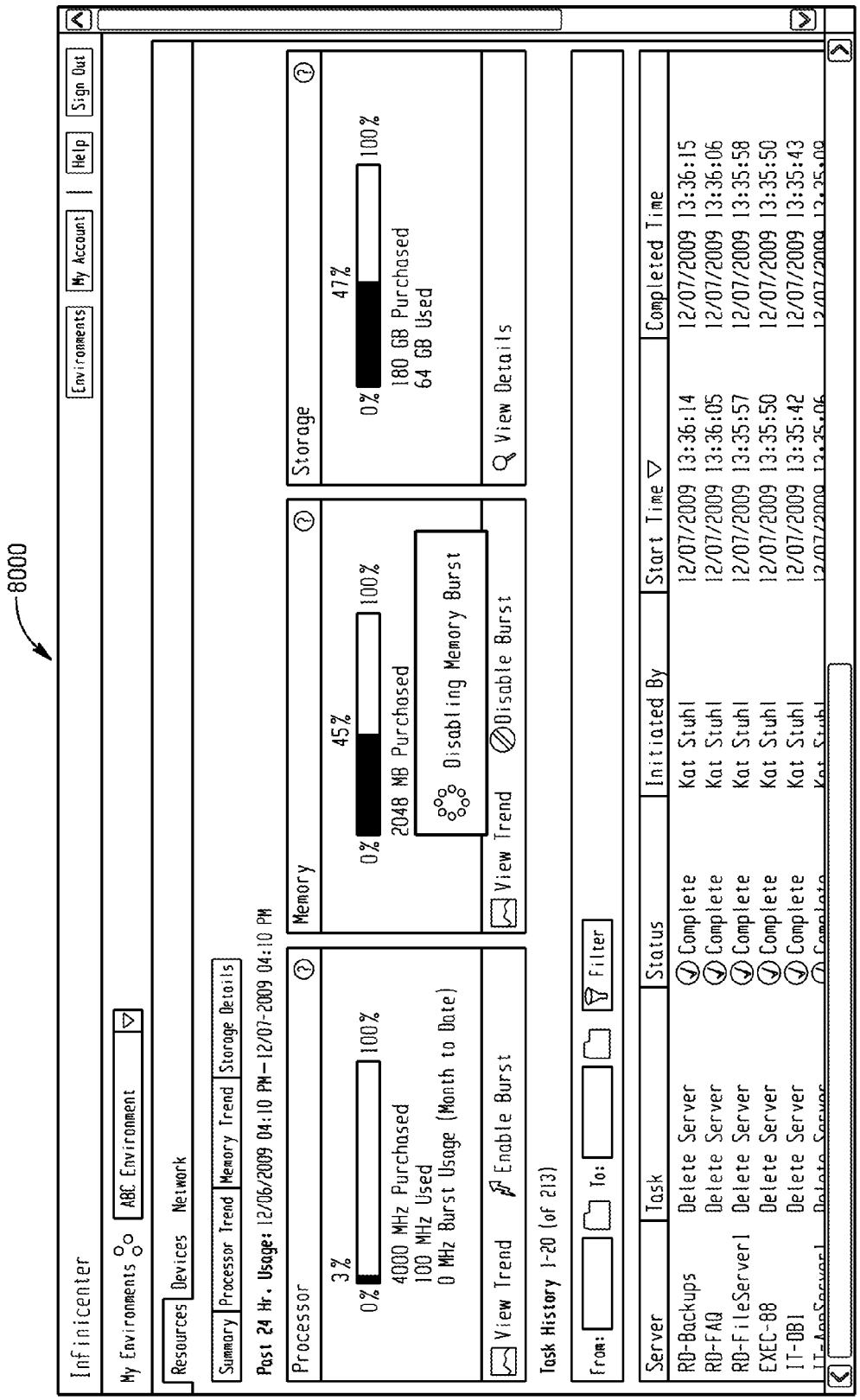

FIG. 78 is a screenshot of a virtual environment status interface provided to a user. The interface displays the current state of processing usage at 7802, memory usage at 7804, and hard drive storage at 7806. None of the resources are currently in a burst mode. However, random access memory usage has burst mode enabled. Toggle buttons are provided at 7608 and 7610 for enabling burst mode for processing and disabling burst mode for memory usage, respectively. Upon clicking the disable burst mode button for memory usage at 7810, a confirmation alert may be provided as shown in FIG. 79. The confirmation alert describes the possible consequences of the current configuration change, including a degradation of system performance, and offers an opportunity for the user to change this decision. Upon confirmation, burst mode for random access memory usage is disabled, as depicted in FIG. 80.

Figure 81:
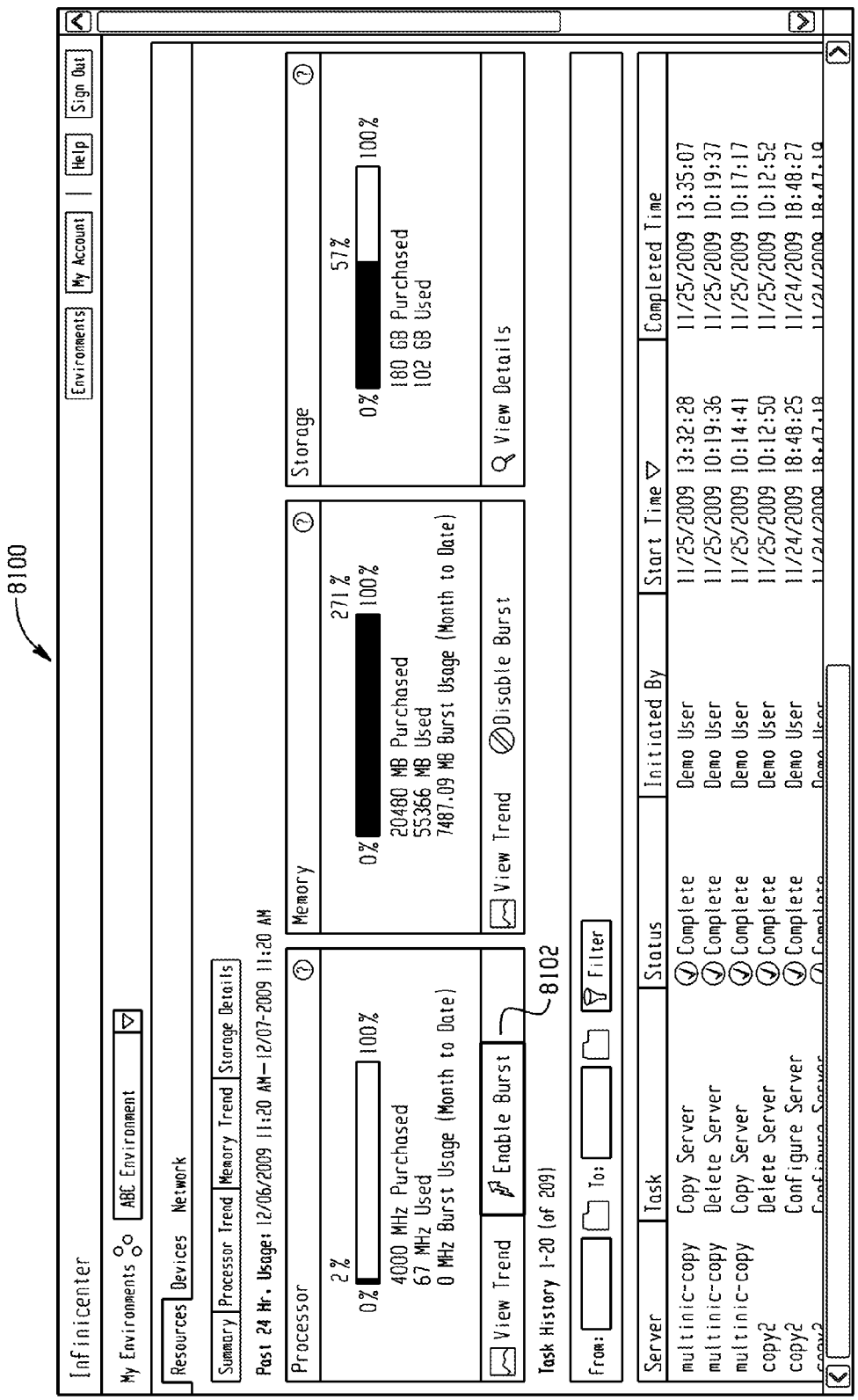
Figure 82:
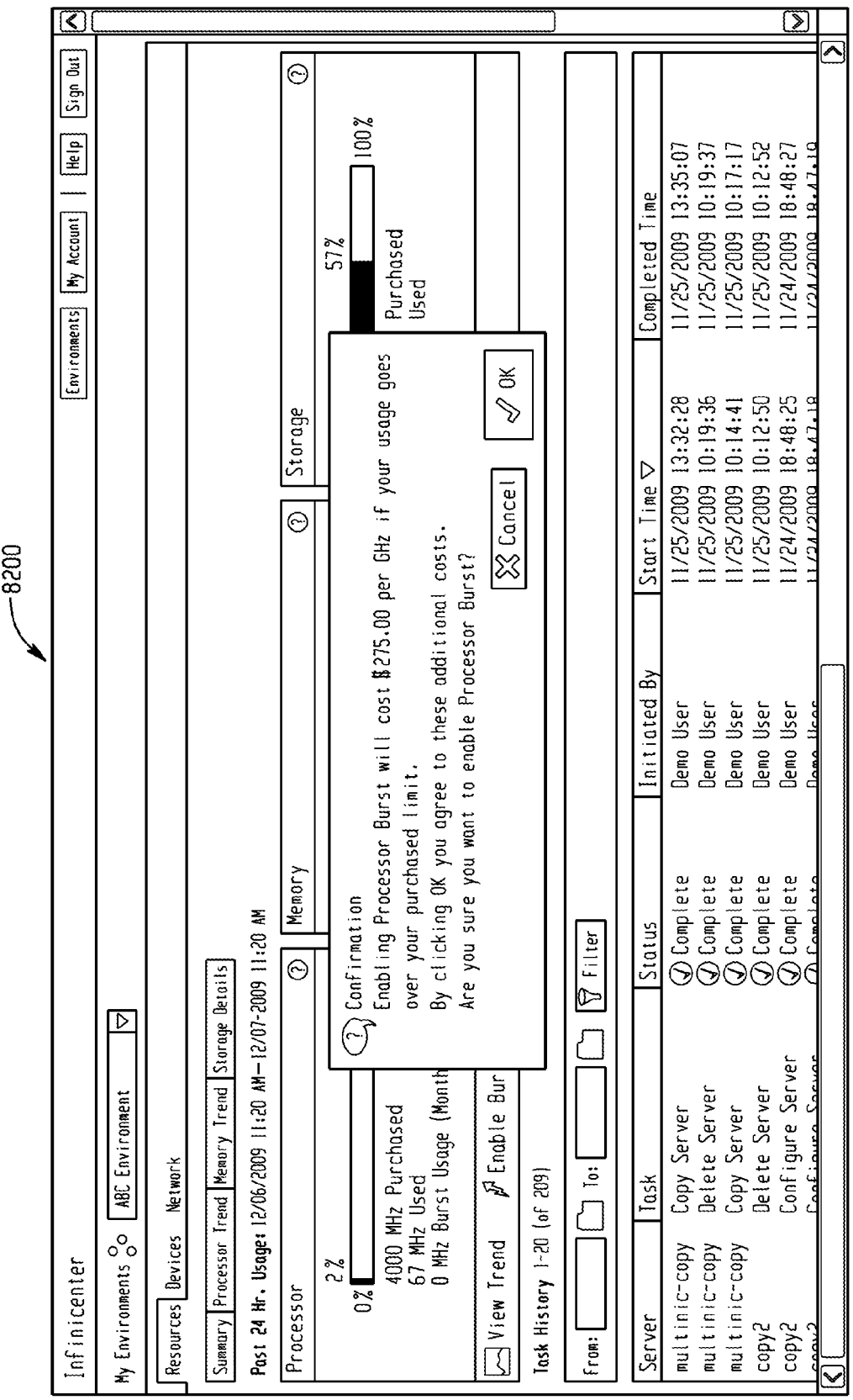
Figure 83:
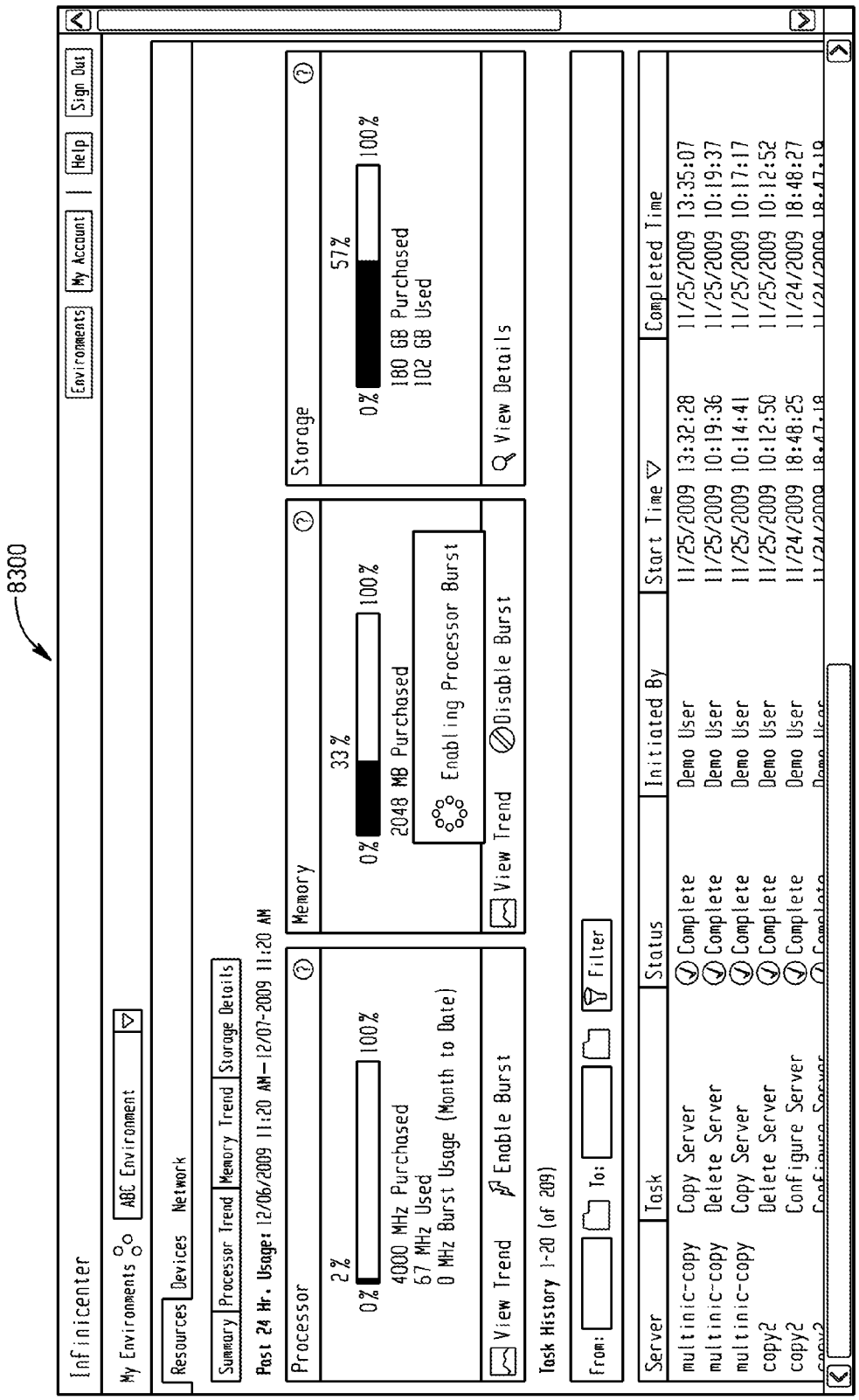

FIG. 81 displays the current state of the virtual environment after disabling burst mode for memory usage. FIG. 81 also highlights the selection of the enable burst button for processor usage at 8102. Upon selection of the enable burst button for processor usage 8102, a user is provided a confirmation alert, as shown in FIG. 82. The confirmation alert describes the consequences of the current configuration change, including the possibility of incurring additional charges to the user's account, and offers an opportunity for the user to change his decision. Upon confirmation, burst mode for processing power is enabled, as depicted in FIG. 83.

Figure 84:
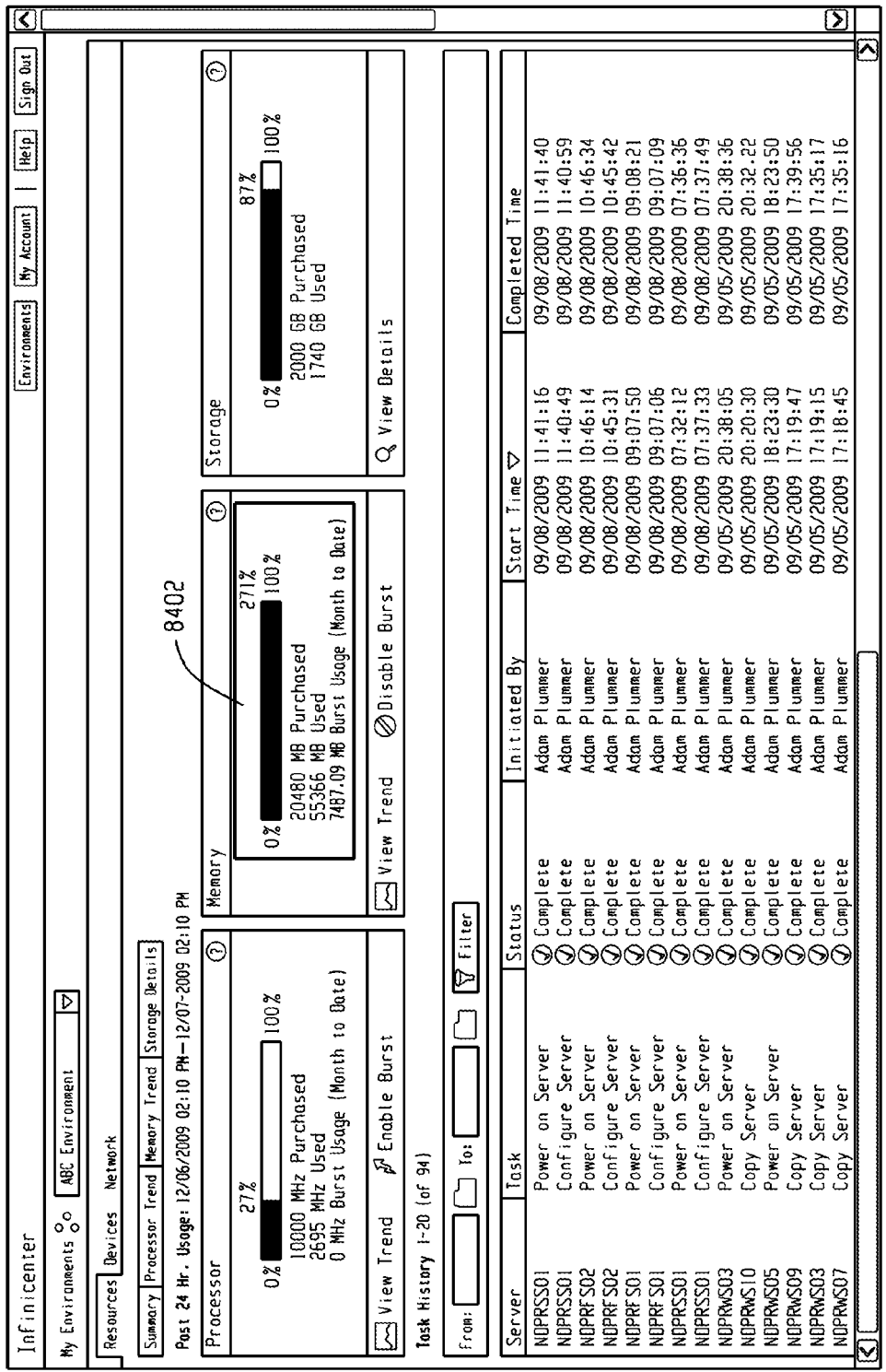
Figure 85:
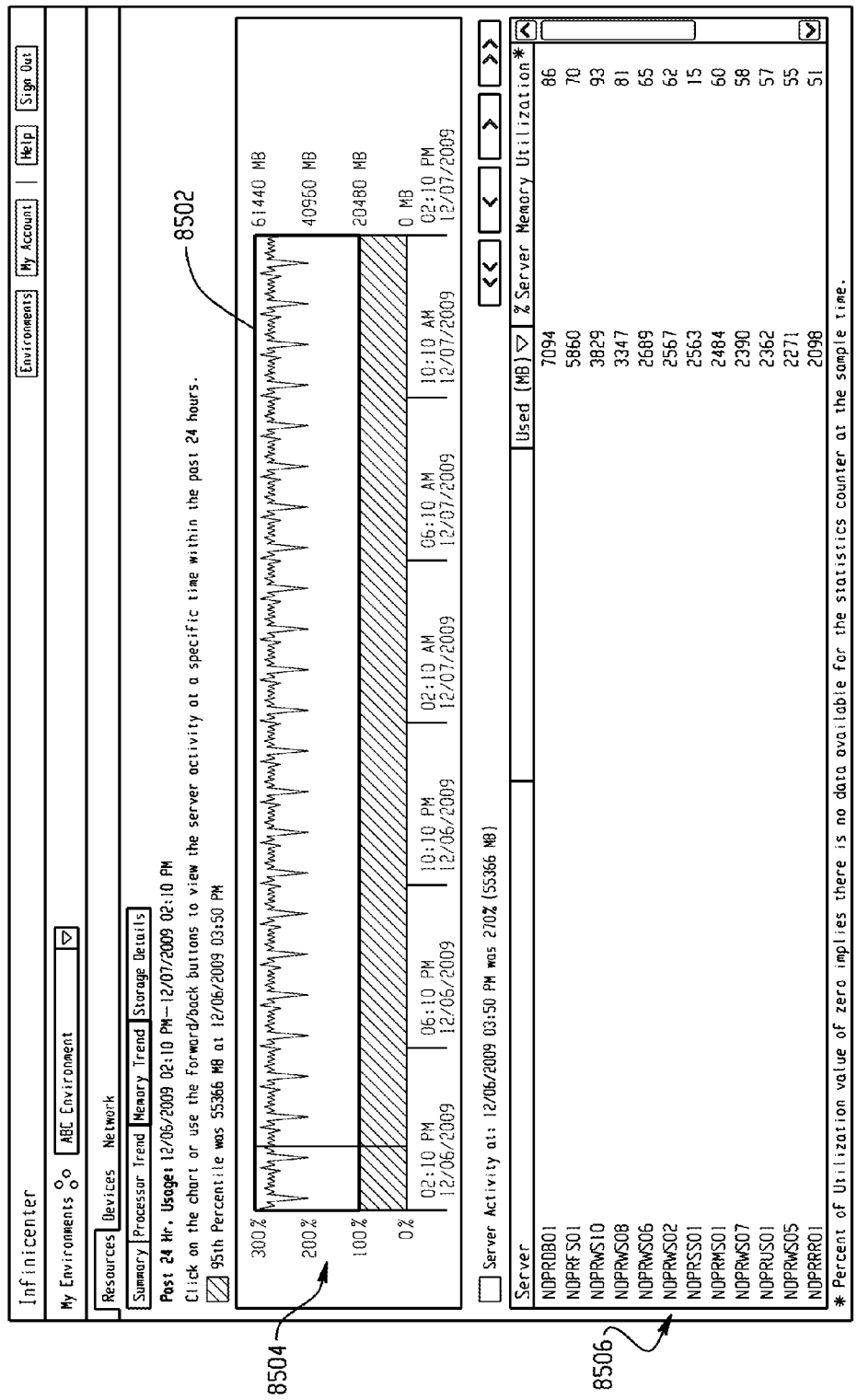

FIG. 84 is a screenshot depicting the status of a virtual environment that is bursting with respect to random access memory usage. The memory status display depicts a current memory usage of 55,366 MB, while only 20,480 MB of memory are currently purchased, such as via a flat-rate periodic agreement. The current memory usage is 271% of the purchased amount of memory. The memory usage display also highlights the average burst memory usage above the purchased amount of memory for the month of 7487.09 MB. FIG. 85 depicts further details of memory usage, including a display of memory usage trends over the past 24 hours at 8502. The memory usage trend 8502 plots the memory usage including the memory usage's relationship to the purchased amount of memory at 8504. The memory usage details page 8500 also displays the virtual environment activities that are using memory at 8506. The activity details display 8506 offers a detailed picture of the memory usage to a user, which may be useful for system monitoring or debugging efforts to reduce memory usage and virtual environment operating cost.

Figure 86:
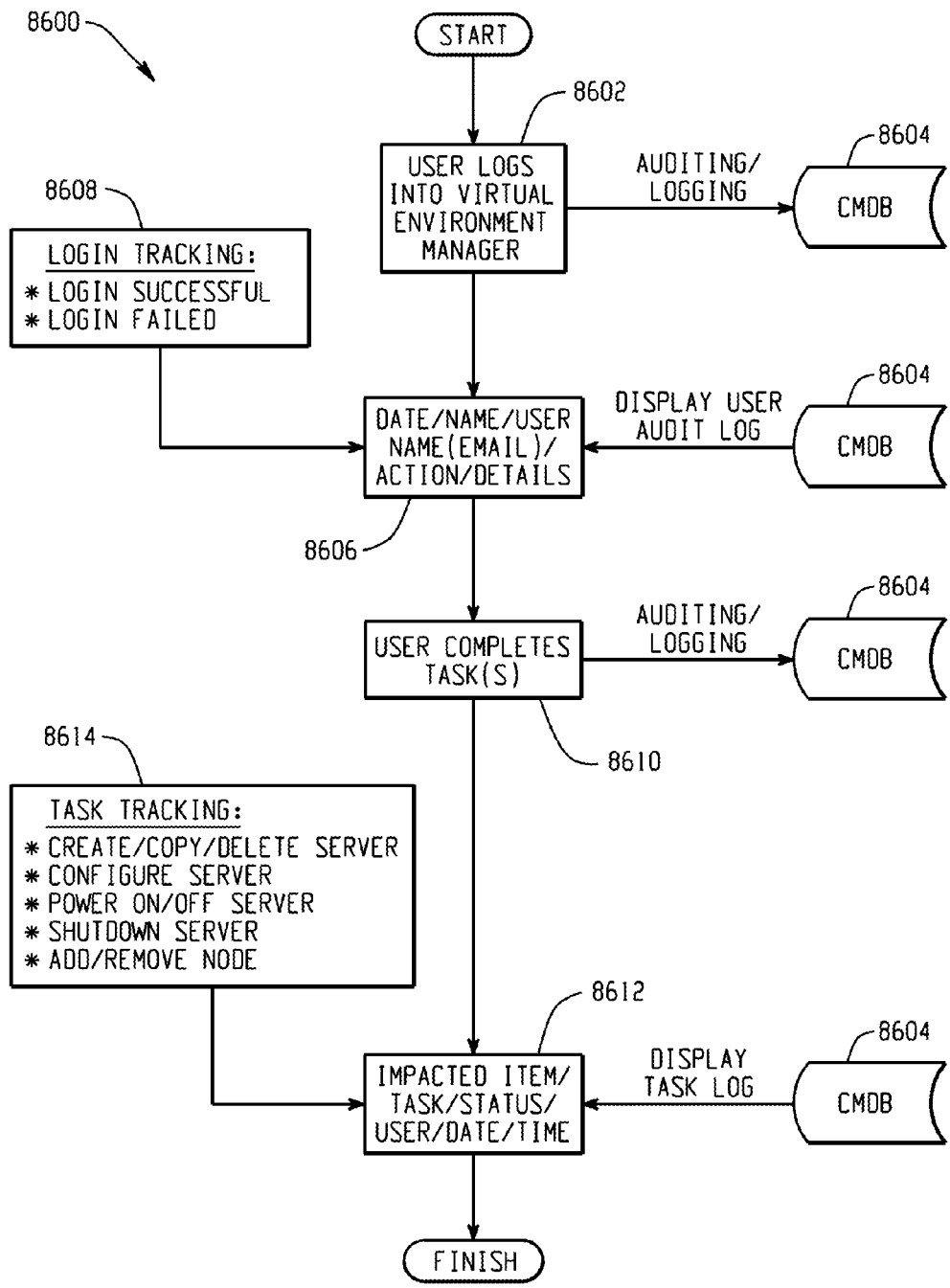
FIG. 86 is a flow diagram depicting an example process for maintaining audit records of actions taken related to a virtual environment.

FIG. 86 is a flow diagram depicting an example process for maintaining audit records of actions taken related to a virtual environment. For example, an audit record may track a variety of data including identification of actions taken in a virtual environment, which users are associated with the actions taken, what devices in the virtual environment are involved in the actions, as well as other data. The audit data may be collected and stored in the configuration management databases. Tracking of such data can be useful for security, accountability, and other applications. While such process monitoring may be useful in a cloud computing environment, the difficulty of such tracking is exacerbated by the non-centralized nature of a cloud computing environment where multiple users may be performing actions on multiple different physical machines, perhaps simultaneously.

At 8602, a user logs into a virtual environment manager. An identification of the user logging in and whether that login attempt was successful or not are stored as audit data in the CMDB 8604. Additional data may also be captured, including an identification of which virtual environment the user attempted to access, the date and time of the attempted login, as well as other information.

An administrator or other user with sufficient access is able to view a user login audit log at 8606. The user login audit log 806 is populated with data from the CMDB 8604. Such data may include date/time information related to logins, user identification information such as the person's name and user name, actions that were attempted, and details of the login attempt. For example, the user login audit log 8606 may be populated with login data identifying whether logins were successful or failed, as identified at 8608.

Audit records may also be tracked related to tasks attempted and completed by a user. At 8610, when a user attempts or completes a task, data related to that action is stored in the CMDB 8604. Audit data retained may include an identification of the user, an identification of the action attempted, device(s) in the virtual environment affected by the requested action, an identification of the success or failure of the action, a date and time associated with the action, an action start time and an action completion time, as well as other data.

An administrator or other user with sufficient access is able to view a task log at 8612. The task log 8612 is populated with data from the CMDB 8604. Such data may include an item related to the task, the requested task, the status of completion of the task, a user requesting the task, as well as dates and times related to the task. Example tasks that may be tracked include creating, copying, or deleting a server, configuring a server, powering on or off a server, shutting down a server, adding or removing a node, as well as other tasks.

FIG. 87 is a screenshot depicting an example user login audit log. The user login audit log display 8700 is a searchable display that depicts dates/times of attempted logins, the requesting user's name, the requesting user's e-mail address, an identification of the success or failure of the attempted login, as well as comments or details regarding the attempt.

Figure 88:
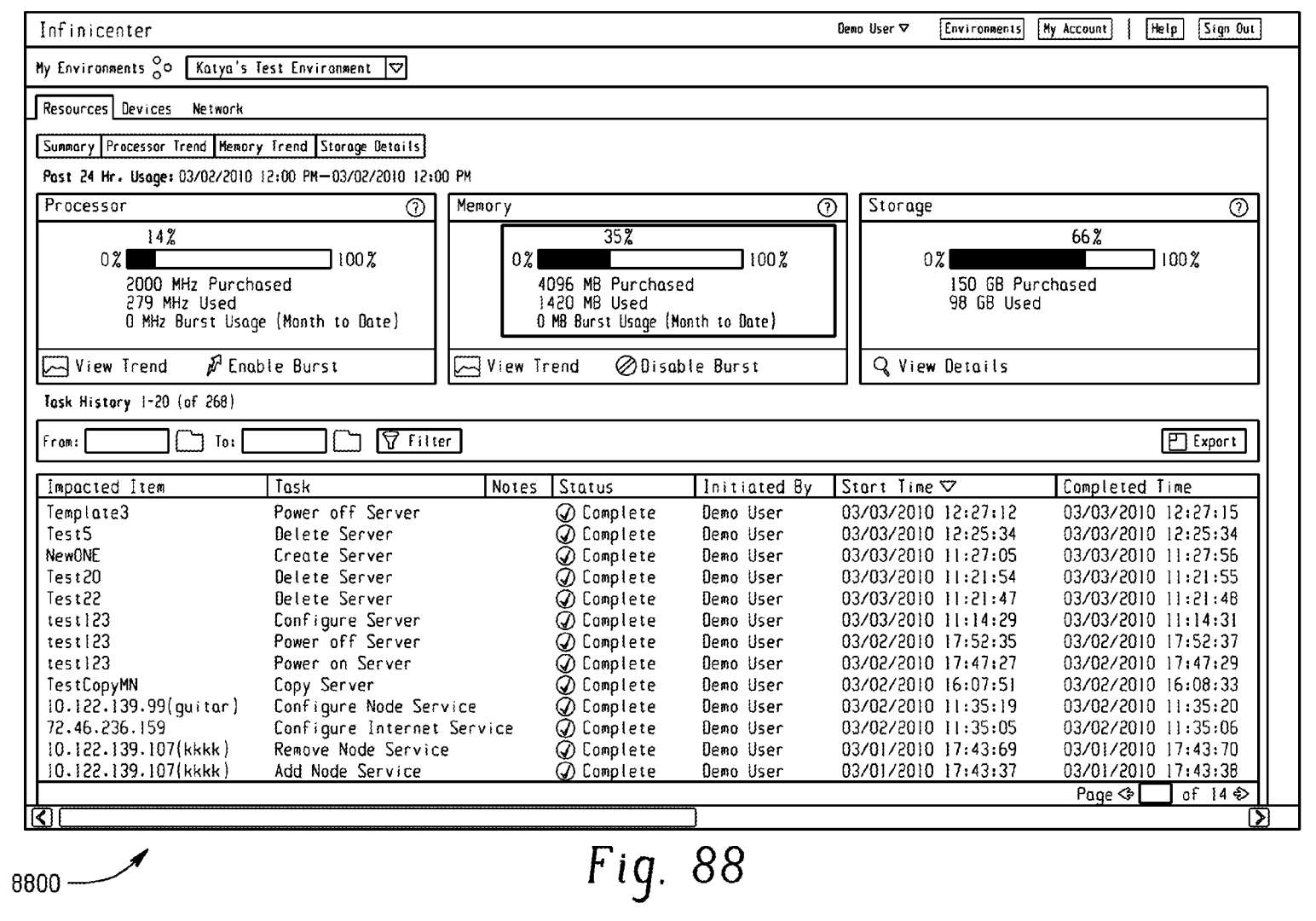

FIG. 88 is a screenshot depicting an example general task log. The general task log 8800 depicts tasks attempted and performed for all or a selection of devices in a virtual environment. The general task log 8800 identifies an impacted item, a requested task, a report on the status of the requested task, an identification of a requesting user, as well as a start time and an end time for execution of the requested task.

Figure 89:
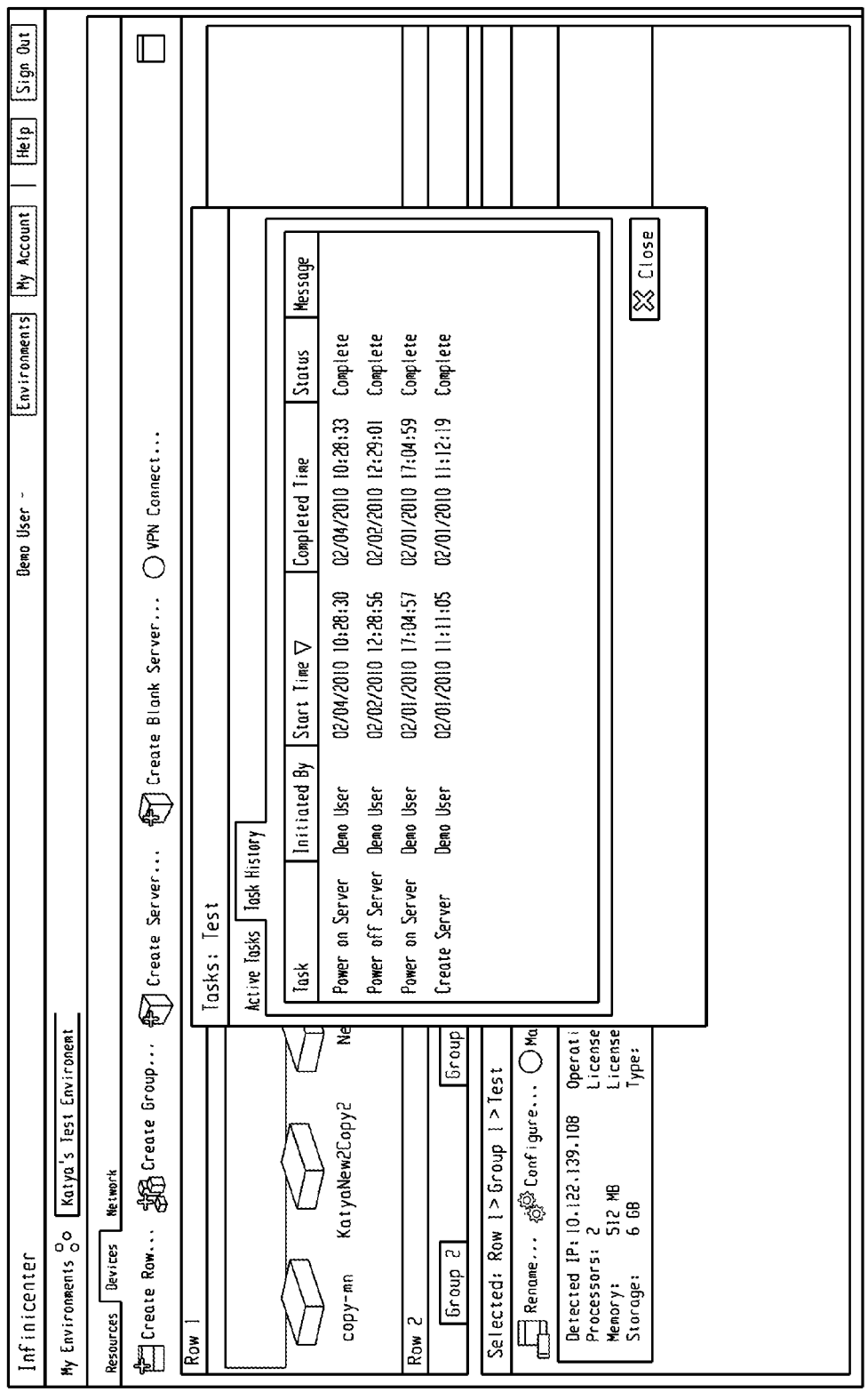
FIG. 89 is a screenshot depicting a device task log.

FIG. 89 is a screenshot depicting a device task log. The device task log 8900 depicts a record of tasks attempted and performed related to a specific device in a virtual environment. The device task log identifies a task requested, the user requesting the task, the start time and end time for execution of the task, as well as a comment regarding the success or failure of the execution of the task.

Figure 90A:
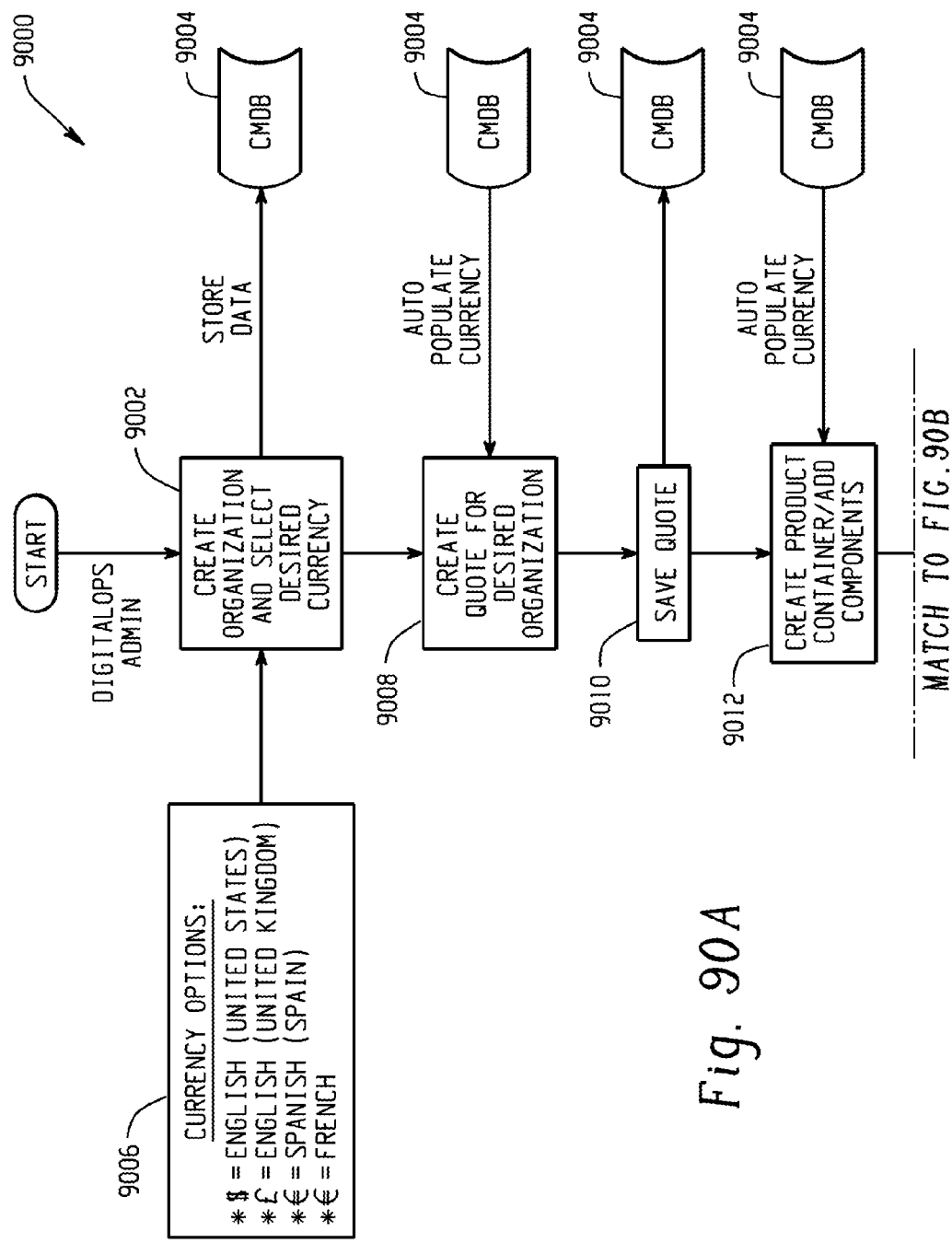

FIGS. 90A and 90B is a flow diagram depicting an example process for providing quotes and other financial data to a user in an appropriate currency for that user within a virtual environment. A quote or other financial data can be provided with a proper currency type indicator (e.g., $, ₣, £, €). A quote or other financial data may also be provided on a display in a different currency than how that data is stored in a database via a currency conversion.

At 9002, an organization record is generated for an organization that will utilize a virtual environment. Among the options selected for the organization during generation is the organization's desired currency. The organization's currency selection is stored in the CMDB 9004. Example currency options are depicted at 9006 and include the U.S. dollar, the U.K. Point, the Spanish Peseta, and the French Franc. A price quote may be provided to an organization at 9008, where, in generating the quote, the currency identification symbol is automatically populated based on data from the CMDB 9004. For example, if the CMDB identifies the organization as preferring to work in U.K. Pounds, then the quote price would be identified by a £ symbol. Additionally, if a quote price is entered or stored in a database in another currency, then the quote may be provided in the organization's preferred currency following a currency conversion calculation.

The quote may be saved in the CMDB 9004 at 9010. A product container may be generated at 9012, and additional components may be added for the organization. Pricing for the additions to the product container may be saved and submitted to the CMDB at 9014. Upon approval of the quote by a user at 9016, a virtual environment is created and activated at 9018 based upon the terms agreed to in the quote. Upon logging into a virtual environment manager at 9020, a number of displays 9022 are available in the preferred currency associated with the organization. Example preferred currencies are depicted at 9024. Example screens that can display values in preferred currencies are depicted at 9026 and include screens for enabling burst capabilities, creating a server, a server summary, a billing summary, metered usage, and a contract network upgrade.

Figure 91A:
Figure 91B:
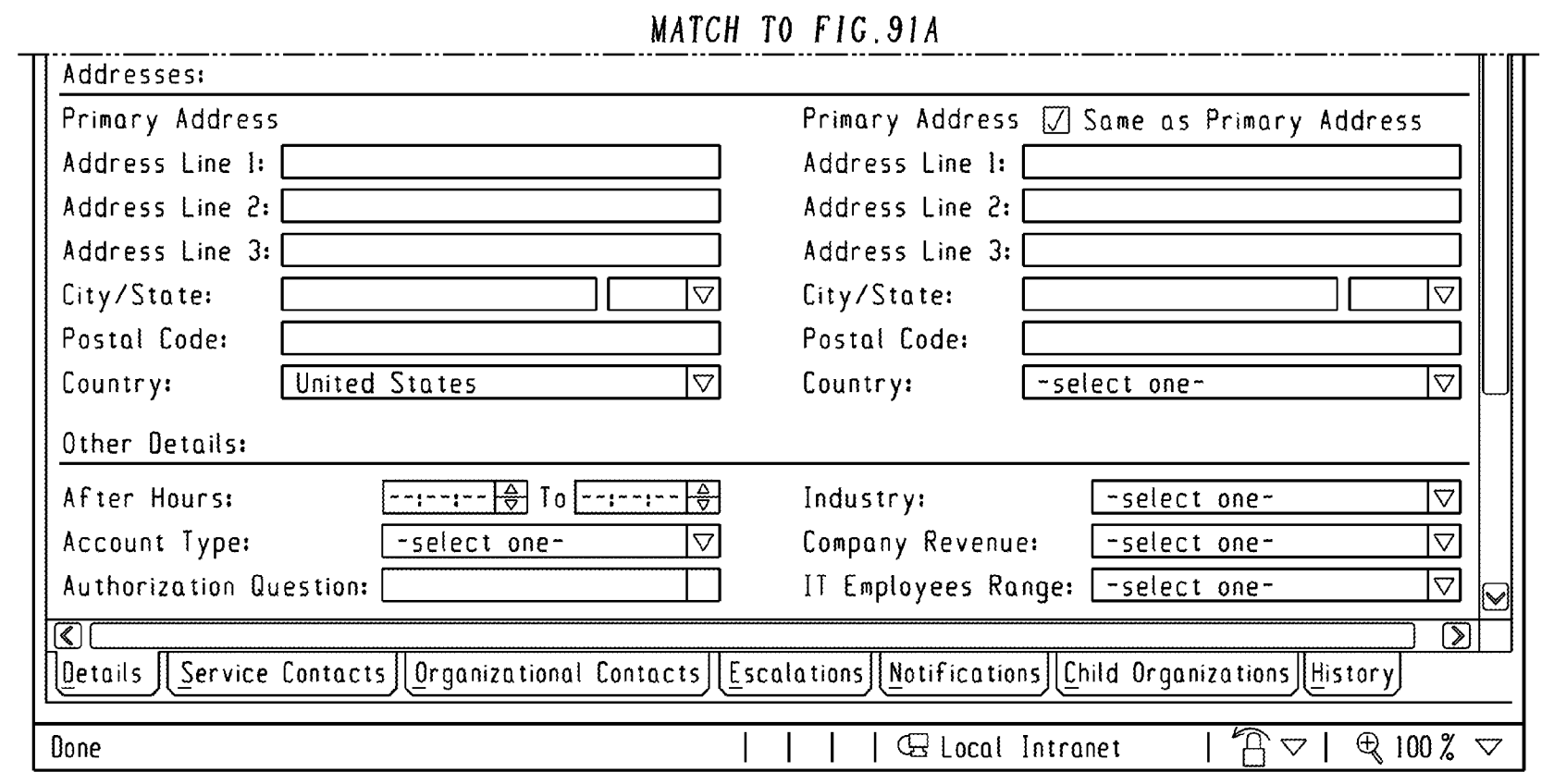
Figure 92:
FIG. 92 is a screenshot depicting a display for generating a price quote for an organization.
Figure 93:
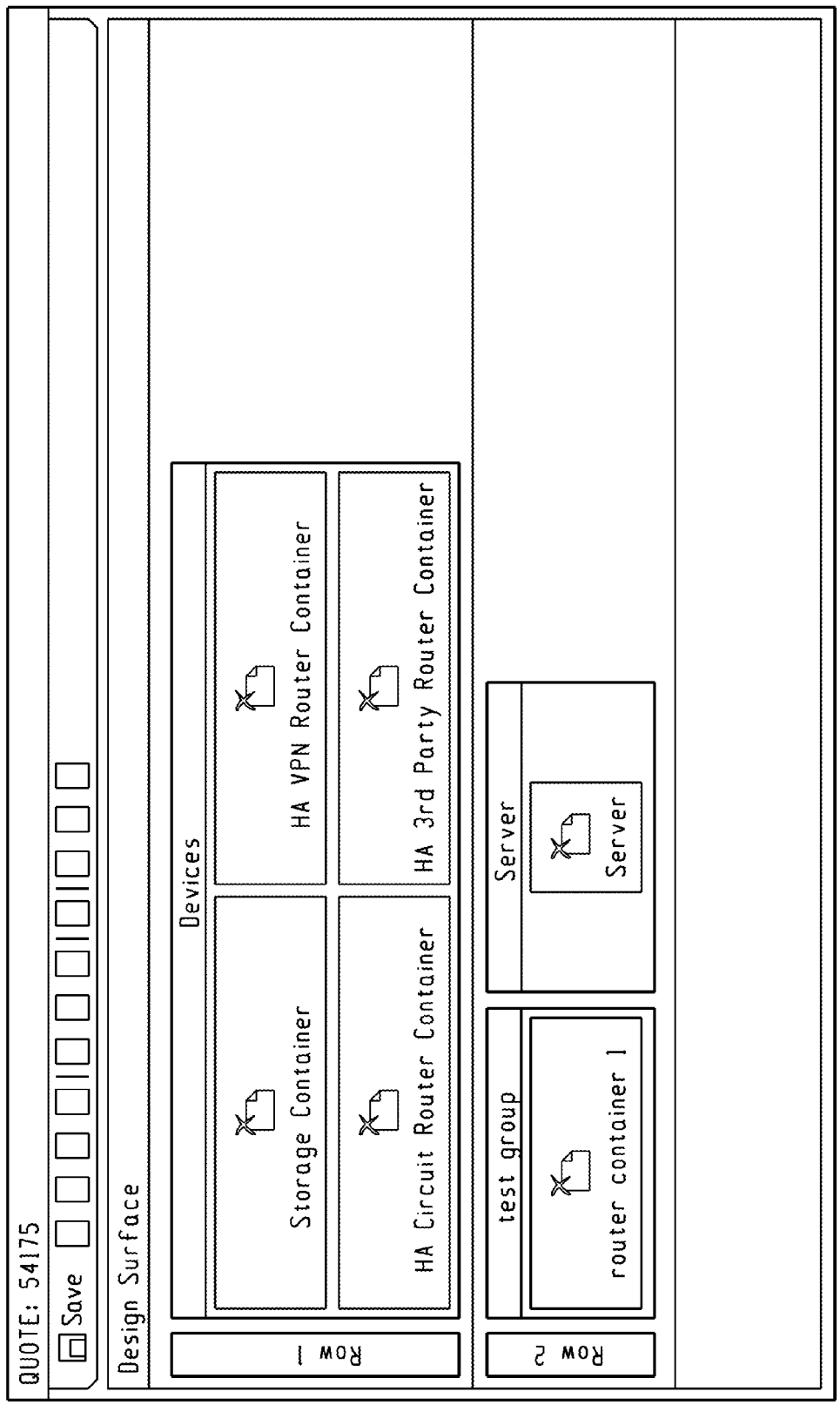
FIG. 93 depicts a screenshot for an example display for creating a product container and adding components.

FIGS. 91A and 91B are a screenshot of an example display for inputting data for a new organization. In addition to entering data regarding name, address, and contact phone numbers, a preferred currency type is selected at 9102. FIG. 92 is a screenshot depicting a display for generating a price quote for an organization. The price quote generation display 9200 can be provided to an employee of the virtual network provider. The employee may use the various controls to create a proposed system setup to meet a user's needs. Upon generation of a quote using the quote generation display 9200, a generated quote can be provided to the user for review. If the user agrees to the terms of the generated quote, then the depicted virtual environment is implemented. If the user does not agree, then the generated quote could be referenced in further negotiations. The preferred currency for the organization is pre-populated at 9202 based on the preferred currency identified in the CMDB for the organization. FIG. 93 depicts a screenshot for an example display for creating a product container and adding components. A product container can be created and populated with components to generate a proposed system setup to be included in a price quotation to the user. FIG. 94 depicts a price list used to update a generated quote based on components added to the product container for the virtual environment. The prices in the price list may be depicted in the preferred currency of the user based on data from the CMDB.

Figure 95:
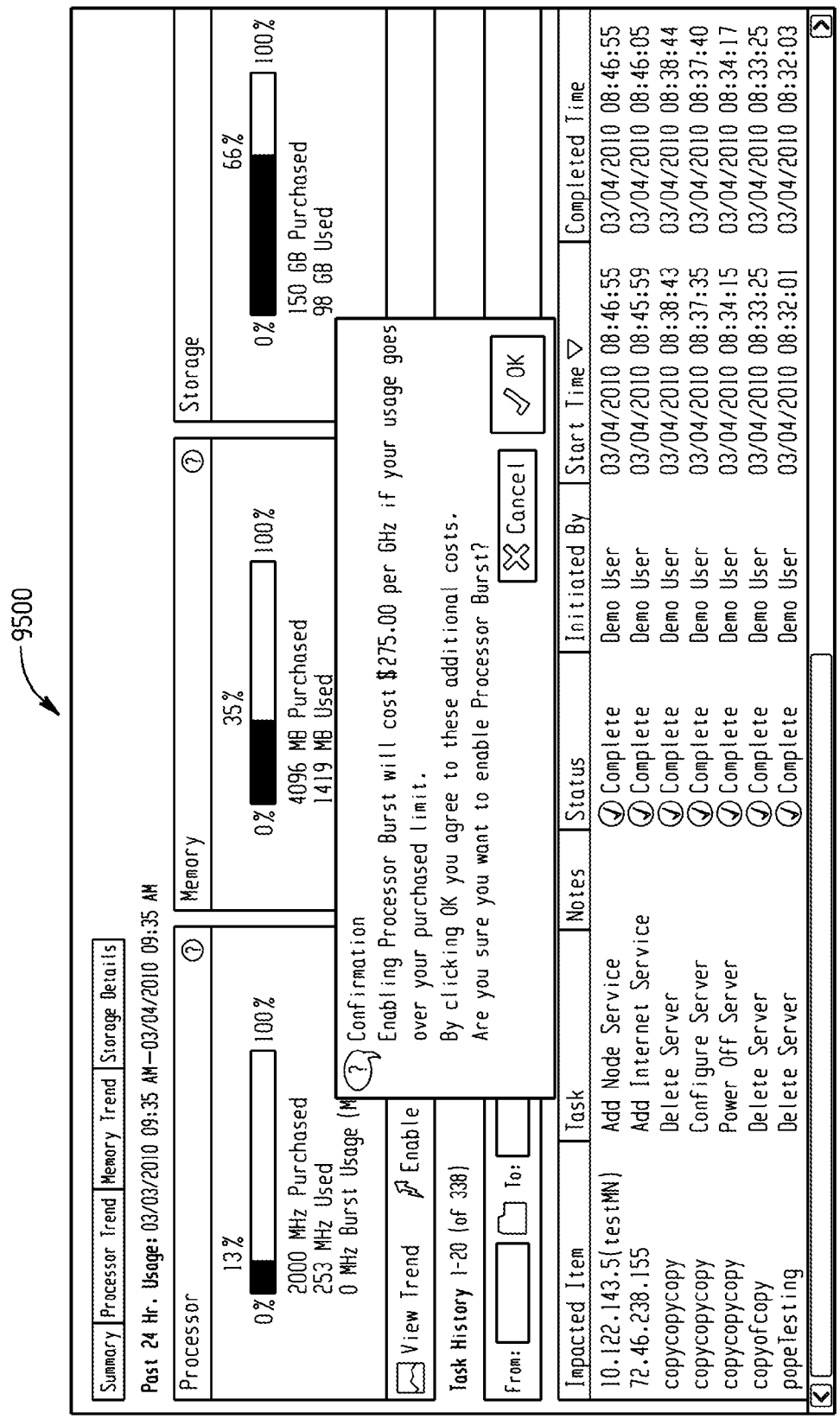
FIG. 95 is a screenshot depicting a confirmation screen displayed to a user prior to the user enabling burst processing.
Figure 96:
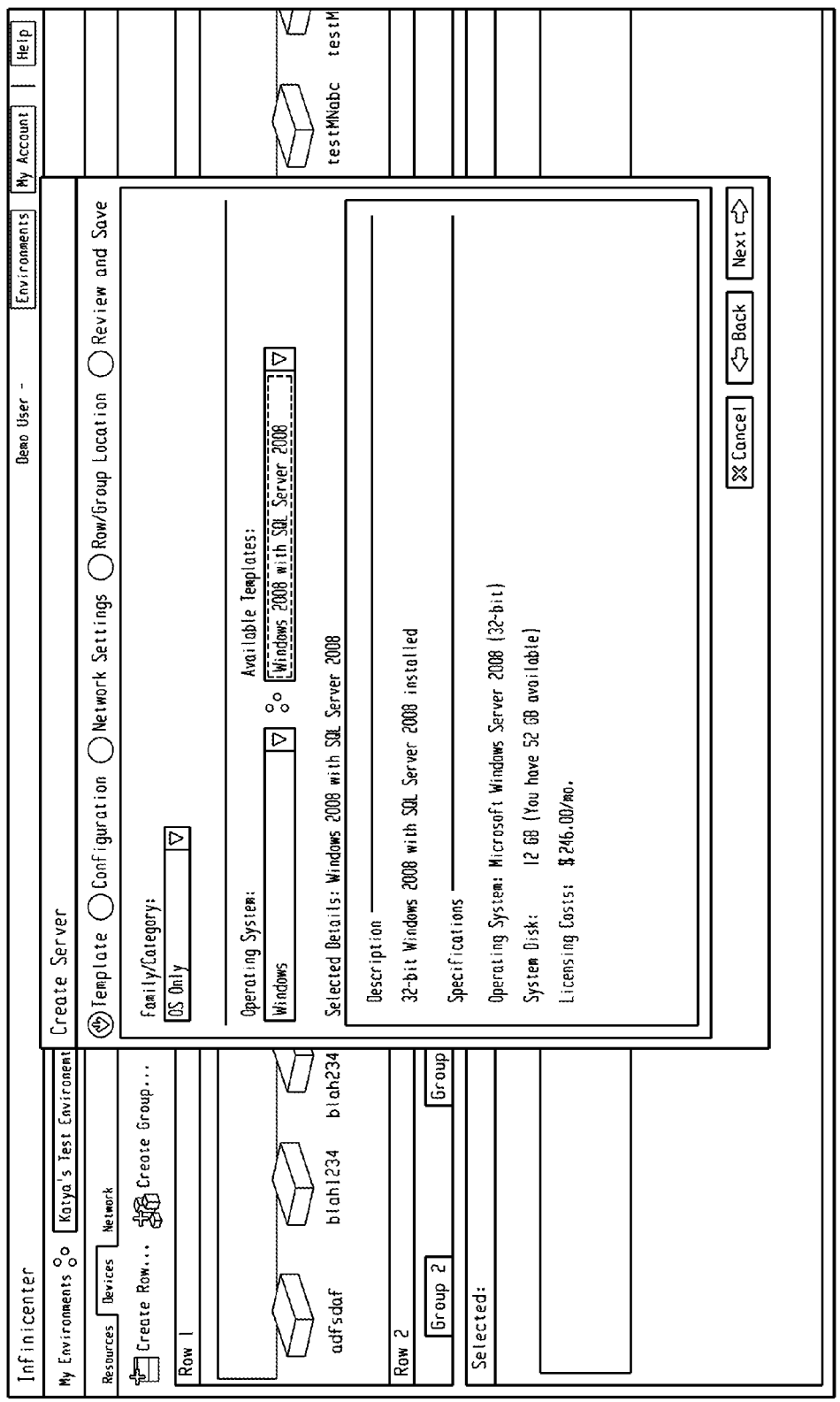
FIG. 96 is a screenshot depicting a dialog for creating a new server.

Price data may be formatted in the preferred currency of the user in other contexts as depicted in the examples of FIGS. 95-97. While these examples depict price data in U.S. dollars, other currencies may also be displayed according to a user's preferred currency. FIG. 95 is a screenshot depicting a confirmation screen displayed to a user prior to the user enabling burst processing. The price identified in the confirmation screen display, $275.00, is provided in the preferred currency of the user. FIG. 96 is a screenshot depicting a dialog for creating a new server. The licensing costs, $246.00 per month, are provided to the user in the user's preferred currency. FIG. 97 is a screenshot depicting a billing summary, wherein the costs depicted are displayed in the preferred currency of the user or organization. For example, the sub-total for Katya's Test environment is provided in U.S. dollars, Katya's preferred currency, as $8,242.00.

Figure 98:
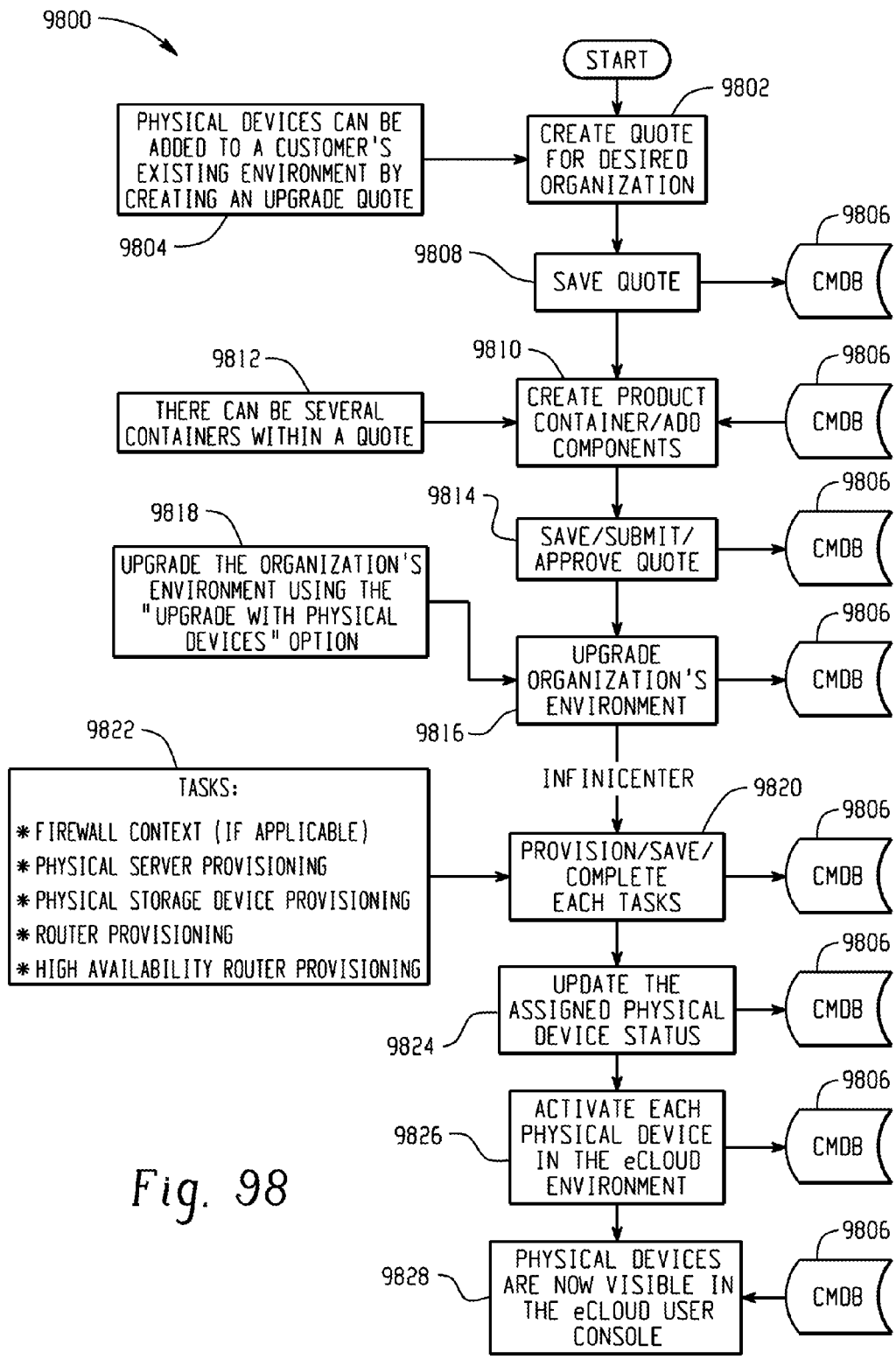
FIG. 98 is a flow diagram depicting a process for incorporating a physical device into an environment containing one or more virtual servers.

FIG. 98 is a flow diagram depicting a process for incorporating a physical device into an environment containing one or more virtual servers. At 9802, a quote is created for an organization requesting that a physical device be incorporated into the organization's virtual server environment. A physical device may be any of a variety of devices that may include a physical server, a network device, as well as other devices. As noted at 9804, a physical device can be incorporated into a customer's existing environment through the use of an upgrade quote. The upgrade quote facilitates entry of data into the CMDB 9806 when the quote is saved 9808 and provides a mechanism for providing pricing to the customer for the addition of the physical device to the environment.

At 9810, a product container is created and components are added to the container. A container is a logical representation of a physical device that is to be implemented. As noted at 9812, there may be several containers within a single quote. Information related to the physical device is associated with the container to be incorporated and is input to the CMDB 9806. Such information may include the type of device and other specifications of the physical device to be incorporated into the environment. The quote containing one or more containers is saved, submitted, and approved at 9814. For example, a price for incorporating the physical device into the network may be associated with the quote, the quote may be provided to the organization, and an approval of the quote may be received. The price may be based on factors including the cost of buying/leasing the physical device and a periodic cost for operating the physical device.

Upon approval of the quote, the organization's environment is upgraded at 9816. Such an upgrade may utilize an "Upgrade with physical devices" option on a graphical user interface, as noted at 9818. Upgrading the organization's environment may include physically incorporating the physical device into an environment that includes resources for providing virtual servers. Physical incorporation may include purchasing the physical device, installing the physical device, assigning an address to the physical device, and testing the physical device. Once the physical device is incorporated at 9816, the physical device may be provisioned and setup tasks may be performed at 9820. The provisioning and setup tasks 9820 surface the physical device in the environment. Example setup tasks are depicted at 9822 and may include adjustment of firewall settings as well as provisioning the physical device which may include a physical server, a physical storage device, a router, a high availability router, or other physical device.

At 9824, the physical device status is updated to an active state, and at 9826, the physical device is activated in the environment such that the physical device is viewable in a virtualization control system console provided to the organization, as indicated at 9828.

Figure 99:
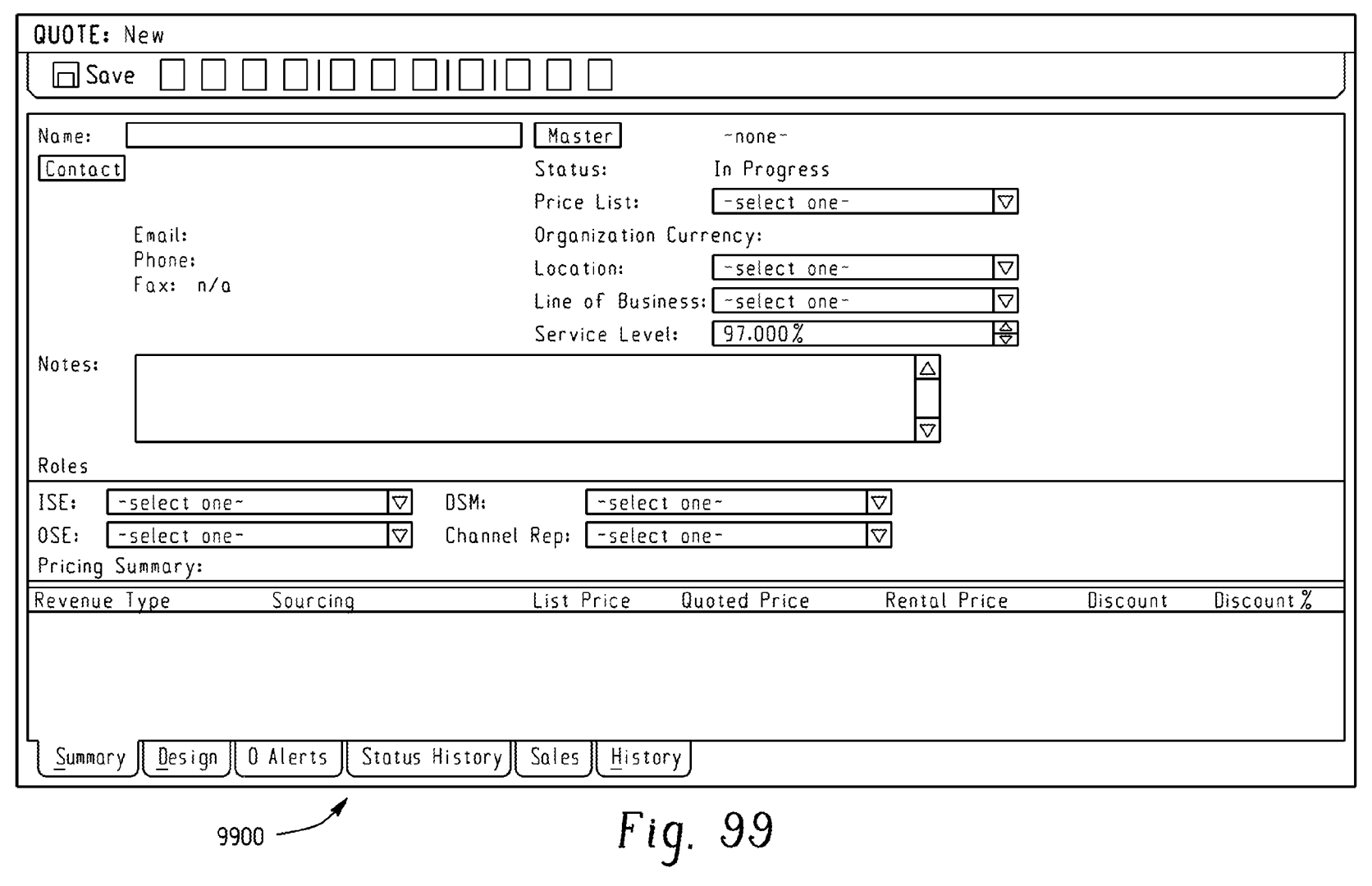
Figure 100:
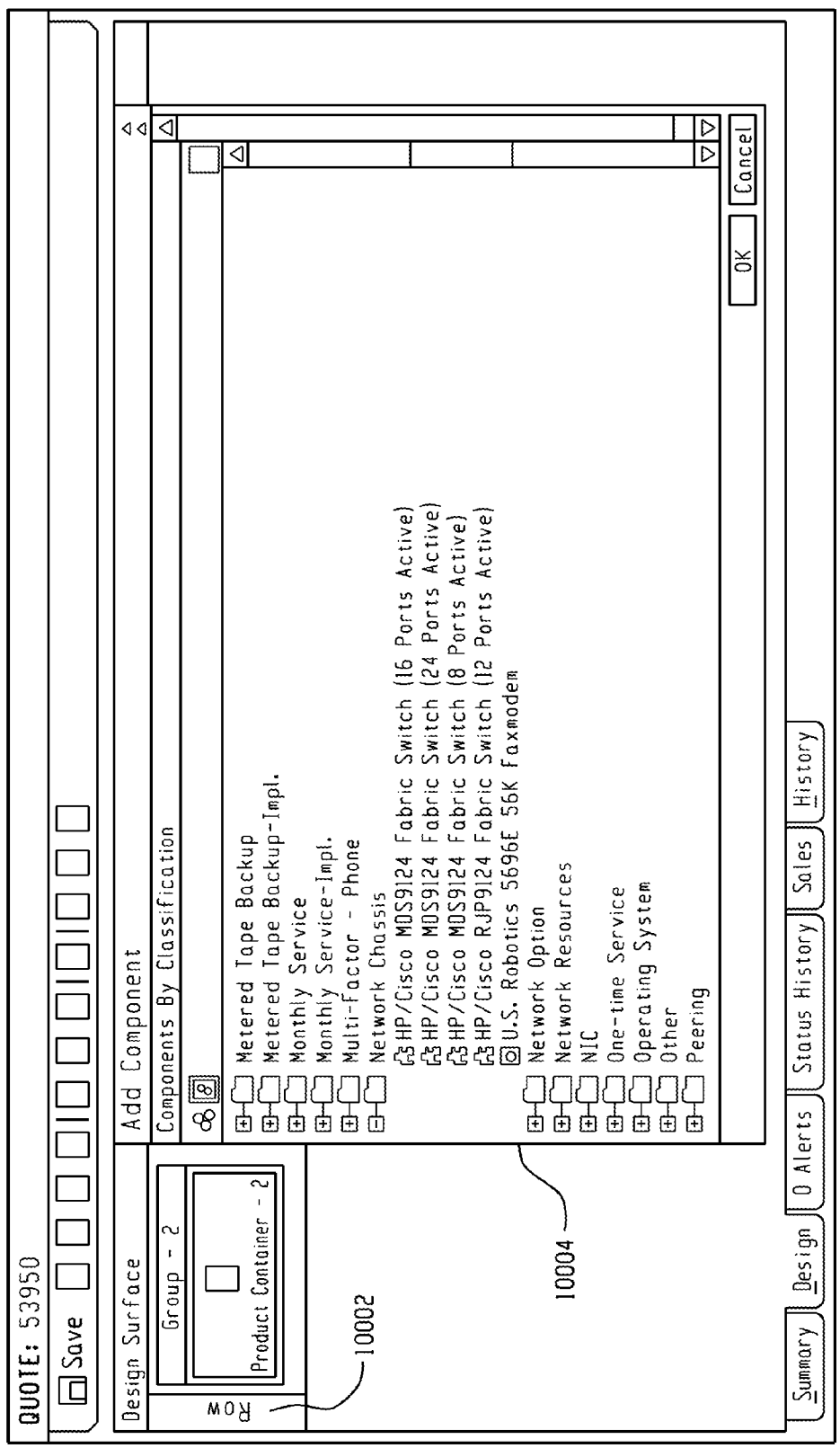
Figure 101:
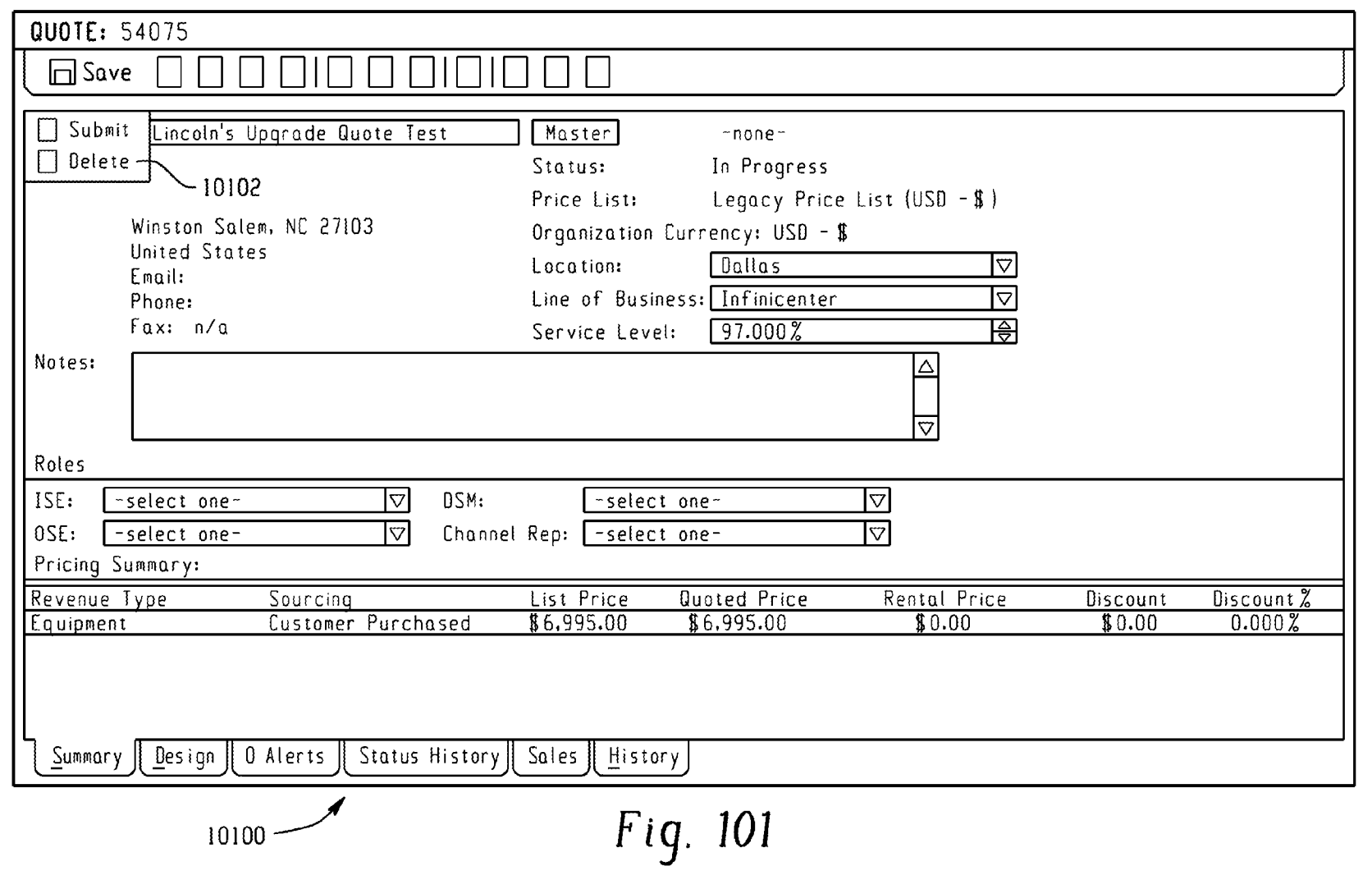

FIG. 99 depicts a graphical user interface including a quote form that can be used to generate an update quote. Data such as the organization name, pricing, and notes may be entered into the quote form of FIG. 99. FIG. 100 depicts a design tab of a quote form containing a product container and a dialog for selecting a physical device to add to the container. A product container 10002 creating a logical representation of the physical device to be incorporated is created and depicted. The dialog at 10004 then enables a physical device to be selected from a list of physical devices to be associated with the product container 10002. FIG. 101 depicts a graphical user interface showing a completed quote form. Data related to the organization whose environment is to be updated and pricing information has been added to the quote form, and the quote form is ready to be submitted as indicated at 10102.

Upon submission of the quote and approval, the organization's environment may be updated. FIG. 102 depicts a graphical user interface for upgrading an environment with physical resources. At 10202, an upgrade drop-down dialog provides an option for upgrading the environment described in the graphical user interface with a physical device. FIG. 103 is a graphical user interface depicting quotes associated with the organization and the effect of the upgrade associated with the quote. As shown at 10302, one quote is associated with the environment to be upgraded. The potential effect of that update is shown at 10304, where the number of servers, storage, and routers will be increased by the upgrade associated with the quote 10302 is indicated. Settings regarding the activation date of the upgrade and other quotes that are coterminus with the quote identified at 10302 are shown at 10306.

Once any steps necessary to physically incorporate the physical device into the network containing physical resources for facilitating virtual servers are complete, the physical device may be provisioned and one or more setup tasks may be executed. FIG. 104 depicts a graphical user interface displaying a number of setup tasks that are currently in progress for incorporating a number of physical devices into an environment. FIG. 105 depicts a graphical user interface showing the completion of a number of setup tasks that have been completed in incorporating a number of physical devices into an environment. FIG. 106 depicts a graphical user interface for updating the status of a physical device. Once the physical device has been provisioned and setup tasks have been completed, the physical device may be noted as being active.

Figure 107:
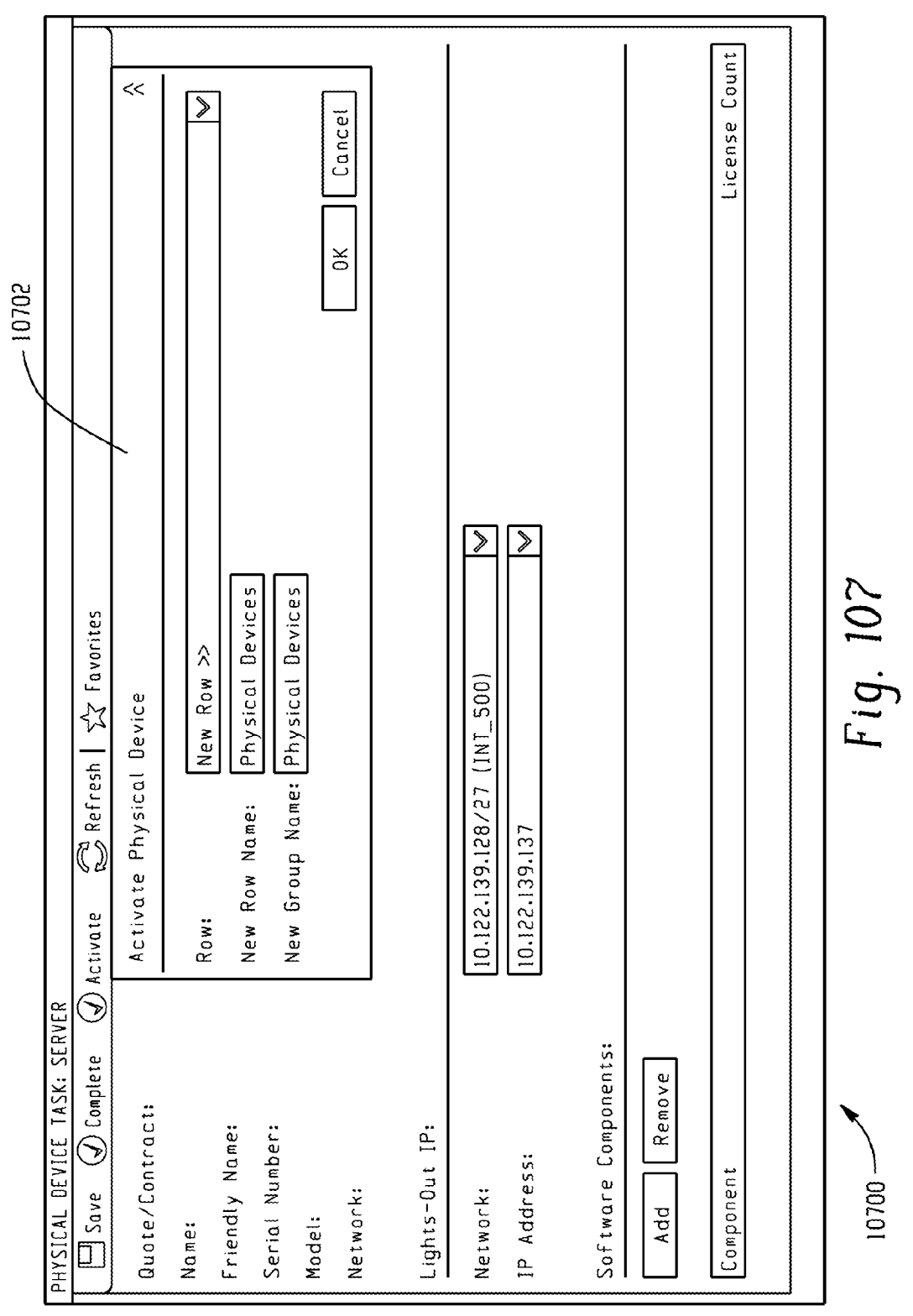
Figure 108:
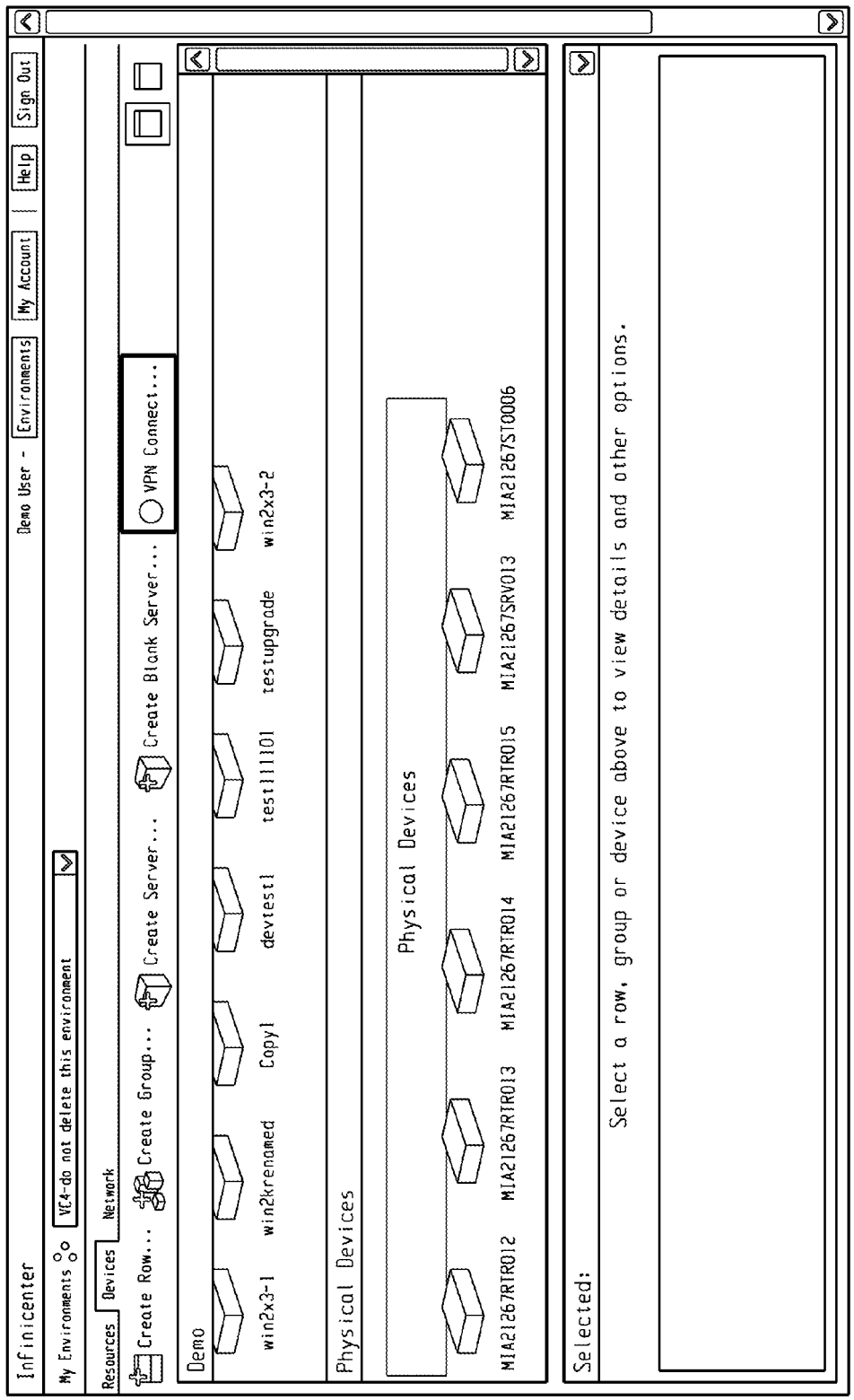

FIG. 107 depicts a graphical user interface for activating a physical device in an environment. In activating the physical device, a dialog 10702 is provided for identifying a row and group with which the physical device is to be associated. The row and group are an organizational tool for visualizing an organization's environment. FIG. 108 is a graphical user interface depicting a plurality of physical devices in the "Physical Devices" row and the "Physical Devices" group.

Figure 109:
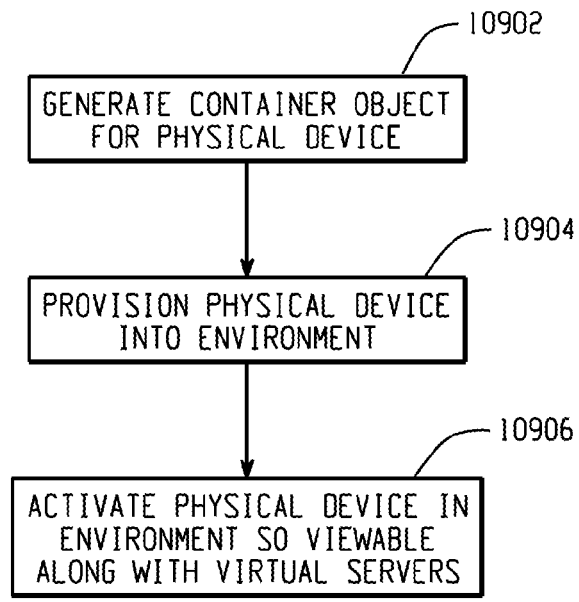
FIG. 109 depicts a computer-implemented method of incorporating a physical device into an environment containing one or more virtual servers associated with a physical server, disk drive, and networking resources via a virtualization control system that partitions physical resources into virtual resources including a virtual processor, memory, and storage resources.

FIG. 109 depicts a computer-implemented method of incorporating a physical device into an environment containing one or more virtual servers associated with a physical server, disk drive, and networking resources via a virtualization control system that partitions physical resources into virtual resources including a virtual processor, memory, and storage resources. At 10902, a container object is generated for a physical device to be incorporated into the environment containing one or more virtual servers, where the container object comprises a logical representation of the physical device to be incorporated. At 10904, the physical device is provisioned into the environment by associating the physical device with the container object, and at 10906, the physical device is activated in the environment such that the physical device is viewable via a virtualization control system console along with the one or more virtual severs also contained within the environment.

Figure 110:
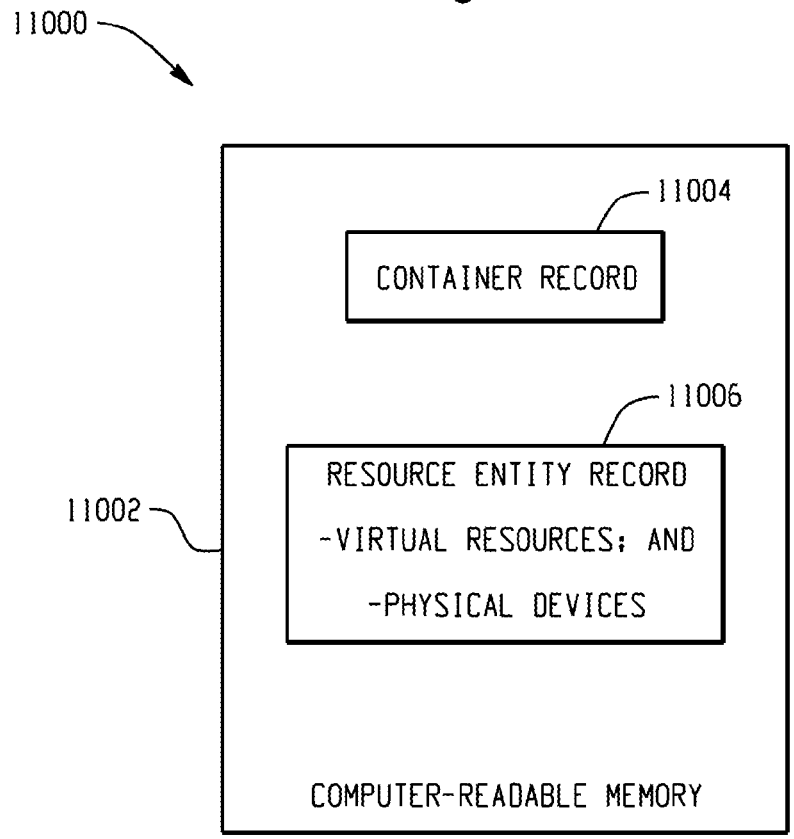
FIG. 110 is a block diagram depicting an apparatus for managing an environment containing one or more virtual servers associated with a physical server, disk drive, and networking resources via a virtualization control system that partitions physical resources into virtual resources including a virtual processor, memory and storage resources.

FIG. 110 is a block diagram depicting an apparatus for managing an environment containing one or more virtual servers associated with a physical server, disk drive, and networking resources via a virtualization control system that partitions physical resources into virtual resources including a virtual processor, memory and storage resources. The apparatus includes a computer readable memory 11002 that stores data structures. The data structures include a container record 11004 that is associated with a customer. The data structures further include a plurality of resource entity records 11006. Each resource entity record is associated with an environment record, and each resource entity record is associated with a virtual resource or physical device. A virtual resource is associated with a physical server, disk drive, and networking resources via a virtualization control system that partitions physical resources into virtual resources including a virtual processor, memory and storage resources. A resource entity record associated with a physical device identifies the physical device by an address, and the resource entity records enable virtual resources and physical devices associated with a same environment record to communicate on a single network.

Figure 111A:
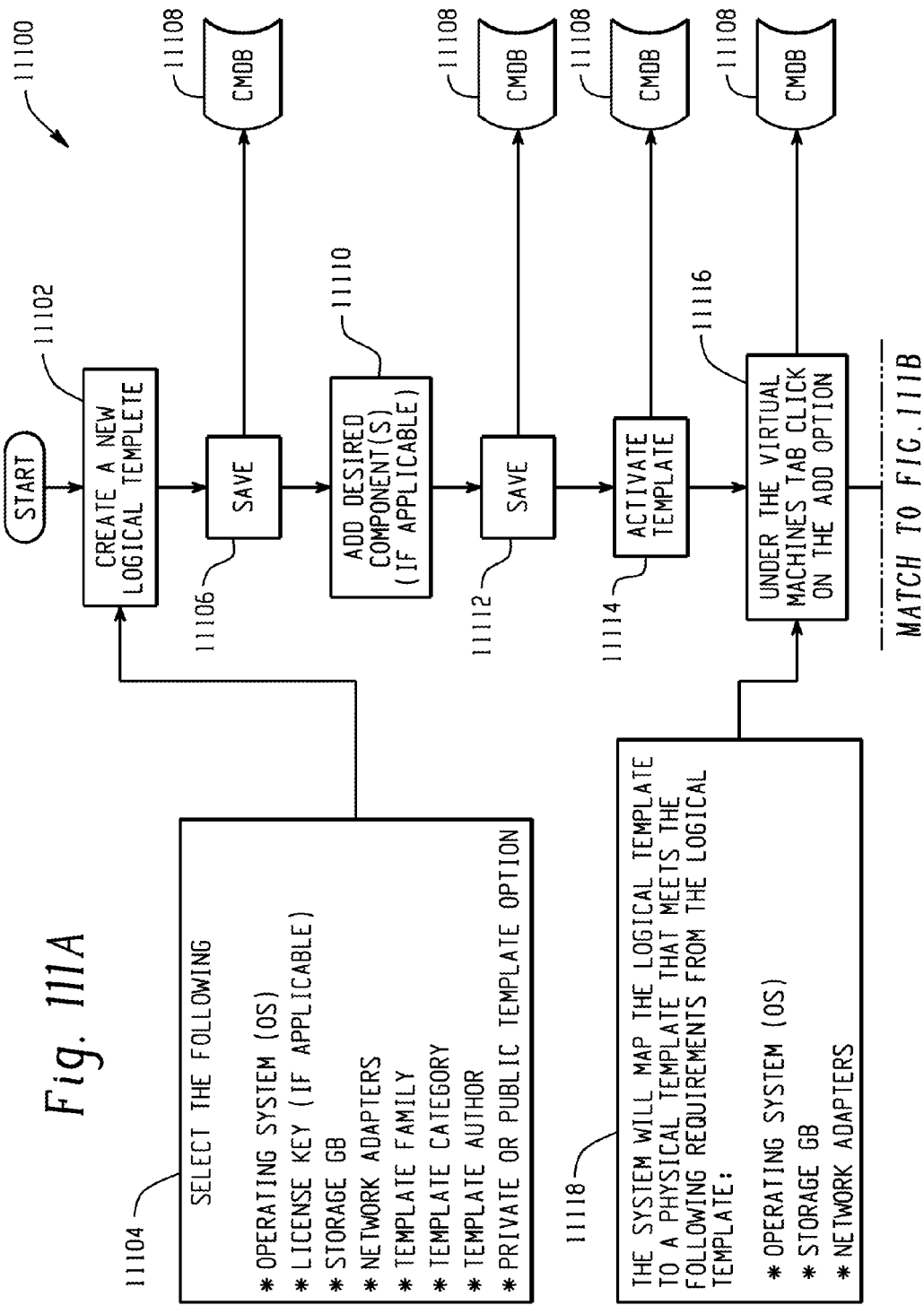
FIGS. 111A and 111B are a flow diagram depicting a process of creating a virtual server using a template.
Figure 111B:
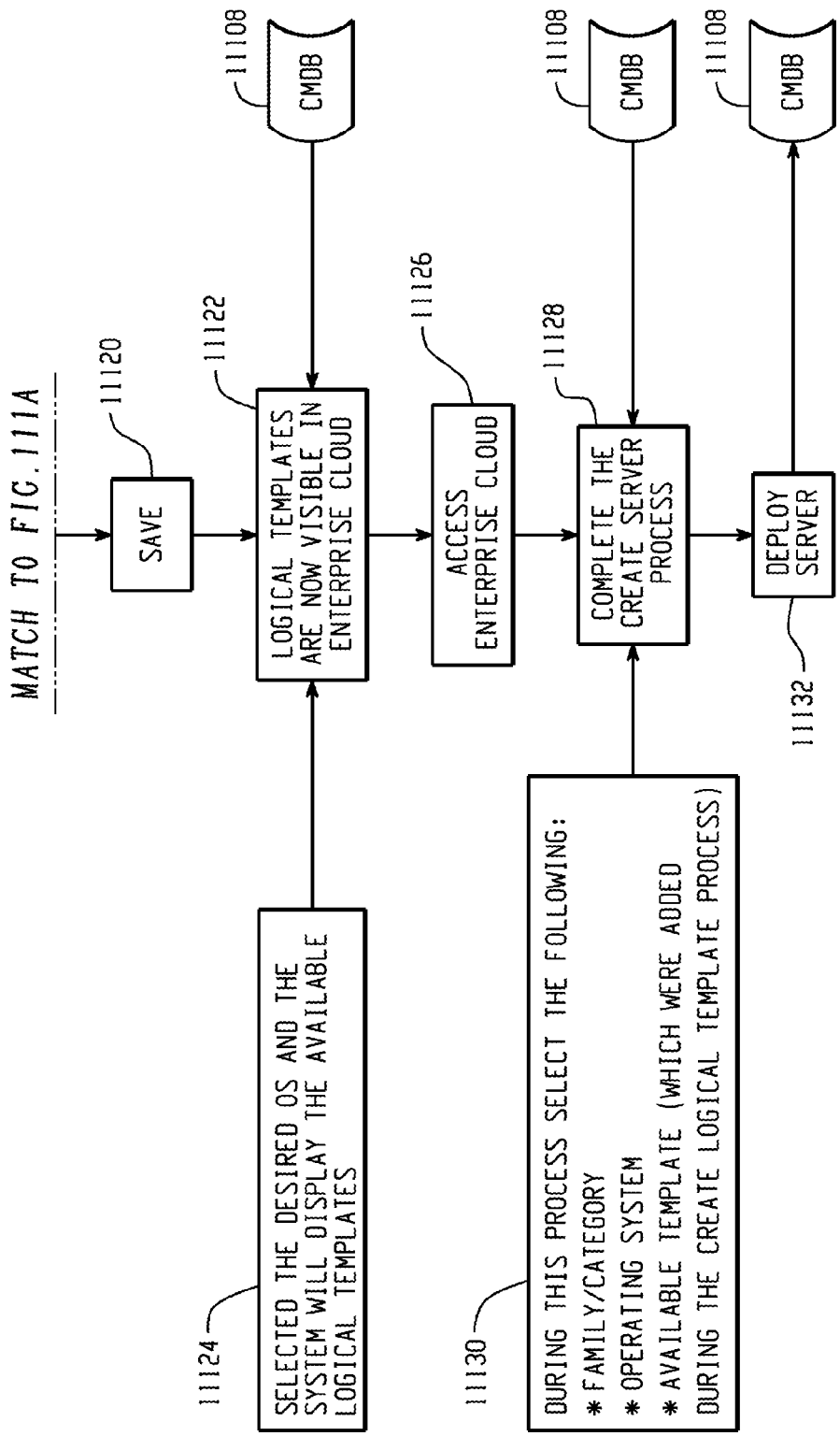

FIGS. 111A and 111B are a flow diagram depicting a process of creating a virtual server using a template. A logical template describes a number of configurable settings for a virtual environment. At 11102, a new logical template is created. As noted at 11104, the configurable settings for the logical template may include an operating system selection, a license key, a storage amount, and a network adapter. A logical template may also be associated with a template family, a template category, and a template author for organizational and search purpose. For example, a template may be associated with the Windows family, the web servers category, and may identify Provider A as an author. Using these associations, one seeking a template for creating a new virtual server could locate the template by searching based on that template family, category, and author. A template may also be identified as private or public, wherein a public template is viewable to all, while a private template is limited in who is able to view the template. Upon creation, the new template may be saved 11106 in the CMDB 11108.

Additional components may be added to the template at 11110. For example, a Microsoft Exchange Component or an SQL component may be added to the template. In this manner, pricing for a system according to the template may be calculated based on the configurable settings and further based on the added components. The template may be saved again at 11112 and may be activated at 11114, such that physical templates may be associated with the logical template.

At 11116, one or more physical templates are associated with the logical template, such that a one-to-many relationship exists between a logical template and associated physical templates. A physical template is a server configuration (e.g., operating system, storage amount, and network adapters) associated with a particular location. For example, a physical template may represent an available server configuration at a particular physical resource location. For best performance, it is often desirable for an organization to be able to select a location for the physical resources for virtual servers. This desired location may be close to some or all of the organization's operations or close to some or all of the organization's customer's locations, or be based on other factors. Listing all of the available physical templates at all of the available locations for the user to choose from could be confusing to a user. Thus, the logical templates are available as an abstraction, where the organization can select a template that recites parameters for their new virtual server and a desired location, and the virtualization control system can select a physical template for implementing that virtual server without the confusion of a long list of physical templates.

The associations between logical templates and physical templates are saved at 11120, and the logical templates are made visible at 11122 to organizations for selecting. For example, as indicated at 11124, an organization may select a desired operating system, and available logical templates may be displayed. An organization may access a virtualization control system console at 11126 and complete the create server process at 11128 by selecting a logical template via search mechanisms, as shown at 11130. Upon selection of a logical template and selection of a location or through use of a default location such as a closest location, a virtual server may be deployed at 11132 using a physical template associated with the selected logical template and the location.

Figure 112:
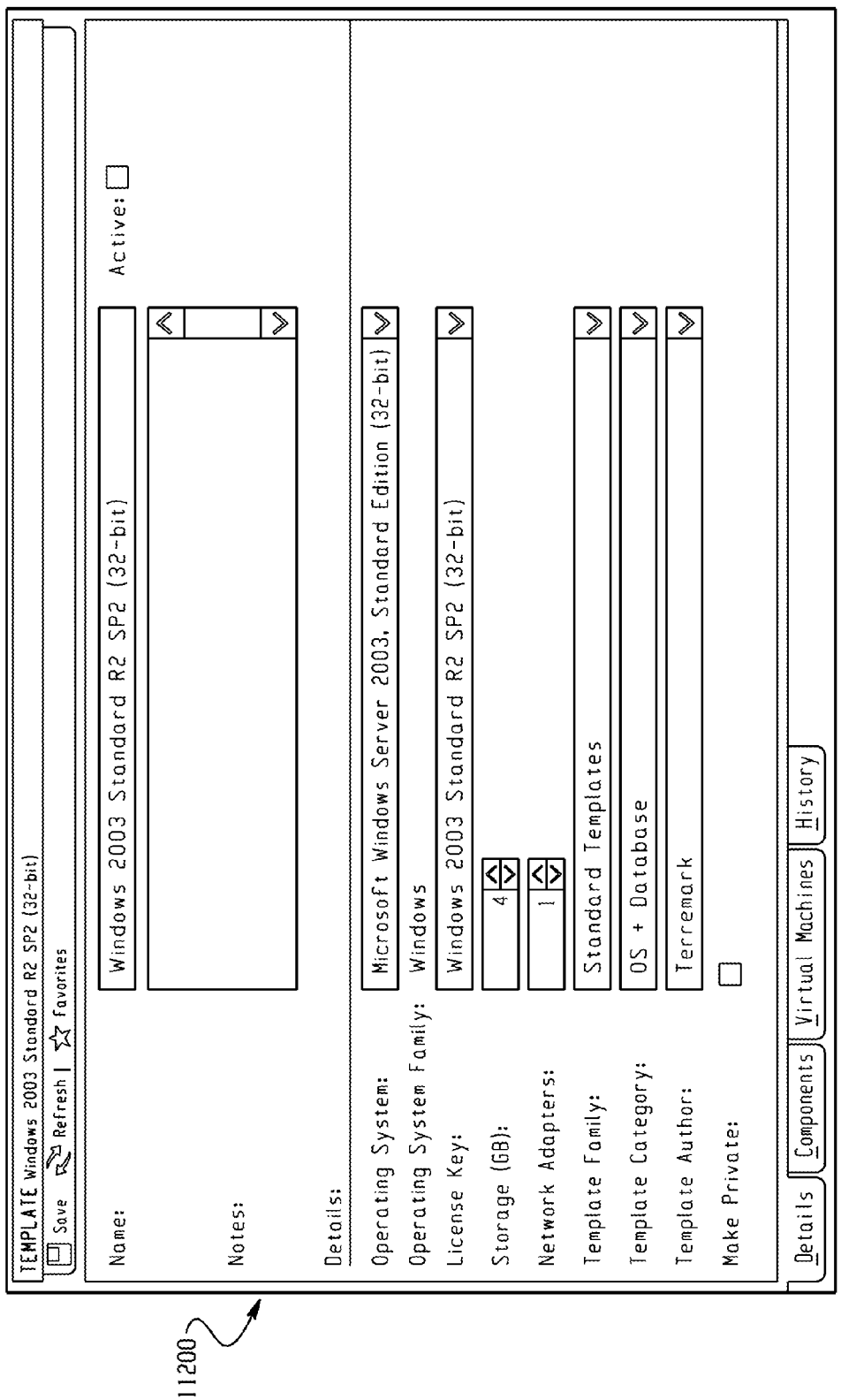
Figure 113:
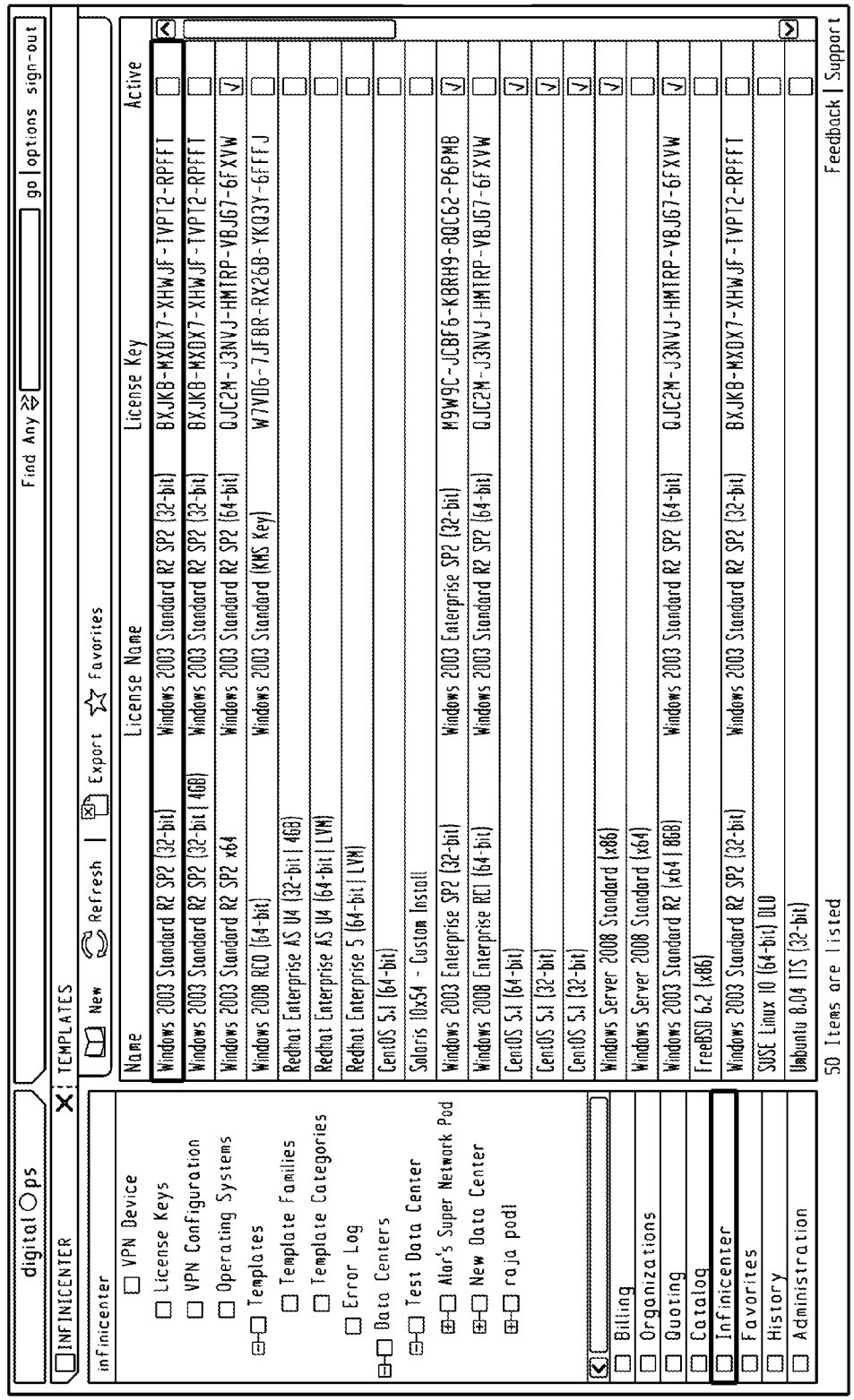

FIG. 112 depicts a graphical user interface for defining a local template. The logical template includes a specification of the name of the logical template, the operating system, the license key, a storage amount, a number of network adapters, as well as a template family, template category, and template author. The logical template definition window also includes toggles for indicating whether the logical template is active and whether the logical template is private. If switched to private, additional options may be provided for identifying to whom the logical template should be visible. FIG. 113 depicts a graphical user interface displaying a listing of logical templates along with indicators as to whether those logical templates are active.

Figure 114:
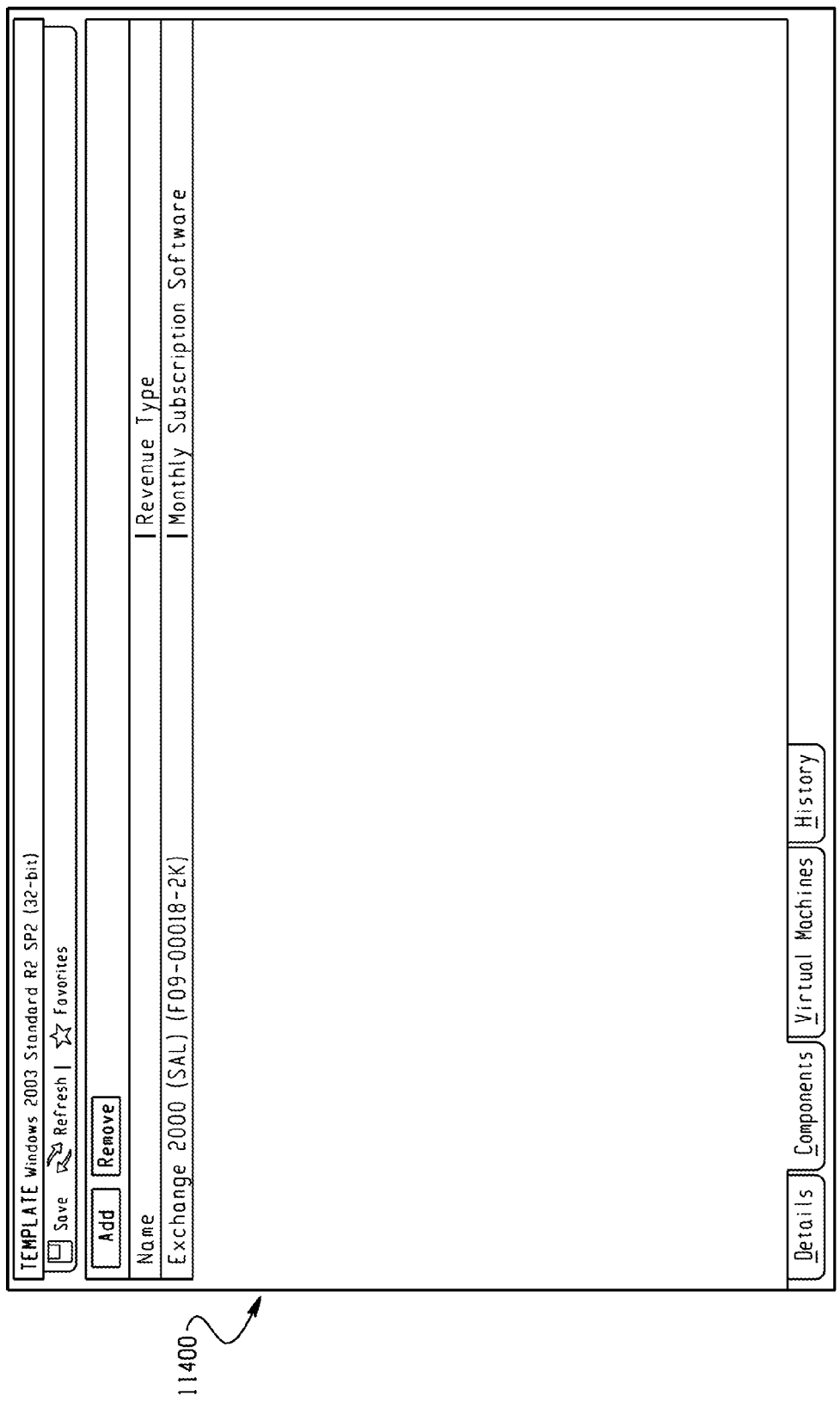

FIG. 114 is a graphical user interface depicting components added to a logical template. In this example, an Exchange 2000 component has been added to a selected logical template. Components may be added or removed using the depicted controls. FIG. 115 depicts a graphical user interface where a depicted logical template has been identified as being active.

Figure 116:
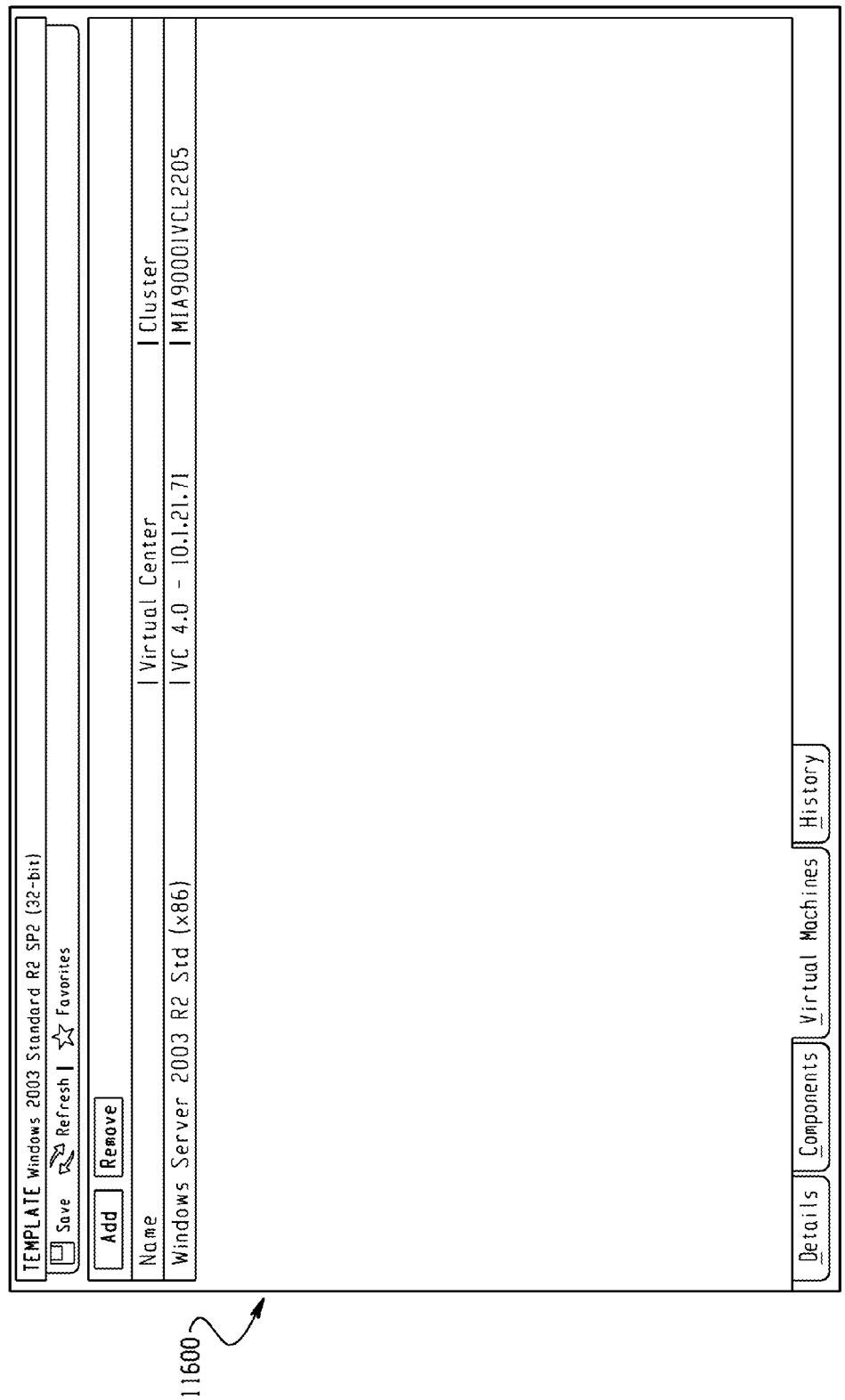

FIG. 116 is a user interface for associating logical templates with physical templates. In FIG. 116, the Windows 2003 Standard R2 SP2 (32-bit) logical template has been associated with one physical template located at cluster MIA90001VCL2205 in Miami. Additional physical template associations may be added such that the relationships between the logical template and the physical templates are one-to-many. After a logical template has been associated with one or more physical templates, the logical template may be made visible to an organization, where it can be selected for creating a new virtual server according to the specification of the logical template using an associated physical template.

Figure 117:
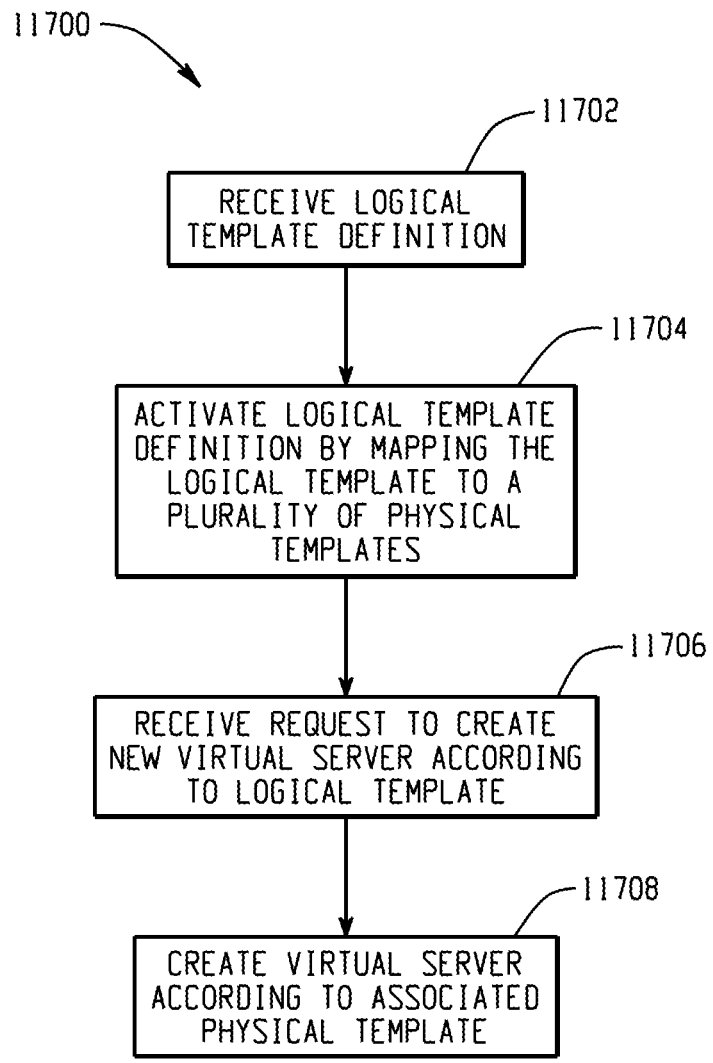
FIG. 117 is a flow diagram depicting a computer-implemented method of creating a virtual server using a template, where the virtual server is associated with a physical server, disk drive, and networking resources via a virtualization control system that partitions physical resources into virtual resources including a virtual processor, memory, and storage resources.

FIG. 117 is a flow diagram depicting a computer-implemented method of creating a virtual server using a template, where the virtual server is associated with a physical server, disk drive, and networking resources via a virtualization control system that partitions physical resources into virtual resources including a virtual processor, memory, and storage resources. At 11702, a logical template definition is received, where the logical template definition specifies an operating system, a disk storage amount and a network parameter. At 11704, the logical template definition is activated, where activating the logical template definition maps the logical template definition to a plurality of physical templates that meet the operating system, disk storage amount, and network parameters required by the logical template definition, where a physical template is associated with a location. At 11706, a request to create a new virtual server is received according to the logical template definition. The new virtual server is created at 11708 according to the logical template by provisioning virtual resources according to a physical template associated with the logical template whose associated location is closest to a requested location to create the new virtual server.

Figure 118:
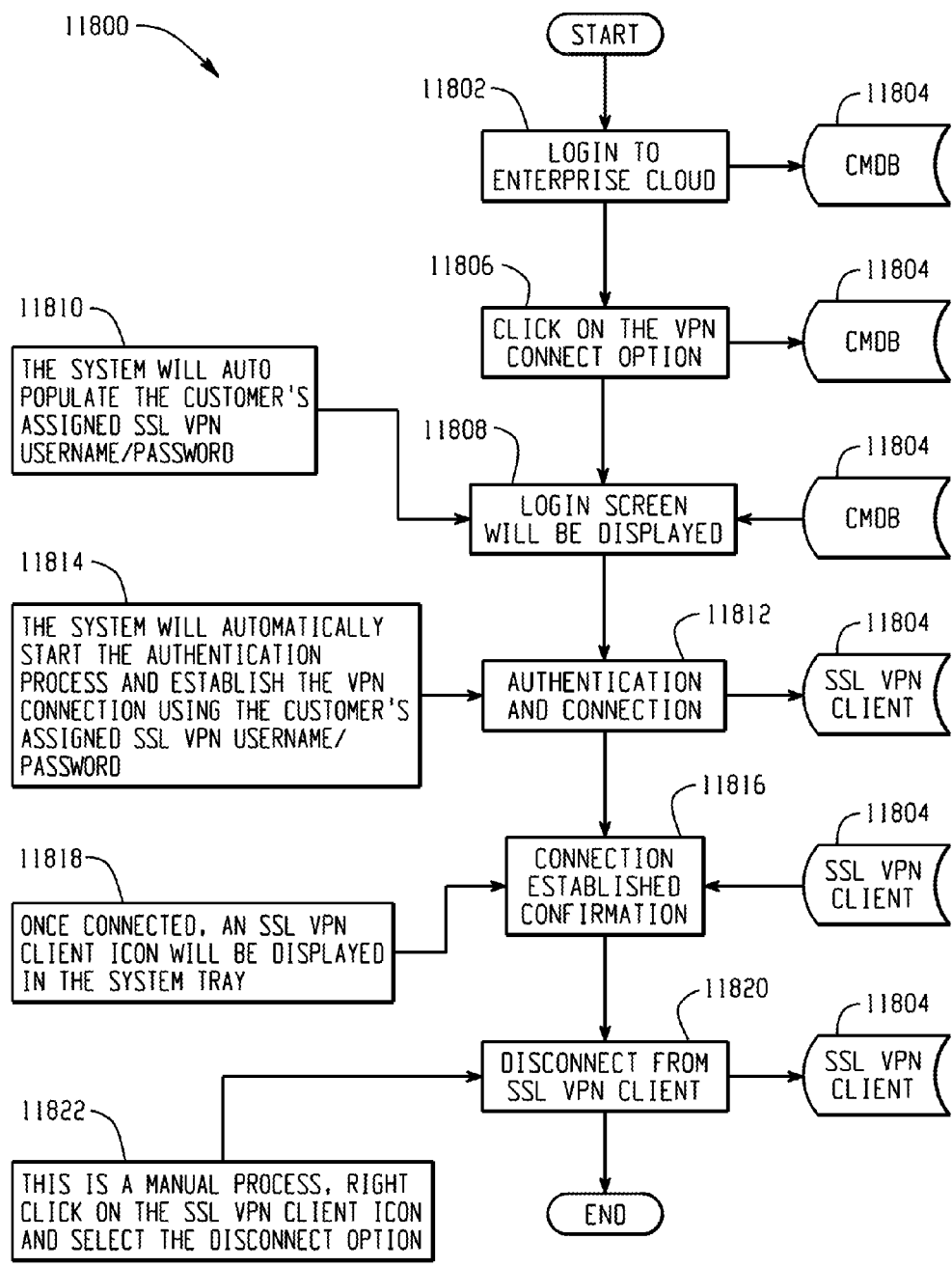
FIG. 118 is a flow diagram depicting a computer-implemented method of providing access to a virtual server through a virtualization control system.

FIG. 118 is a flow diagram depicting a computer-implemented method of providing access to a virtual server through a virtualization control system. A sole-user or a user associated with an organization may log into a virtualization control system to manage an environment containing one or more virtual servers and/or physical devices. For security reasons, the entities in the environment may be on a private IP address space and may not be accessible via a public network such as the Internet. Thus, to access one of these entities, a VPN connection is required. The CMDB contains data related to entities contained within an environment. For example, the CMDB contains data identifying all of the virtual servers associated with an environment. The CMDB may also be configured to store VPN login data for each of those virtual servers. Thus, a user logged into the virtualization control system could be provided with a mechanism for automatically achieving a VPN connection without being required to enter login information beyond the first login information required to login to the virtualization control system.

At 11802, a user logs into their enterprise cloud via the virtualization control system using a first login. The virtualization control system verifies the login based on data in the CMDB 11804. After logging in, the user may click on the VPN connect option, identifying a virtual server with which the user wishes to connect. Any necessary downloads for facilitating the connection are provided (e.g., if this is the user's first VPN connection), and a login screen requesting data such as a user name and password is displayed at 11808. The virtualization control system auto-populates the login information, as described at 11810, and the login information is verified and connection to the virtual server is initiated at 11812. As noted at 11814, the system may automatically start the authentication process and establish the VPN connection using the user's assigned SSL VPN username/password accessed from the CMDB 11804. A confirmation of the VPN connection to the virtual server may be displayed at 11816, and an icon showing the status of the connection may be displayed in the system tray at 11818. After selection of the VPN connect option, a system may be configured to require no additional input from the user before the VPN connection is established. Upon request from the user, the VPN connection may be disconnected at 11820. For example, the user may request a disconnection by right-clicking on the SSL VPN client icon in the system tray and selecting a disconnect option, as described at 11822.

Figure 119:
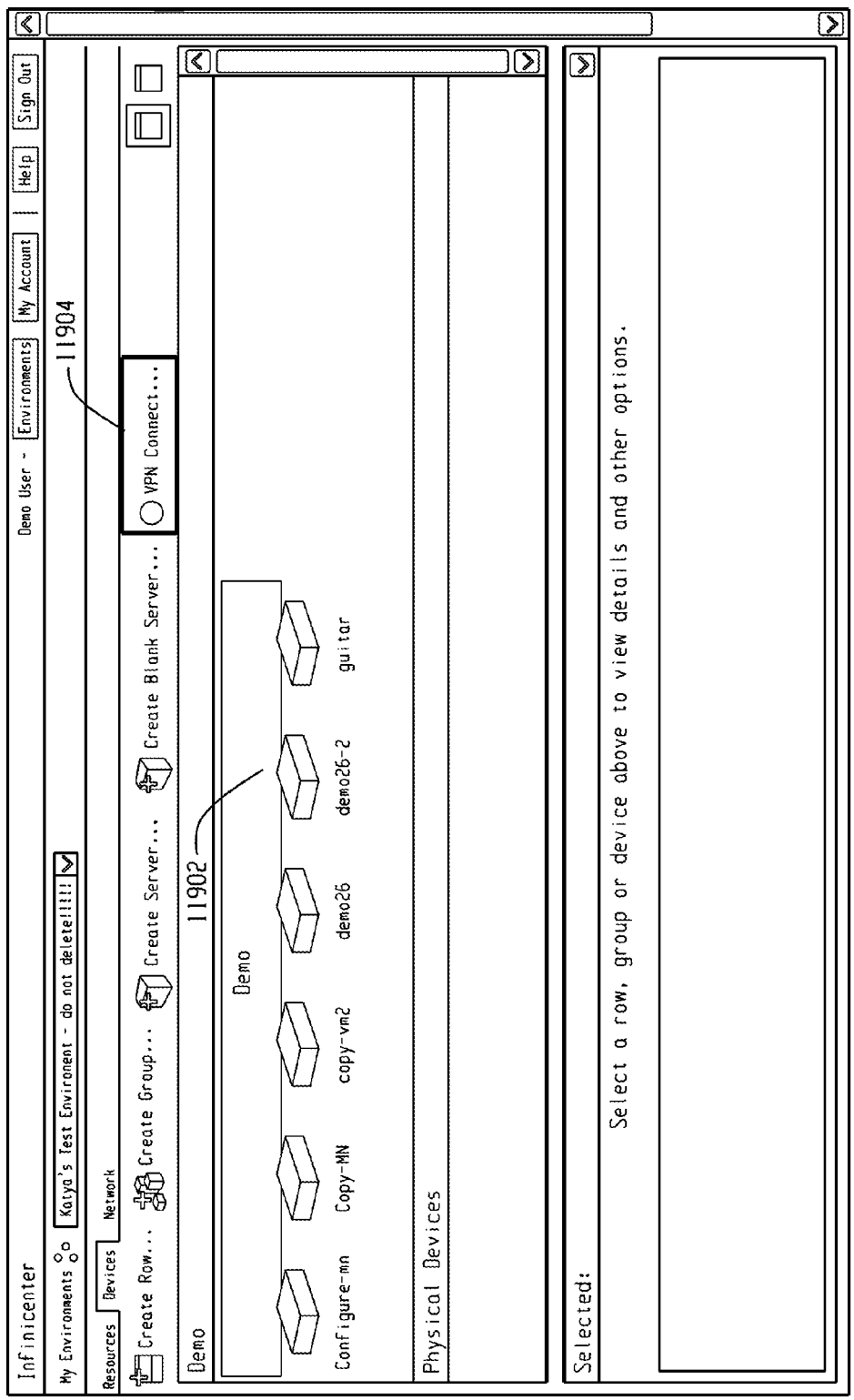
FIGS. 119-123 are graphical user interfaces for facilitating providing access to a virtual server through a virtualization control system.
Figure 120:
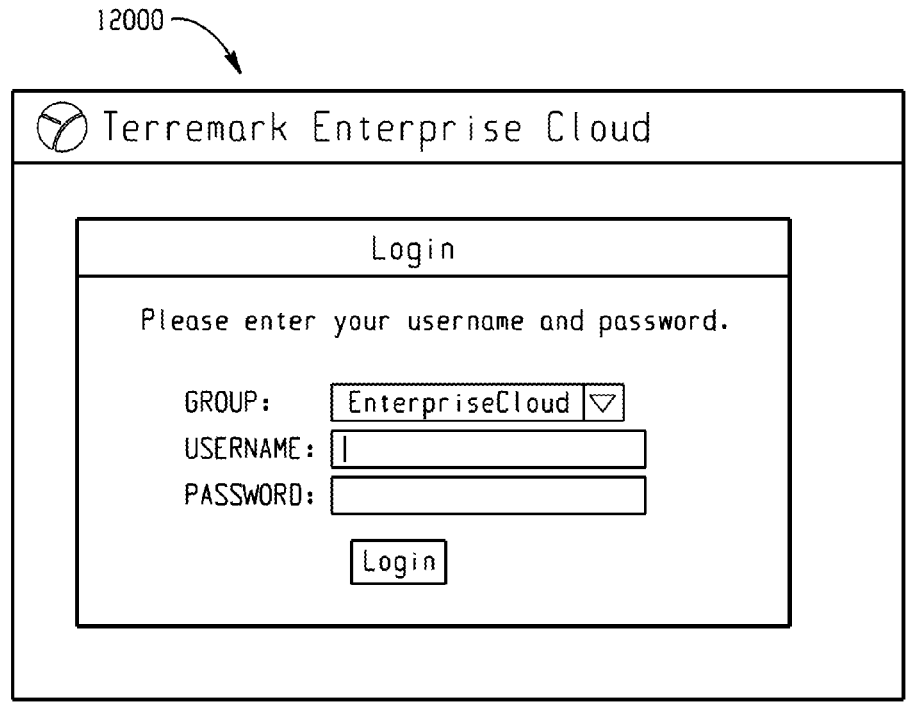
Figure 121:
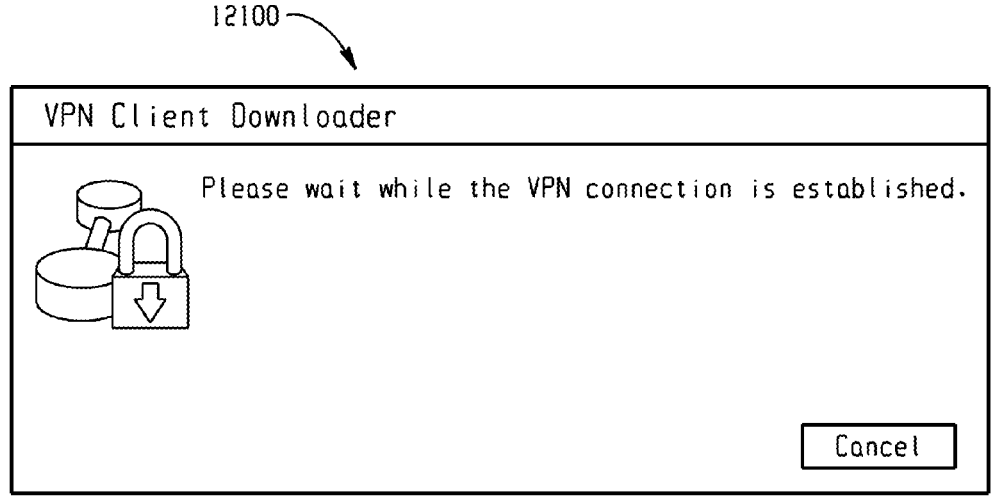
Figure 122:
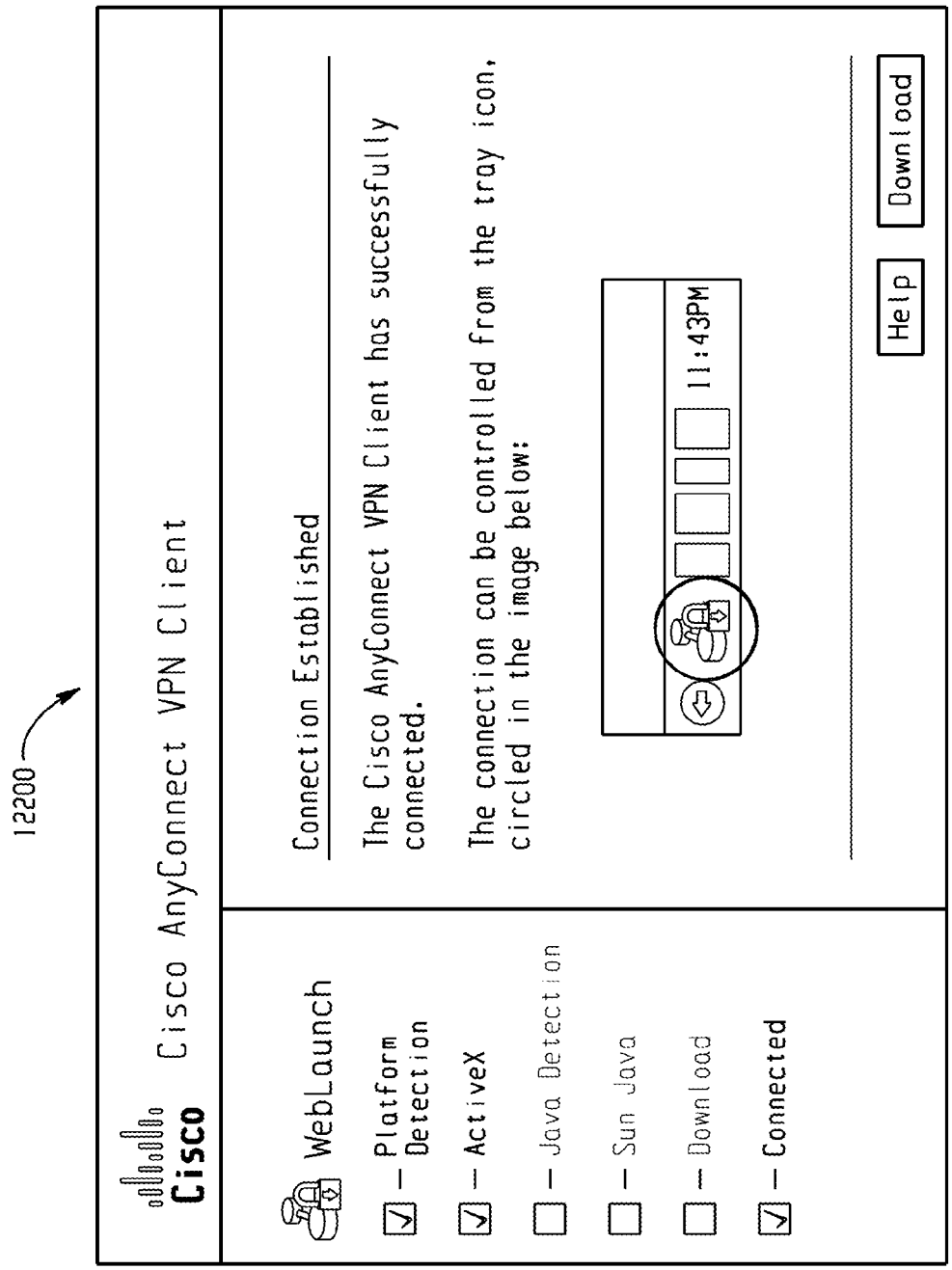
Figure 123:
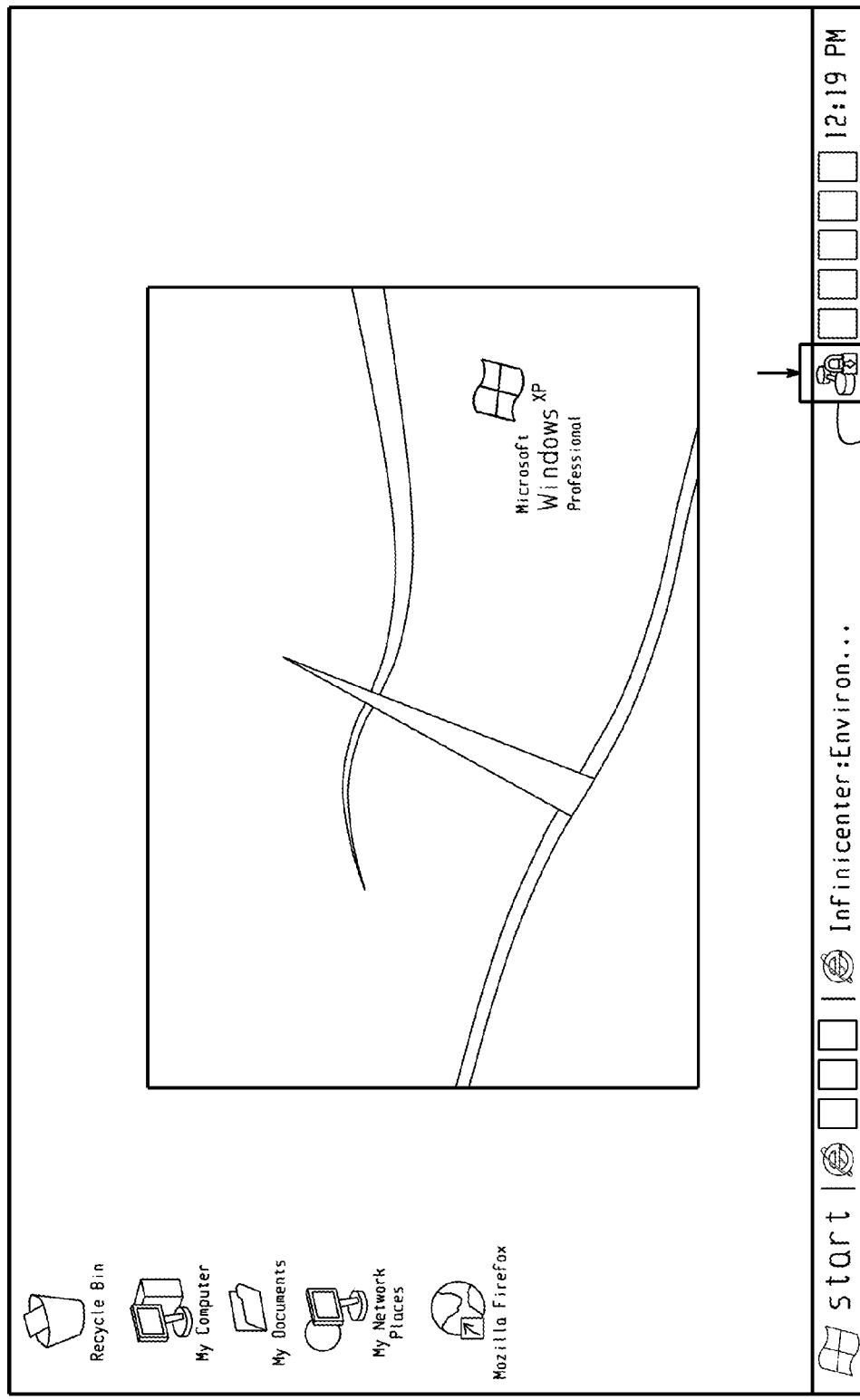

FIG. 119 is a graphical user interface where a virtual server 11902, demo 26-2, has been selected, and a VPN Connect control 11904 has been activated. Upon receiving a VPN connect request, a login screen, such as depicted in FIG. 120, may be provided, and the login data (e.g., a username and password) may be populated after being retrieved from the CMDB. FIG. 121 depicts a display that may be provided while a VPN connection is being established, and FIG. 122 depicts a screenshot of a connection confirmation. FIG. 123 is a screenshot of a windows desktop where a system tray icon is depicted at 12302 indicating a VPN connection is currently established with a virtual server.

Figure 124:
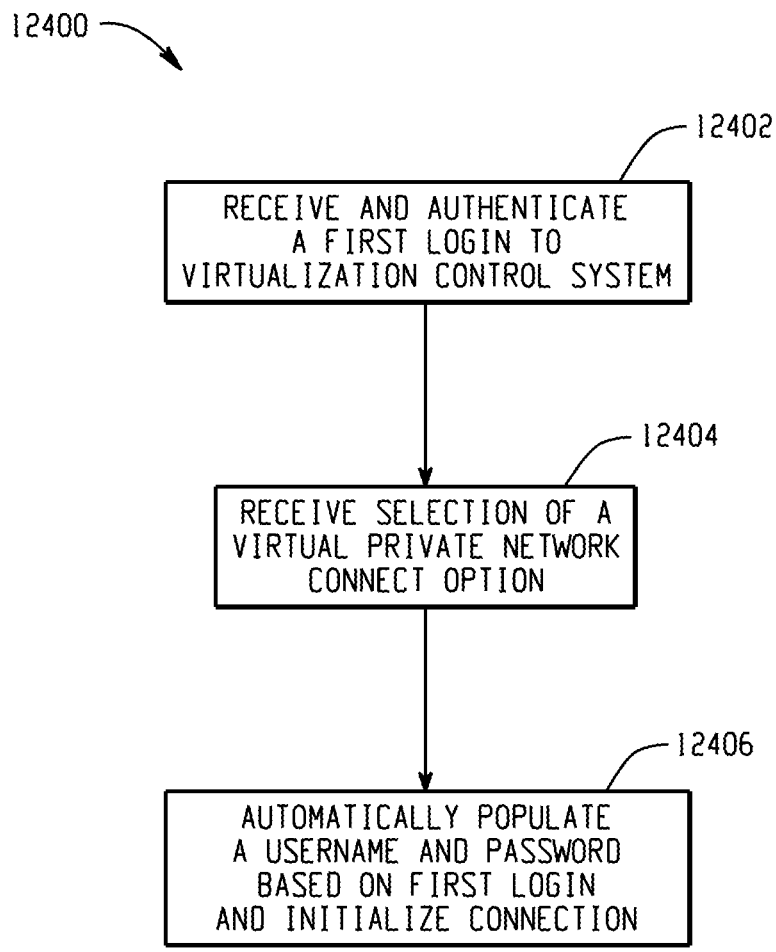
FIG. 124 is a flow diagram depicting a computer-implemented method of providing access to a virtual server through a virtualization control system interface associated with a virtualization control system that partitions physical resources into virtual resources including a virtual processor, memory, and storage resources for a virtual server.

FIG. 124 is a flow diagram depicting a computer-implemented method of providing access to a virtual server through a virtualization control system interface associated with a virtualization control system that partitions physical resources into virtual resources including a virtual processor, memory, and storage resources for a virtual server. At 12402, a first login to the virtualization control system is received and authenticated. A selection of a virtual private network connect option is received at 12404. At 12406, a username and password are automatically populated for a VPN login based on the first login, and a connection to the virtual server is initialized using the automatically populated username and password, where access to the virtual server is provided through a VPN connection.

Figure 125A:
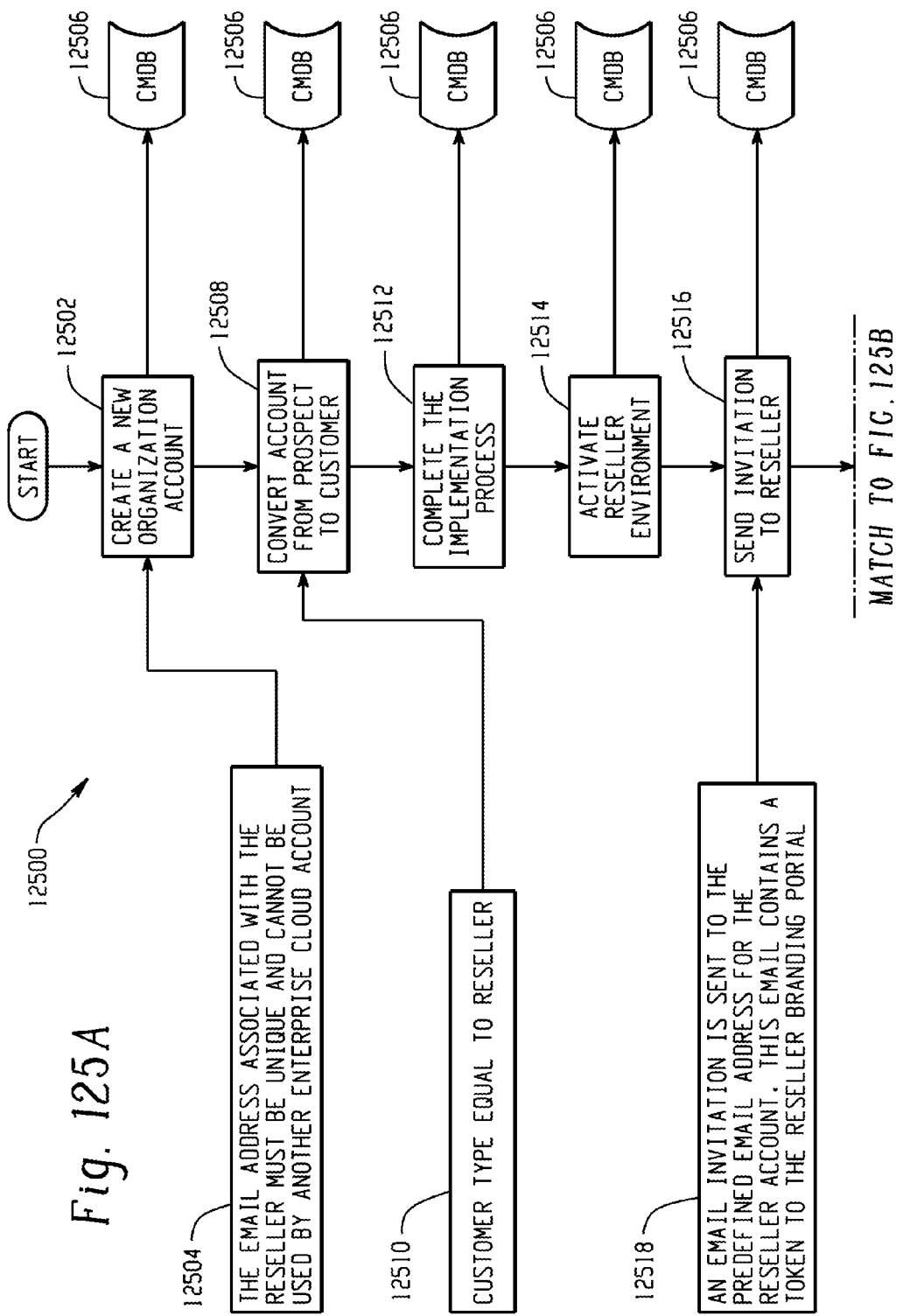
FIGS. 125A and 125B are a flow diagram depicting a computer-implemented method of branding a virtual environment generation service provided by a first entity to appear to be provided by a second entity.
Figure 125B:
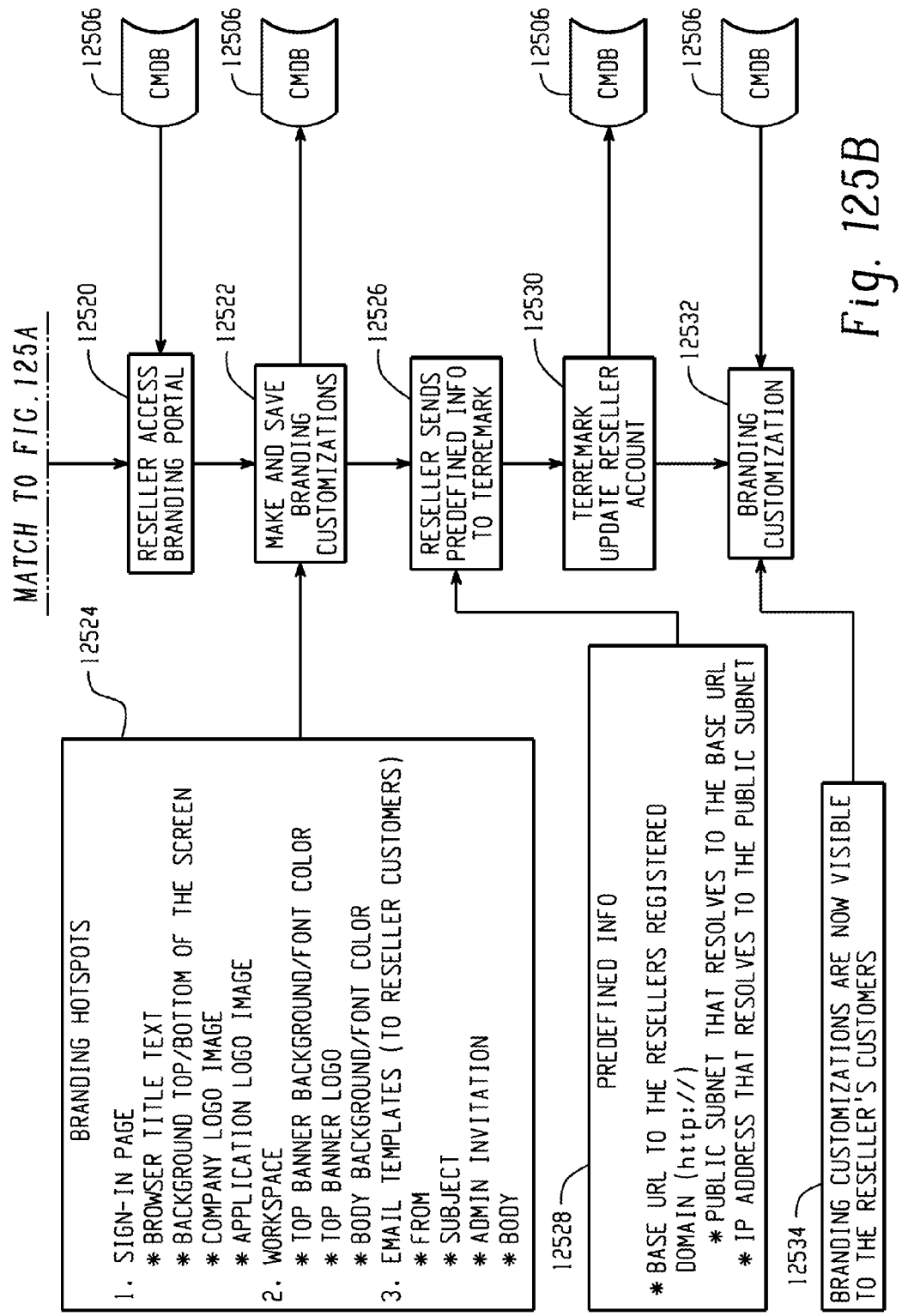

FIGS. 125A and 125B are a flow diagram depicting a computer-implemented method of branding a virtual environment generation service provided by a first entity to appear to be provided by a second entity. A service reseller may wish to market and sell a virtualization control system without providing the hardware and software to actually implement the virtualization control system. Thus, the service reseller may contract with a provider of a virtualization control system to provide the implementation of the system, while making the system appear to be provided by the service reseller. A user would then be able to purchase virtualization services from the service reseller without knowledge that the implementation is being provided by a separate entity.

A service reseller creates a new organization account with the virtualization control system implementation provider at 12502. Account restrictions similar to other organization accounts may be implemented as indicated at 12504, such as a requirement that the email address associated with the reseller account must be unique and cannot be used by another account. The new account information is stored in the CMDB 12506. At 12508 the organization account is converted from prospect status to customer, and the customer type may be set as a reseller, as shown at 12510. Additional steps to complete the registration process may be performed at 12512 and the reseller's environment may be activated at 12514. Upon activation, an invitation may be sent to the reseller at 12516. As noted at 12518, an email invitation may be sent to the email address associated with the reseller account with a token for access to the reseller branding portal.

The reseller is then able to access the branding portal at 12520. The reseller can then customize several options at 12522 so that customers to whom they are selling view interface screens that represent the reseller and not the virtualization control system while retaining the functionality of the virtualization control system for the customer. Example customizations are provided at 12524. For example, a sign-in page can be customized with custom browser title text, background colors, company logos, and application logs. A virtualization control system console workspace can have banner background/font color customizations, logo customizations, and background/font color customizations. E-mail templates may also be customized such that communications to the customer will appear to come from the reseller. For example, the from field, subject fields, and body texts may be customized as desired by the reseller.

The reseller may also provide IP information to the virtualization control system provider so that the virtualization control system provider can utilize the reseller's public address range in providing the virtualization control system, further giving the appearance that the reseller is providing the virtualization control system. The reseller provides the IP information to the virtualization control system provider at 12526. As noted at 12528, the IP information can include a base URL to the reseller's registered domain, a public subnet that resolves to the base URL, and an IP address that resolves to the public subnet. The virtualization control system provider updates the reseller account with the IP information at 12530. The virtualization control system may also be customized such that the virtualization control system can be accessed by a customer through the reseller's public address range, such as through a URL of the reseller.

At 12532, the branding customizations made by the reseller are applied to the virtualization control system such that branding customization are visible to the reseller's customers, as indicated at 12534.

Figure 126:
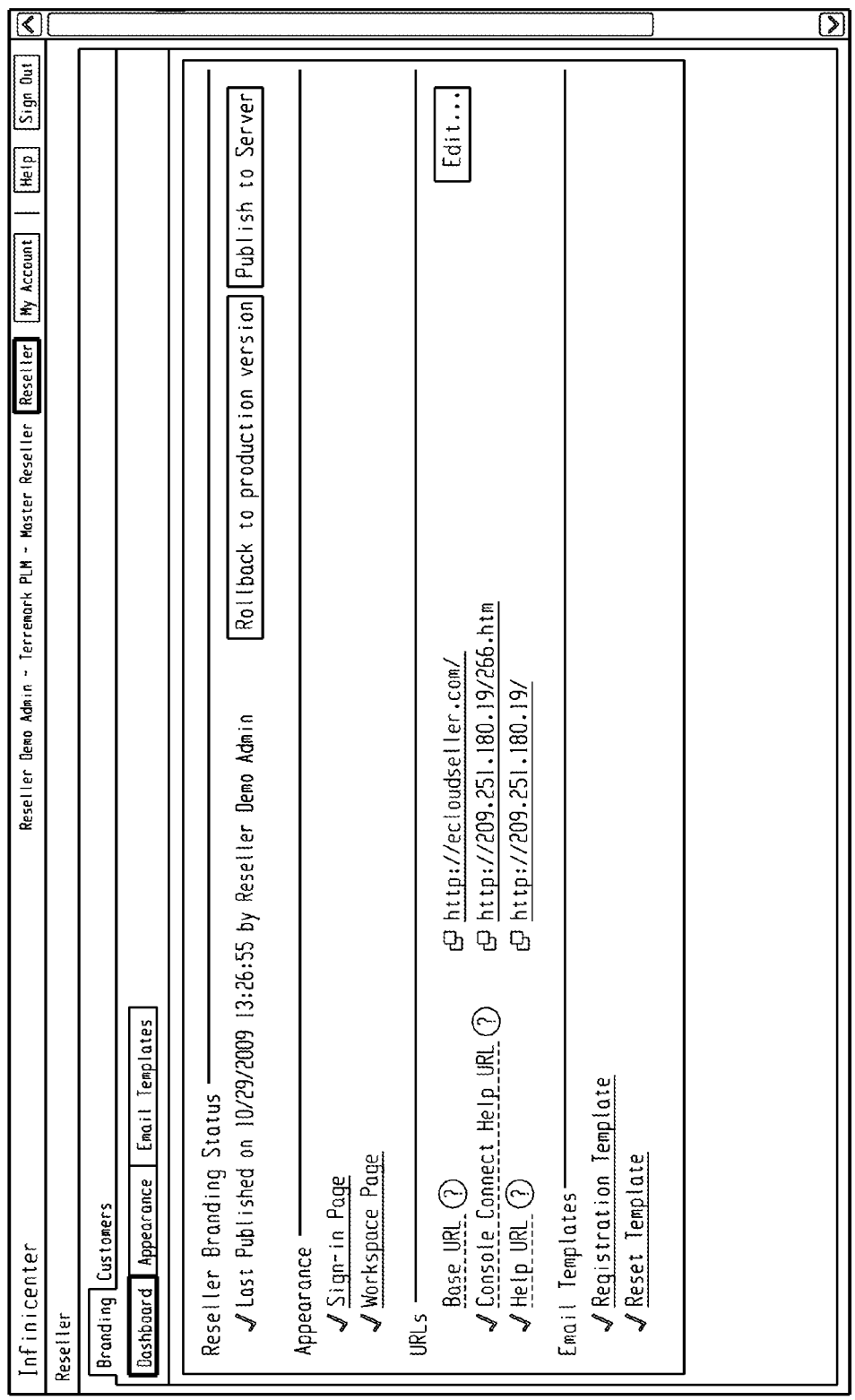
Figure 127:
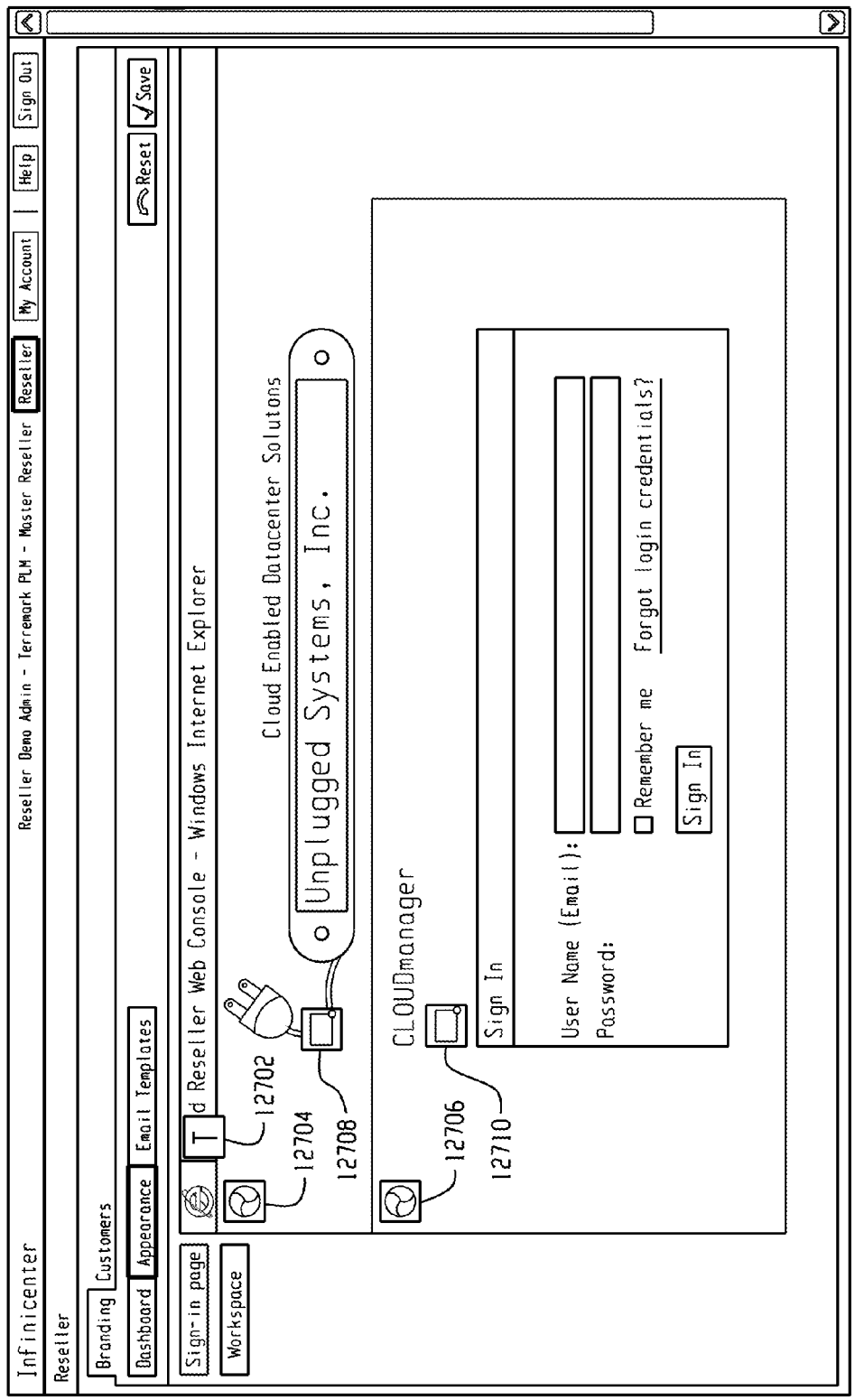

FIG. 126 is a graphical user interface for a branding portal provided to a reseller for use in customizing the virtualization control system interface for customers of the reseller. The branding portal lists a number of customizations that are available to the reseller and may also track the reseller's progress in making those branding customizations. FIG. 127 is a graphical user interface depicting an example branding customization screen that may be provided to a reseller. The customization screen includes controls for changing a number of options such as: window title text 12702, top banner properties 12704, main window properties 12706, banner graphic properties 12708, and sign-in box text properties 12710. By editing the customization options, the login screen of FIG. 127 can be made to look like it is being provided by Unplugged Systems, Inc., the reseller, when, in fact, the implementation of the virtualization control system may be provided by an entirely different entity.

Figure 128:
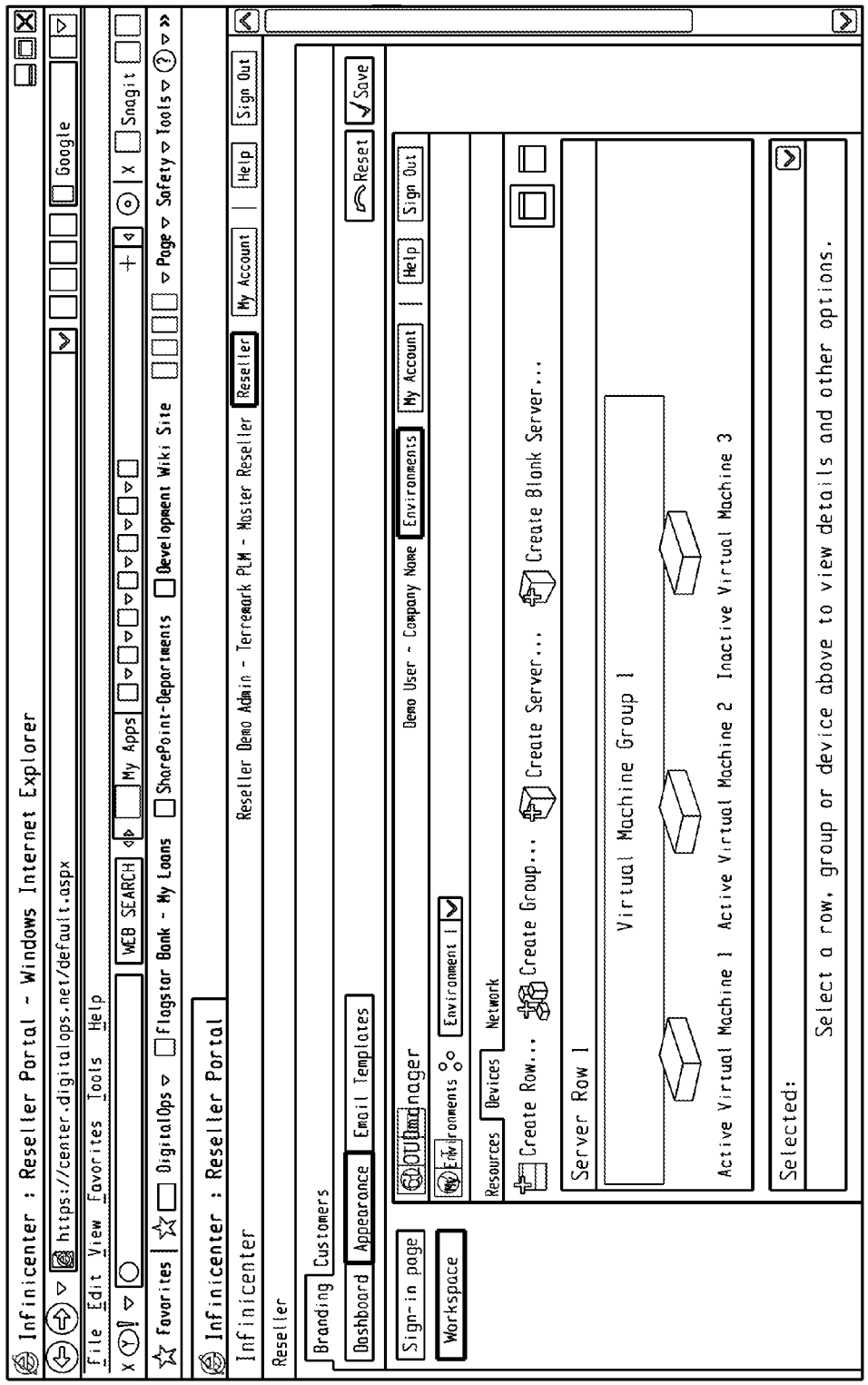

FIG. 128 is a graphical user interface depicting another branding customization screen. In FIG. 128, a virtualization control system interface is customized with graphics, text properties, background color properties, and other modifications to create the appearance that the virtualization control system is being provided by the reseller. FIGS. 129A and 129B are a graphical user interface depicting an email branding interface. The email branding interface enables automatic system email, such as those inviting a user to register as an administrator for an environment, to be customized such that it appears to be coming from the reseller. Example customizations include return e-mail address, subject, and email body text.

Figure 130:
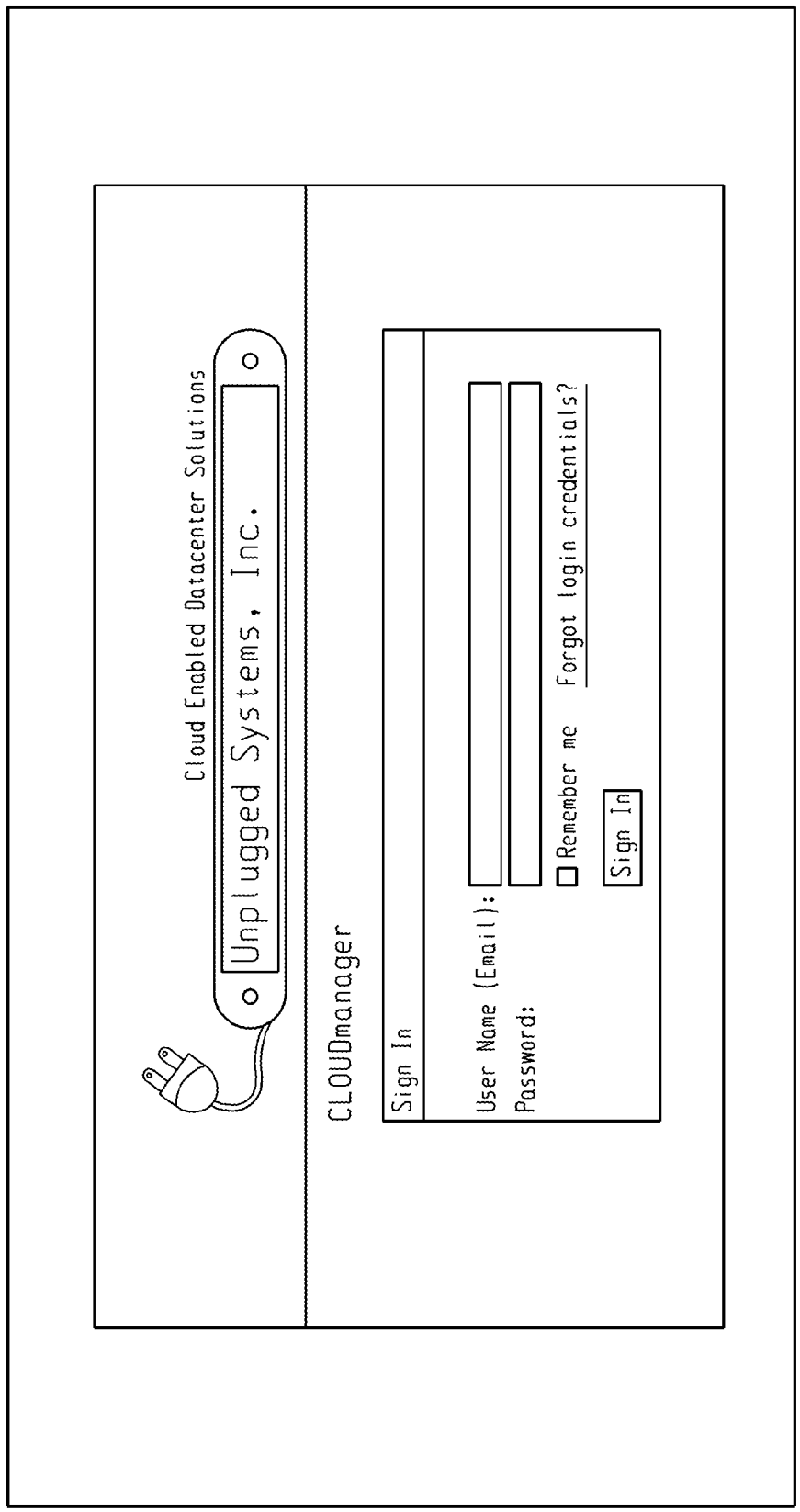
Figure 131:
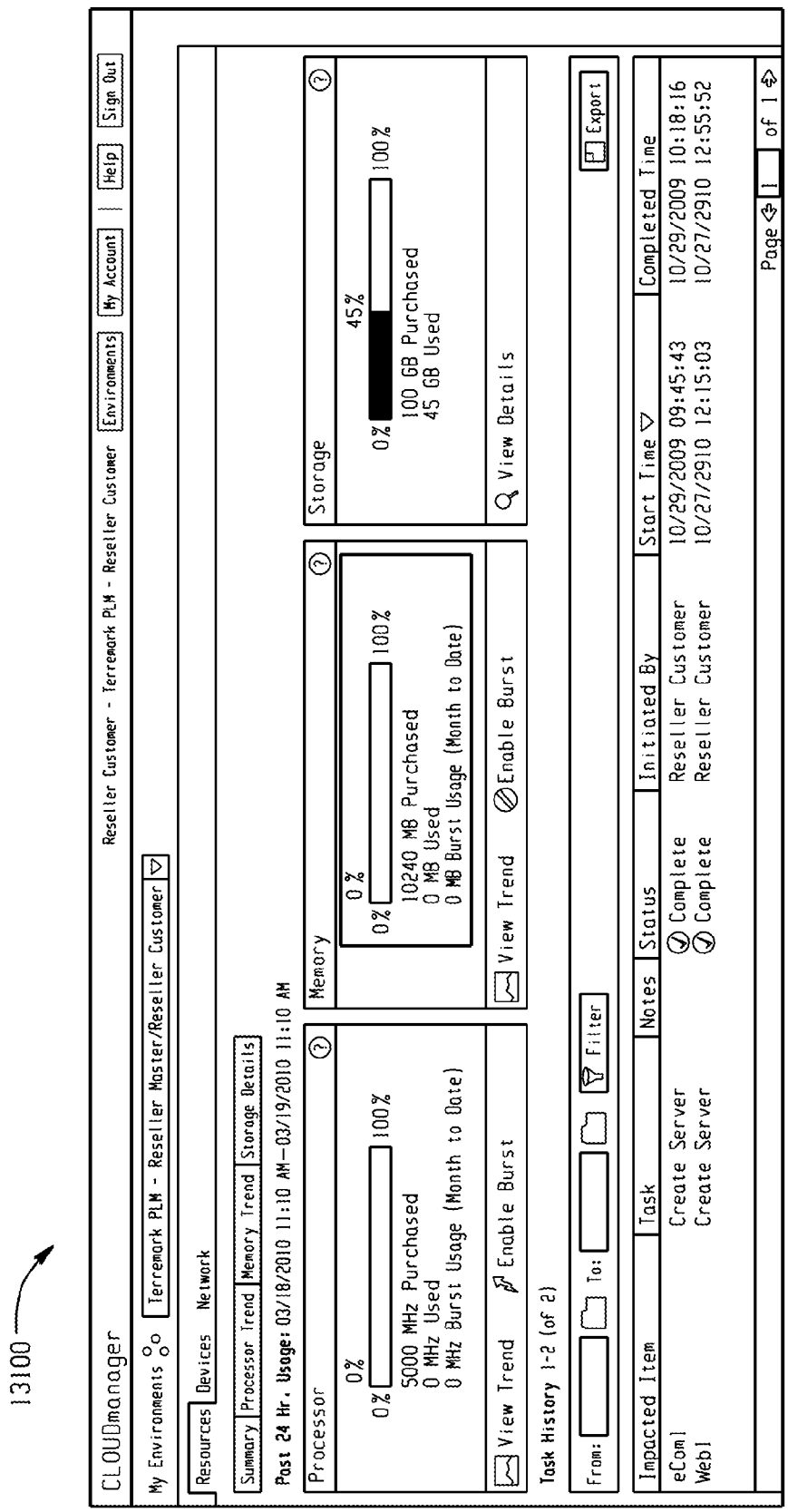

FIG. 130 depicts an example login graphical user interface. The login user interface of FIG. 130 could be provided to a customer of the reseller after the reseller implements the branding customizations depicted in FIG. 127. FIG. 131 depicts an example virtualization control system interface. The virtualization control system interface of FIG. 131 could be provided to a customer of the reseller after the reseller implements the branding customizations depicted in FIG. 128.

Figure 132:
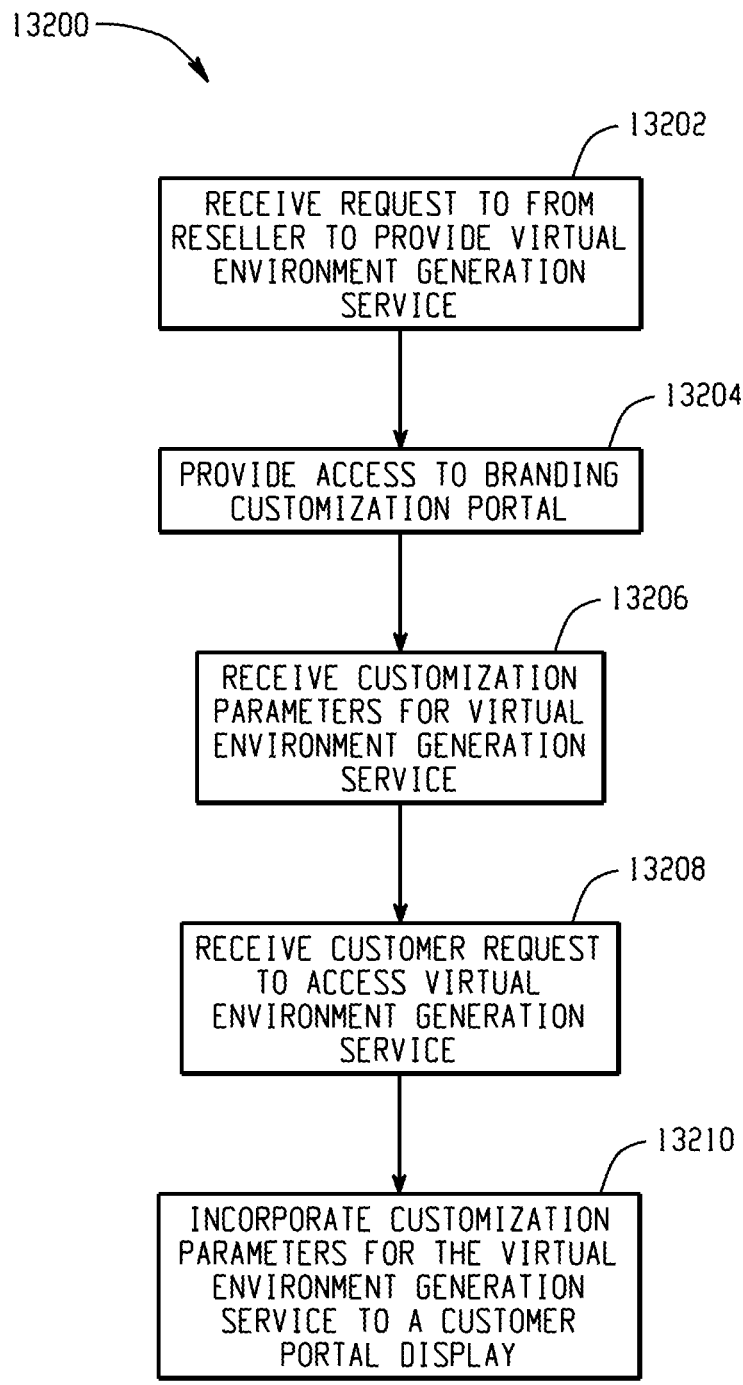
FIG. 132 is a flow diagram depicting a computer-implemented method of branding a virtual environment generation service provided by a first entity to appear to be provided by a second entity, where the virtual environment generation provides a virtual server enabled by a virtualization control system that partitions physical resources into virtual resources including a virtual processor, memory, and storage resources.

FIG. 132 is a flow diagram depicting a computer-implemented method of branding a virtual environment generation service provided by a first entity to appear to be provided by a second entity, where the virtual environment generation provides a virtual server enabled by a virtualization control system that partitions physical resources into virtual resources including a virtual processor, memory, and storage resources. At 13202, a request from a reseller is received from the first entity to provide a virtual environment generation service. At 13204, access to a branding customization portal is provided, and at 13206, customization parameters for the virtual environment generation service are received. At 13208, a customer request is received to access the virtual environment generation service, and at 13210, the customization parameters for the virtual environment generation service are incorporated to a customer portal display prior to the first entity providing the customer portal display, where the customization parameters incorporate brand features of the second entity in the customer portal display that is provided by the first entity.

While certain examples have been used to disclose and illustrate one or more embodiments of the invention, including the best mode, and also to enable any person skilled in the art to make and use the invention, the patentable scope of the invention is defined by the claims, and may include other examples that occur to those skilled in the art.

It is further noted that the systems and methods disclosed herein may be implemented on various types of computer architectures, such as for example on a general purpose computer or workstation, or on a network (e.g., local area network, wide area network, or internet), or in a client-server configuration, or in an application service provider configuration. Also, the system's and method's data (such as hierarchical dimensional data) may be stored as one or more data structures in computer memory and/or storage depending upon the application at hand. The systems and methods may be provided on many different types of computer readable media including instructions being executable by a computer to perform the system and method operations described herein. The systems and methods may also have their information transmitted via data signals embodied on carrier signals (e.g., radio frequency carrier signals) or other communication pathways (e.g., fiber optics, infrared, etc.).

The computer components, software modules, functions and data structures described herein may be connected directly or indirectly to each other in order to allow the flow of data needed for their operations. It is also noted that a module includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The computer components may be located on a single computer or distributed across multiple computers depending upon the situation at hand.

It is claimed:

1. A computer-implemented method of provisioning virtual servers in a virtual environment having a virtualization control system coupled to a physical server, disk drive, and networking resources, where the virtualization control system is configured to partition physical resources into virtual resources including virtual processor, memory, and storage resources, the method comprising:
   receiving an identification of an operating system, a server name, a number of processors, a memory amount, and a disk storage amount;
   receiving an identification of a network on which a virtual server is to reside;
   provisioning the virtual server by provisioning a number of processors, an amount of memory, and an amount of storage resources based on the identified number of processors, the identified memory amount, and the identified disk storage amount;
   deploying the provisioned virtual server;
   monitoring resource usage of a virtual environment comprising the virtual server;
   detecting resource usage of virtual servers in the virtual environment exceeding processing resources, memory amount, or disk storage amount allocated to the virtual environment;
   determining whether burst resource usage mode is enabled for the virtual environment;
   receiving a request to enable burst usage mode for the virtual environment;
   providing a display identifying cost data regarding costs that will be incurred should burst usage mode be activated;
   receiving a confirmation of the request to enable burst usage mode;
   enabling burst usage mode for the virtual environment; and
   provisioning additional resources for the virtual servers in the virtual environment based on the burst resource usage mode being enabled for the virtual environment.

2. The method of claim 1, further comprising:
   receiving an identification of a logical row and a logical group for the provisioned virtual server; and
   providing a virtual server organization display, wherein the virtual server organization display depicts the provisioned virtual server in the identified logical row and the identified logical group with any other virtual servers associated with the identified logical row and the identified logical group.

3. The method of claim 1, further comprising:
   mounting a utility image onto the virtual server.

4. The method of claim 3,
   wherein the utility image comprises an operating system.

5. The method of claim 3,
   wherein the utility image comprises a system utility application.

6. The method of claim 3, wherein mounting the utility image onto the virtual server comprises:
   receiving an identification of an image file comprising the utility image to be mounted onto the virtual server;
   receiving a command to mount the utility image onto the virtual server; and
   mounting the utility image onto the virtual server.

7. The method of claim 6,
   wherein the image file is a .iso file.

8. The method of claim 6, further comprising
   updating a database comprising configuration data for a plurality of virtual servers to reflect the mounting of the utility image onto the virtual server.

9. The method of claim 8,
   wherein updating the database occurs after receiving a Ctl+Alt+Delete command.

10. The method of claim 9,
    wherein the Ctl+Alt+Delete command is initiated via a button click.

11. The method of claim 1, further comprising:
    receiving a copy server command requesting contents of a source virtual server be replicated on the provisioned virtual server.

12. The method of claim 11, further comprising
    copying the contents of the source virtual server to the provisioned virtual server, based on receiving the copy server command,
    wherein copying the contents of the source virtual server to the provisioned virtual server comprises:
    duplicating the contents of the source virtual server on the provisioned virtual server;
    associating the provisioned virtual server with an identified network;
    associating the provisioned virtual server with an identified IP address;
    associating the provisioned virtual server with a logical row and a logical group; and
    providing a virtual server organization display, wherein the virtual server organization display depicts the provisioned virtual server in the logical row and the logical group with any other virtual servers associated with the identified logical row and the identified logical group.

13. The method of claim 1,
    wherein a burst resource usage mode is able to be enabled for processors, memory, and disk storage individually.

14. The method of claim 13,
    wherein when resource usage of the virtual environment exceeds the requested amount of processing resources and burst resource usage mode is enabled for processors, then additional processing resources are provisioned for the virtual environment;
    wherein when resource usage of the virtual environment exceeds the requested memory amount and burst resource usage mode is enabled for memory, then additional memory is provisioned for the virtual environment; and wherein when resource usage of the virtual environment exceeds the requested disk storage and burst resource usage mode is enabled for disk storage, then additional disk storage is provisioned for the virtual environment.

15. The method of claim 1, wherein provisioning additional resources for the virtual environment comprises:
identifying an amount of needed additional resources based on the detected resource usage of the virtual servers exceeding an allocated amount of processing resources, memory amount, or disk storage amount;
identifying an amount of resources available in a free for all resource pool; and
provisioning the amount of needed additional resources to the virtual environment if the amount of resources available exceeds the amount of needed additional resources.

16. The method of claim 15,
wherein the amount of needed additional resources is not provisioned to the virtual environment if the amount of resources available is less than the amount of needed additional resources.

17. The method of claim 15,
wherein the amount of resources available in the free for all resource pool is provisioned to the virtual environment if the amount of resources available is less than the amount of needed additional resources.

18. The method of claim 15,
wherein the amount of resources available in the free for all resource pool is determined based on a total processing capacity, a total memory, and a total disk storage available for all virtual environments and the total virtual processors, virtual memory, and virtual disk storage requested or used by all virtual servers in all virtual environments.

19. The method of claim 18,
wherein the amount of resources available in the free for all resource pool is an amount of free physical resources that can be provisioned to requesting virtual environments while guaranteeing a virtual environment specific requested amount of processing capacity, requested memory amount, and requested disk storage amount for each virtual server in a utility computing platform.

20. The method of claim 1, further comprising:
tracking burst resource usage for the virtual environment.

21. The method of claim 20, further comprising:
billing based on the tracked burst resource usage for the virtual environment.

22. The method of claim 21, further comprising:
displaying tracked burst resource usage for the virtual environment for a period of past time.

23. The method of claim 22, further comprising:
displaying incurred costs based on tracked burst resource usage for the virtual environment for the period of past time.

24. A computer-implemented system for provisioning virtual servers in a virtual environment having a virtualization control system coupled to a physical server, disk drive, and networking resources, where the virtualization control system is configured to partition physical resources into virtual resources including virtual processor, memory, and storage resources, the system comprising:
a hardware data processor;
a computer-readable memory encoded with instructions for commanding the data processor to:
receive an identification of an operating system, a server name, a number of processors, a memory amount, and a disk storage amount;
receive an identification of a network on which a virtual server is to reside;
provision the virtual server by provisioning a number of processors, an amount of memory, and an amount of storage resources based on the identified number of processors, the identified memory amount, and the identified disk storage amount;
deploy the provisioned virtual server;
monitor resource usage of a virtual environment comprising the virtual server;
detect resource usage of virtual servers in the virtual environment exceeding processing resources, memory amount, or disk storage amount allocated to the virtual environment;
determine whether burst resource usage mode is enabled for the virtual environment;
receive a request to enable burst usage mode for the virtual environment;
provide a display identifying cost data regarding costs that will be incurred should burst usage mode be activated;
receive a confirmation of the request to enable burst usage mode; and
enable burst usage mode for the virtual environment; and
provision additional resources for the virtual servers in the virtual environment based on the burst resource usage mode being enabled for the virtual environment.

25. The system of claim 24, wherein the instructions further command the data processor to:
receive an identification of a logical row and a logical group for the provisioned virtual server; and
provide a virtual server organization display, wherein the virtual server organization display depicts the provisioned virtual server in the identified logical row and the identified logical group with any other virtual servers associated with the identified logical row and the identified logical group.

26. The system of claim 24,
wherein the instructions further command the data processor to mount a utility image onto the virtual server.

27. The system of claim 26,
wherein the utility image comprises an operating system.

28. The system of claim 26,
wherein the utility image comprises a system utility application.

29. The system of claim 26, wherein mounting the utility image onto the virtual server comprises:
receiving an identification of an image file comprising the utility image to be mounted onto the virtual server;
receiving a command to mount the utility image onto the virtual server; and
mounting the utility image onto the virtual server.

30. The system of claim 29,
wherein the image file is a .iso file.

31. The system of claim 29,
wherein the instructions further command the data processor to update a database comprising configuration data for a plurality of virtual servers to reflect the mounting of the utility image onto the virtual server.

32. The system of claim 31,
wherein updating the database occurs after receiving a Ctl+Alt+Delete command.

33. The system of claim 32,
wherein the Ctl+Alt+Delete command is initiated via a button click.

34. The system of claim 24,
wherein the instructions further command the data processor to receive a copy server command requesting contents of a source virtual server be replicated on the provisioned virtual server.

35. The system of claim 34, wherein the instructions further command the data processor to copy the contents of the source virtual server to the provisioned virtual server based on receiving the copy server command, wherein copying the contents of the source virtual server to the provisioned virtual server comprises:
   duplicating the contents of the source virtual server on the provisioned virtual server;
   associating the provisioned virtual server with an identified network;
   associating the provisioned virtual server with an identified IP address;
   associating the provisioned virtual server with a logical row and a logical group; and
   providing a virtual server organization display, wherein the virtual server organization display depicts the provisioned virtual server in the logical row and the logical group with any other virtual servers associated with the identified logical row and the identified logical group.

36. The system of claim 24,
wherein a burst resource usage mode is able to be enabled for processors, memory, and disk storage individually.

37. The system of claim 36,
wherein when resource usage of the virtual environment exceeds the requested amount of processing resources and burst resource usage mode is enabled for processors, then additional processing resources are provisioned for the virtual environment;
wherein when resource usage of the virtual environment exceeds the requested memory amount and burst resource usage mode is enabled for memory, then additional memory is provisioned for the virtual environment;
wherein when resource usage of the virtual environment exceeds the requested disk storage and burst resource usage mode is enabled for disk storage, then additional disk storage is provisioned for the virtual environment.

38. The system of claim 24, wherein provisioning additional resources for the virtual environment comprises:
   identifying an amount of needed additional resources based on the detected resource usage of the virtual servers exceeding an allocated amount of processing resources, memory amount, or disk storage amount;
   identifying an amount of resources available in a free for all resource pool; and
   provisioning the amount of needed additional resources to the virtual environment if the amount of resources available exceeds the amount of needed additional resources.

39. The system of claim 38,
wherein the amount of needed additional resources is not provisioned to the virtual environment if the amount of resources available is less than the amount of needed additional resources.

40. The system of claim 38,
wherein the amount of resources available in the free for all resource pool is provisioned to the virtual environment if the amount of resources available is less than the amount of needed resources.

41. The system of claim 38,
wherein the amount of resources available in the free for all resource pool is determined based on a total processing capacity, a total memory, and a total disk storage available for all virtual environments and the total virtual processors, virtual memory, and virtual disk storage requested or used by all virtual servers in all virtual environments.

42. The system of claim 41,
wherein the amount of resources available in the free for all resource pool is an amount of free physical resources that can be provisioned to requesting virtual environments while guaranteeing a virtual environment specific requested amount of processing capacity, requested memory amount, and requested disk storage amount for each virtual server in a utility computing platform.

43. The system of claim 24,
wherein the instructions further command the data processor to track burst resource usage for the virtual environment.

44. The system of claim 43,
wherein the instructions further command the data processor to bill based on the tracked burst resource usage for the virtual environment.

45. The system of claim 44,
wherein the instructions further command the data processor to display tracked burst resource usage for the virtual environment for a period of past time.

46. The system of claim 45,
wherein the instructions further command the data processor to display incurred costs based on tracked burst resource usage for the virtual environment for the period of past time.

* * * * *